US007885981B2

(12) United States Patent
Kaufman et al.

(10) Patent No.: US 7,885,981 B2
(45) Date of Patent: Feb. 8, 2011

(54) SYSTEM AND METHOD FOR GENERATING AUTOMATIC USER INTERFACE FOR ARBITRARILY COMPLEX OR LARGE DATABASES

(75) Inventors: Michael Philip Kaufman, 77 E. 12th St., Suite 2FG, New York, NY (US) 10003; Micah Philip Silverman, Huntington Station, NY (US)

(73) Assignee: Michael Philip Kaufman, New York, NY (US)

(*) Notice: Subject to any disclaimer, the term of this patent is extended or adjusted under 35 U.S.C. 154(b) by 362 days.

(21) Appl. No.: 11/925,236

(22) Filed: Oct. 26, 2007

(65) Prior Publication Data

US 2008/0046462 A1 Feb. 21, 2008

Related U.S. Application Data

(63) Continuation of application No. 10/428,209, filed on Apr. 30, 2003, now Pat. No. 7,318,066, which is a continuation-in-part of application No. 09/703,267, filed on Oct. 31, 2000, now abandoned.

(51) Int. Cl.
*G06F 17/30* (2006.01)

(52) U.S. Cl. ........................ 707/802; 707/728; 707/912

(58) Field of Classification Search ..................... 707/4, 707/104.1, 713, 802, 704, 708, 728, 783, 707/912; 715/783; 717/113
See application file for complete search history.

(56) References Cited

U.S. PATENT DOCUMENTS 5,353,401 A * 10/1994 Iizawa et al. ................ 715/763
5,355,474 A * 10/1994 Thuraisngham et al. ........ 707/9
5,418,957 A * 5/1995 Narayan ..................... 717/113
5,495,567 A * 2/1996 Iizawa et al. ................ 715/762
5,499,371 A * 3/1996 Henninger et al. .......... 717/108
5,553,218 A * 9/1996 Li et al. ...................... 707/803
5,627,979 A * 5/1997 Chang et al. ................ 715/763
5,742,813 A * 4/1998 Kavanagh et al. .............. 707/8
5,778,356 A * 7/1998 Heiny ............................ 707/2
5,778,375 A * 7/1998 Hecht .......................... 707/101
5,835,910 A * 11/1998 Kavanagh et al. ....... 707/103 R
5,838,965 A * 11/1998 Kavanagh et al. ....... 707/103 R
5,873,093 A * 2/1999 Williamson et al. ..... 707/103 R
5,950,190 A * 9/1999 Yeager et al. .................. 707/3
5,970,490 A * 10/1999 Morgenstern ................ 707/10
6,016,394 A * 1/2000 Walker ....................... 717/104

(Continued)

*Primary Examiner*—Shahid A Alam
(74) *Attorney, Agent, or Firm*—Hughes Hubbard & Reed LLP; Ronald Abramson

(57) ABSTRACT

A software system automatically and dynamically generates a fully functional user interface (UI) based upon, and connected directly to, an underlying data model (as instantiated within a relational database management system (RDBMS)). The UI derives from an automated interrogation of the RDBMS, and comprises all mode displays (e.g., browse, search, edit, add) for all tables, and a full complement of mechanisms—integrated directly into the mode displays—for representing, navigating, and managing relationships across tables, regardless of the complexity of the underlying RDBMS schema. It utilizes a hierarchical "context stack" for suspending the working state of a particular table while "drilling down" to work with related-table information and return relevant changes to the base table. The embodiment further provides methods to enhance and extend the internal representation of table structures, constraints, relationships, and-special requirements ("business rules") for improved revelation of the schema structure through external interrogation.

6 Claims, 35 Drawing Sheets

U.S. PATENT DOCUMENTS

| | | | | |
|---|---|---|---|---|
| 6,035,300 | A * | 3/2000 | Cason et al. | 707/102 |
| 6,061,515 | A * | 5/2000 | Chang et al. | 717/114 |
| 6,199,068 | B1 * | 3/2001 | Carpenter | 707/100 |
| 6,275,824 | B1 * | 8/2001 | O'Flaherty et al. | 707/9 |
| 6,279,008 | B1 * | 8/2001 | Tung Ng et al. | 707/102 |
| 6,292,827 | B1 * | 9/2001 | Raz | 709/217 |
| 6,487,552 | B1 * | 11/2002 | Lei et al. | 707/4 |
| 6,591,272 | B1 * | 7/2003 | Williams | 707/802 |
| 2001/0034733 | A1 * | 10/2001 | Prompt et al. | 707/102 |
| 2001/0037331 | A1 * | 11/2001 | Lloyd | 707/4 |

* cited by examiner

SYSTEM AND METHOD FOR GENERATING AUTOMATIC USER INTERFACE FOR ARBITRARILY COMPLEX OR LARGE DATABASES

CROSS-REFERENCE TO RELATED APPLICATIONS

This application is a continuation of U.S. patent application Ser. No. 10/428,209 filed Apr. 30, 2003 (now issued as U.S. Pat. No. 7,318,066), which is a continuation of International Application No. PCT/US01/42867, filed Oct. 31, 2001, which claims priority to U.S. patent application Ser. No. 09/703,267, now abandoned, filed Oct. 31, 2000, and U.S. provisional patent application Ser. No. 60/276,385 filed Mar. 16, 2001.

COMPUTER PROGRAM LISTING

The computer program listing submitted on compact disc is hereby incorporated by reference. The compact disc contains the following directory structure:

| File Name and Path | Date of Creation | Size in Bytes |
|---|---|---|
| SchemaliVe/AddEditForm.jsp | 10/30/2001 | 36,431 |
| Schemalive/BalloonHelp.jsp | 10/30/2001 | 2,375 |
| Schemalive/Browse.jsp | 10/30/2001 | 42,376 |
| Schemalive/DataDictionary.jsp | 10/30/2001 | 1,501 |
| Schemalive/DoAddEdit.jsp | 10/30/2001 | 18,925 |
| Schemalive/DoViewGenerator.jsp | 10/30/2001 | 1,356 |
| Schemalive/Error500.jsp | 10/30/2001 | 3,670 |
| Schemalive/ExpiredSession.jsp | 10/30/2001 | 3,853 |
| Schemalive/OutOfSequence.jsp | 10/30/2001 | 4,306 |
| Schemalive/showSession.jsp | 10/30/2001 | 5,317 |
| Schemalive/common/EmptyParamCheck.jsp | 10/30/2001 | 592 |
| Schemalive/common/EntryPoints.jsp | 10/30/2001 | 319 |
| Schemalive/common/GlobalHeaderHTML.jsp | 10/30/2001 | 4,096 |
| Schemalive/common/GlobalHeaderJavascript.jsp | 10/30/2001 | 13,557 |
| Schemalive/common/GlobalHeaderVARS.jsp | 10/30/2001 | 952 |
| Schemalive/WEB-INF/web.xml | 10/30/2001 | 3,783 |
| Schemalive/WEB-INF/classes/Connection.properties | 10/30/2001 | 186 |
| Schemalive/WEB-INF/classes/common/Debug.java | 10/30/2001 | 1,591 |
| Schemalive/WEB-INF/classes/dbUtils/CustomCaps.java | 10/30/2001 | 552 |
| Schemalive/WEB-INF/classes/dbUtils/CustomDrillDown.java | 10/30/2001 | 1,218 |
| Schemalive/WEB-INF/classes/dbUtils/CustomDropDown.java | 10/30/2001 | 1,094 |
| Schemalive/WEB-INF/classes/dbUtils/CustomDropDownComponent.java | 10/30/2001 | 968 |
| Schemalive/WEB-INF/classes/dbUtils/DataDictionary.java | 10/30/2001 | 8,892 |
| Schemalive/WEB-INF/classes/dbUtils/DataDictionaryServlet.java | 10/30/2001 | 6,864 |
| Schemalive/WEB-INF/classes/dbUtils/DataDictionaryTD.java | 10/30/2001 | 11,537 |
| Schemalive/WEB-INF/classes/dbUtils/MasterDetail.java | 10/30/2001 | 2,537 |
| Schemalive/WEB-INF/classes/dbUtils/MasterDetailServlet.java | 10/30/2001 | 3,922 |
| Schemalive/WEB-INF/classes/dbUtils/SQLUtil.java | 10/30/2001 | 3,390 |
| Schemalive/WEB-INF/classes/dbUtils/TableDescriptor.java | 10/30/2001 | 21,728 |
| Schemalive/WEB-INF/classes/dbUtils.ViewGenerator.java | 10/30/2001 | 21,979 |
| Schemalive/WEB-INF/classes/HTMLUtils/Balloon.java | 10/30/2001 | 1,325 |
| Schemalive/WEB-INF/classes/HTMLUtils/BalloonHelp.java | 10/30/2001 | 5,264 |
| Schemalive/WEB-INF/classes/HTMLUtils/TableDescriptorDisplay.java | 10/30/2001 | 41,339 |

-continued

| File Name and Path | Date of Creation | Size in Bytes |
|---|---|---|
| Schemalive/WEB-INF/classes/sessionUtils/ManageSession.java | 10/30/2001 | 1,319 |
| Schemalive/WEB-INF/classes/sessionUtils/StackElement.java | 10/30/2001 | 5,045 |
| Schemalive/WEB-INF/classes/sessionUtils/StackTag.java | 10/30/2001 | 8,732 |
| Schemalive/WEB-INF/classes/sessionUtils/StackTagExtraInfo.java | 10/30/2001 | 581 |
| Schemalive/WEB-INF/classes/tagUtils/ViewTag.java | 10/30/2001 | 2,461 |
| Schemalive/WEB-INF/classes/tagUtils/ViewTagExtraInfo.java | 10/30/2001 | 785 |
| Schemalive/WEB-INF/taglib/stack.tld | 10/30/2001 | 1,219 |
| Schemalive/WEB-INF/taglib/view.tld | 10/30/2001 | 922 |
| SQL/CreateSchema.sql | 10/30/2001 | 32,698 |

BACKGROUND OF THE INVENTION

1. Field of the Invention

The present invention relates to the field of data processing, and more particularly to relational computer databases, and to systems and methods for automatically generating without any custom programming a user interface for the database, and/or a complete application utilizing the database.

2. Description of the Related Art

Modern databases—and in particular, complex or large databases which serve many concurrent users—are constructed as "client/server" or "n-tier" (client/server/server) systems, wherein specialized components perform separate (and carefully delineated) functions. At a minimum, such systems are generally composed of a "back-end" relational database management system (RDBMS)—which maintains and manipulates information according to requests submitted by other components or software processes (or expert human administrators) via open-standard query languages (i.e., SQL)—and a "front-end" presentation layer or user interface, which mediates the end-users' work with the back-end data.

Developing such a database system consists both in defining the organizational structure to be used by the back-end for storing data (that is, the complement of tables which store data, and the relational links between these tables)—known as a "schema" or "data model"—and in building a front-end program (or "application") via which end-users can manipulate this data (and which communicates with the back-end on the users' behalf). And although the back- and front-end components must be closely synchronized and reflect similar structures, these respective development efforts are typically rather separate—with the requisite synchronization and parallels in structuring being effected only manually.

Moreover, the construction of front-end applications is generally undertaken using conventional third- or fourth-generation computer languages, which require by-hand coding at a very low level of functionality. Current tools for easing the development burden are limited to fairly specific (and, still, fairly low-level) uses—among them, providing more-sophisticated or "richer" controls for manipulating individual data elements; associating individual user-interface elements with specific back-end storage locations; or—at best—offering "form generator" or "wizard" facilities to automatically generate the code for a simple UI display which manipulates a single underlying (back-end) data table.

Even with such tools, considerable work remains in building a complete, fully-functional UI for a back-end schema of any appreciable size or complexity—especially where industrial-grade performance and reliability is required. And as enterprise-scale data models continue to grow, the attendant explosion of manual-coding requirements quickly becomes unwieldy—and eventually, untenable.

BRIEF SUMMARY OF THE INVENTION

It is an object of the invention to provide a complete and fully functional user interface (UI) for any arbitrarily complex or large database schema, without any custom software programming.

It is another object of the invention that, once a back-end schema has been designed and constructed within the RDBMS, the system can automatically "interrogate" this schema, and "absorb" its structure into an internal cache (or, at the cost of real-time performance, the internal caching mechanism can be sidestepped).

It is a further object of the invention to present to end-users, for any arbitrarily complex or large database, a comprehensive application through which the back-end can be operated, and through which all conventional database activities—searching, listing, adding, editing—can be supported, across all base-tables comprising the schema.

It is yet a further object of the invention that the application so presented reveals (and enforces) the relational/hierarchical organization among the tables within the back-end via smoothly integrated UI mechanisms which are embedded directly into the base-table screen displays—providing a natural, powerful, and easy-to-use environment for managing complex data relationships and interactions.

One embodiment (the "reference implementation") of the present invention achieves these and other objects by providing a system, currently written in Java and JSP, which automatically and dynamically ("on-the-fly") generates (in HTML, Javascript, and HTTP/CGI code), a fully functional UI system, based upon, and connected directly to, the underlying data model (as instantiated within an Oracle8i SQL RDBMS). The UI is built based on an automated interrogation of the RDBMS, either as needed (on-the-fly) or by building an in-memory representation of the data model. The generated UI comprises all mode displays (e.g., browse, search, edit, and add) for all tables, and a full complement of mechanisms, integrated into the mode displays for representing, navigating, and managing relationships across tables. This embodiment has the capability of creating such a UI where the underlying RDBMS is complex and comprises a plurality of tables, constraints, and relationships. It utilizes a hierarchical "context stack" for maintaining (and suspending) the working state of a particular table (comprising selected record, display "mode", pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack. The embodiment provides a set of rules for traversing/navigating the context stack. It further provides naming conventions and annotational methods for enhancing and extending the representation of table structures, constraints, and relationships within the back-end so as to more fully support revelation of the schema structure through external interrogation.

BRIEF DESCRIPTION OF THE DRAWINGS

The following briefly describes the accompanying drawings.

In addition, the complete source code for the reference implementation, and scripts for creating the reference demonstration schema (and demonstrating the extended back-end annotational methods employed) are set forth in the annexed appendix.

DETAILED DESCRIPTION OF THE PREFERRED EMBODIMENT

The preferred embodiment of the invention, as illustrated in FIGS. 1 through 9E, corresponds in most respects to an implementation of the invention being developed under the trademark SCHEMALIVE™ which is herein referred to as the "reference implementation." The preferred embodiment is further represented substantially in full by the reference-implementation source code files, documentation and scripts in the appendices accompanying and incorporated by reference into this application, as further described in the text that follows. The preferred embodiment includes in addition some further developments which are herein described which have not as yet been rendered in the reference implementation.

Although the invention has been most specifically illustrated with a particular preferred embodiment, it should be understood that the invention concerns the principles by which such embodiment may be designed, and is by no means limited to the configuration shown.

Figure 1:
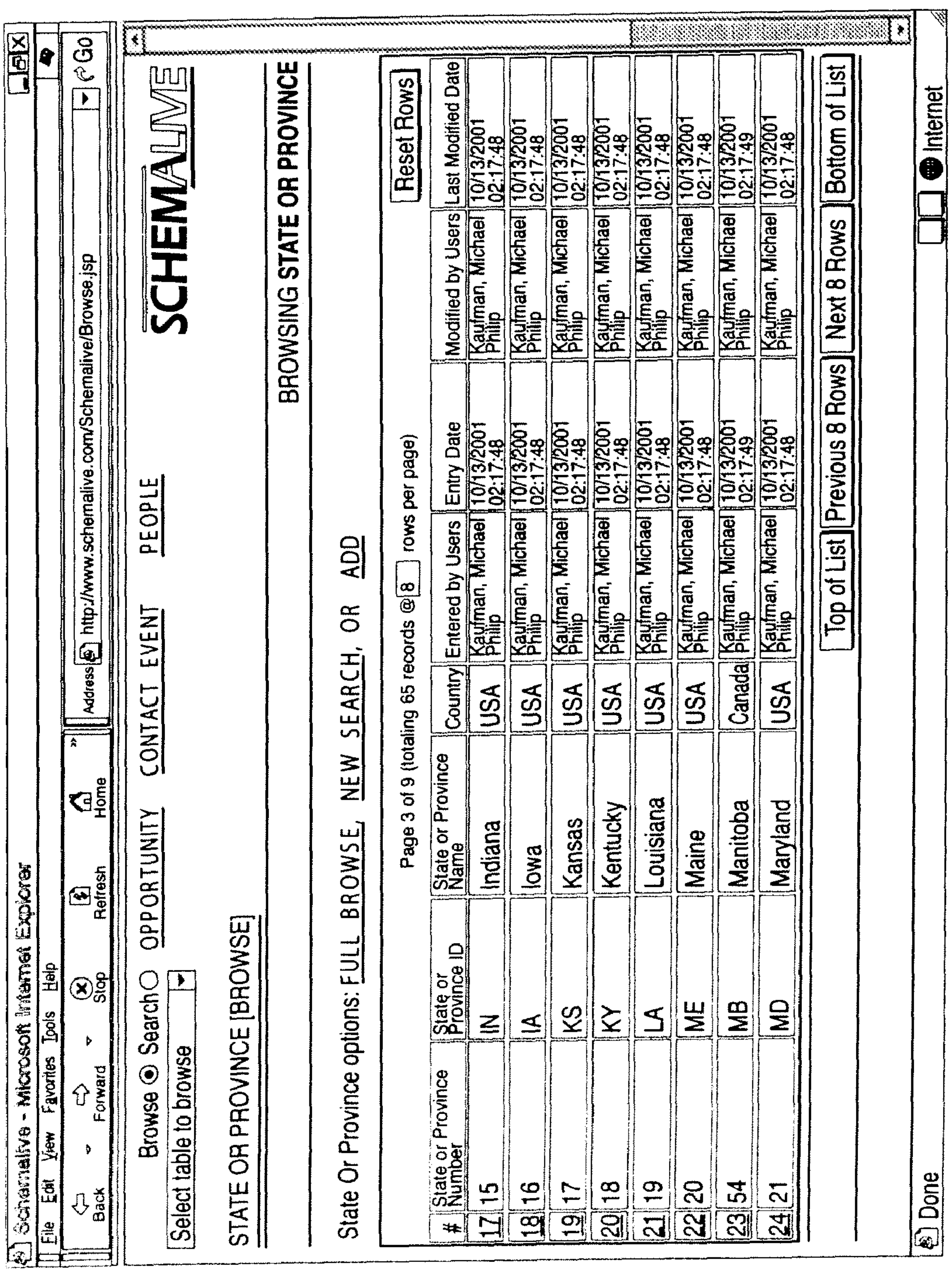
FIG. 1 is a normal "browse mode" display from the reference implementation.
Figure 2:
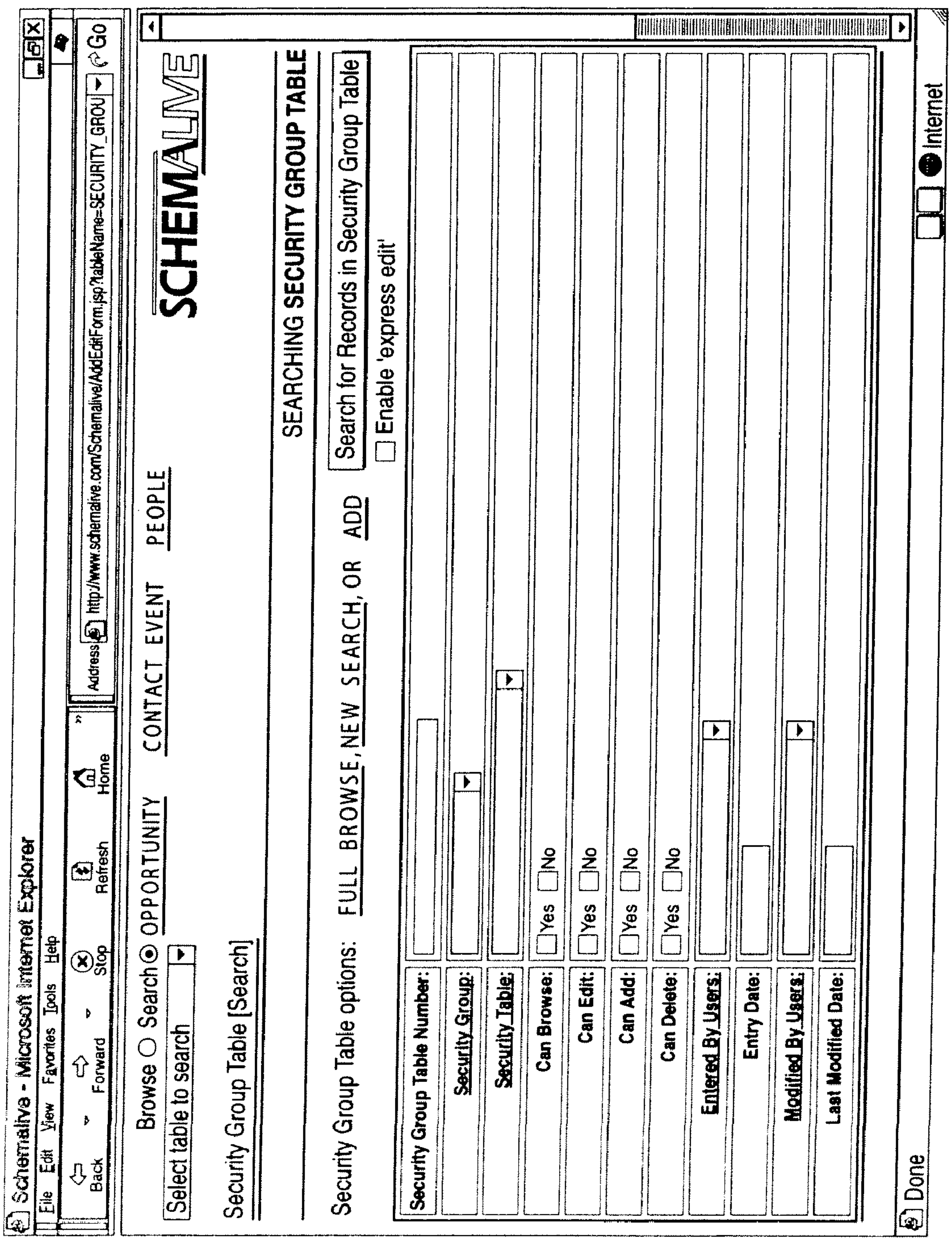
FIG. 2 is a normal "search mode" display from the reference implementation.
Figure 3:
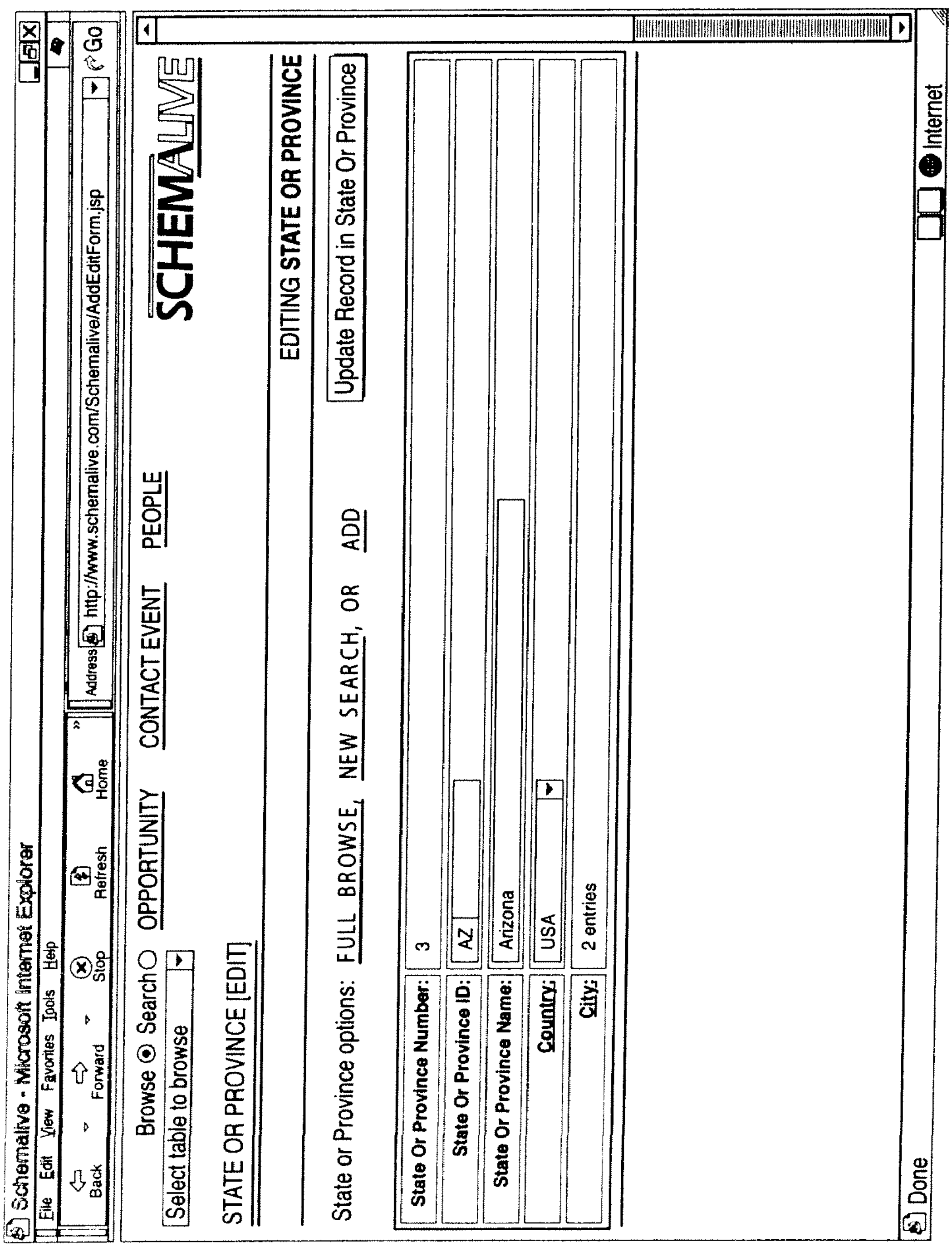
FIG. 3 is a normal "edit mode" display from the reference implementation.
Figure 4:
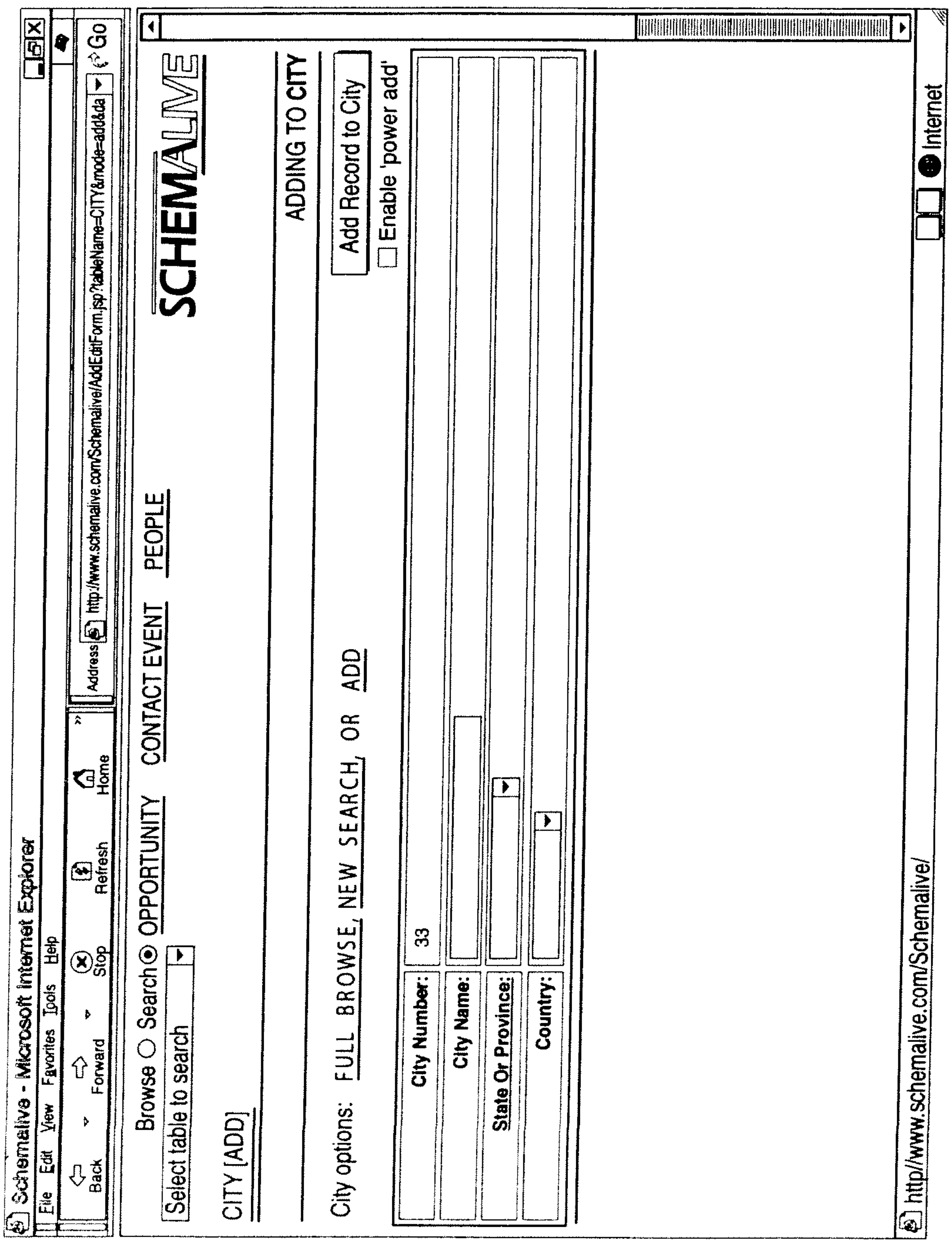
FIG. 4 is a normal "add mode" display from the reference implementation.
Figure 5A:
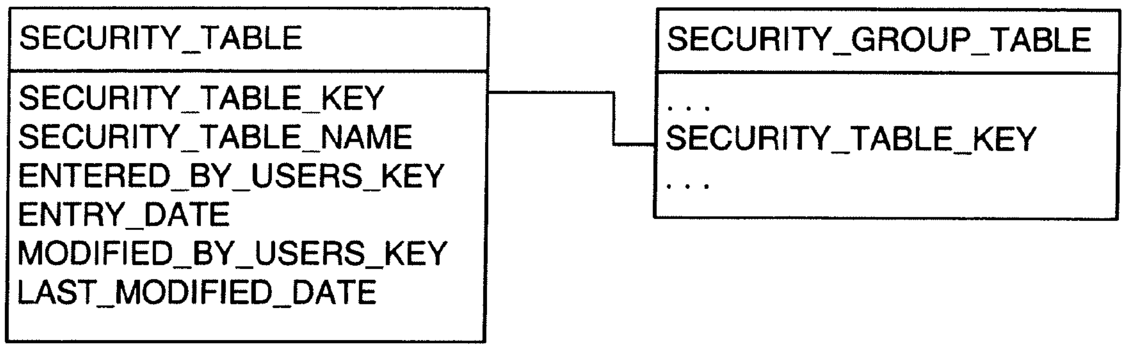
FIGS. 5A-5W is a diagram of the demonstration RDBMS schema from the reference implementation.
Figure 5B:
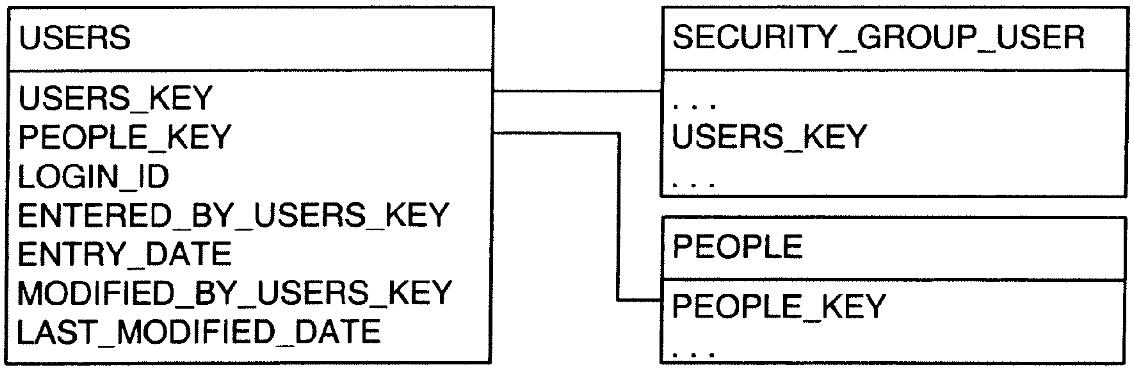
Figure 5C:
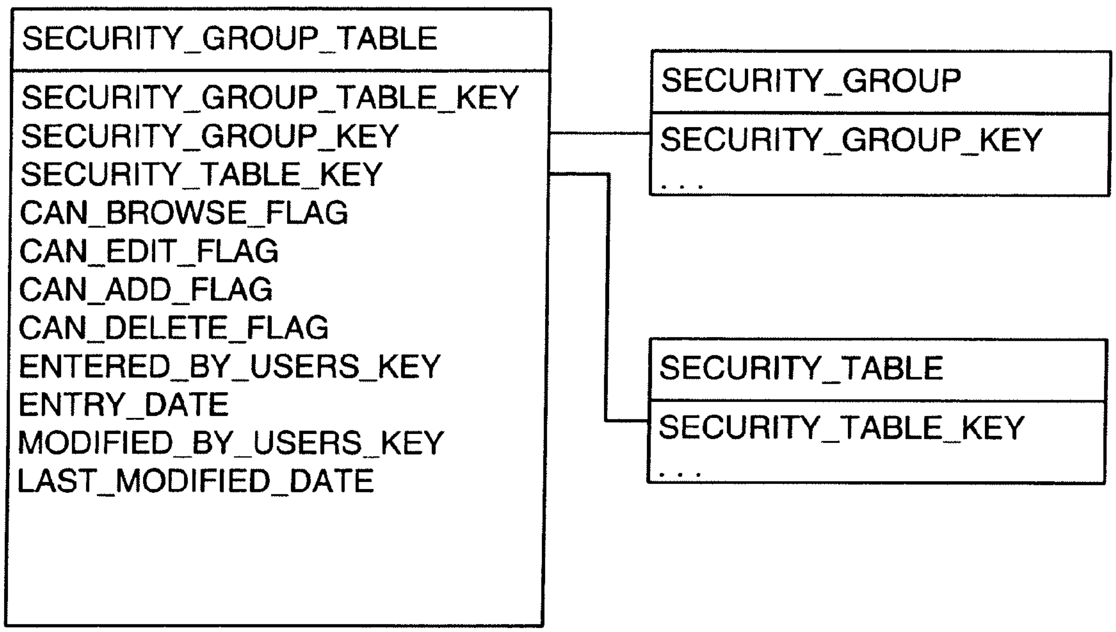
Figure 5D:
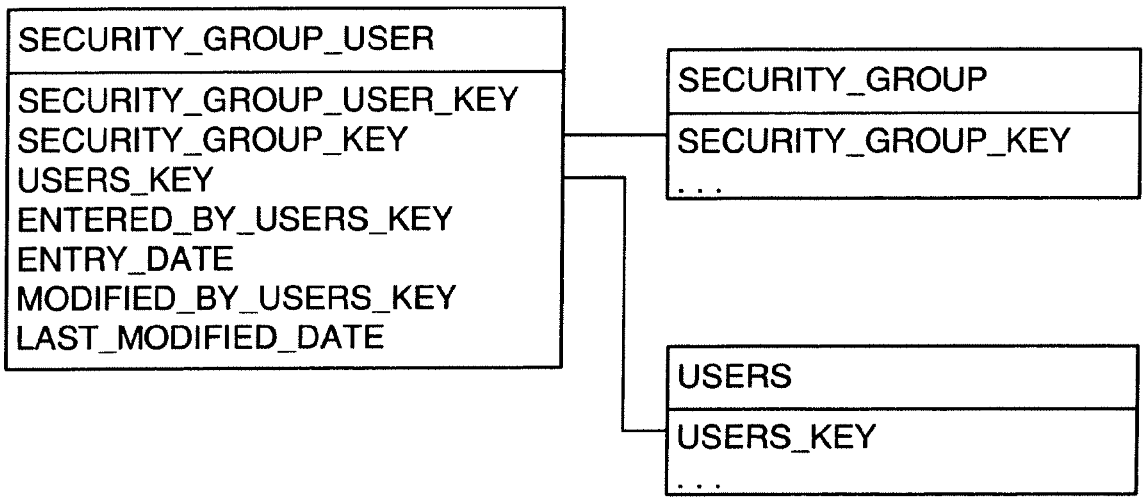
Figure 5E:
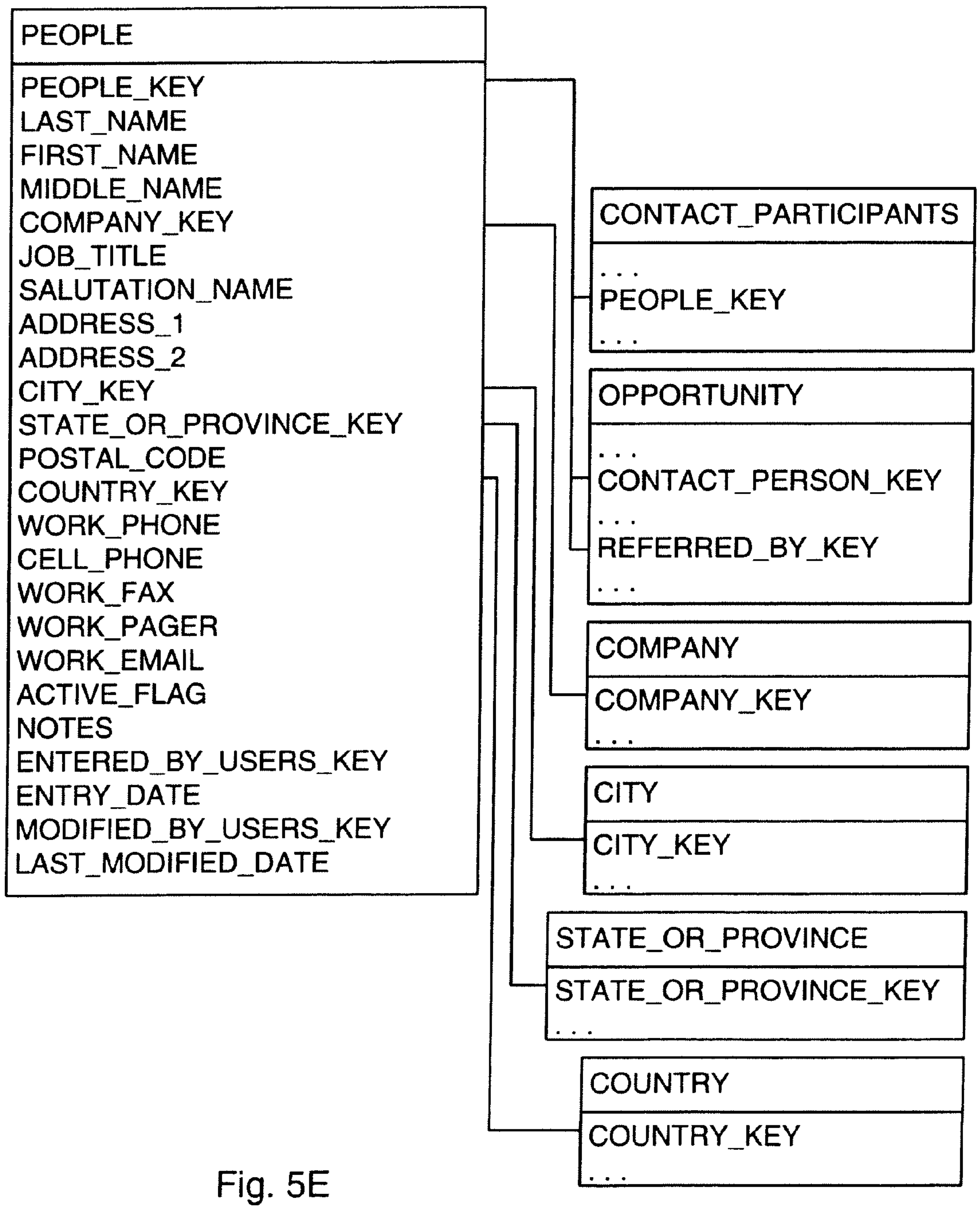
Figure 5F:
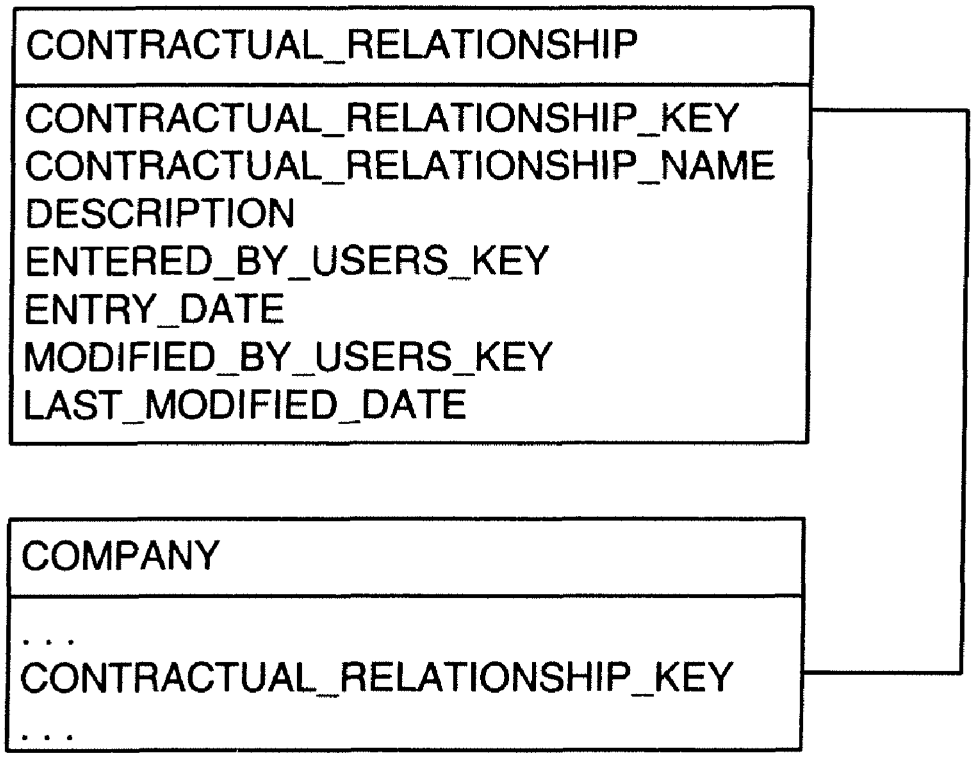
Figure 5G:
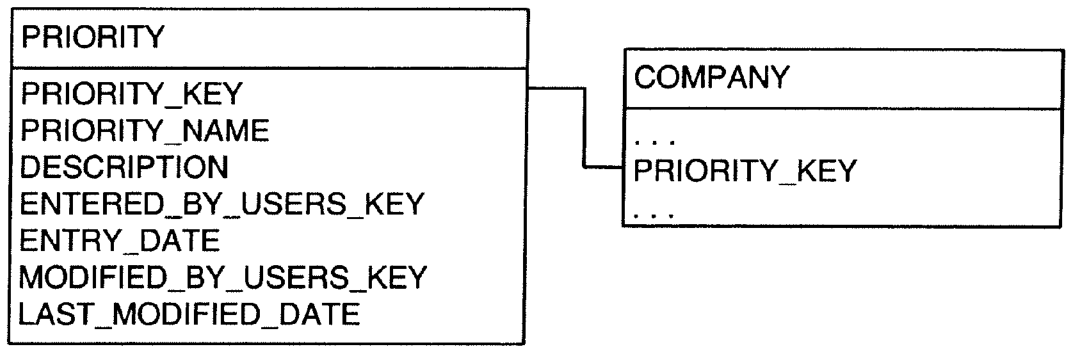
Figure 5H:
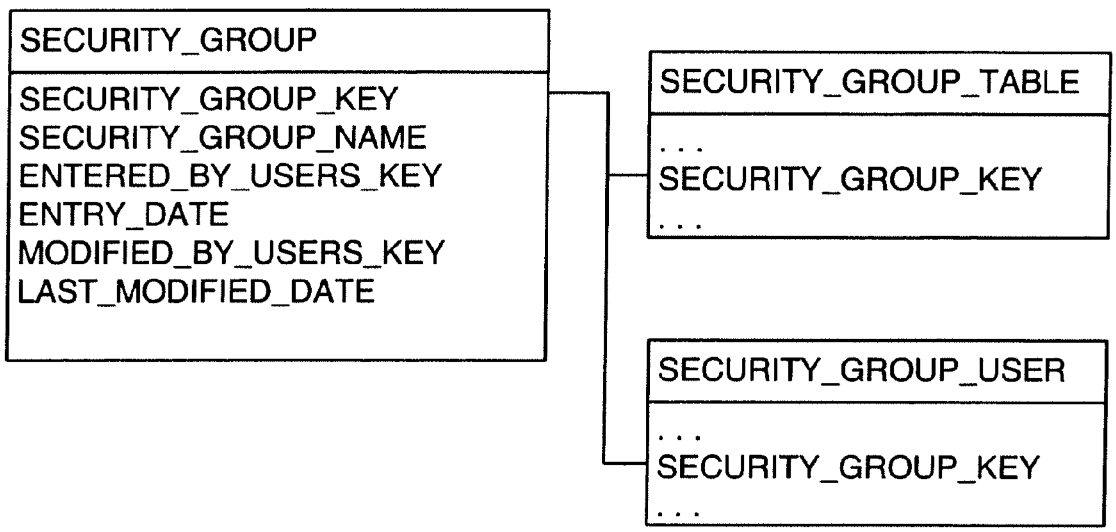
Figure 5I:
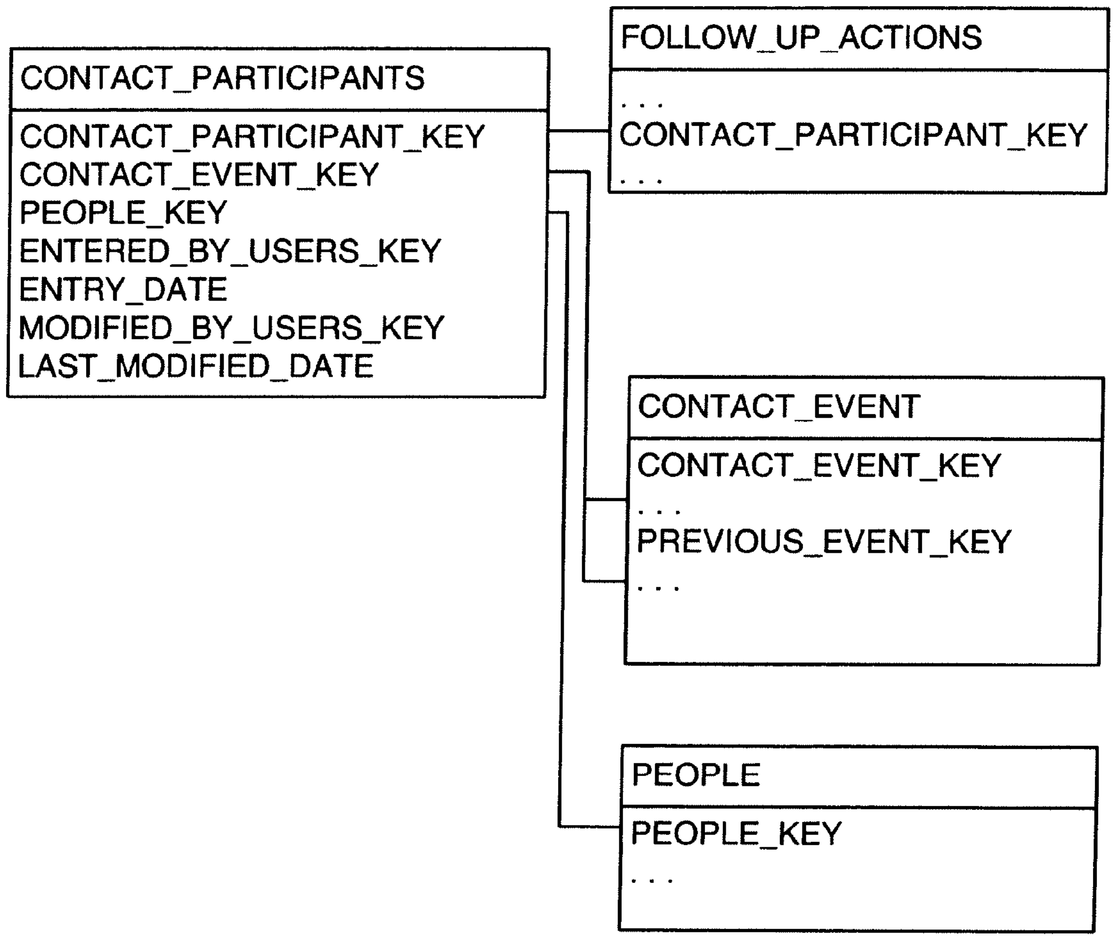
Figure 5J:
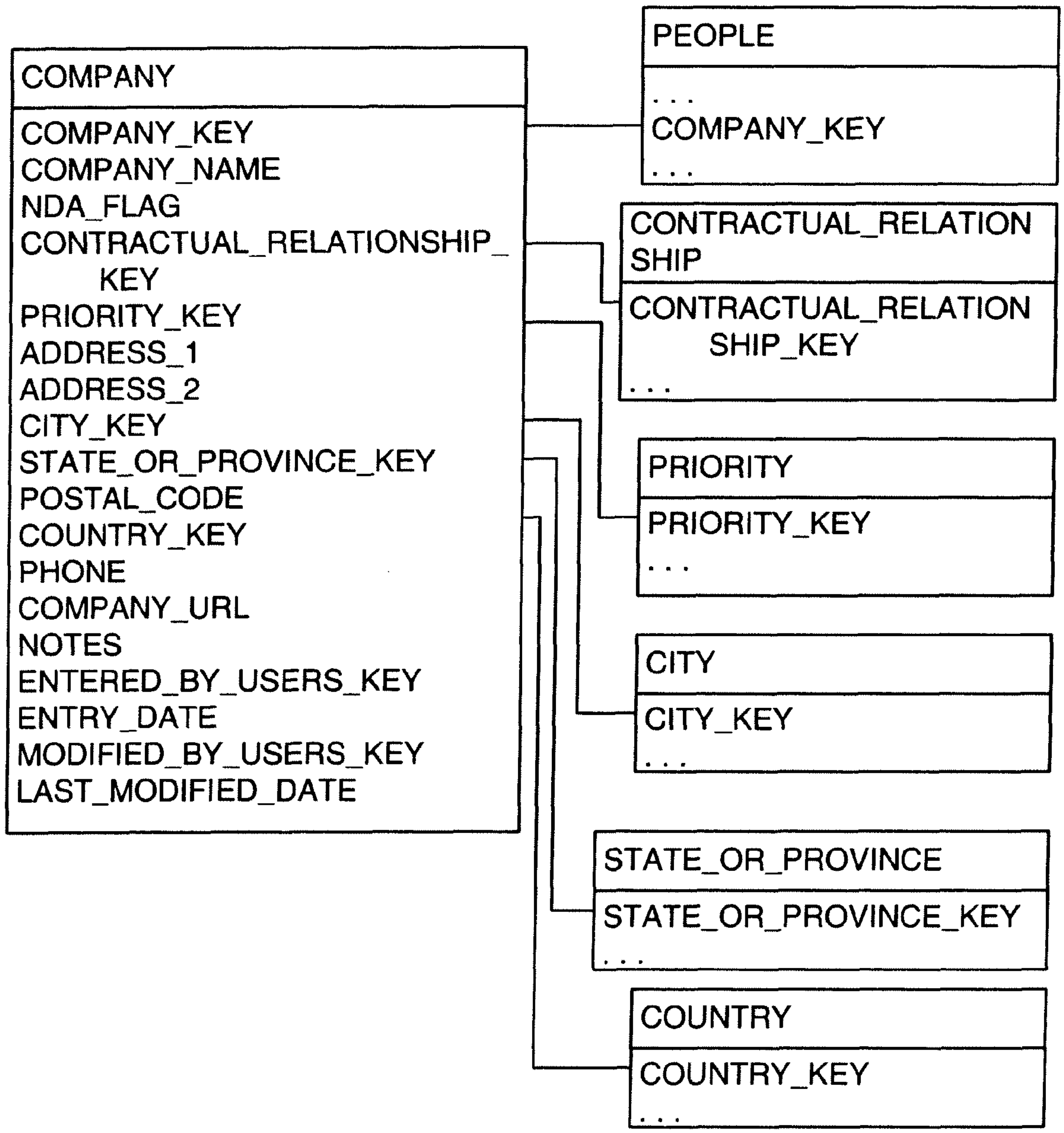
Figure 5K:
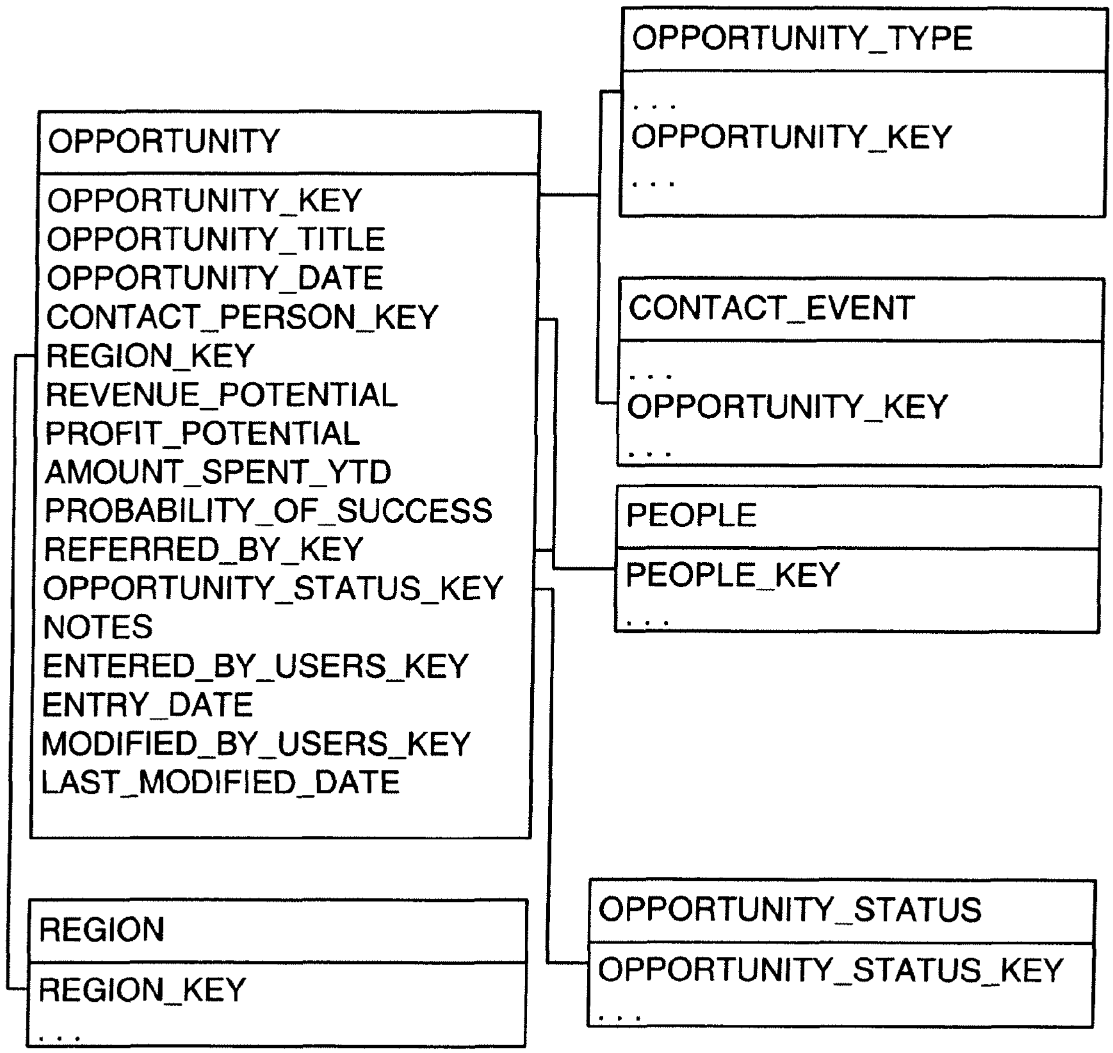
Figure 5L:
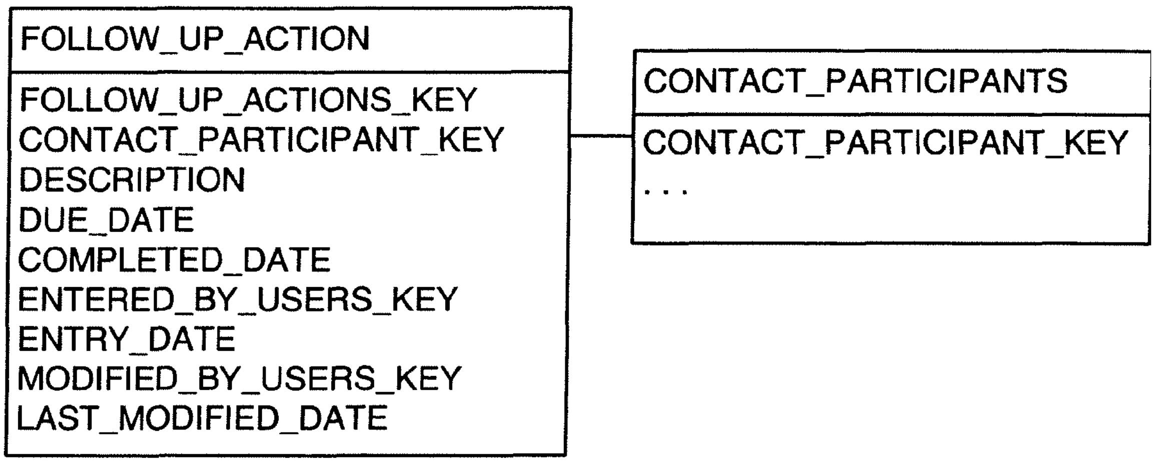
Figure 5M:
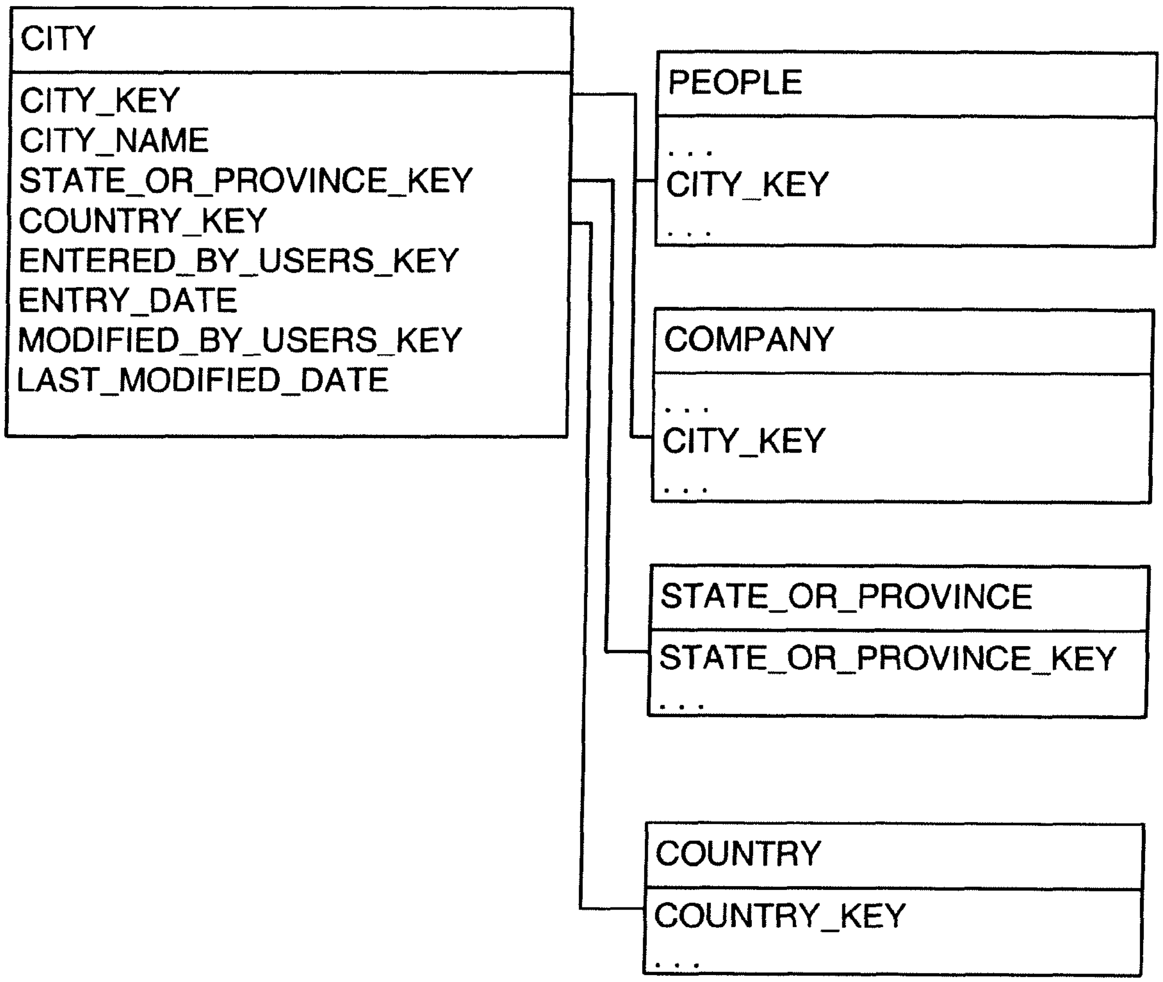
Figure 5:
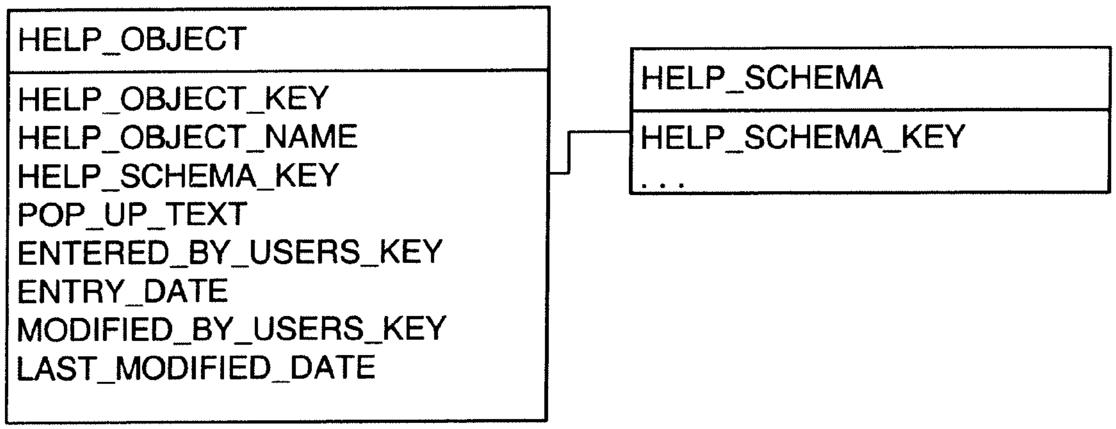
Figure 5O:
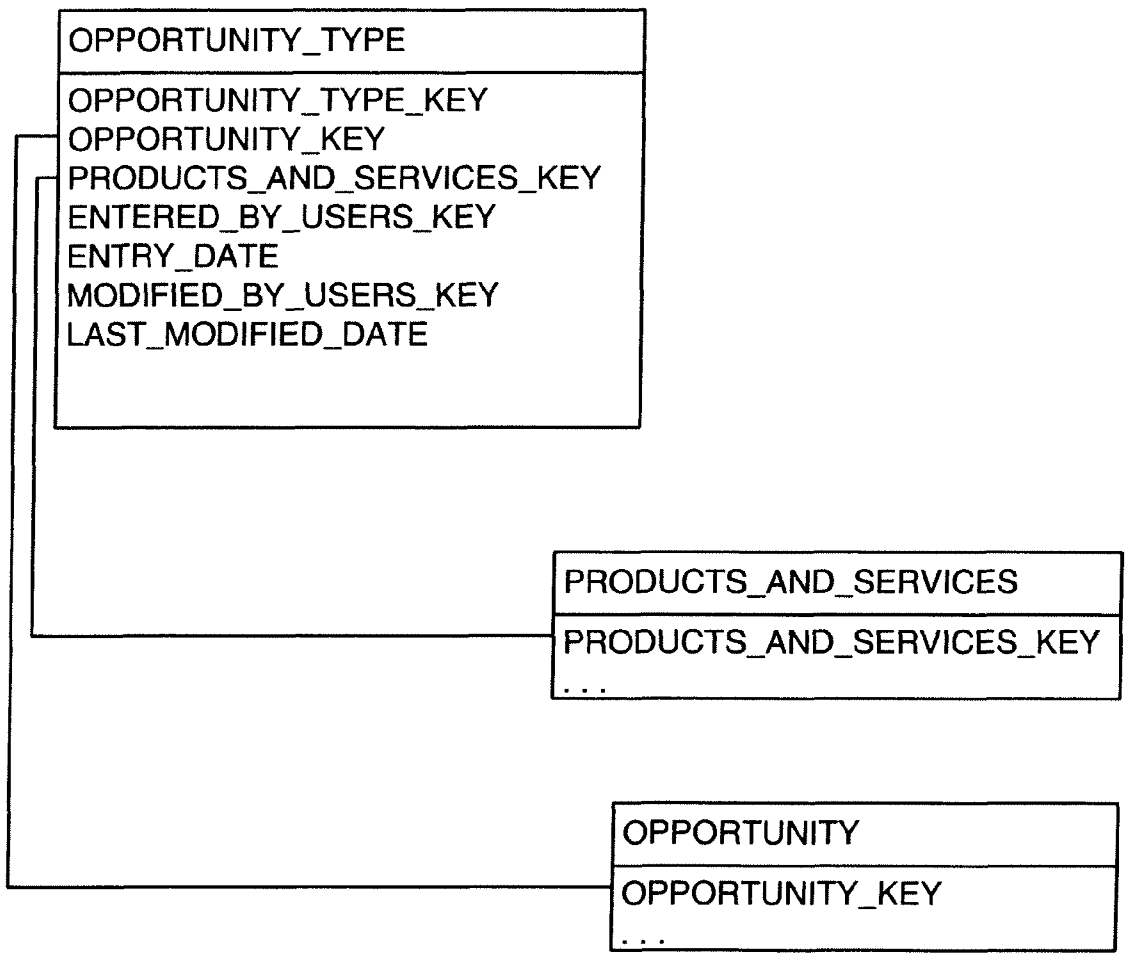
Figure 5P:
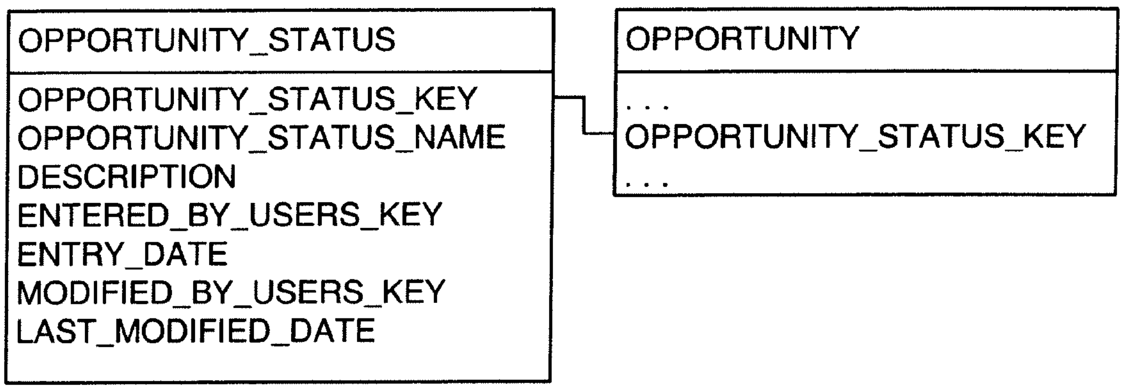
Figure 5Q:
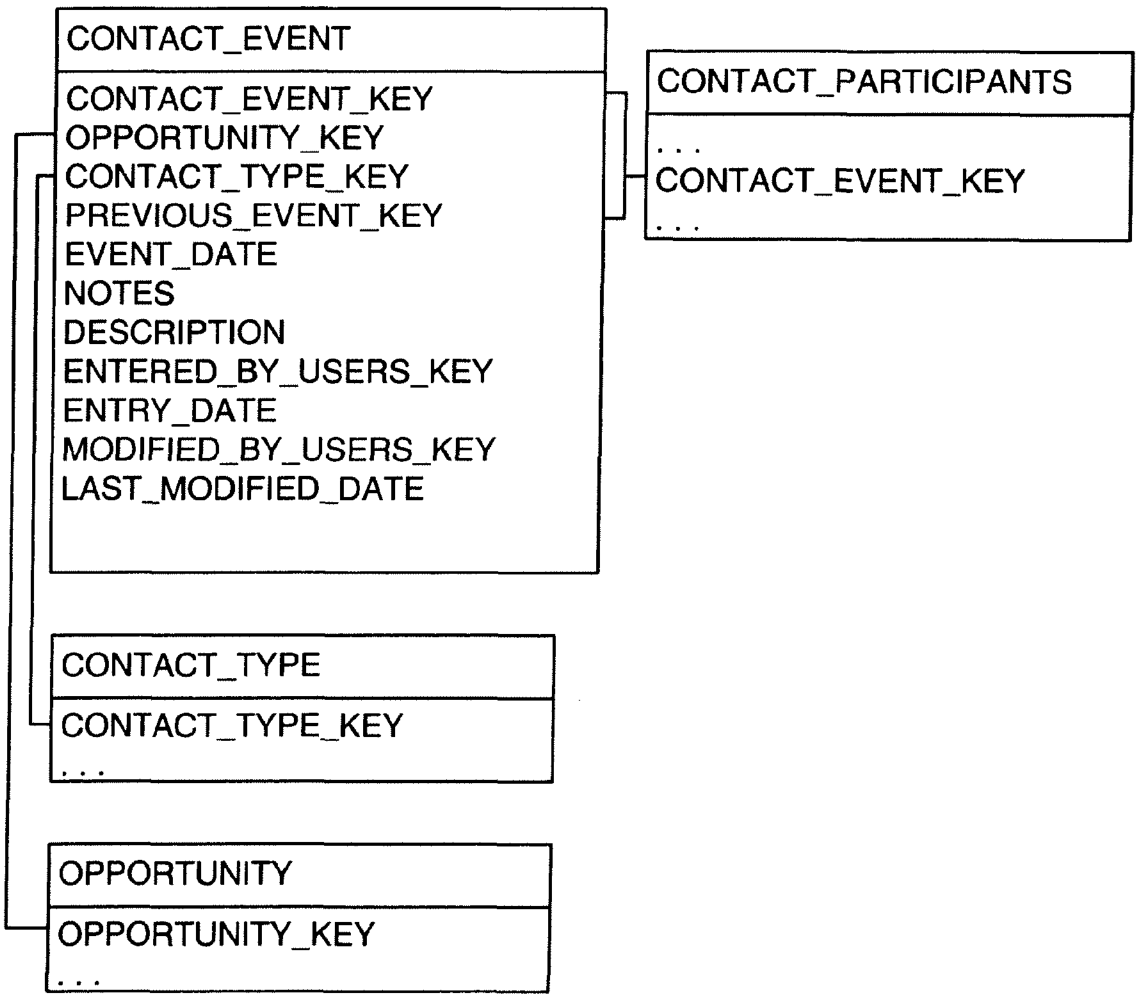
Figure 5R:
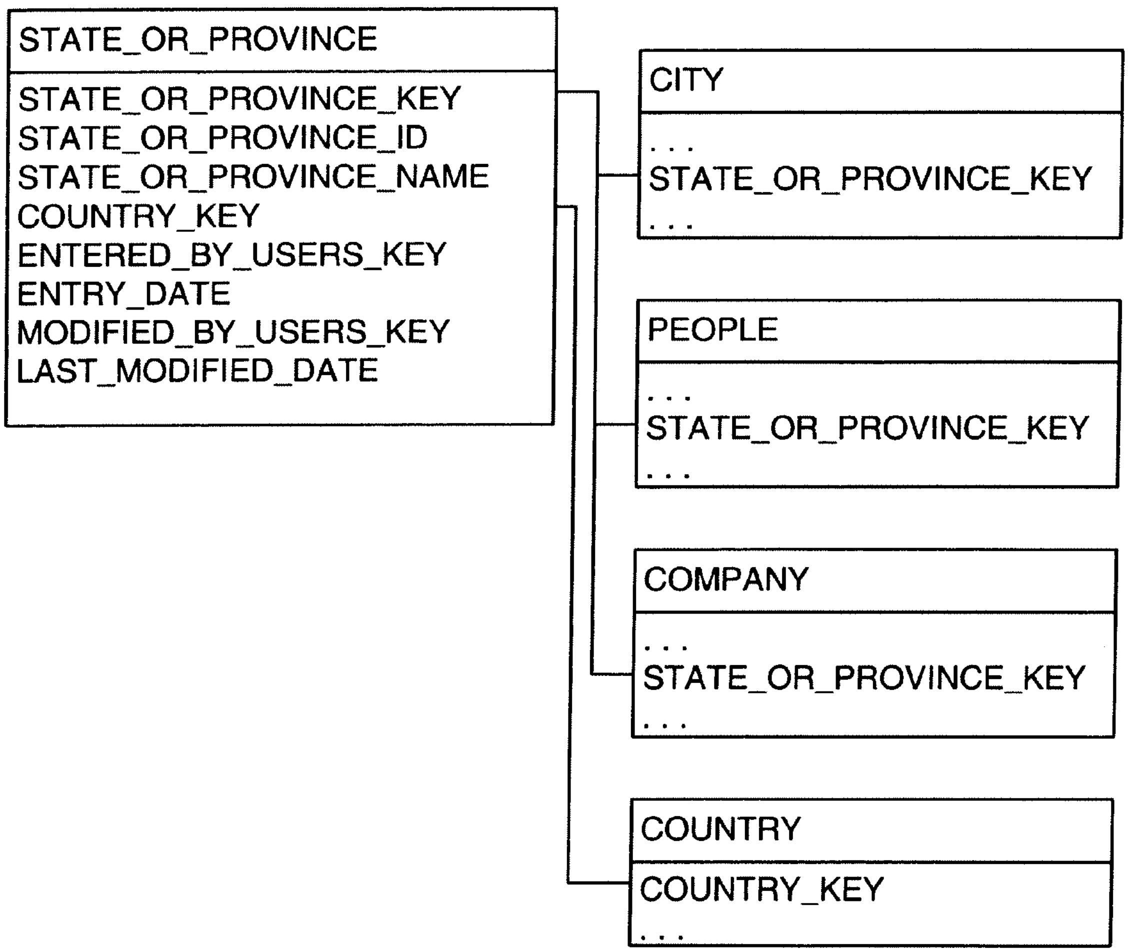
Figure 5S:
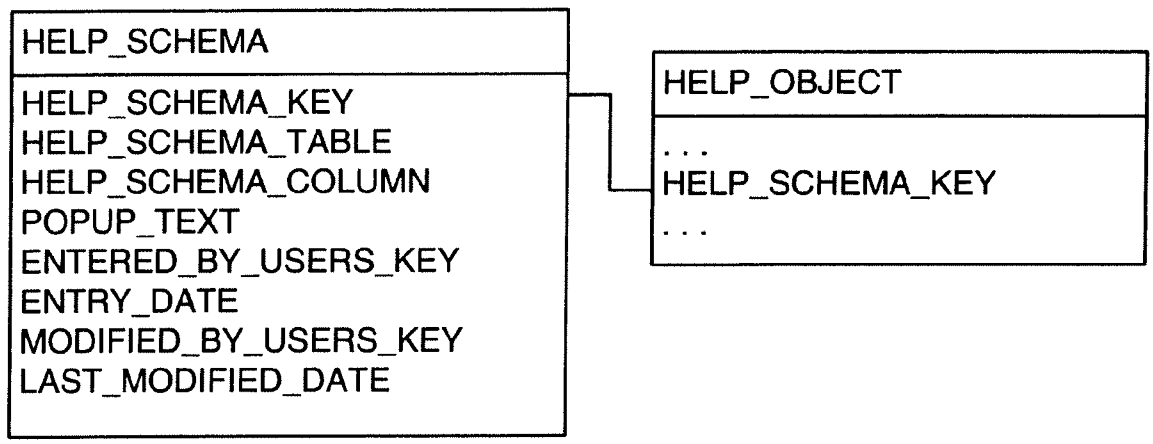
Figure 5T:
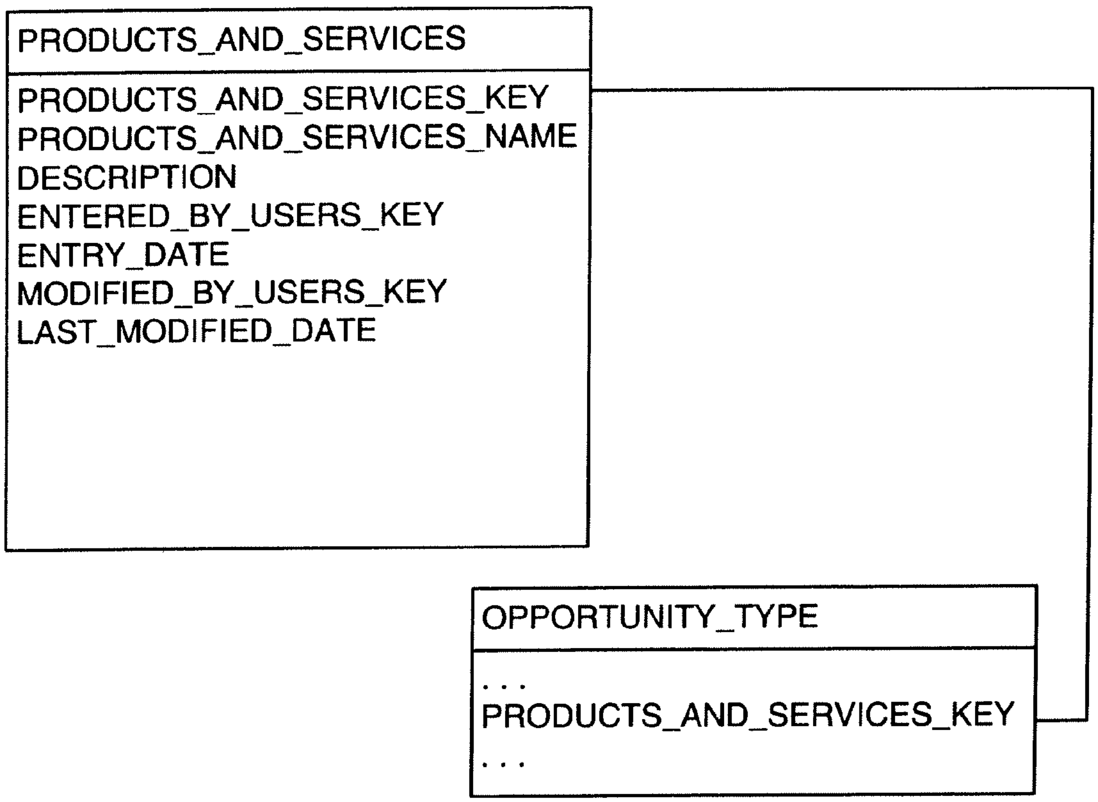
Figure 5U:
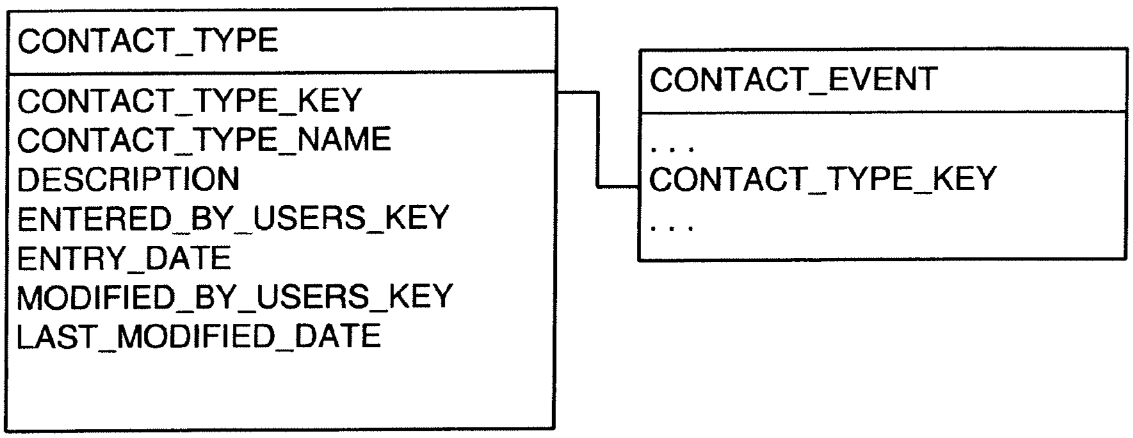
Figure 5V:
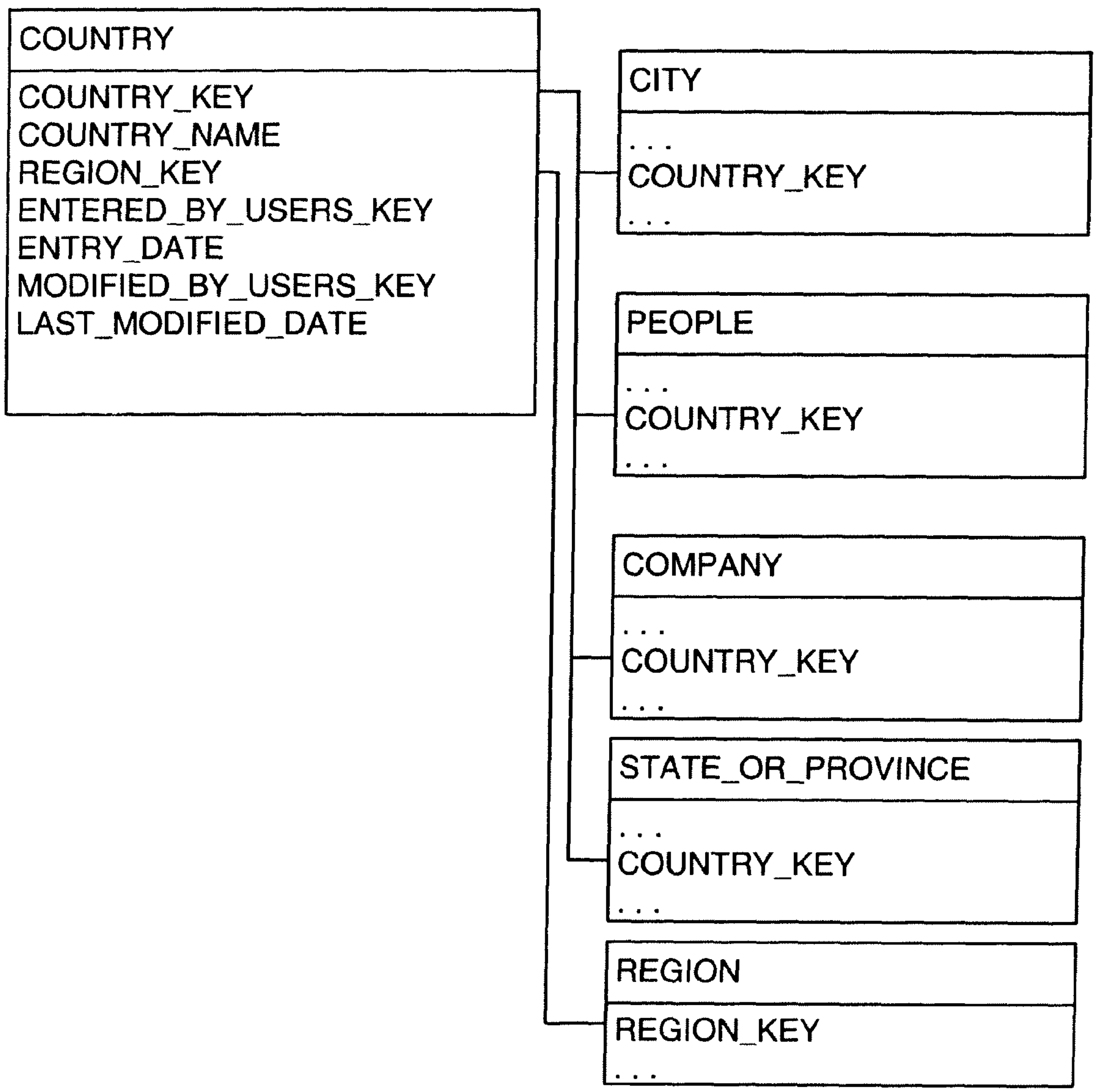
Figure 5W:
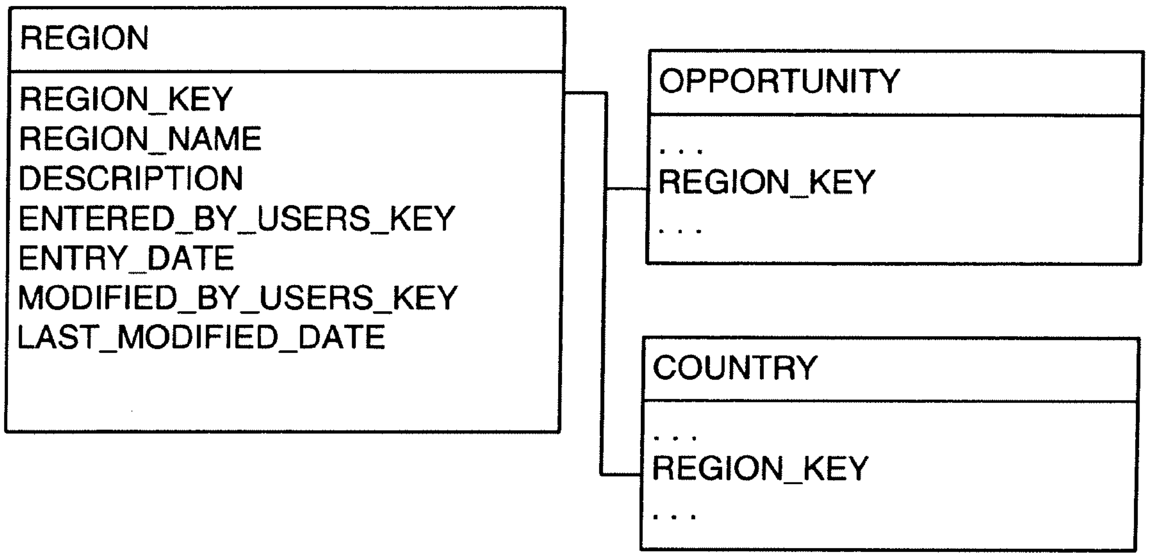

As can be more fully appreciated by studying the accompanying source code, the preferred embodiment operates in accordance with a comprehensive and formalized paradigm for presenting a(n end-)user interface to any arbitrarily large or complex relational database schema (or "data model"), as represented via generally accepted data-modeling conventions (comprising the explicit declaration of any cross-table "referential integrity" [RI] constraints, and full exploitation of available native-RDBMS datatype- and constraint-attribute declaration mechanisms) and instantiated within a commercial-grade SQL RDBMS engine (Oracle8i, for example, in the reference implementation). The paradigm encompasses:

- A set of "modes" for interacting with a(ny) given database table (which modes, taken together, cover all desired end-user operations which may be effected upon such tables), and a corresponding display format ("screen" or "window" architecture) for each mode. These modes comprise:

- BROWSE (full or filtered, possibly context-constrained) (see FIG. 1)
- SEARCH (new or revised, full or context-constrained) (see FIG. 2)
- EDIT (full or context-constrained) (see FIG. 3)
- ADD (full or context-constrained) (see FIG. 4)

Certain key screen elements for navigation control/support are shared across all of these displays (see FIGS. 7-8):

- A TITLE BAR 712, 814 which indicates current mode, current table, context-constraint (if any), and filter indicator (if search-filter is in effect)
- A TABLE-NAVIGATION HEADER 702, 802 which provides direct "random access" to any system table, in either Browse or Search mode, via either a full (dropdown-) list of all (available) system tables or a short list of (clickable) "quick links" to key tables. Use of this header will also reset (and abandon) any nested stack-contexts in effect
- A CONTEXT-STACK DISPLAY 704, 804 which indicates the active table and mode at each level in the context stack (described below), and also allows direct navigation ("pop-up") to any suspended ("higher") stack-level (with abandonment of all lower levels)
- A MODE-NAVIGATION BAR 710, 812 which allows the user to move amongst the various available mode displays for the current working table (or "stack level"). The list of available modes varies, dynamically, according to both the user's access rights (described below) and the current state of the working session (i.e., whether a search-filter is currently in effect). The full list of possible mode-navigation options is: FULL BROWSE, FILTERED BROWSE, NEW SEARCH, REVISED SEARCH, and ADD. Note that FILTERED BROWSE and REVISED SEARCH appear only when a search-filter is currently in effect; if so, the former restores a Browse-mode display with the most recent filter and scroll-position, while the latter pre-populates a Search-mode display with the current filter parameters
- Additional MODE-NAVIGATION 706 to allow "edit mode" for a single table record
- SCROLL NAVIGATION 708 allowing a(n end) user to navigate through all the records in a table and also allowing the user to dynamically change the number of records contained in the webpage displayed (i.e., dynamic page-sizing)
- HOT LINK 806 for "drill-down" to cross-reference table (e.g., in the embodiment shown in FIG. 8, "Country")
- HOT LINK 808 for "drill-down" to master-detail table (e.g., in the embodiment shown in FIG. 8, "City")
- CROSS-REFERENCE FIELD 810 to generate dropdown lists of available foreign-key values (with automatic correlation to display-name labels)
- FIELD 811 for free-form text entry, to provide automatic client-side data validation according to back-end datatype (for edit/add mode only)
- SUBMIT BUTTON 816 commits changes, and executes appropriate mode-switch (and stack-context return, if appropriate)

Note that, although not shown in the reference implementation, DELETE capability is also readily incorporated—as either (or both) true record-removal from the underlying table, and/or record "flagging" for UI suppression (with continued underlying-table record retention)—simply by adding (according to the user's access rights, potentially) another pushbutton within the Edit-mode display A set of rules and methods for moving among the modes (and, hence, displays) for a given table (see "mode navigation" in FIG. 7), comprising:

- Explicit (manual) mode-selection via the mode-navigation bar
- Browse-to-Edit mode-transition for a specific record, by clicking on a Browse-row's leftmost-column "row label" link
- Implicit return-to-Browse transitions from other modes:
  - From Edit mode, upon record commit (UPDATE pushbutton)
  - From Add-mode, upon record commit (ADD pushbutton), with optional override via an on-screen checkbox setting which "locks" user into Add mode for the current table until checkbox is cleared, or until user explicitly navigates away
  - From Search mode, upon filter commit (SEARCH pushbutton), with optional override via an on-screen checkbox setting which enables direct Search-to-Edit transitions for single-row result-sets, provided user has requisite edit rights. In the reference implementation, this checkbox setting is session-persistent (that is, it remains in effect until the user's session terminates, so long as the user does not explicitly turn it off); it could as easily be made "sticky" to a variety of degrees—lasting for only a single search, for a single stack-context session, or even across system sessions (via database-stored user "preferences")

Figure 6:
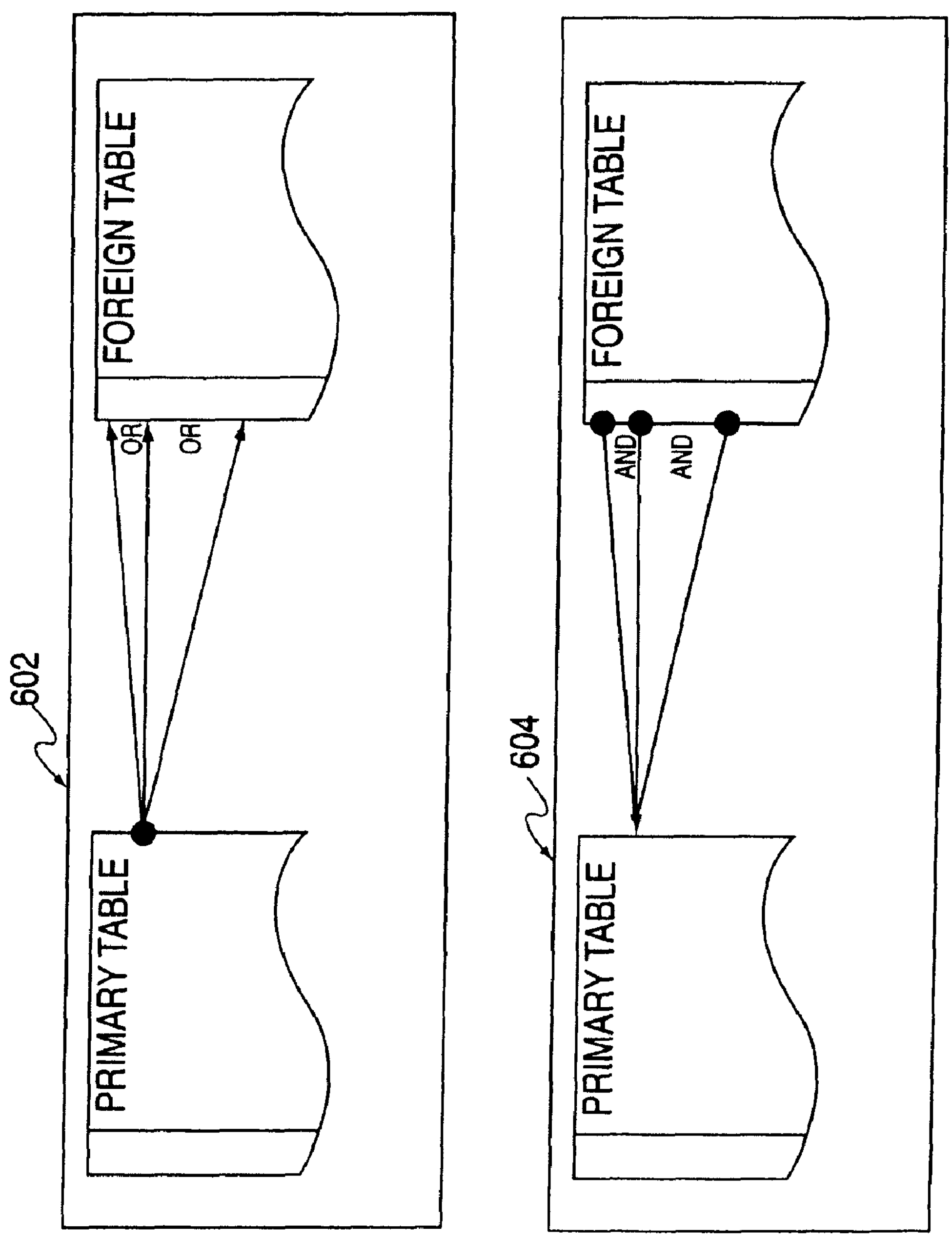
FIG. 6 is a diagram of the relationship types comprised in the paradigm of the present invention.
Figure 7:
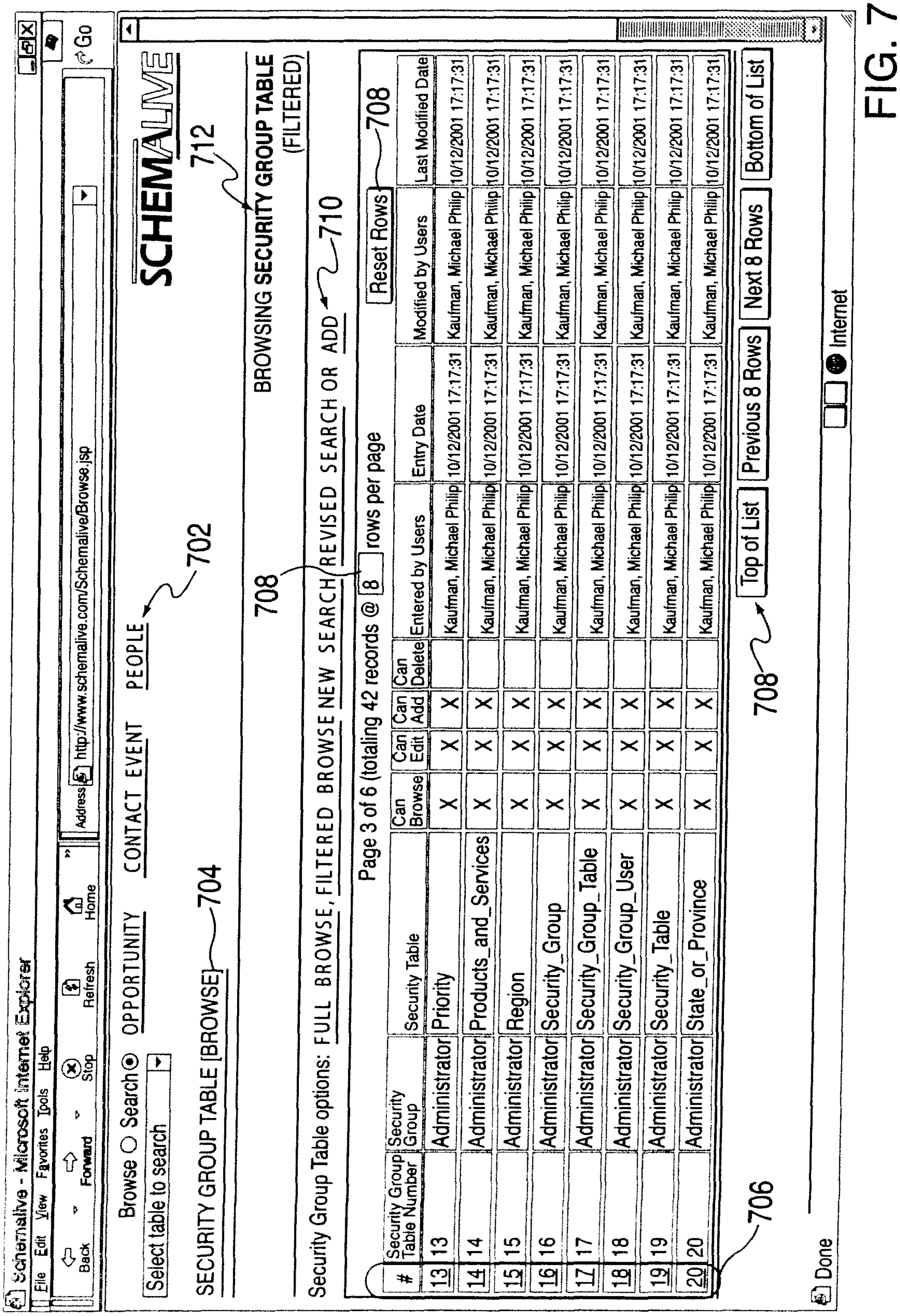
FIG. 7 is an annotated screen dump showing the active elements in a "browse mode" display.
Figure 8:
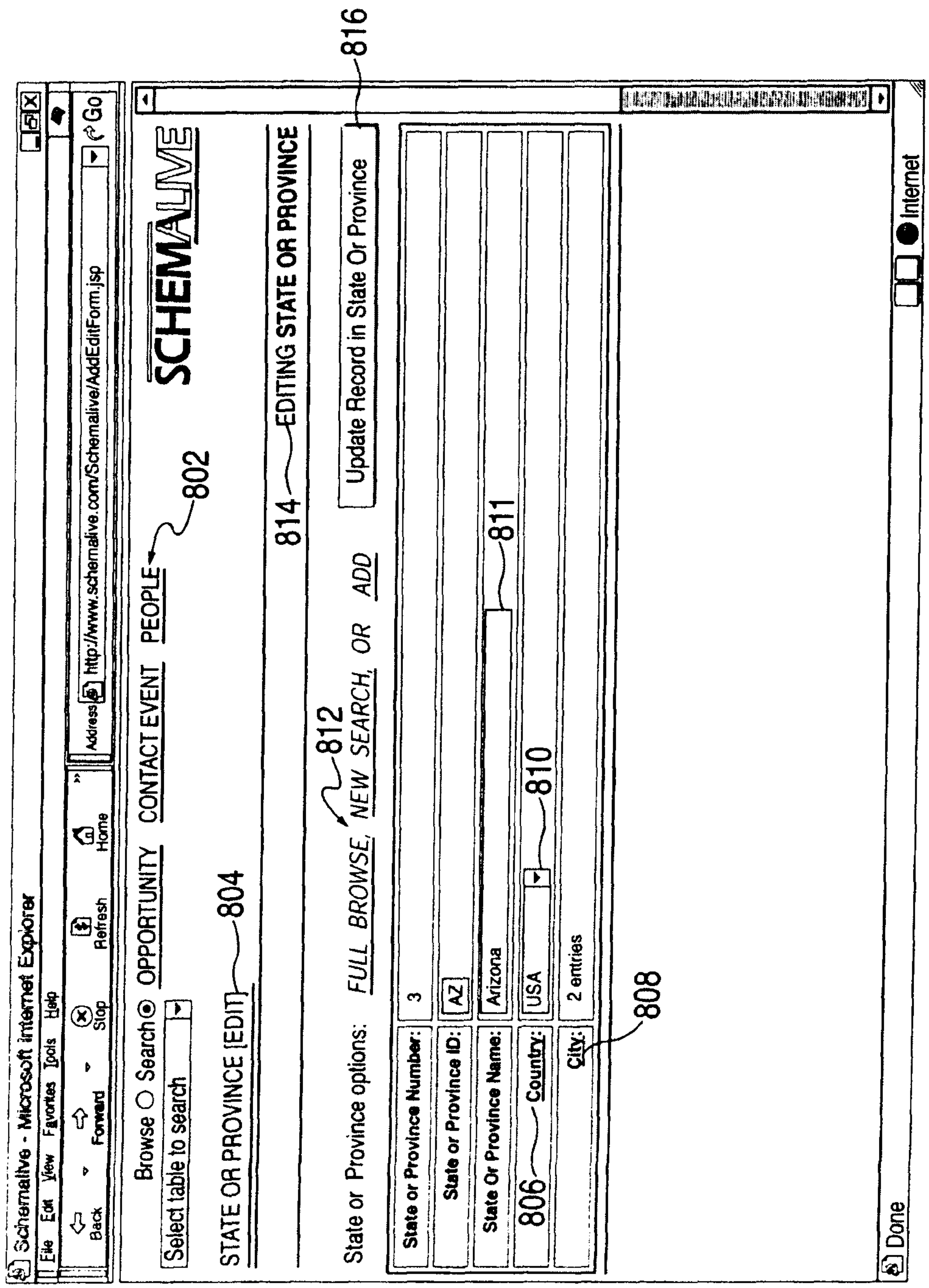
FIG. 8 is an annotated screen dump showing the active elements in an "edit" "add" or "search" mode display.

A set of "relationship types" between individual database tables (which types, taken together, cover all desired connections between any two tables), and a corresponding UI convention for representing each type of relationship "in-place" within the (single-table mode displays. As shown in FIG. 6, these "relationship types" comprise:

- CROSS-REFERENCE 602 (a.k.a. "foreign key" or "FK")—single primary-table record keeps pointer to any single foreign-table record
- MASTER/DETAIL 604 (a.k.a. "parent/child" or "one-to-many")—multiple foreign-table records keep pointers to single primary-table record A set of rules and methods both for extending the representation of any single table (according to its relationships to other tables) (FIGS. 7 and 8), and for managing (and navigating across) these relationships (comprising the resolution, display, and manipulation of cross-referenced elements within a primary table's display context, and the creation or revision of related-table information within the context of a primary table by "drilling down" to a secondary table, constraining the "working context" of that secondary table as necessary, and "passing back" relevant changes to the primary-table context) (see FIG. 9). Said rules and methods comprise:

- Foreign-key fields occurring within a table—that is, fields which contain "keys" that uniquely identify cross-referenced records from secondary (a.k.a. "foreign", or "referenced") tables—are automatically "resolved" for display purposes, so as to substitute a corresponding (and, presumably, more meaningful) "name" field from the foreign-table record (in lieu of the key value itself—which, per generally accepted data-modeling conventions, is generally intentionally devoid of intrinsic meaning):

- The paradigm specifies a "default" behavior for determining this name field within the foreign-table record, based (optionally) upon a combination of field-naming conventions, field datatype (i.e., character data), field constraints (i.e., unique values), and/or order of appearance within the table definition (i.e., first non-primary-key field meeting other requirements)
- In the reference implementation, this field is the first one whose name ends with "_NAME"—or, in special-case handling for tables containing "LAST_NAME", "FIRST_NAME", and "MIDDLE_NAME" columns, a composite "Last, First Middle" value. Additional special-case processing supports successive cross-referencing through multiple tables until a "_NAME" field is discovered, if (and only if) intervening tables include unique-value constrained FK columns. If no name field can be resolved, the UI displays the actual key values (that is, the primary-key values from the foreign table) themselves
- Alternatively, the rules for determining the name field can themselves be made "soft"—that is, specified once (globally) by a system administrator, and used thereafter to drive all (default) name-field constructions. (See the discussion of naming conventions and annotational methods, below.)
- The default behavior for name-field resolution can also be overridden with (either or both) "global" and/or "local" custom-name definitions for specific tables, as described below (within the discussion of extensions to, and customization of, the baseline UI paradigm)
- Auto-resolution of display-names applies to both Browse-mode cells (where a single display-name is derived and substituted for a given foreign-key value), and Add/Edit/Search form-fields (where a dropdown list includes the display-names for all foreign-table records, and UI actions on this list are correlated to the underlying keys)

Figure 9A:
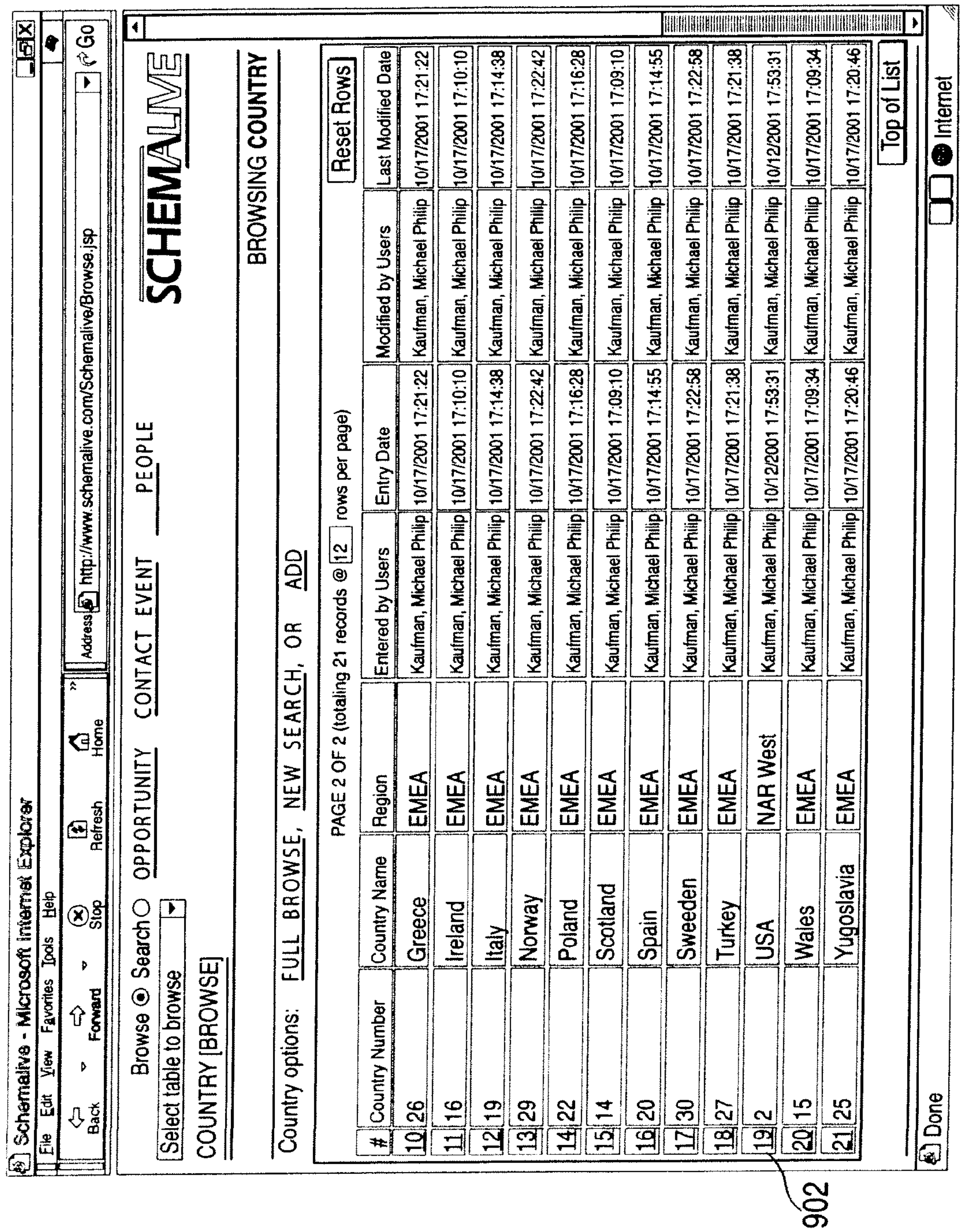
FIGS. 9A-9E show an exemplary "master/detail drill-down" and a doubly-constrained subordinate table search as rendered in the reference implementation.
Figure 9B:
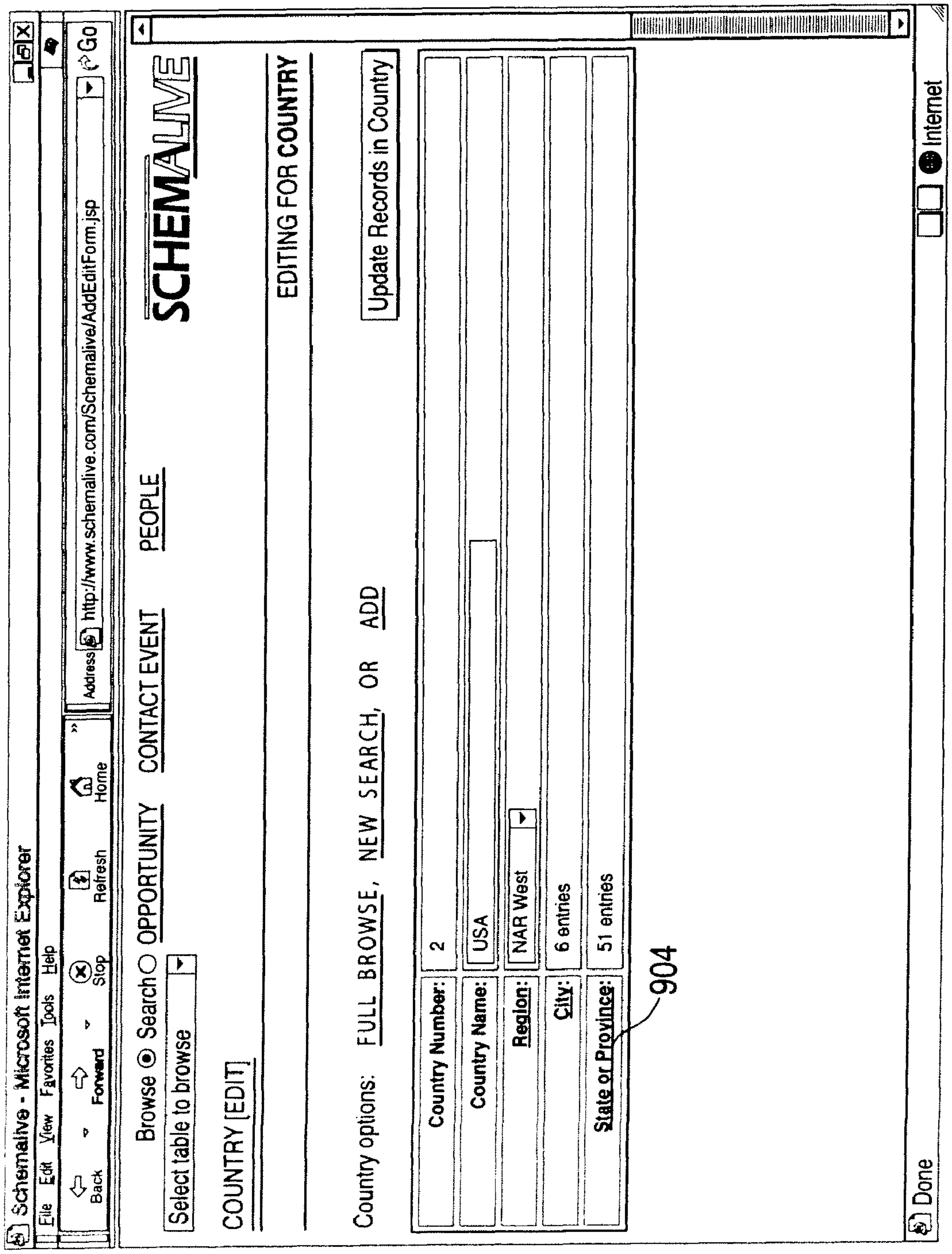
Figure 9C:
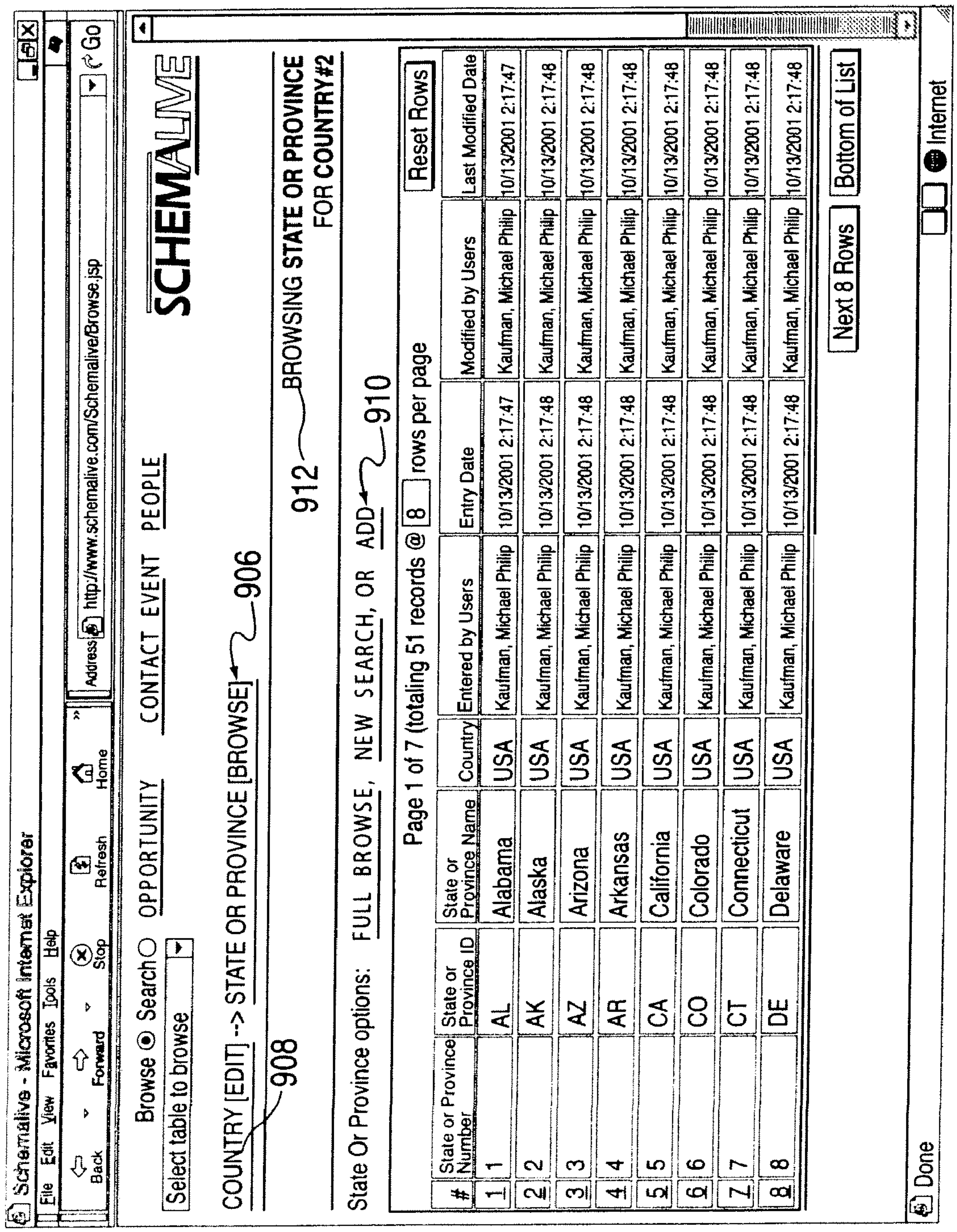
Figure 9D:
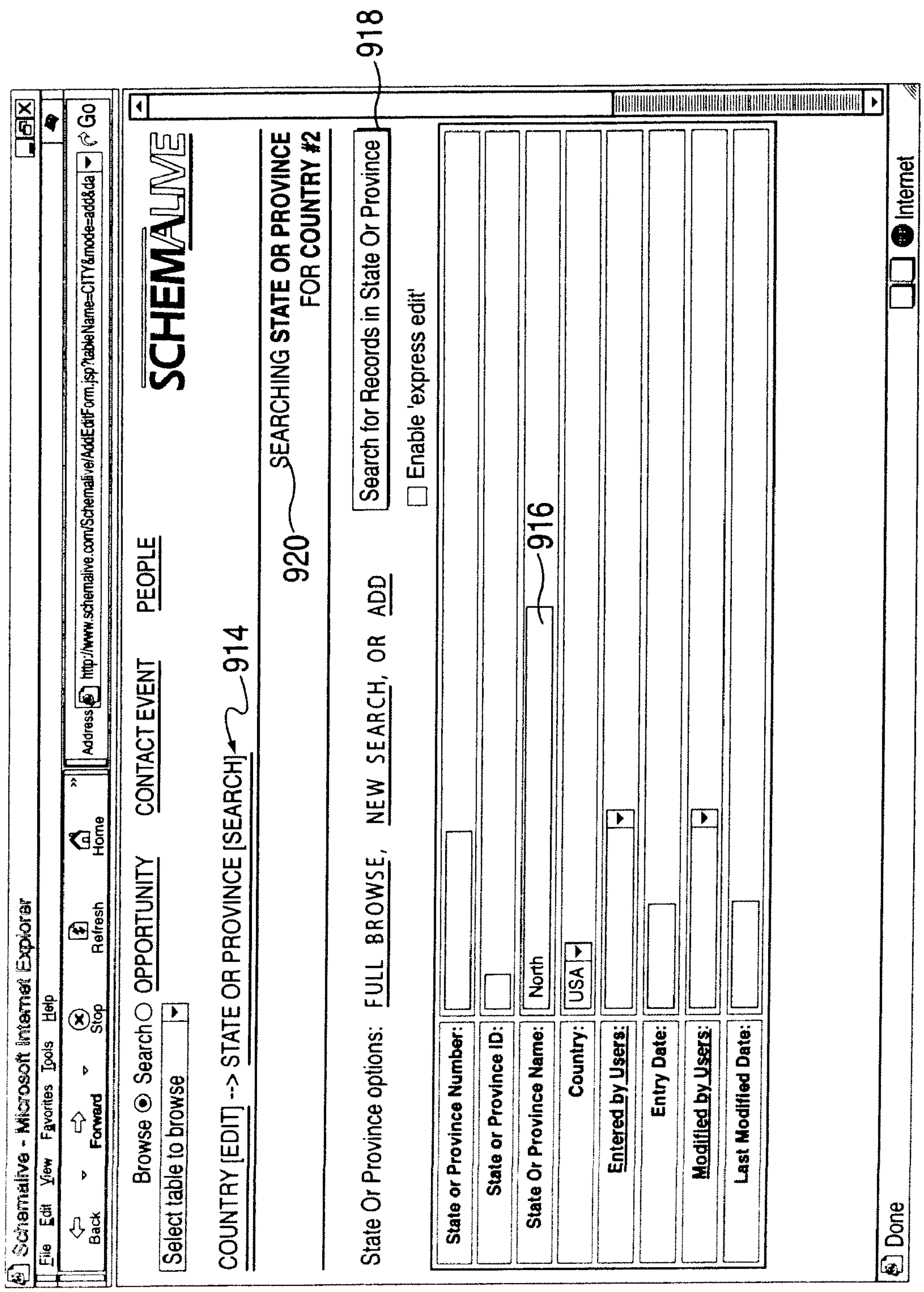
Figure 9E:
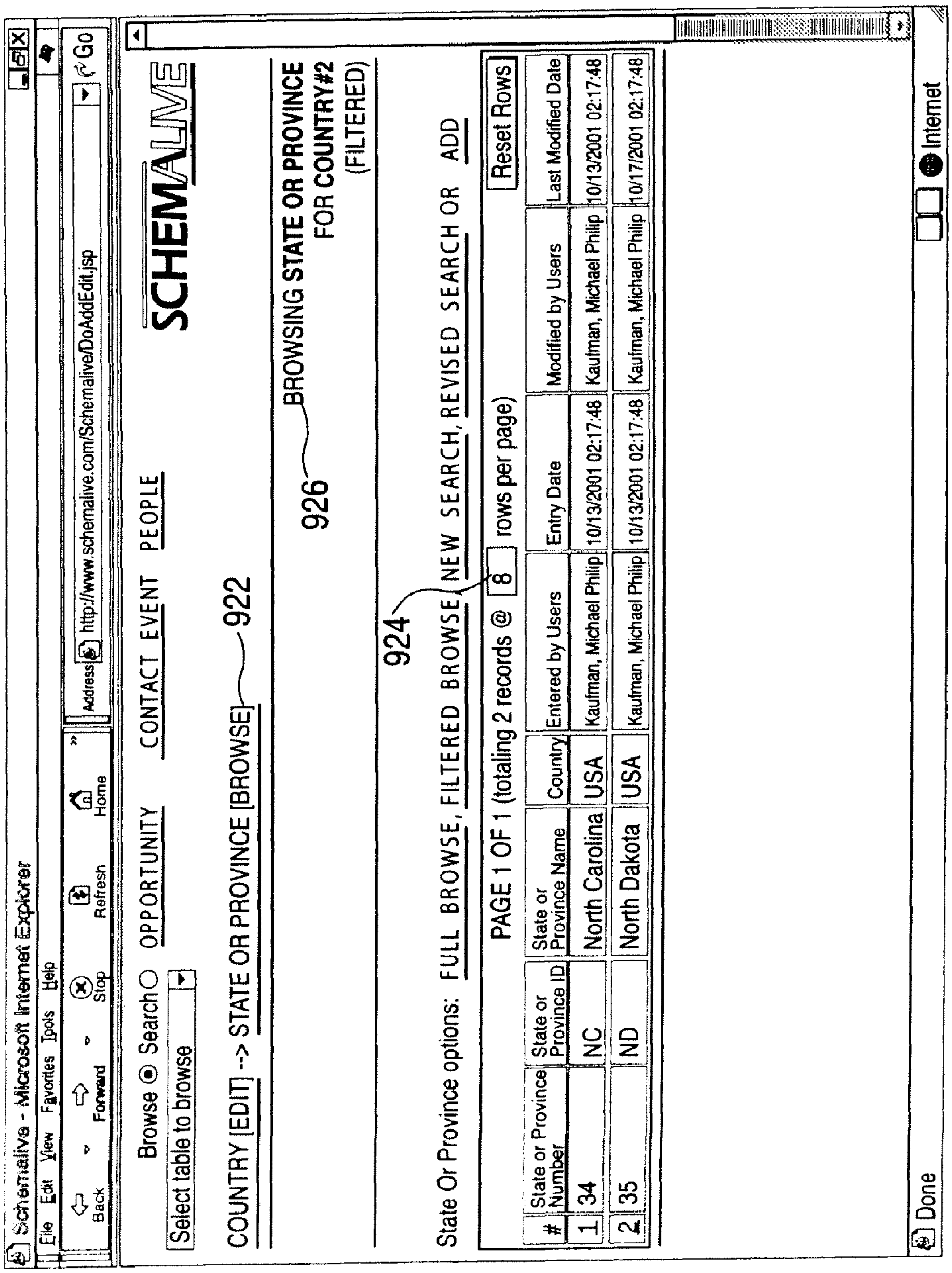

For "master" tables in any master/detail relationships (as specified via the core complement of naming conventions and annotational methods, discussed below), record displays incorporate a "pseudo-field" for each associated detail-table, which indicates the number (i.e., count) of corresponding detail (or "child") records belonging to the displayed master (or "parent") record:

- In the reference implementation, the master/detail pseudo-fields are included only for Edit-mode displays (so as to allow for streamlined system logic and, therefore, improved run-time performance)
- Alternatively, these pseudo-fields can also be (and have been, in alternate implementations) readily incorporated into the Browse-, Search-, and Add-mode displays, at the cost of added complexity in supporting views (i.e., correlated-subqueries for Browse-mode displays) and state-management logic (i.e., transitioning to Edit mode for not-yet-completed Add-mode transactions before allowing navigation to associated detail-table contexts where the user might add dependent "child" records), and the attendant performance implications To enhance the run-time performance of Browse-mode displays, the system automatically generates a corresponding back-end "view" for every table, which:

- Resolves all FK displays, per above
- Incorporates any and all default-behavior overrides
- By rendering (and, subsequently, executing) this view in the native language of the underlying RDBMS (i.e., SQL), effectively "projects" this extended representation of the table (according to its relationships to other tables) from the software (where it is derived) back into the RDBMS environment itself, for significantly improved rendering performance and reduced network- and application-server loading See the discussion, below, of rules and methods for traversing/navigating the context stack, for more information on the creation and revision of related-table information within the context of a primary table A set of user-interface conventions for signaling other (non-referential) data constraints, and for enforcing adherence to same, across all Add/Edit/Search forms, comprising:

- For "required" fields (i.e., underlying table-columns with "NOT NULL" CHECK constraints, in the reference implementation), the corresponding data-field labels (descriptive names appearing to the left of the entry areas) are displayed in boldface (see FIG. 3)
- The physical width of text-entry (vs. dropdown) fields—as well as the maximum permitted length for entered text—is driven directly by the specified data-length of the underlying table columns.
- For text fields whose length-limit exceeds a certain threshold (globally defined, in the reference implementation, though potentially user-preference configurable), the on-screen field is presented as a multiline, vertically scrollable control with multiple-row visibility, rather than the default single-row (and non-scrollable) entry field. (In the reference implementation, this is an HTML "TEXTAREA" rather than an "INPUT" field.) Note that this functionality is also applied to Browse-mode table cells, so that occasional lengthy cell-entries are made scrollable (and therefore don't distort an otherwise reasonable table-layout)
- Required fields (per above)—along with numeric, date, and text fields (whose length might exceed the threshold specification described above)—also generate automatic validation logic which prompts the user to correct any erroneous or problematic data-entries locally—that is, on the end-user's (or "client") computer, before any communication with the database takes place. In the reference implementation (which is web-based), this manifests as client-side Javascript routines—along with all requisite invocation logic, automatically embedded into the appropriate entry-field specifications—which are delivered along with the (system-generated) web-page. Failed validation (upon field-exit and/or at page-submission time, depending on the type of validation) puts the "focus" back into the corresponding problem-field (or the first of several), highlights ("selects") the entire field contents, and displays an informational pop-up dialog box explaining the problem. This effectively "projects" constraint-awareness from the back-end RDBMS (where the constraints are defined) into the front-end client, for significantly improved performance and reduced network- and database-loading A hierarchical "context stack" for maintaining (and suspending) the working state of a particular table (comprising selected record, display mode, pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack A set of rules and methods for traversing/navigating the context stack, among them:

- The user is always working at the "bottom" (or rightmost, within the stack display) level of the context stack. Typically (i.e., at initial system entry, or following direct access via the table-navigation header), there is only one level in the stack (that is, no nested or suspended stack contexts are in effect)
- Changing modes for a given table (or "stack context") is referred to as "lateral" or "horizontal" movement (see, e.g., FIG. 7)
  - e.g., in the embodiment shown in FIG. 9A, a click on a mode transition button 902 (shown in this example as "19") allows for a "lateral" or "horizontal" mode transition to "edit" (shown in FIG. 9B)
- Traversing relationships (either cross-reference or master/detail) is referred to as "drill-down" (and, upon return, "pop-up") or "vertical" movement across tables (and nested stack contexts) (see, e.g., FIG. 9)
  - e.g., in the embodiment shown in FIG. 9B, a click on a "drill-down" button 904 (shown in this example as "State or Province") allows for a "drill-down" to related detail records (shown in FIG. 9C)
- Vertical navigation therefore always increases or decreases the "stack depth", while horizontal navigation merely alters the "view" of the current table—affecting only the current (bottom-most) stack level
- Drill-downs are supported by enabling "hot-linked" (or "clickable") labels for the related data fields in the primary table (stack context) (see FIGS. 9B and 9C)
- A drill-down traversal "suspends" the above stack context
- Drilling-down across a cross-reference relationship imposes no "context constraints" on the lower stack context, while drilling-down across a master/detail link constrains the subordinate table to only those records "belonging" to the above stack-context table-record (see, e.g., FIG. 9C), such that:
  - A superseding filter is applied to all detail-table mode displays, separate from (and invisible to) any lower-context search-filters which may subsequently be applied by the user
  - Even a "full browse" request (with no explicit search-filter) therefore shows only related child-records
  - The title bar 912, 920, 926 (across all modes) separately indicates the subordinate-table context constraint with a "FOR <PARENT-TABLE><PARENT RECORD>"-style suffix (vs. the "(FILTERED)" suffix, which indicates a user-applied search-filter). (For example, Title Bar 912 of FIG. 9C shows constraint from above stack context, Title Bar 920 of FIG. 9D still shows the context-constraint, and Title Bar 926 of FIG. 9E reflects both the above context-constraint and the presence of a current-context "filter.")
  - In Edit mode (for a specific child-table record), the user is prevented from changing the datum that links the child record to its parent record, by filtering the dropdown-list for the corresponding FK field so that it contains only the parent-record value
- Full lateral movement (mode-switching) is supported within the subordinate stack context
- User can "return" (ascend the context stack) either by "committing" a lower-level action (a database edit or addition), or by abandoning the subordinate stack context (via the context-stack display or table-navigation header). In the former case, committed changes are automatically propagated to the above stack context and displayed in the corresponding mode display (i.e., "results" are "returned") unless the user has enabled Power Add in the lower context; in the latter case, any pending changes are abandoned, and the above stack context is restored exactly as originally suspended
- Cross-reference drill-downs are "context sensitive" to the parent-field status: A drill-down from a blank parent-field enters the subordinate stack context in "Add" mode, while a drill-down from a non-blank parent-field enters the subordinate stack context in "Edit" mode for the already-selected (cross-referenced) secondary-table record. Nevertheless, the default drill-down mode can be "overridden" (that is, abandoned) via a lateral or horizontal mode-switch in the lower stack context. In any event (and regardless of intervening actions), a "committed" return from a subordinate stack context will always properly update the parent record
- Master/detail drill-downs generally enter the subordinate stack context in "Browse" mode, although this behavior can be modified as a "business rule" via the described customization mechanisms (see FIG. 9 and the CreateSchema.sql script)
- The user may always return directly to any suspended ("higher") stack-context by clicking on the corresponding stack-display entry 908. Doing so effectively "pops" the stack, and abandons any work-in-progress in all lower contexts. (For the embodiment shown in FIG. 9C, for example, clicking on "COUNTRY [EDIT]" abandons the current stack content and restores the above context exactly as originally suspended, i.e., as shown in FIG. 9B.)
- The user may further search or filter records at the subordinate stack context level by clicking on the "New Search" link in Mode Navigation 910. In the embodiment shown, the further search page (see, e.g., FIG. 9D) comprises the following screen elements:
  - Stack Display 914 which still shows the nested contexts
  - Search Field 916. In the embodiment shown in FIG. 9D, search field 916 is free-form text entry, wherein the text "North" adds an additional "filter," requiring that "State or Province Name" begins with "NORTH".
  - Title Bar 920 which still shows the context constraint
  - Search Initiating Button 918, which, when clicked, initiates a "lateral" or "horizontal" mode transition to (filtered) "browse" mode (see, e.g., FIG. 9E). The embodiment shown in FIG. 9E comprises the following screen elements:
    - Stack Display 922 which still shows nested contexts
    - Title Bar 926 which now reflects both the above context-restraint (as shown, e.g., in FIG. 9D) and the presence of current-context "filter"
    - Scroll Navigation 924 allowing the user to navigate through all the records in a table and also allowing the user to dynamically change the number of records displayed. In the embodiment shown in FIG. 9E, manipulating the Scroll Navigation 924 has no effect because all the records under the current constraint and filter are displayed on one page, since only two rows now meet both parent-context constraint and the current "filter."

Integrated, group-based security mediation, "granular" both in scope (i.e., global-, table-, row-, or field-level) and by task (browse, edit, add, delete), which dynamically adjusts all system displays (throughout the entire UI paradigm) according to the user's granted access-rights, such that prohibited options are always hidden Note, finally, that while the preferred embodiment operates according to the particular paradigm described above, it remains possible to effect alternate paradigms which would nevertheless be consistent with the basic principles of the invention. For instance, it may be desirable in some instances to realize instead a "modeless" UI paradigm, such that all end-user activities (browsing, searching, editing, adding) are supported by a single, unified display context (such as a "spreadsheet" display).

Software (written in Java and JSP, in the reference implementation) automatically and dynamically ("on-the-fly") generates a fully functional UI system (written in HTML, Javascript, and HTTP/CGI in the reference implementation) based upon, and connected directly to, the underlying data model (as instantiated within the RDBMS), and in full conformance to the described paradigm. In order to generate the UI, the RDBMS is first interrogated or scanned by this software, applying a body of rules to interpret the data model (comprising its tables; their column-complements, datatypes, and constraints; and relationships across the tables), and to correlate same to the UI paradigm (either "on-the-fly", or by building an in-memory representation, or "cache", of said data model, and by automatically deriving enhanced back-end "views" of all tables, which are consistent with the paradigm and which, further, coherently incorporate any and all extensions, customizations, adaptations, or overrides which may have been specified as described below). In the reference implementation, the results of this RDBMS interrogation are used to construct an internal object representation of the schema, conforming to a graph in which the nodes represent database tables, and the edges represent relationships (i.e., referential integrity links) between these tables. As the UI is rendered for any given database table, this underlying object representation is referenced, and appropriate components for depicting and traversing all cross table links are automatically included in the resulting display.

A core complement of naming conventions and annotational methods (written in XML, in the reference implementation) is used for enhancing and extending the representation of the table structures and relationships (entirely within the back-end representation of the data model, in the reference implementation) so as to more fully support revelation of the schema structure through external interrogation. Said methods consist of "annotations" (or "comments") which are "attached to" (or "associated with") individual tables or table-columns within the back-end RDBMS; in discussing these methods, it is important to note that although there are any number of alternative embodiments for the formatting, storage, and association of such annotations with their corresponding objects—including (but not limited to): formatting as XML-tagged, name/value-paired, or fixed-sequence data; storage within native-RDBMS "comment" fields, application-defined database tables, or external (operating system) disk files; and association via native-RDBMS comment "attachment", explicit object-naming (within the annotations themselves), or pointers or keys (attached to the objects themselves)—the methods ultimately concern the principles by which such embodiments may be designed and applied to illuminating the schema, rather than any particular configuration or embodiment itself. Within the reference implementation, then, the attachment of annotations, as XML-formatted "comments", directly to database objects, should be considered illustrative of, rather than essential to, the methods so described. The core conventions and methods comprise:

The indication of column-datatypes not natively (or explicitly) supported by the underlying RDBMS (for example, "binary" or "yes/no" fields in the Oracle8i-based reference implementation) yet subject to special handling within the UI paradigm, via the use of specific object-name suffixes ("_FLAG", in this example)

The specification of master/detail relationships between tables (as distinguished from a [reverse-]cross-reference relationship), by associating a table-level annotation with the master (or "parent") table, and indicating both the table name and the parent-referencing FK field for each detail table (see comments in the CreateSchema.sql script)

Following the paradigm, the generated UI comprises all mode displays for all tables, with integrated (-into-the-mode-displays) mechanisms for representing, navigating, and managing relationships across tables (comprising hierarchical context constraint/enforcement, and pass-through/"pop-up" return, or "propagation", of subordinate-context results). In rendering this UI, the preferred embodiment applies logic to (re-) convert column- and table-names retrieved through RDBMS interrogation from all-uppercased text, if necessary (as it is with Oracle8i, in the reference implementation) into mixed-case, initial-caps text (where only the first letter of each word—or "token"—is capitalized), and to replace underscore characters with spaces. The case-restoration logic is designed to also consider a list of approved acronyms—or, more generally, "exceptions"—which, when encountered as tokens within object-name strings, are instead cased exactly as they appear in the list. (This could mean all-uppercase, all-lowercase, or any non-conventional mixture of cases, such as "ZIPcode".) This case-exceptions list is provided once, globally, for the entire system, and impacts all table- and column-name references throughout the UI presentation. (In the reference implementation, the list is defined as a string array within a public "CustomCaps" object; this object could in turn be initialized via a disk file, or a special database table.)

The software also constructs and utilizes the above-described hierarchical context stack for maintaining (and suspending) the working state of a particular table (comprising selected record, display mode, pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack (see, e.g., stack display 906 in FIG. 9C, which displays the nested contexts). Note further that, in addition to its core function in supporting nested working contexts (and by virtue of its always being on-screen), the context stack also enables certain ancillary capabilities:

Since the current context (or "table-session") always corresponds to the "bottom" of the stack (i.e., the rightmost link in the display), the user can "refresh" his current table-session session by clicking on this link. This can be useful, for instance, when the user wishes to "undo" or revert numerous changes made to a current Edit- or Add-mode form (but not yet committed) without having to re-navigate to the current table and record When a system exception (security violation, internal error, etc.) occurs, the resulting error screen also incorporates a stack display. Although the default error-screen behavior is to restart the user's session after a timed delay (and thereby abandon all work in progress), the user will often be able to recover his session by making a selection from the error-page stack display The preferred embodiment further provides a structured collection of methods, mechanisms, tools, techniques, and facilities for extending, customizing, adapting, or overriding the baseline UI paradigm and software to support non-standard and/or special requirements ("business rules"), comprising:

Means to "override" the default behavior for FK "display-name" resolution with (either or both) "global" and/or "local" custom specifications on how to generate display-names for a given foreign-key:

Such overrides can be useful, for example, when the foreign (referenced) table lacks a (resolvable) name column; when a composite (multiple-field), treated, or otherwise modified display-name is desired; when the sort-order within display lists should be modified; or when the foreign-table records depend on yet other table-records (foreign, in turn, to the FK-referenced table) for full name construction (for instance, where FKs into a "CITY" table depend in turn on FKs from CITY into a "STATE" table in order to distinguish like-named cities, such as Portland, Oreg. and Portland, Me.)

A custom specification consists of an explicit SQL expression that generates key-value/display-name pairs for any and all foreign-table key values Such specifications will automatically propagate throughout the entire UI, including all relevant Browse-mode cells and Add/Edit/Search form-fields Global display-name specifications are associated as table-level annotations (see above) with the referenced foreign table Local specifications are associated instead as column-level annotations with the referencing (foreign-key) column in the base-table itself In this way, both "default" (global, or system-wide) and "special-case" (local, or single referencing-table only) custom display-names can be defined for the same foreign table. If a "local" specification is defined for a given FK-column, it will supersede any "global" or "default" specification also defined for the referenced (foreign) table.

In the reference implementation, specifications are made via a special XML tag ("<sql>") which is attached to the table or column (for global or local specifications, respectively) as a "comment"

Ability to alter the order and visibility of individual table-columns across all mode displays (Browse, Add, Edit, Search) vs. the actual column-complement and -ordering of the associated (underlying) table:

This is sometimes desirable in a post-production environment, especially when the particular back-end RDBMS product in use makes it impractical or impossible to alter the actual structure of the underlying table once it has been populated with data and is participating in referential-integrity relationships with other populated tables A specification consists of a listing of the desired table-columns, in the desired display order (either by name or, alternatively, by ordinal position in the actual underlying table)

If a specification is made, then any columns not explicitly included within that specification will be suppressed from the UI mode displays Specifications are associated as table-level annotations with the actual underlying table In the reference implementation, specifications are made via a special XML tag ("<columnOrder>") which contains sub-tags ("<cl>") indicating the desired columns in order and by name, and is attached to the table as a "comment"

Support for composite or "custom views" of multiple-table data which mimic a single base-table. Such a derived (non-table) result-set is typically generated by a "stored query" or "SQL VIEW" within the back-end RDBMS, and nevertheless can be rendered and presented by the UI as if it were an actual single base-table (subject to certain limitations which may be imposed by the underlying RDBMS—particularly, the inability to edit or add "records" for such result-sets, rendering them effectively "read-only")

Ability to manually define Search-mode "dropdown fields" (which list the range of possible values for a given column) for such custom views:

Because, by its nature, the custom view appears to be an actual table—and therefore obscures the underlying (real) tables on which it is based—the system cannot automatically resolve the referential-integrity (RI) links that would normally serve to identify the appropriate value lists (i.e., foreign-table values)

Moreover, the normal value-to-key translations managed by dropdown fields are inappropriate for custom views anyway, since these views actually incorporate the cross-referenced values themselves (rather than foreign keys that point to these values, as base-tables do)

To support custom-view dropdown lists that (appear to) behave consistently with the general (actual-table) UI paradigms, then, a manual (explicit) dropdown-list specification is made for each corresponding custom-view column A specification identifies the foreign table which contains the dropdown-list values, and the column (either by name or, alternatively, by ordinal position within that table) which supplies the actual values Specifications are associated as column-level annotations with their corresponding custom-view columns In the reference implementation, specifications are made via a special XML tag ("<manualDropDown>") which, in turn, contains sub-tags indicating the related foreign-table name ("<foreignTableName>") and key field ("<foreignKeyField>"), and is attached to the corresponding view-column as a "comment"

In-place pass-through (drill-down) from custom views to Edit-mode displays for underlying (component) base-table members:

Because the "stored queries" or "SQL VIEWs" that underlie custom views are typically non-updateable (according to RDBMS limitations), the usual UI mechanisms for editing data cannot be used with these views. Nevertheless, it is often desirable to provide users with easy access to editing for (at least some of) the data behind the views To enable such editing access, a mechanism is provided to create a (series of) cross-referential link(s) from the individual cells (row-values) in a given column of a Browse-mode display, with each link forwarding the user to a secondary display—most commonly, to an Edit form for the underlying base-table containing that cell's value (although it is, in fact, possible to link-through to any arbitrary table, row, and column, and in any "mode")

While such links usually reference the same underlying base-table (and -field) for every row in the column, special-case extension logic can reference different tables for different rows, according to "trigger" or "switching" values from another column in that same display-row A further variation of the mechanism (described below) modifies the behavior of the leftmost-column "row label" links, rather than the interior Browse-mode table-values themselves On-screen, the link appears as a highlighting (in the reference implementation, a "clickable link" or HTML "HREF") of the cell-value itself. (Empty cells display the value "NONE" so as to still enable drill-down navigation.) When the user selects (clicks on) the link, the display forwards (typically) to an Edit form for the corresponding record in the appropriate underlying base-table, with the proper edit-field pre-selected (i.e., given the "focus"). In effect, the system auto-navigates to the same exact base-table Edit form, selected-record, and edit-field that the user could (theoretically) navigate to himself, manually, in order to alter the underlying datum that supplies the custom view The working context for this drilled-down Edit form is constrained by the same mechanisms that govern master/detail drilldowns (as described above)—that is, a stack-context filter is imposed on the edit session in order to prevent the user from changing the datum that links the base-table record to the custom view (note that this also requires a separate, explicit specification of the base-table as a "detail table" to the custom view); and if/when the user "commits" the drilled-down edit session (by pressing the "Update" button), she is automatically returned to the "parent" custom view A specification identifies the underlying (or "target") base-table; the (initial) base-table display-mode (typically, "Edit"); the custom-view column whose corresponding row-value contains the identifying key for the target base-table record; the custom-view column (if any) whose corresponding row-value contains the "constraining" (master/detail) key; and the base-table field-name which should be selected (i.e., the field that contains the target value, and should therefore receive the "focus")

Specifications are associated as column-level annotations with their corresponding custom-view columns A special-case extension of the specification can be associated as a table-level annotation with the custom view itself (rather than one of its columns). In this context, the specification will modify the behavior of the leftmost-column "row label" links (which, in normal-table Browse-mode displays, link to Edit-mode displays for the corresponding table-records). A common use for such specifications is to support master/detail-style transitions to secondary Browse-mode displays of records which "belong to" the selected custom-view record In the reference implementation, specifications are made via a special XML tag ("<customDrillDown>") which, in turn, contains sub-tags indicating the target base-table ("<tableName>"), display-mode ("<mode>"), identifying-FK field within the custom view ("<keyColumn>"), constraining-context or master/detail key, if any ("<parentColumn>"), and target field ("<focusField>"), and is attached to the corresponding view-column as a "comment"

The preferred embodiment also supports the specification and enforcement of both global and granular (by table and function) access rights and activity-stamping, according to a group-based (rather than hierarchical) permissions scheme, and based on table entries which themselves can be entered and maintained via the system:

In the reference implementation, six tables support these security features: PEOPLE, USERS, SECURITY_TABLE, SECURITY_GROUP, SECURITY_GROUP_USERS, and SECURITY_GROUP_TABLE:

The PEOPLE table contains an Active_Flag field, which allows for "deactivation" of individuals without destroying existing RI links throughout the database. Every system user must appear in the PEOPLE table (among other reasons, to support full-name resolution when displaying usage-tracking fields through the UI), and if/when a user's PEOPLE.Active_Flag is turned off, the user is immediately blocked from all further system access The USERS table incorporates (among others) a Login_ID field, which is correlated against the system-user's operating-environment credentials. (In the reference implementation, this is the UID which has been authenticated and forwarded by the web server; alternatively, it could be the user's OS login.) When the system establishes a new user-session (upon the user's initial contact), it attempts this correlation to a valid USERS.Login_ID. If no correlation can be made, access to the system is denied; otherwise, the corresponding USERS.Users_Key value is henceforth associated with that user's session SECURITY_TABLE maintains a list of all security-mediated tables and custom views. (Alternatively, this list could be automatically derived from the system's data-model interrogation; the use of an explicit and hand-managed table supports the manual exclusion of "special" or "hidden" tables and/or views)

SECURITY_GROUP supports the definition of functional security roles. In and of themselves, entries to the SECURITY_GROUP table are little more than descriptive names; their primary purpose is to serve as "connective conduits" between USERS and SECURITY_TABLEs. It is important to note (again) that SECURITY_GROUPs are non-hierarchical; that is, each group can be granted any mix of rights to any arbitrary set of tables, without respect to the rights of other groups. And USERS can be assigned to any number of SECURITY_GROUPs; When a user belongs to multiple groups, her aggregate rights comprise a superset of the rights for each of the groups to which she belongs SECURITY_GROUP_USERS simply effects many-to-many relationships between USERS and SECURITY_GROUPs, and is defined (via the methods described above) as a "detail" table to both of these Similarly, SECURITY_GROUP_TABLE supports many-to-many relationships between SECURITY_GROUPs and SECURITY_TABLEs (and is a "detail" table to both). Additionally, however, the SECURITY_GROUP_TABLE incorporates Boolean (true/false) columns which indicate permission for the related SECURITY_GROUP to (respectively) browse, add to, edit, or delete from the corresponding SECURITY_TABLE. This forms the nexus of access-rights control All UI displays automatically adjust to the current user's access rights. In particular, the following navigational elements ("links", as defined in the reference implementation), appear or are suppressed according to the user's rights:

Mode-navigation bar links 710 (browses/searches/add); here, suppressed links are entirely removed from the display, rather than simply "disabled" (or made "non-clickable", as is done for all other links, below)

Record-edit links 706 (in the first column of Browse-mode displays)

Drill-through cross-reference links (on the labels of Add/Edit/Search dropdown fields)

Drill-down master/detail links (on the labels of Edit-form master/detail summary-counts)

Note that custom views with custom-drilldown specifications are subject to "double" security mediation: If edit permission to the custom view itself is withheld for a given user, then all custom-drilldown links will also be disabled. But (even) if the custom-view edit permission is granted, the user must also have the necessary rights to support each particular drilldown (e.g., edit or browse permission on an underlying table) before the corresponding link will be enabled Separately (and assuming the necessary access rights have been granted), all system add/edit activity can be time- and user-stamped at the table-record level (optionally, on a per-table basis). Security-stamping is completely automatic, and is governed (in the reference implementation) by the presence of four special columns within the table: Entered_By_Users_Key, Entry_Date, Modified_By_Users_Key, and Last_Modified_Date. If these columns exist, then any "add" event causes the current USERS.Users_Key (from the user's session) to be recorded in both the Entered_By_Users_Key and Modified_By_Users_Key columns, and the current system time to be stamped into both the Entry_Date and Last_Modified_Date columns. "Edit" events, of course, update only the Modified_By_Users_Key and Last_Modified_Date columns. Note further that when they exist in a table, these fields are visible only in Browse and Search displays; they are hidden (but automatically updated) from Add and Edit displays Although not present in the reference implementation, the granularity of this model can be readily extended with both row- and column-level access mediation:

Row-Level Security allows for the individual rows (records) of any given table to be made visible or invisible (and, therefore, accessible or inaccessible) to a given user:

In a sense, row-level security can be said to affect only "content" visibility, rather than "structural" visibility (as with other security axes); a row-level security filter impacts which particular table-entries are presented, but never which classes or types of data elements A specification thus identifies the filter condition (i.e., WHERE clause) that relates one or more table-columns to (some transformation/JOIN-sequence on) the current user. (Note that such "user relations" may optionally involve attributes of the particular user, and/or those of "security groups" to which the user belongs)

Specifications are associated as table-level annotations with the actual underlying table Because there are no effects upon the structure or "shape" of the data, these filters can be "encapsulated", effectively, and introduced as a (logical) "shim" layer between the raw back-end tables and the data-dictionary object model.

By exploiting the identical column structure of each such "shim view" to its underlying base-table, on the one hand, and to the "virtualized" schema view (as constructed during the interrogation phase) of that table, on the other, the rest of the system logic and infrastructure can be insulated from any awareness of (or sensitivity to) this mechanism Application of the row-level filter consists of "surgical" modifications to the defining SQL for the corresponding Browse-mode view (see above), so as to incorporate the requisite additional WHERE clause (and any additional FROM-clause tables, utilizing the same view-integration and alias-merging logic already employed within the reference implementation in generating said view)

Function-oriented mediation (i.e., Browse/Edit/Add/Delete granularity) is supported via (optional) separate specifications (per table) for each function (and with a "default/override" hierarchy among these specifications—such that Browse rights obtain for editing, for instance, unless explicit Edit rights have been specified). The UI-generation logic then compares record-presence across the respective (resulting) views to resolve specific rendering and action decisions (i.e., is this record editable?)

Column-Level Security allows user access to be governed on a field-by-field basis:

Specifications are analogous to those described in the reference implementation for table-level security (see the discussion of SECURITY_GROUP_TABLE, above), except that only "Browse" and "Edit" rights are meaningful on a per-column basis (that is, there is no way to "Add" or "Delete" only individual columns)

Column-level specifications are treated as "subtractive overrides" to table-level specifications, such that table-level specifications serve as "defaults" that can be further restricted—but not expanded—by column-level specifications Application of column-level security to the Browse function consists of an additional "overlay" view which hides additional columns as necessary Edit-function mediation is processed by the UI on a per-field basis, either (or both) during rendering (where display conventions utilize read-only fields, or otherwise signal non-editability via labeling conventions [such as italicized text]) and/or processing (where attempts to change non-editable fields are rejected, with an alert notification to the user)

Also incorporated into the preferred embodiment are both generalized and special-case exception-handling mechanisms, with integrated session-recovery support:

- The generalized exception-handling mechanism guarantees a controlled recovery from any unanticipated error condition. This mechanism:
  - Presents as much diagnostic information as possible, within a paradigm-consistent UI display, comprising:
    - A pass-through errortext from the underlying program-execution environment
    - A complete "(program call-)stack dump" indicating the suspended (and nested) program-function calls in effect at error-time
    - The entire current context-stack display
  - Permits user recovery either by:
    - Controlled reinitiation of a(n entirely) new session
    - Navigation through the context-stack display to a pre-error session context, thereby (generally) enabling the user to recover his session-in-progress (more-or-less) intact, vs. requiring a restart from scratch
- Special-case exception-handling mechanisms are defined separately for certain types of system errors which are common or "normal" (such as authorization failures or session timeouts). In such cases, these "customized" exception-handlers can suppress unnecessary technical detail (which can be confusing or alienating to end-users and give the misimpression of software failure), and provide additional (end-user suitable) information specific to the user's particular error context. The reference implementation can identify and separately handle the following common exceptions:
  - Session-Sequence Errors: In the reference implementation (which, again, is web-based), it is important that the system govern the "flow" or sequence of pages passed back and forth between the (web-)server and the client (web-browser); as a result, the system incorporates several mechanisms to track and enforce this flow (comprising back-button "defeat" logic, and incremental serialization of all URLs [such that the system always knows what serial number to "expect" along with the user's next page-submission]). If the user manages to violate this flow, either intentionally or inadvertently (perhaps by selecting a "favorite" or "bookmark", or by clicking multiple links on the same page before the server can respond), the system can detect this particular error, provide a detailed explanation of how and why it might have occurred, and (per above) allow the user to recover her session-in-progress without any loss of work
  - Security Violations: Generally, the system proactively prevents the user from attempting access to any authorized system modes or functions. However, in the (web-based) reference implementation, it is not impossible for the user to navigate to a situation where he might possibly attempt an illegal transition—or to manually adjust a URL so that it attempts such unauthorized access without triggering a session-sequence error (as described above). In these cases—and in the simpler case, when a user attempts access without any system rights whatsoever—the system provides a plain-English report of exactly what access rights the user has tried to violate
  - Session Timeout: Because the system maintains a "user session" in which various context, sequence, and configuration information is tracked, and which (because it consumes system resources) can expire after a (configurable) period of disuse—and also because (in the web-based reference implementation) the dialog between client and server is "connectionless" (meaning that there can never be any automatic detection by the server that a user has "quit" or "broken" a connection)—it is entirely possible that a user may try to continue or resume a session which appears perfectly intact from his perspective (i.e., in his web-browser) but for which the system has discarded the corresponding user-session. In this case, a full session-reinitiation is still required—but it can at least be delivered along with a meaningful explanation of what has occurred
- These special-case error handlers dovetail and integrate smoothly with the generalized exception-handling facility, and share many of the same features (including, when available, the session-stack display). Within the reference implementation, these handlers are hard-coded, but they describe the basis of a subsystem which can be readily extended—abstractly and dynamically—in several ways:
  - Specific exceptions—and their corresponding, customized error displays—can be defined and administered via a central list (or table), and automatically detected (and their respective displays invoked) at runtime, within the framework of a generalized facility and without the need for custom programming
  - Information can be "mined" from the pass-through errortext—and, potentially, from the runtime environment as well—according to the nature of the particular error, and used (if appropriate) in the construction of dynamic error displays (via templates, for example)
  - Custom follow-on actions can be associated with specific errors, so that special-case recovery procedures can be specified. (For instance, a database-detected data-entry violation might cause a return to the previous data-entry form.) "Mined" runtime-environment information can also be used here to govern the behavior of said follow-on actions A generalized, extensible, and data-driven "pop-up help" facility is also included in the reference implementation. This facility allows for the specification of descriptive text which can be associated both with specific on-screen navigational elements, and with (any) individual schema elements (i.e., table-columns). When the user positions his mouse over a described object (or data-field) and pauses for a specified timeout interval, the system will flash a pop-up window (or "balloon") displaying the corresponding description. The system thereby becomes self-documenting with respect to both the UI paradigm itself, and the meaning of its data-fields. Within the reference implementation, the specifications are stored within back-end tables—so that they, too, may be administered via the system UI—although any of the above-described annotational methods could alternatively be used.

Except as noted, the detailed implementation of each of the foregoing capabilities is set forth in full in the accompanying source code, which represents the complete source code for a working version of the reference implementation. A full demonstration RDBMS schema upon which this system can operate has been provided, and accompanies this application and is incorporated herein by reference (see FIG. 5 and the CreateSchema.sql script).

Numerous extensions of the above-described scheme are of course possible:

- Most importantly, while the reference implementation is in various instances custom-coded to the data-dictionary architecture of its particular underlying RDBMS (i.e., Oracle8i), the scheme is nevertheless readily converted to a "generic" (or "RDBMS-agnostic") architecture through the introduction of a platform-neutral "middleware" layer. (The DatabaseMetaData class within the Java 2 Platform Standard Edition v1.3.1 API Specification, for instance, is easily applied toward this end.) The described invention, therefore, is by no means limited to a specific RDBMS product A set of mechanisms, rules, and methods may be provided through which each end-user can evolve (and manage) personalizations to the UI architecture (with persistent back-end storage and tracking by user and/or group)—including (but not limited to) preferred table-navigation hierarchies; UI "entry points" based on usage-frequency patterns; default (or most-recent) searches/filters for each back-end table; default "page size" for Browse-mode lists (adjusted for the particular user's screen resolution, for example); default sort-orders for each table; and default "Power Edit" and "Power Add" settings. Because user-tracking is already integrated (for security purposes), it is a simple matter to add the supporting tables and UI-application "hooks" to collect, store, and utilize such preference information Expanded concurrency-control options are easily incorporated into the scheme. Many database-related systems offer a range of behaviors which extend from unfettered write-back of edited table-records (offering maximum system performance, at the cost of minimal overwrite protection), through competing-update detection with approval/abandonment of data overwrites (a blend of performance and protection, at the cost of added complexity), to full edit-record locking (offering maximum protection at the cost of performance); and while the reference implementation incorporates only the first of these behaviors, the others can certainly be added—along with a system-configuration mechanism for choosing among them—in a straightforward manner A generalized journaling/auditing subsystem may also be integrated. Such a subsystem could, for instance, utilize database "triggers" to update a master table with a new tuple (comprising table-name, record-key, column-name, old-value, new-value, user-key, and timestamp) whenever any table-record is modified. Such a mechanism would (at a cost in system performance, of course) permit complete backtracking/"rollback" to previous database states, and guarantee the ability to recover from any rogue data modifications (whether accidental or malicious) and identify the actors A further extension to journaling/auditing support is the ability to require a user to explain his justification for (only) certain data-field changes, and then either record that explanation to the system journal or audit log (along with the other tuple information), or (possibly) roll-back the transaction (if the user declines to supply an explanation). Such a facility could be implemented with additional text-entry fields integrated into the primary Edit-mode display, or alternatively, with "pop-up window" logic (which, within World Wide Web presentation, could comprise additional browser windows or DHTML "simulated" pop-ups, for instance). The specification of which data-fields should require such justification would be considered a "business rule", and could be implemented via any of the annotational methods described elsewhere in this document. Such specifications could also be assigned at various levels of global vs. local "scoping" (i.e., perhaps automatically for all date fields, or only for specifically assigned text fields)

Within the current (World Wide Web-based) reference implementation, it is possible to select certain navigational links (for example, from the context-stack display or the mode-navigation bar) which will abandon the user's current screen display and, with it, any data entries or modifications which may have been made but not yet committed to the database. Although this behavior is by design, it may be desirable to add a pop-up "warning" mechanism for such cases, so as to alert the user to the imminent loss of data (and to provide a means for aborting said action). Such a mechanism could utilize client-side Javascript logic to:

- Set an internal flag each (and every) time any on-screen change is made
- Invoke a "cover function", each time a screen-abandoning link is clicked, which will display a confirmation dialog (pop-up window) if the "change flag" has been set (or, if the flag is not set, will simply execute the link)
- Proceed with the link action (and abandon the current screen) only if the user supplies explicit confirmation A variety of extensions can be made to the Browse-mode display paradigm, comprising:

- The ability to sort Browse-mode listings (by any combination of columns) by clicking on the corresponding column-headings. Successive clicks on the same column-heading would invert the sort-order for that column; successive clicks on different columns would effectively produce "ordered sorting" (where the most-recently clicked column is the "primary" sort, and each successively less-recently clicked column is the next "subordinate" sort)
- Support for "random-access" page navigation, wherein the table-header (which, in the reference implementation, allows direct entry only for the number of rows per page) would also allow direct entry of the desired page number. For instance, a Browse-mode display whose table-header said "PAGE 5 OF 12 (TOTALING 300 RECORDS AT 25 ROWS PER PAGE)" would thus render both the "5" and the "25" as text-entry fields, so that in addition to resizing the page length (by changing the rows-per-page entry), the user could also "zoom" to a specific page just by changing the page-number entry. This would eliminate the need to scroll, page-by-page, from either the top or bottom of the result-set
- Similarly, another form of random-access page navigation could be introduced via the addition of phone-book-style "tab" links (for instance, "A|B|C|D . . . ") such that clicking a particular link would jump to the first record in the result-set whose corresponding-column entry began with that character:
  - Said "corresponding column" could be (initially) determined according to similar default-processing rules to those embodied in the reference implementation for FK display-name resolution (for instance, the first column whose name ends in "_NAME", if any)
- Alternatively, the corresponding column could simply track the current (primary) sort-order column (as described above), if implemented
- Yet another option would be to allow explicit designation of the corresponding column via an associated dropdown-list of all table-columns
- However selected, any change in the corresponding column would then automatically regenerate the tab list, according to the range of actual (sorted) leading characters appearing within that column. In this way, numeric tabs would appear for a "social-security number" column, vs. alphabetic tabs for a "last name" column A variety of extensions can be made to the Search-mode display paradigm, comprising:

In the reference implementation, field-value filters are applied by default as prefix matches (i.e., as "starts with" comparisons), with optional support for explicit relational-operator prefixing (comprising <, <=, >=, >, and exactly=). Relational options could be further extended to support ranges ("between x and y"), NULL/NOT-NULL conditions, and other arbitrarily complex transformations on the corresponding field-values (such as field-value substitution into a complex string-manipulation or arithmetic expression)

The reference-implementation Search-form paradigm comprises a single set of fields (corresponding to the underlying table-columns), where any entered filter-values (for the respective columns) are logically "AND"ed together. A more general and flexible search facility could:

Allow toggling between logical "AND" and "OR" combination of a search form's filter-values Allow "stacking" of multiple search-form copies, such that the fields in each individual (sub-)form comprise a parenthetical filter "phrase", which is "AND"ed or "OR"ed together (selectably, as above) with the parenthetical phrases for other sub-forms A variety of extensions can be made to the Edit-mode and Add-mode display paradigms, comprising:

In the reference implementation, violations of any extant "unique" constraints on underlying table-columns are intercepted and reported only upon violation, and then only via the generalized exception-handling mechanism (in response to a back-end RDBMS exception "throw"). Alternatively:

Special-case exception handling (as described above) could still exploit the thrown back-end exception, but provide clearer diagnostics (i.e., exactly—and only—the field-value that has violated a "unique" constraint), and then restore the data-entry form with the problem-field contents pre-selected; or Employ separate database-interrogation logic for each "unique"-constrained field, so as to "pre-qualify" data-entries—and, thereby, allow for "in-place" duplicate-entry detection and signaling (without ever leaving the data-entry form, and without invoking formal exception-handling mechanisms)

Similarly—but more generally—violations of any arbitrary "check" constraints (such as imposed value-ranges, or required satisfaction of algebraic expressions) are intercepted and reported only upon violation within the back-end RDMBS. Instead, such constraints could be extracted from the back-end and "projected" into the client-side UI display (for the reference implementation, via custom-generated Javascript routines). Doing so would allow the detection and signaling of constraint violations immediately upon data-entry, without (additional) contact with the back-end RDBMS (and this, in turn, would obviate the need for any display/session recovery logic)

When adding new records, the reference-implementation Add-form logic does not "initialize" fields for which the back-end defines "default" values—that is, although the underlying table-column will (properly) be set to its default value if the corresponding Add-form field is not explicitly set, the user has no indication (prior to committing the new record) of that default value. Instead, the form could automatically pre-populate the appropriate fields with their corresponding default values (as determined through interrogation of the underlying column-constraints)

In certain situations, it may be desirable during schema interrogation to "deduce" relational interdependencies between tables where no explicit referential-integrity constraints have been defined. In such cases, it is possible to further compare field-names and associated attributes across tables, so as to identify columns which (for instance) are identically named, and (only) one of which is the primary key for its respective table. Under these conditions, it could (optionally) be assumed that the other-table column is a foreign-key cross-reference to the first column. Note that, in so doing, the UI paradigm would then enforce referential integrity for this relationship, even absent the explicit back-end constraint.

Additional mechanisms for further customizing or adapting the baseline UI paradigm and software to meet non-standard and/or special requirements ("business rules") are also indicated, such as:

Specification and enforcement of correlations, interactions, or interdependencies between disparate data-elements (either within or across base-tables), comprising:

"Context-sensitive dropdown controls", whose dropdown-lists are filtered (or "constrained") based on user-defined relations to superior stack-contexts (other than direct master/detail constraints, which already are included as a part of the core UI paradigm). Such controls could be specified via any of the aforementioned annotational methods. Specifications would "attach" to the subordinate-level table-column (i.e., the column whose dropdowns should be "filtered" or "sensitized"), and would consist of tuples indicating (at least) the superior-level table, relevant table-column, and a relation between the superior and subordinate columns. Each tuple could (optionally) be further qualified so as to "scope" the relation—for instance, so that the filter should consider only so many levels above the current stack-context, or that the filter only applies if certain other tables also do (or do not) appear in intervening levels—and possibly, even, only in a specific sequence. It would also, of course, be further possible to assign multiple such "sensitivities" to the same target-column. Consider, as an example, a project-management schema, in which both equipment and technicians are assigned to projects; technicians have specific equipment certifications; and schedules apply both to projects and to technicians. In assigning new technicians to a given project, one may wish to automatically "pre-qualify" the dropdown-list of available technicians such that it only includes technicians who are certified on (at least some of) the project's equipment, and who also are currently available during the lifetime of the project "Interactive dropdown controls" are similar, but effect relations between multiple elements within a single mode-display, rather than across context-stack levels. Using the above example, a single many-tomany table might connect technicians to projects; if the table is accessed directly (that is, at the topmost stack-level, rather than by drilling-down to it from the associated project record), then each time the "project"-dropdown is altered, the "technician" dropdown-list would be automatically regenerated according to the above-described criteria. Again, (potentially multiple) specifications per target-column would resemble those for context-sensitive dropdowns, except (of course) that the "superior-level table" and "scoping extensions" would be irrelevant here. Note that although these two dropdown-types are similar—and that, in some cases (namely, where context-sensitive dropdowns utilize only direct drill-down relations), the former could be simulated with the latter—each offers (or lacks) functionality which makes it more suitable for certain types of use "Context-sensitive and interactive column-level security" would allow data-entry fields to "lock" (or unlock) according to values of (and changes in) other data-fields (for instance, once a project has reached a certain "status" designation). Again, specifications could be effected via any of the aforementioned annotational methods, would "attach" to the "target" table-column (i.e., the column whose security is being mediated), and would resemble those for context-sensitive and interactive dropdowns, respectively, except that the "relation" specification would be supplanted by a Boolean evaluation on the controlling data-field. Note that this same mechanism is easily generalized further to support the toggling of arbitrary column-level constraints (by adding a "constraint definition" field to the specification tuple).

Triggering of custom software subprocesses—on the front- and/or back-end—under specified data conditions and/or at specified system-transition events, such as the "data-change justification" pop-up mechanism described above in detail Various mechanisms for enhancing web-client (or client/server) user-interface performance and functionality can be introduced, comprising:

"Buffered" dropdown controls, which maintain their own separate connections to the back-end RDBMS, and allow the screen display to be rendered before their dropdown lists have been completely populated. Such dropdowns can further be made "typeable", so that a user could begin typing a desired value and "home-in" on matching list-entries; in this case, list-retrieval from the RDBMS can by dynamically revised to retrieve a successively smaller (i.e., closer-matching) result-set.

"Caching" or "sharing" of duplicate dropdown lists, when such lists are lengthy and their retrieval significantly impacts front-end performance and network traffic. For instance, the user-stamping fields described above (Entered_By_Users_Key and Modified_By_Users_Key) generally appear together within the same tables, always share identical dropdown lists, and can (potentially) grow quite long over time; logic to retrieve the shared list once from the RDBMS—rather than twice—for use within both dropdown controls can effect meaningful gains in system responsiveness.

"Back-link" support, to provide functionality similar to that of the standard web-browser "back" button, but without violating the integrity of the user-session or the hierarchical context stack.

"Bookmarking" support, to provide compatibility with standard web-browser "bookmarks" or "favorites" functions: By clicking a special button or link, users can re-render their current display with a re-formed URL, which completely describes the current user-session and context-stack (or, alternatively, a limited and "cauterized" subset of same) so as to allow bookmark-based return to an equivalent display at a later date.

Although the preferred embodiment comprises a standalone application which interacts (on a client/server basis) with a back-end RDBMS, it may in some circumstances become desirable instead to integrate some or all of the invention directly into said RDBMS product (or a tightly-coupled extension or utility to same). Of course, any such alternative embodiment would still conform to the principles of the described invention.

Finally, the implementation described herein could be further varied in numerous respects, but still be within the principles herein illustrated. For instance, while the reference implementation uses a World Wide Web presentation mechanism, a more conventional client-server or native-GUI system could instead be delivered. Also, while the reference implementation depends on adherence to certain structural requirements and naming conventions in the design of any underlying or "target" schema (comprising the use of a single unique, auto-generated primary-key field for every table; the existence of a supporting "sequence" [i.e., reference-implementation RDBMS mechanism for auto-generating primary keys] for every table, and that each sequence be named for its corresponding table plus a "_SEQ" suffix; the reservation of "_VIEW"-suffixed names across the entire table/view namespace [for use by auto-generated system views]; the use of certain column-name suffixes as alternatives to or substitutes for direct datatype- or other attribute-driven discovery [such as a "_FLAG" suffix to connote "yes/no" or "binary" fields, or a "_DATE" suffix to indicate time/date data]; and a specific complement of security-related tables, as described below), such requirements and conventions can be easily supplanted, circumvented, or removed, and do not in any way define or limit the scope of the invention.

It is evident that the embodiment described above accomplishes the stated objects of the invention. While the presently preferred embodiment has been described in detail, it will be apparent to those skilled in the art that the principles of the invention are realizable by other implementations, structures, and configurations without departing from the scope and spirit of the invention, as defined in the appended claims.

Schemalive/AddEditForm.jsp

```
<%!
   // $Revision: 2.6 $
   // $Date: 2001/10/30 08:54:22 $
%>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>
<%@ page import="common.*" %>

<%@ page autoFlush="false" buffer="1000k" errorPage="/Error500.jsp"
session="true"%>

<%! public static final String version_AddEditForm_jsp = "$Revision: 2.6 $";
%>

<HTML>
   <HEAD>

   <%@ include file="common/EntryPoints.jsp" %>
   <%@ include file="common/GlobalHeaderVARS.jsp" %>
   <%@ include file="common/EmptyParamCheck.jsp" %>

   <%
      String unqStr=

         TableDescriptorDisplay.getNoCache(TableDescriptorDisplay.ForJavaScri
         pt);
      if (request.getParameter("unq") != null &&
         request.getParameter("unq").equals((String)
         session.getAttribute("unq"))) {
         /*
         if (Debug.areDebugging) {
         Debug.doLog("AddEditForm unq matched!",Debug.INFO);
         }
         */
         session.setAttribute("unq",unqStr);
      }
      else if (request.getParameter("stackLevel") != null &&
         request.getParameter("stackLevel").equals("0")) {
         /*
         if (Debug.areDebugging) {
         Debug.doLog("Chose to restart from header",Debug.INFO);
         }
         */
         session.setAttribute("unq",unqStr);
      }
      else if (request.getParameter("unq") != null &&
         session.getAttribute("unq") == null) {
         // *THIS* is a (real) expired-session error...
         response.sendRedirect("/Schemalive/ExpiredSession.jsp");
         return;
      }
      else {
```

```
      /*
      if (Debug.areDebugging) {
      Debug.doLog("AddEditForm unq did not match",Debug.INFO);
      }
      */
      // *THIS* is actually an out-of-sequence error...
      response.sendRedirect("/Schemalive/OutOfSequence.jsp");
      return;
   }
   Connection con=null;
   Statement stmt=null;
   Statement sfmt=null;
   ResultSet rs=null;
   ResultSet sf=null;
   boolean canBrowseFlag;
   boolean canEditFlag;
   boolean canAddFlag;
   try {
      con=SQLUtil.makeConnection();
%>

<%@ taglib uri="/WEB-INF/taglib/stack.tld" prefix="sessionUtils" %>

<% response.setHeader("pragma","no-cache"); %>
<% response.setHeader("Expires",new java.util.Date(new
java.util.Date().getTime()-100).toString()); %>

<%@ include file="common/GlobalHeaderJavascript.jsp" %>

<%
      if (request.getParameter("newPageSize") != null) {
         session.setAttribute("pageSize",
         request.getParameter("newPageSize"));
      }

      // session.setAttribute("powerAdd", "No");

      String tableName=request.getParameter("tableName");
      if (tableName == null) {
         // entryPoints is defined in common/EntryPoints.jsp
         for (int i=0;i<entryPoints.length;i++) {
            if (Arrays.binarySearch(headerTableList,entryPoints[i]) >= 0)
            {
               tableName=entryPoints[i];
               break;
            }
         }
         if (tableName == null) {
            if (headerTableList.length > 0) {
               tableName=headerTableList[0];
            }
         }
      }
      String doProcess=request.getParameter("doProcess");
      if (doProcess == null) {
         doProcess="new";
      }
      String stackLevel=request.getParameter("stackLevel");
```

```
    if (stackLevel == null) {
       stackLevel = "@";
    }
    String mode=request.getParameter("mode");
    if (mode == null) {
       mode="search";
    }
    if (usersKey == null || tableName == null) {
       throw new ServletException("<p><br><br><br>"+

          "          &
          nbsp; "+
          "</b>YOU ARE <b>NOT AUTHORIZED</b> TO USE THIS SYSTEM<b><br>"+

          "          &
          nbsp;   ");
    }
%>

    <sessionUtils:stack tableName="<%= tableName %>" mode="<%= mode %>"
    stackLevel="<%= stackLevel %>" database="<%= dbName %>" dbConn="<%=
    dbConnName %>">
    <%
       //   %= stackInfo %
    %>
    </sessionUtils:stack>

<%

   // First, check to see if we should be processing
   //Hashtable returnHash=null;
   //DBConnectionManager connMgr=null;
   //Connection con=null;
   //Statement stmt=null;
   //ResultSet editResultSet=null;

   /*
   String returnTable=request.getParameter("returnTable");
   if (returnTable != null) {
   session.setAttribute("returnTable",returnTable);
   }
   */
   LinkedList l=(LinkedList)session.getAttribute("sessionStack");
   Hashtable tableVals=((StackElement)l.get(l.size()-1)).getFormValues();
   if (mode.equals("search") && doProcess.equals("revised")) {
      tableVals=((StackElement)l.get(l.size()-1)).getSearchParams();
   }

   DataDictionary dd1=DataDictionary.getInstance(dbName,dbConnName);
   DataDictionaryTD ddtd=dd1.getDataDictionaryTD(tableName);

   Enumeration displayFieldsEnumeration = ddtd.displayFields();

   /*
   if (doProcess.equals("return")) {
   int index=Integer.parseInt(request.getParameter("index"));
   LinkedList l=(LinkedList)session.getAttribute("LinkedList");
   returnHash=(Hashtable)l.get(index);
```

```
l.remove(index);
session.setAttribute("LinkedList",l);
doProcess=(String)returnHash.get("doProcess");
}
*/
if (mode.equals("edit")) {
   // build query String
   StringBuffer editQStr=new StringBuffer();
   Enumeration qStrFieldsEnumeration = ddtd.displayFields();
   while (qStrFieldsEnumeration.hasMoreElements()) {
      String fieldName = (String)qStrFieldsEnumeration.nextElement();
      if (fieldName.endsWith("_DATE")) {
         editQStr.append("to_char("+fieldName+",'MM/DD/YYYY') AS ");
      }
      editQStr.append(fieldName+",");
   }
   editQStr.deleteCharAt(editQStr.length()-1);
   editQStr.insert(0,"SELECT ");
   editQStr.append(" FROM "+tableName+" WHERE "+ddtd.getKeyField()+
      "='"+request.getParameter("keyValue")+"'");

   if (Debug.areDebugging) {
      Debug.doLog("editQstr (with globalCon): "+editQStr,Debug.INFO);
   }

   //con=(Connection)pageContext.getAttribute("globalCon");
   //connMgr=DBConnectionManager.getInstance();
   //con=connMgr.getConnection(ddtd.getDBConnection());
   //con=DriverManager.getConnection(JDBCURL);

   stmt=con.createStatement();
   rs = stmt.executeQuery(editQStr.toString());
   rs.next();
 }
%>

<jsp:directive.page session="true"/>

<TITLE>Schemalive</TITLE>
<SCRIPT>
   function filterOperators(rawText) {
   <%
      if (mode.equals("search")) {
         // return(rawText.slice(1+(Math.max(Math.max(rawText.search(">"),
         rawText.search("<")),rawText.search("=")))));
   %>
         var i;
         for (i=0; i<rawText.length; i++) {
            if (rawText.charAt(i) != " ") {
               break;
            }
         }
         rawText=rawText.slice(i);

         if ((rawText.search("<=") == 0) || (rawText.search("<>") == 0) ||
         (rawText.search(">=") == 0)) {
            rawText=rawText.slice(2);
         }
```

```
      else if ((rawText.search("<") == 0)
      || (rawText.search(">") == 0)) {
         rawText=rawText.slice(1);
      }
<%
   }
%>
      return(rawText);
}

function _checkNumeric() {
   var errorStr="";
   with (document.numericFields) {
      for (i=0;i<elements.length;i++) {
         var chkStr=filterOperators(eval("document.<%= tableName
         %>."+elements[i].name+".value"));
         if (eval("\""+chkStr+"\" != \"\"") &&
         eval("isNaN(\""+chkStr+"\")")) {
            errorStr+="\t"+elements[i].value+"\n";
         }
      }
   }
   return(errorStr);
}

function checkNumeric() {
   var errorStr=_checkNumeric();

   if (errorStr != "") {
      alert("The following fields must have numeric values only:\n\n"+
         errorStr);
      return(false);
   }
   else {
      return(true);
   }
}

function checkRequired() {
   var errorStr="";
   with (document.requiredFields) {
      for (i=0;i<elements.length;i++) {
         var chkStr="document.<%= tableName %>."+elements[i].name;
         if (eval(chkStr+".type==\"select-one\"")) {
            //chkStr=chkStr+".selectedIndex==0";
            chkStr=chkStr+".options[document.<%= tableName %>."+
               elements[i].name+".selectedIndex].text == \"\"";

         }
         else {
            chkStr=chkStr+".value==\"\"";
         }
         //alert(chkStr);
         if (eval(chkStr)) {
            errorStr+="\t"+elements[i].value+"\n";
         }
      }
   }
```

```
   var checkNumericStr = _checkNumeric();
   if (errorStr != "" || checkNumericStr != "") {
      var combinedErrorStr = "";
      if (errorStr != "") {
         combinedErrorStr+="The following fields must be entered:\n\n"+
            errorStr+"\n";
      }
      if (checkNumericStr != "") {
         combinedErrorStr+="The following fields must have numeric "+
            "values only:\n\n"+checkNumericStr;
      }
      alert(combinedErrorStr);
      return(false);
   }
   else {
      return(true);
   }
}

function checkDate(objName) {
   var datefield = objName;
   if (chkdate(objName) == false) {
      datefield.select();
      alert("Date is invalid -- please try again...");
      datefield.focus();
      return false;
   }
   else {
      return true;
   }
}

function chkdate(objName) {
   var strDatestyle = "US"; //United States date style
   //var strDatestyle = "EU";  //European date style
   var strDate;
   var strDateArray;
   var strDay;
   var strMonth;
   var strYear;
   var intday;
   var intMonth;
   var intYear;
   var booFound = false;
   var datefield = objName;
   var strSeparatorArray = new Array("-"," ","/",".");
   var intElementNr;
   var err = 0;
   strDate = filterOperators(datefield.value);
   // check for invalid chars
   var i;
   for (i=0; i<strDate.length; i++) {
      if (strDate.charAt(i) != " ") {
         break;
      }
   }
   strDate=strDate.slice(i);
   if (strDate.length < 1) {
```

```
      return true;
   }
   for (i=0; i<strDate.length; i++) {
      var chDate = strDate.charAt(i);
      if (chDate >= '0' && chDate <= '9') {
         continue;
      }
      var j;
      var foundSep=false
      for (j=0;j<strSeparatorArray.length;j++) {
         if (chDate == strSeparatorArray[j]) {
            foundSep=true;
            continue;
         }
      }
      if (!foundSep) {
         return false;
      }
   }
   for (intElementNr = 0; intElementNr < strSeparatorArray.length;
      intElementNr++) {
      if (strDate.indexOf(strSeparatorArray[intElementNr]) != -1) {
         strDateArray =
            strDate.split(strSeparatorArray[intElementNr]);
         if (strDateArray.length != 3) {
            err = 1;
            return false;
         }
         else {
            strDay = strDateArray[0];
            strMonth = strDateArray[1];
            strYear = strDateArray[2];
         }
         booFound = true;
      }
   }
   if (booFound == false) {
      if (strDate.length>5) {
         strDay = strDate.substr(0, 2);
         strMonth = strDate.substr(2, 2);
         strYear = strDate.substr(4);
      }
      else {
         strYear="";
         strDay="";
         strMonth=strDate;
      }
   }
   if (strYear.length == 1) {
      strYear = '0'+strYear;
   }
   intYear = parseInt(strYear, 10);
   if (isNaN(intYear)) {
      err = 4;
      return false;
   }
   if (strYear.length == 2) {
      if (intYear > 50) {
```

```
        strYear = '19' + strYear;
    }
    else {
        strYear = '20' + strYear;
    }
}

// US style
if (strDatestyle == "US") {
    strTemp = strDay;
    strDay = strMonth;
    strMonth = strTemp;
}
intday = parseInt(strDay, 10);
if (isNaN(intday)) {
    err = 2;
    return false;
}
intMonth = parseInt(strMonth, 10);
if (isNaN(intMonth)) {
    err = 3;
    return false;
}
if (intMonth>12 || intMonth<1) {
    err = 5;
    return false;
}
if ((intMonth == 1 || intMonth == 3 ||
    intMonth == 5 || intMonth == 7 ||
    intMonth == 8 || intMonth == 10 ||
    intMonth == 12) && (intday > 31 || intday < 1)) {
    err = 6;
    return false;
}
if ((intMonth == 4 || intMonth == 6 ||
    intMonth == 9 || intMonth == 11) &&
    (intday > 30 || intday < 1)) {
    err = 7;
    return false;
}
if (intMonth == 2) {
    if (intday < 1) {
        err = 8;
        return false;
    }
    if (LeapYear(intYear) == true) {
        if (intday > 29) {
            err = 9;
            return false;
        }
    }
    else {
        if (intday > 28) {
            err = 10;
            return false;
        }
    }
}
```

```
    /*
    if (strDatestyle == "US") {
       datefield.value = intMonth + "/" +
       intday+ "/" + strYear;
    }
    else {
       datefield.value = intday + "/" +
       intMonth-1 + "/" + strYear;
    }
    */
    return true;
 }

 function LeapYear(intYear) {
    if (intYear % 100 == 0) {
       if (intYear % 400 == 0) { return true; }
    }
    else {
       if ((intYear % 4) == 0) { return true; }
    }
    return false;
 }

 function doDateCheck(from, to) {
    if (Date.parse(from.value) <= Date.parse(to.value)) {
       alert("The dates are valid.");
    }
    else {
       if (from.value == "" || to.value == "")
          alert("Both dates must be entered.");
       else
          alert("To date must occur after the from date.");
    }
 }

 function holdForPickList(whereTo,selectObject) {
    with (document.forms[1]) {
       if (selectObject.value != "") {
          keyValue.value=selectObject.value;
       }
       doProcess.value='drillPickList';
       stackLevel.value="+";
       returnDropDown.value=selectObject.name;
       tableName.value=whereTo;
       submit();
    }
 }

 function holdForDetail(whereTo,masterKeyValue) {
    with (document.forms[1]) {
       keyValue.value=masterKeyValue;
       doProcess.value='drillDetail';
       stackLevel.value="+";
       tableName.value=whereTo;
       submit();
    }
 }
</SCRIPT>
```

```
</HEAD>

<BODY bgcolor="<%= PAGEBKGD %>"
<%
   String focusField=request.getParameter("focusField");
   if (focusField != null) {
%>
      onLoad="javascript:document.forms[1].<%= focusField
      %>.focus();javascript:if (document.forms[1].<%= focusField %>.type
      != 'select-one') { document.forms[1].<%= focusField %>.select()
      );javascript:history.forward(1);"
<%
   }
   else {
%>
      onLoad="javascript:history.forward(1);"
<%
   }
%>
>

<%@ include file="common/GlobalHeaderHTML.jsp" %>
<%
      sfmt =
      con.createStatement(ResultSet.TYPE_SCROLL_INSENSITIVE,ResultSet.CONC
      UR_READ_ONLY);
      sf = sfmt.executeQuery(
         "SELECT "+
         "        DECODE(MAX(ABS(Can_Browse_Flag)), NULL, 0,
         MAX(ABS(Can_Browse_Flag))) AS Can_Browse_Flag, "+
         "        DECODE(MAX(ABS(Can_Edit_Flag)), NULL, 0,
         MAX(ABS(Can_Edit_Flag))) AS Can_Edit_Flag, "+
         "        DECODE(MAX(ABS(Can_Add_Flag)), NULL, 0,
         MAX(ABS(Can_Add_Flag))) AS Can_Add_Flag "+
         "FROM "+
         //          "        PEOPLE, STAFF, USERS, SECURITY_GROUP_USER,
         SECURITY_GROUP_TABLE, SECURITY_TABLE "+
         "        PEOPLE, USERS, SECURITY_GROUP_USER, SECURITY_GROUP_TABLE,
         SECURITY_TABLE "+
         "WHERE "+
         "        PEOPLE.Active_Flag <> 0 AND "+
         //          "        PEOPLE.People_Key = STAFF.People_Key AND "+
         //          "        STAFF.Staff_Key = USERS.Staff_Key AND "+
         "        PEOPLE.People_Key = USERS.People_Key AND "+
         "        USERS.Users_Key = SECURITY_GROUP_USER.Users_Key AND "+
         "        SECURITY_GROUP_USER.Security_Group_Key =
         SECURITY_GROUP_TABLE.Security_Group_Key AND "+
         "        SECURITY_GROUP_TABLE.Security_Table_Key =
         SECURITY_TABLE.Security_Table_Key AND "+
         "        SECURITY_TABLE.Security_Table_Name = '"+tableName+"' AND
         "+
         "        SECURITY_GROUP_USER.Users_Key = "+usersKey
         );
      sf.next();
      canBrowseFlag = sf.getBoolean(1);
      canEditFlag = sf.getBoolean(2);
      canAddFlag = sf.getBoolean(3);
```

```
      boolean relevantFlag;
      String modePhrase = null;
      if (mode.equals("add")) {
         relevantFlag = canAddFlag;
         modePhrase = "ADD TO";
      }
      else if (mode.equals("search")) {
         relevantFlag = canBrowseFlag;
         modePhrase = "BROWSE";
      }
      else {
         relevantFlag = canEditFlag;
         modePhrase = "EDIT";
      }
      if (!relevantFlag) {
         throw new ServletException("<p><br><br><br>"+

            "          &
            nbsp; "+
            "</b>YOU ARE <b>NOT AUTHORIZED</b> TO "+modePhrase+" THE
            <b>"+TableDescriptorDisplay.getDisplayLabel(tableName,
            TableDescriptorDisplay.AllUpper)+"</b> TABLE<b><br>"+

            "          &
            nbsp;   ");
      }
%>

<%=
   TableDescriptorDisplay.displayStack((LinkedList)
   session.getAttribute("sessionStack"),unqStr)
%>
   <hr>
   <TABLE width="100%" cellpadding="0" cellspacing="0">
      <tr valign="bottom" align="right">
<%
      String titlePrefix = null;
      if (mode.equals("add")) {
         titlePrefix = "ADDING TO ";
      }
      else if (mode.equals("search")) {
         titlePrefix = "SEARCHING ";
      }
      else {
         titlePrefix = "EDITING ";
      }
%>

         <TD valign="bottom"><font face="ARIAL,HELVETICA" size="4"><%=
         titlePrefix %><b>
            <%=
            TableDescriptorDisplay.getDisplayLabel(tableName,TableDescript
            orDisplay.AllUpper) %></b>
            <!--img src="images/logo-width.gif"-->

<%
      StackElement se=(StackElement)l.getLast();
      StackElement pe=null;
```

```
      if (se.getMasterColumn() != null) {
         pe=(StackElement)l.get(l.size()-2);
%>
            <br><font size="4">FOR
            <b><%=
            TableDescriptorDisplay.getDisplayLabel(pe.getTableName(),
            TableDescriptorDisplay.AllUpper) %><%=
            (TableDescriptorDisplay.getDisplayLabel(pe.getTableName(),Tabl
            eDescriptorDisplay.AllUpper).equals("CUSTOM VIEW PROTOTYPE_3")
            ||
            TableDescriptorDisplay.getDisplayLabel(pe.getTableName(),Table
            DescriptorDisplay.AllUpper).equals("CUSTOM VIEW PROTOTYPE_2")
            || TableDescriptorDisplay.getDisplayLabel(pe.getTableName(),
            TableDescriptorDisplay.AllUpper).equals("CUSTOM VIEW
            PROTOTYPE_1"))?"":" #"+pe.getCurrentKey() %></font></b>
            <img src="images/logo-width.gif">
<%
      }
%>
         </font></TD>
      </TR>
   </TABLE>

   <hr>
   <FORM METHOD="POST" NAME="<%= tableName %>" ACTION="<%= URIPath %>
   /DoAddEdit.jsp">
      <TABLE width="100%" cellpadding="0" cellspacing="0">
         <tr valign="middle" align="right"><TD valign="top" align="left"
         WIDTH=100% ROWSPAN=3>
         <%=

            TableDescriptorDisplay.displayNavbar(tableName,unqStr,canBrows
            eFlag,canAddFlag,(se.getSearchString() != null))
         %>
<%
      String buttonLabel = null;
      if (mode.equals("add")) {
         buttonLabel = "Add Record to ";
         doProcess = "insert";
      }
      else if (mode.equals("search")) {
         buttonLabel = "Search for Records in ";
         doProcess = "filter";
      }
      else {
         buttonLabel = "Update Record in ";
         doProcess = "update";
      }
      buttonLabel += TableDescriptorDisplay.getFormattedLabel(tableName);
%>

         </TD><TD valign="middle" align="right">
            <INPUT TYPE="SUBMIT" VALUE="<%= buttonLabel %>"
            <%= (mode.equals("search")?"onClick=\"return
            checkNumeric();\"":"onClick=\"return checkRequired();\"") %>
            >
            <!-- %= (mode.equals("search")?"":"onClick=\"return
            checkRequired();\"") % -->
```

```
      </TD><TD valign="middle" align="right">
         <img src="images/logo-width.gif">
      </TD></TR>
<%
   if (mode.equals("search") || mode.equals("add")) {
%>
      <tr valign="top" align="right" height=1><TD valign="top"
      align="left">
      </TD><TD></TD></TR>
      <tr valign="top" align="right"><TD valign="top" align="left">
<%
      Balloon b=null;
      if (mode.equals("search")) {
         b=bh.getNavBalloon("expressEditCheckbox");
%>
         <input name="expressEdit" type="checkbox" <% if (b!=null) { %>
         onMouseOver="setHang('<%= b.getID() %>',event,this,'navLink');
         return true;" onMouseOut="clearHang(); return true;"
         onClick="clearHang(); return true;" <% } %> value="Yes" <%=
         ((session.getAttribute("expressEdit") != null) && (((String)
         session.getAttribute("expressEdit")).equals("Yes")))?"CHECKED"
         :"" %>>
<%
         if (b!=null) {
%>
         <A HREF="" CLASS="notDecorated" onMouseOver="setHang('<%=
         b.getID() %>',event,this,'navLink'); return true;"
         onMouseOut="clearHang(); return true;" onClick="clearHang();
         return false;">
<%
         }
%>
         Enable 'express edit'<% if (b!=null) { %></A><% } %>

<%
      }
      else if (mode.equals("add")) {
         b=bh.getNavBalloon("powerAddCheckbox");
%>
         <input name="powerAdd" type="checkbox" <% if (b!=null) { %>
         onMouseOver="setHang('<%= b.getID() %>',event,this,'navLink');
         return true;" onMouseOut="clearHang(); return true;"
         onClick="clearHang(); return true;" <% } %> value="Yes" <%=
         ((request.getParameter("powerAdd") != null) &&
         ((request.getParameter("powerAdd")).equals("Yes")))?"CHECKED":
         "" %>>
<%
         if (b!=null) {
%>
         <A HREF="" CLASS="notDecorated" onMouseOver="setHang('<%=
         b.getID() %>',event,this,'navLink'); return true;"
         onMouseOut="clearHang(); return true;" onClick="clearHang();
         return false;">
<%
         }
%>
         Enable 'power add'<% if (b!=null) { %></A><% } %>
```

```
<%
        }
%>
        </TD><TD valign="top" align="right">
           <img src="images/logo-width.gif">
        </TD></TR>
<%
     }
%>
     </TABLE>
     <br>
     <TABLE border="1" width="100%" id="dataTable">
<%
     int columnNumber=1;
     int htmlElementNum=1;
     StringBuffer requiredFieldsForm=
        new StringBuffer("<FORM name=\"requiredFields\">\n");
     StringBuffer numericFieldsForm=
        new StringBuffer("<FORM name=\"numericFields\">\n");

     StringBuffer tableHelp = new StringBuffer();
     while (displayFieldsEnumeration.hasMoreElements()) {
        String columnName=(String)displayFieldsEnumeration.nextElement();
        String formattedColumnName=
        ddtd.getFormattedField(columnNumber-1);

        if ((!mode.equals("search")) &&
           (columnName.equals("ENTERED_BY_USERS_KEY") ||
           columnName.equals("ENTRY_DATE") ||
           columnName.equals("MODIFIED_BY_USERS_KEY") ||
           columnName.equals("LAST_MODIFIED_DATE")))
        {
           columnNumber++;
           continue;
        }

        String value="";

        value=request.getParameter(ddtd.getDatabase()
        +"__"+ddtd.getTable()+"__"+columnName);
        if (value == null) {
           if (tableVals.size() > 0) {
              value=(String)tableVals.get(ddtd.getDatabase()
              +"__"+ddtd.getTable()+"__"+columnName);
           }
           else if (mode.equals("edit")) {
              value=rs.getString(columnNumber++);
           }
        }
        if (value == null) {
           value="";
        }
        String displayLabel =
           TableDescriptorDisplay.getDisplayLabelEdit(ddtd,
           columnName,
           "document.forms[1]."+ddtd.getDatabase()+"__"+
           ddtd.getTable()+"__"+columnName,1,unqStr,usersKey,con);
        int begTag=displayLabel.indexOf("<b>");
```

```
        int endTag=displayLabel.indexOf("</b>");
        String trimmedDisplayLabel=displayLabel;
        if (begTag >=0 && endTag >= 0) {
           trimmedDisplayLabel=
              trimmedDisplayLabel.substring(begTag+3,endTag);
        }
        ResultSetMetaData rsmd=ddtd.getMetaData();
        try {
           if ((rsmd.isNullable(ddtd.findColumnName(columnName)) !=
              ResultSetMetaData.columnNullable) &&
              ddtd.getKeyField() != null &&
              !ddtd.getKeyField().equals(columnName) &&
              !columnName.endsWith("_FLAG"))
           {
              requiredFieldsForm.append("\t<INPUT type=\"hidden\" "+
                 "name=\""+ddtd.getDatabase()+"__"+ddtd.getTable()+
                 "__"+columnName+"\" value=\""+
                 trimmedDisplayLabel+"\">\n");
           }

           if
           (rsmd.getColumnTypeName(ddtd.findColumnName(columnName)).equal
           s("NUMBER") && ((ddtd.getKeyField() != null &&
           ddtd.getKeyField().equals(columnName)) ||
           !(columnName.endsWith("_KEY") ||
           columnName.endsWith("_FLAG")))) {
              numericFieldsForm.append("\t<INPUT type=\"hidden\" "+
                 "name=\""+ddtd.getDatabase()+"__"+ddtd.getTable()+
                 "__"+columnName+"\" value=\""+
                 trimmedDisplayLabel+"\">\n");
           }
        }
        catch (SQLException sqle) {
           sqle.printStackTrace();
        }
%>
        <TR><TD bgcolor="<%= DARKCELL %>" align="right" valign="center">
           <font size="2">
           <nobr>
           <%=
              displayLabel
           %>:
           </nobr>
           </font>
        </TD><TD bgcolor="<%= MIDLCELL %>" width="100%">
           <%=
              TableDescriptorDisplay.getDisplayFieldEdit(ddtd,
                 // columnName,(returnHash != null)?"return":mode,value,
                 (LinkedList) session.getAttribute("sessionStack"))
                 columnName,mode,value, 1, con)
              // (LinkedList) session.getAttribute("sessionStack"))
           %>
<%
        Balloon tb = bh.getTableBalloon(ddtd.getTable().toUpperCase()
        +"."+columnName.toUpperCase());
        if (tb != null) {
           tableHelp.append("makeTableBalloon(\""+tb.getID()+"\",\""+
              tb.getMsg()+"\");\n");
```

```
%>
        </TD></TR>
<%
      }
      ((StackElement)l.get(l.size()-1)).setFormValues(new Hashtable());
      /*
      if (con != null) {
         editResultSet.close();
         stmt.close();
         //connMgr.freeConnection(ddtd.getDBConnection(),con);
      }
      */
      MasterDetail md=MasterDetail.getInstance(dbName,dbConnName);
      Vector detailTables=md.getDetailTables(tableName);
      if (detailTables != null && mode.equals("edit")) {
         Object[] detailTablesAry = detailTables.toArray();
         //Arrays.sort(detailTablesAry);
         for (int i=0;i<detailTablesAry.length;i++) {
            String detailTableInfo=(String)detailTablesAry[i];
            int dot=detailTableInfo.indexOf(".");
            String detailTable=detailTableInfo.substring(0,dot);
            String detailTableFKey=detailTableInfo.substring(dot+1);
            String mdQStr="SELECT COUNT(*) FROM "+detailTable+
               " WHERE "+detailTableFKey+"="+
               request.getParameter("keyValue");

            if (Debug.areDebugging) {
               Debug.doLog("mdQStr: "+mdQStr,Debug.INFO);
            }

            //Statement masterStmt = masterCon.createStatement();
            rs = stmt.executeQuery(mdQStr);
            rs.next();
            int numEntries=Integer.parseInt(rs.getString(1));
            String entryStr=(numEntries == 1)?"entry":"entries";
%>
         <TR><TD align="right" bgcolor="<%= DARKCELL %>">
            <font size="2">
            <!--A HREF="<%= URIPath %>/DoAddEdit.jsp?tableName=<%=
            detailTable %>&keyField=<%= detailTableFKey %>&keyVal=<%=
            request.getParameter("keyValue") %>&stackLevel=%2B&doProcess=
            drillDetail&<%=
            TableDescriptorDisplay.getNoCache(TableDescriptorDisplay.ForUR
            L) %>"-->
<%
            sf = sfmt.executeQuery(
               "SELECT "+
               "        DECODE(MAX(ABS(Can_Browse_Flag)), NULL, 0,
               MAX(ABS(Can_Browse_Flag))) AS Can_Browse_Flag "+
               "FROM "+
               //                    "        PEOPLE, STAFF, USERS,
               SECURITY_GROUP_USER, SECURITY_GROUP_TABLE, SECURITY_TABLE
               "+
               "        PEOPLE, USERS, SECURITY_GROUP_USER,
               SECURITY_GROUP_TABLE, SECURITY_TABLE "+
               "WHERE "+
               "        PEOPLE.Active_Flag <> 0 AND "+
```

```
            //                           "
            STAFF.People_Key AND "+
            //                           "        STAFF.Staff_Key =
            USERS.Staff_Key AND "+
            "         PEOPLE.People_Key = USERS.People_Key AND "+
            "         USERS.Users_Key = SECURITY_GROUP_USER.Users_Key AND
            "+
            "         SECURITY_GROUP_USER.Security_Group_Key =
            SECURITY_GROUP_TABLE.Security_Group_Key AND" +
            "         SECURITY_GROUP_TABLE.Security_Table_Key =
            SECURITY_TABLE.Security_Table_Key AND "+
            "         SECURITY_TABLE.Security_Table_Name =
            '"+detailTable+"' AND "+
            "         SECURITY_GROUP_USER.Users_Key = "+usersKey
         );
         sf.next();
         if (sf.getBoolean(1)) {
%>
         <A HREF="javascript:holdForDetail('<%= detailTable %>',<%=
         request.getParameter("keyValue") %>,<%= unqStr %>)">
         <%= TableDescriptorDisplay.getFormattedLabel(detailTable) %>
         </A>:
<%
         }
         else {
%>
         <%= TableDescriptorDisplay.getFormattedLabel(detailTable) %>:
<%
         }
%>
         </font>
      </TD><TD bgcolor="<%= MIDLCELL %>">
         <nobr>
         <%= numEntries %> <%= entryStr %></nobr>
      </TD></TR>
<%
      //masterRs.close();
      //masterStmt.close();
      //connMgr.freeConnection(dbConnName,masterCon);
      }
   }
%>
   </TABLE>
   <hr>
   <!--INPUT TYPE="SUBMIT" VALUE="<%= buttonLabel %>"
   onClick="document.forms[1].doProcess.value='update';return true;"-->
   <!--INPUT TYPE="SUBMIT" VALUE="<%= buttonLabel %>"-->

   <INPUT type="hidden" name="doProcess" value="<%= doProcess %>">
   <INPUT type="hidden" name="holdDoProcess" value="">
   <INPUT type="hidden" name="tableName" value="">
   <INPUT type="hidden" name="keyValue" value="">
   <INPUT type="hidden" name="stackLevel" value="@">
   <INPUT type="hidden" name="returnDropDown" value="">
   <INPUT type="hidden" name="unq" value="<%= unqStr %>">
   <!-- %=
   TableDescriptorDisplay.getNoCache(TableDescriptorDisplay.ForForm) %
   -->
```

```
        </FORM><P>

    <%=
        requiredFieldsForm.toString()
    %>
        </FORM>

    <%=
        numericFieldsForm.toString()
    %>
        </FORM>
        <!--jsp:include page="/common/GlobalFooter.jsp" flush="true"-->
        <!--/jsp:include-->
        <SCRIPT>
            setTableCoords();
            setupNavHelp();
            <%= tableHelp.toString() %>
        </SCRIPT>
    </BODY>
</HTML>
    <%
        }
        catch (SQLException sqle) {
            sqle.printStackTrace();
            throw sqle;
        }
        finally {
            try {
                if (sf != null)sf.close();
                if (rs != null)rs.close();
                if (sfmt != null)sfmt.close();
                if (stmt != null)stmt.close();
                if (con != null)con.close();
            }
            catch (SQLException sqle) {
                sqle.printStackTrace();
            }
        }
    %>
<%@ include file="common/GlobalFooter.jsp" %>
```

Schemalive/BalloonHelp.jsp

```
<%!
    // $Revision: 2.3 $
    // $Date: 2001/10/30 01:35:53 $
%>

<%@ page import="HTMLUtils.*" %>
<%@ page import="java.util.*" %>

<HTML>
    <HEAD>
    <TITLE>BalloonHelp</TITLE>
    </HEAD>

    <BODY bgcolor="#FFFFFF">
    <%
```

```
      //BalloonHelp.refreshInstance(out);
      String function=request.getParameter("function");
      if (function==null) {
   %>
         <A HREF="/Schemalive/BalloonHelp.jsp?function=rebuild">Rebuild
         BalloonHelp</A>
         <h3>Navigation BalloonHelp</h3>
         <TABLE BORDER="1">
            <TR><TH align="left">Help Object Name</TH><TH align="left">PopUp
            Text</TH></TR>
   <%
         BalloonHelp bh = BalloonHelp.getInstance();
         Enumeration nbi = bh.getNavBalloonIDs();
         Enumeration tbi = bh.getTableBalloonIDs();
         while (nbi.hasMoreElements()) {
            String key = (String)nbi.nextElement();
            Balloon b = bh.getNavBalloon(key);
   %>
            <TR><TD align="left"><%= key %></TD><TD align="left"><%=
            showHTML(b.getMsg()) %></TD></TR>
   <%
         }
   %>
         </TABLE>
            <h3>Table BalloonHelp</h3>
            <TABLE border="1">
                <TR><TH align="left">TABLE.Column</TH><TH align="left">PopUp
                Text</TH></TR>
   <%
            while (tbi.hasMoreElements()) {
                String key = (String)tbi.nextElement();
                Balloon b = bh.getTableBalloon(key);
    %>
                <TR><TD align="left"><%= key %></TD><TD align="left"><%=
                showHTML(b.getMsg()) %></TD></TR>
    <%
            }
    %>
            </TABLE>
    <%
      }
        else if (function.equals("rebuild")) {
            BalloonHelp.refreshInstance(out);
    %>
            <P>
            <A HREF="/Schemalive/BalloonHelp.jsp">Browse BalloonHelp</A>
    <%
        }
   %>
   </BODY>
</HTML>
<%!
    public String showHTML(String msg) {
        StringBuffer sb = new StringBuffer(msg);
        int tagLoc=-1;
        while (0 < (tagLoc=sb.toString().indexOf("<"))) {
            sb.deleteCharAt(tagLoc);
            sb.insert(tagLoc,"<");
```

```
        }
        while (0 < (tagLoc=sb.toString().indexOf(">"))) {
            sb.deleteCharAt(tagLoc);
            sb.insert(tagLoc,">");
        }
        return(sb.toString());
    }
%>
```

Schemalive/Browse.jsp

```
<%!
   // $Revision: 2.5 $
   // $Date: 2001/10/30 08:26:33 $
%>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>
<%@ page import="common.*" %>

<%@ page autoFlush="false" buffer="3000k" errorPage="/Error500.jsp"
session="true"%>

<%! public static final String version_Browse_jsp = "$Revision: 2.5 $"; %>

<HTML>
   <HEAD>

   <%@ include file="common/EntryPoints.jsp" %>
   <%@ include file="common/GlobalHeaderVARS.jsp" %>
   <%@ include file="common/EmptyParamCheck.jsp" %>

   <%
      response.setHeader("pragma","no-cache");
      response.setHeader("Expires",
         new java.util.Date(new java.util.Date().getTime()-100).toString());
      String unqStr=

         TableDescriptorDisplay.getNoCache(TableDescriptorDisplay.ForJavaScri
         pt);
      if (request.getParameter("unq") != null &&
         request.getParameter("unq").equals((String)
         session.getAttribute("unq")))
      {
         if (Debug.areDebugging) {
            Debug.doLog("Browse unq matched!",Debug.INFO);
         }
         session.setAttribute("unq",unqStr);
      }
      else if (request.getParameter("stackLevel") != null &&
         request.getParameter("stackLevel").equals("0"))
      {
         if (Debug.areDebugging) {
            Debug.doLog("Chose to restart from header",Debug.INFO);
         }
```

```
      session.setAttribute("unq",unqStr);
   }
   else if (request.getParameter("unq") != null &&
      session.getAttribute("unq") == null)
   {
      // *THIS* is a (real) expired-session error!!!
      response.sendRedirect("/Schemalive/ExpiredSession.jsp");
      return;
   }
   else {
      /*
      if (Debug.areDebugging) {
         Debug.doLog("AddEditForm unq did not match",Debug.INFO);
      }
      */
      // *THIS* is actually an out-of-sequence error...
      response.sendRedirect("/Schemalive/OutOfSequence.jsp");
      return;
   }
   Connection con=null;
   Statement stmt=null;
   ResultSet rs=null;
   boolean canBrowseFlag;
   boolean canEditFlag;
   boolean canAddFlag;
   boolean BrowseTarget2Flag=true;
   boolean BrowseTarget1Flag=true;
   boolean EditTarget2Flag=true;
   boolean EditTarget1Flag=true;
   boolean loopCellFlag=true;
   try {
      con=SQLUtil.makeConnection();
%>


   <TITLE>Schemalive</TITLE>

<%@ include file="common/GlobalHeaderJavascript.jsp" %>
</HEAD>


<%
      int sequence=ManageSession.updateSequence(session);

      // session.setAttribute("powerAdd", "No");
%>
<!-- BODY bgcolor="<%= PAGEBKGD %>"
onLoad="location.href='/Schemalive/CheckSequence.jsp?sequence=<%= sequence
%>&<%= TableDescriptorDisplay.getNoCache(TableDescriptorDisplay.ForURL)
%>';" -->
<BODY bgcolor="<%= PAGEBKGD %>" onLoad="history.forward(1);">

<%@ include file="common/GlobalHeaderHTML.jsp" %>
<%
      if (request.getParameter("newPageSize") != null) {
         session.setAttribute("pageSize",
         request.getParameter("newPageSize"));
      }
```

```
String tableName=request.getParameter("tableName");
if (tableName == null) {
   // entryPoints is defined in common/EntryPoints.jsp
   for (int i=0;i<entryPoints.length;i++) {
      if (Arrays.binarySearch(headerTableList,entryPoints[i]) >= 0)
      {
         tableName=entryPoints[i];
         break;
      }
   }
   if (tableName == null) {
      if (headerTableList.length > 0) {
         tableName=headerTableList[0];
      }
   }
}
String doProcess=request.getParameter("doProcess");
if (doProcess == null) {
   doProcess="new";
}
String stackLevel=request.getParameter("stackLevel");
if (stackLevel == null) {
   stackLevel = "@";
}
if (usersKey == null || tableName == null) {
   throw new ServletException("<p><br><br><br>"+

      "          &
      nbsp; "+
      "</b>YOU ARE <b>NOT AUTHORIZED</b> TO USE THIS SYSTEM<b><br>"+

      "          &
      nbsp;   "
   );
}

stmt =
con.createStatement(ResultSet.TYPE_SCROLL_INSENSITIVE,ResultSet.CONC
UR_READ_ONLY);
rs = stmt.executeQuery(
   "SELECT "+
   "  DECODE(MAX(ABS(Can_Browse_Flag)), NULL, 0,
   MAX(ABS(Can_Browse_Flag))) AS Can_Browse_Flag, "+
   "  DECODE(MAX(ABS(Can_Edit_Flag)), NULL, 0,
   MAX(ABS(Can_Edit_Flag))) AS Can_Edit_Flag, "+
   "  DECODE(MAX(ABS(Can_Add_Flag)), NULL, 0,
   MAX(ABS(Can_Add_Flag))) AS Can_Add_Flag "+
   "FROM "+
   // "  PEOPLE, STAFF, USERS, SECURITY_GROUP_USER,
   SECURITY_GROUP_TABLE, SECURITY_TABLE "+
   "  PEOPLE, USERS, SECURITY_GROUP_USER, SECURITY_GROUP_TABLE,
   SECURITY_TABLE "+
   "WHERE "+
   "        PEOPLE.Active_Flag <> 0 AND "+
   //       "        PEOPLE.People_Key = STAFF.People_Key AND "+
   //       "        STAFF.Staff_Key = USERS.Staff_Key AND "+
   "        PEOPLE.People_Key = USERS.People_Key AND "+
   "        USERS.Users_Key = SECURITY_GROUP_USER.Users_Key AND "+
```

```
   "  SECURITY_GROUP_USER.Security_Group_Key =
   SECURITY_GROUP_TABLE.Security_Group_Key AND "+
   "  SECURITY_GROUP_TABLE.Security_Table_Key =
   SECURITY_TABLE.Security_Table_Key AND "+
   // "  SECURITY_TABLE.Security_Table_Name =
   '"+request.getParameter("tableName")+"' AND "+
   "  SECURITY_TABLE.Security_Table_Name = '"+tableName+"' AND "+
   "  SECURITY_GROUP_USER.Users_Key = "+usersKey
);
rs.next();
canBrowseFlag = rs.getBoolean(1);
canEditFlag = rs.getBoolean(2);
canAddFlag = rs.getBoolean(3);
if (!canBrowseFlag) {
   throw new ServletException("<p><br><br><br>"+

      "          &
      nbsp; "+
      //       "</b>YOU ARE <b>NOT AUTHORIZED</b> TO BROWSE THE
      <b>"+TableDescriptorDisplay.getDisplayLabel(request.getParamet
      er("tableName"), TableDescriptorDisplay.AllUpper)+"</b>
      TABLE<b><br>"+
      "</b>YOU ARE <b>NOT AUTHORIZED</b> TO BROWSE THE
      <b>"+TableDescriptorDisplay.getDisplayLabel(tableName,
      TableDescriptorDisplay.AllUpper)+"</b> TABLE<b><br>"+

      "          &
      nbsp;   ");
}

//    if
(request.getParameter("tableName").equals("CUSTOM_VIEW_PROTOTYPE_1")
) {
if (tableName.equals("CUSTOM_VIEW_PROTOTYPE_1")) {
   rs = stmt.executeQuery(
      "SELECT "+
      "  SECURITY_TABLE.Security_Table_Name, "+
      "        DECODE(MAX(ABS(Can_Browse_Flag)), NULL, 0,
      MAX(ABS(Can_Browse_Flag))) AS Can_Browse_Flag, "+
      "        DECODE(MAX(ABS(Can_Edit_Flag)), NULL, 0,
      MAX(ABS(Can_Edit_Flag))) AS Can_Edit_Flag "+
      "FROM "+
      //         "        PEOPLE, STAFF, USERS, SECURITY_GROUP_USER,
      SECURITY_GROUP_TABLE, SECURITY_TABLE "+
      "        PEOPLE, USERS, SECURITY_GROUP_USER,
      SECURITY_GROUP_TABLE, SECURITY_TABLE "+
      "WHERE "+
      "        PEOPLE.Active_Flag <> 0 AND "+
      //              "        PEOPLE.People_Key = STAFF.People_Key
      AND "+
      //              "        STAFF.Staff_Key = USERS.Staff_Key AND
      "+
      "        PEOPLE.People_Key = USERS.People_Key AND "+
      "        USERS.Users_Key = SECURITY_GROUP_USER.Users_Key AND "+
      "        SECURITY_GROUP_USER.Security_Group_Key =
      SECURITY_GROUP_TABLE.Security_Group_Key AND "+
      "        SECURITY_GROUP_TABLE.Security_Table_Key =
      SECURITY_TABLE.Security_Table_Key AND "+
```

```
        "        SECURITY_TABLE.Security_Table_Name IN
        ('DRILL_TARGET_2', 'EDIT_TARGET_2', 'DRILL_TARGET_1',
        'EDIT_TARGET_1') AND "+
        "        SECURITY_GROUP_USER.Users_Key = "+usersKey+" "+
        "GROUP BY "+
        "   SECURITY_TABLE.Security_Table_Name "+
        "ORDER BY 1 ASC"
     );
     rs.next();
     EditTarget2Flag = rs.getBoolean(3);
     rs.next();
     BrowseTarget2Flag = rs.getBoolean(2);
     rs.next();
     EditTarget1Flag = rs.getBoolean(3);
     rs.next();
     BrowseTarget1Flag = rs.getBoolean(2);
   }
%>

<!--%@ taglib uri="view" prefix="view" %-->
<%@ taglib uri="/WEB-INF/taglib/stack.tld" prefix="sessionUtils" %>

<%
    // String tableName=request.getParameter("tableName");
    String keyField=request.getParameter("keyField");
    String keyVal=request.getParameter("keyVal");
    // String doProcess=request.getParameter("doProcess");
    // String stackLevel=request.getParameter("stackLevel");
    if (stackLevel == null) { stackLevel="@"; }
    if ((String)session.getAttribute("returnTable") != null) {
       session.removeAttribute("returnTable");
    }

    if (tableName == null) {
       tableName=entryPoints[0];
    }

    String origTableName=null;
    tableName=tableName.toUpperCase();
    //          if (dd.getDataDictionaryTD(tableName+"_VIEW") != null) {
    if (dd.getDataDictionaryTD(ViewGenerator.getViewName(tableName)) !=
    null) {
       origTableName=new String(tableName);
       tableName=ViewGenerator.getViewName(tableName);
    }
    else {
       origTableName=tableName;
    }
%>
   <!--view:setVars defaultEntryPoint="<%= entryPoints[0] %>" dbName="<%=
   dbName  %>" dbConn="<%= dbConnName %>"-->
   <sessionUtils:stack tableName="<%= origTableName %>" mode="browse"
   stackLevel="<%= stackLevel %>" database="<%= dbName %>" dbConn="<%=
   dbConnName %>">
      <%
      // StackInfo: %= stackInfo %
      %>
   </sessionUtils:stack>
```

```
<%=
   TableDescriptorDisplay.displayStack((LinkedList)
   session.getAttribute("sessionStack"),unqStr)
%>
<hr>

<TABLE width="100%" cellpadding="0" cellspacing="0">
   <tr valign="top" align="right"><td>
      <font face="ARIAL,HELVETICA" size="4">BROWSING<b>
      <%=
      TableDescriptorDisplay.getDisplayLabel(origTableName,TableDescrip
      torDisplay.AllUpper) %></b>
      <!--img src="images/logo-width.gif"-->
<%
     LinkedList sessionStack=(LinkedList)
     session.getAttribute("sessionStack");
     StackElement se=(StackElement)sessionStack.getLast();

     //if (doProcess != null && doProcess.equals("fullList")) {
     if (doProcess.equals("fullList")) {
        /*
        String filterString=(String)session.getAttribute(origTableName);
        if (filterString != null) {
        session.removeAttribute(origTableName);
        }
        */
        se.setSearchString(null);
        se.setSearchParams(new Hashtable());
     }
     /*
     else if (!keyField.equals("null")) {
     session.setAttribute(origTableName,"A."+keyField+"="+keyVal);
     }
     */

     //String filterTarget = (String)
     session.getAttribute("filterTarget");
     //if (filterTarget != null && filterTarget.equals(origTableName)) {
     String filterString=null;
     //if ((filterString=(String)session.getAttribute(origTableName)) !=
     null) {
     StackElement pe=null;
     if (se.getMasterColumn() != null) {
        pe=(StackElement)sessionStack.get(sessionStack.size()-2);
%>
        <br>
        <font size="4">FOR
        <b><%=  TableDescriptorDisplay.getDisplayLabel(pe.getTableName(),
        TableDescriptorDisplay.AllUpper) %><%=
        (TableDescriptorDisplay.getDisplayLabel(pe.getTableName(),
        TableDescriptorDisplay.AllUpper).equals("CUSTOM VIEW
        PROTOTYPE_3") ||
        TableDescriptorDisplay.getDisplayLabel(pe.getTableName(),
        TableDescriptorDisplay.AllUpper).equals("CUSTOM VIEW
        PROTOTYPE_2") ||
        TableDescriptorDisplay.getDisplayLabel(pe.getTableName(),
        TableDescriptorDisplay.AllUpper).equals("CUSTOM VIEW
        PROTOTYPE_1"))?"":" #"+pe.getCurrentKey() %></b>
```

```
          </font>
          <img src="images/logo-width.gif">
<%
      }
      if (se.getSearchString() != null) {
%>
          <br><FONT size="4">(FILTERED)</font>
          <img src="images/logo-width.gif">
<%
      }
%>

          </font></TD>
      </TR>
   </TABLE>
   <hr>
   <!--FORM-->
   <FORM name="editForm" action="<%= URIPath %>/Browse.jsp" METHOD="POST"
   onSubmit="return validateRPP()">
      <TABLE width="100%" cellpadding="0" cellspacing="0">
         <tr valign="top" align="right"><TD valign="top" align="left">
            <%=

               TableDescriptorDisplay.displayNavbar(origTableName,unqStr,c
               anBrowseFlag,canAddFlag,(se.getSearchString() != null))
            %>
         </TD><TD valign="top" align="right">
         </TD>
         </TR>
      </TABLE>
      <br>

<%
      StringBuffer qStr=new StringBuffer();
      StringBuffer paramStrBuf=new StringBuffer();
      StringBuffer tableHeaders=new StringBuffer();
      DataDictionaryTD ddtd = dd.getDataDictionaryTD(tableName);

      Enumeration displayFieldsEnumeration = ddtd.displayFields();

      int columnIndex = 0;
      while (displayFieldsEnumeration.hasMoreElements()) {
         String columnName = (String)
         displayFieldsEnumeration.nextElement();

         /*
         if (columnName.endsWith("_DATE")) {
            qStr.append("to_char("+columnName+",'MM/DD/YYYY') AS ");
         }
         */
         paramStrBuf.append(columnName+",");
         qStr.append(columnName+",");
         if (ddtd.getKeyField() != null &&
            ddtd.getKeyField().equals(columnName))
         {
            continue;
         }
         //tableHeaders.append("<TH bgcolor="+DARKCELL+"><font size=
```

```
   \"2\">"+TableDescriptorDisplay.getDisplayLabel(view,ddtd.columnNam
   e)+"</font></TH>");
   tableHeaders.append("<TH bgcolor="+DARKCELL+"><font size=
   \"2\">"+ddtd.getFormattedField(columnIndex++)+"</font></TH>");
}

// delete last ,
qStr.deleteCharAt(qStr.length()-1);
paramStrBuf.deleteCharAt(paramStrBuf.length()-1);

qStr.insert(0,"SELECT ");
qStr.append(" FROM "+tableName);

/*
else if (origTableName.equals(
   session.getAttribute("filterTarget")))
{
   qStr.append(session.getAttribute("filterString"));
}
*/
//if (keyField != null ||
origTableName.equals(session.getAttribute("filterTarget"))) {
//String filterString;
//if ((filterString=(String)session.getAttribute(origTableName)) !=
null) {
if ((se.getMasterColumn() != null) || (se.getSearchString() !=
null)) {
   if (tableName.endsWith("_VIEW")) {
      DataDictionaryTD ddtd2 = dd.getDataDictionaryTD(tableName);
      qStr = new StringBuffer(ddtd2.getViewSelect().trim());
   }
   else {
      qStr.append(" A");
   }
}

if (se.getMasterColumn() != null) {
   if (qStr.toString().indexOf("WHERE") > 0) {
      qStr.append(" AND A."+se.getMasterColumn()
      +"="+pe.getCurrentKey());
   }
   else {
      qStr.append(" WHERE A."+se.getMasterColumn()
      +"="+pe.getCurrentKey());
   }
}
if (Debug.areDebugging) {
   Debug.doLog("Pre search-string suffix: "+qStr,Debug.INFO);
   Debug.doLog("Search string: |"+se.getSearchString()
   +"|",Debug.INFO);
}
if ((se.getSearchString() != null) && (se.getSearchString().length()
> 0)) {
   if (qStr.toString().indexOf("WHERE") > 0) {
      qStr.append(" AND "+se.getSearchString());
   }
   else {
      qStr.append(" WHERE "+se.getSearchString());
```

```
   }
}
if (Debug.areDebugging) {
   Debug.doLog("Pre search-string suffix: "+qStr,Debug.INFO);
}
StringBuffer orderByStr = new
StringBuffer(TableDescriptorDisplay.getOrderBy(ddtd));

// check for sort order
String sortOrderName = null;
ResultSetMetaData rsmd = ddtd.getMetaData();
try {
   for (int i=1;i<=rsmd.getColumnCount();i++) {
      String curColName = rsmd.getColumnName(i);
      if (curColName.endsWith("SORT_ORDER") ||
         curColName.endsWith("SORT_KEY"))
      {
         sortOrderName = curColName;
         break;
      }
   }
   if (sortOrderName != null) {
      if (orderByStr.length() == 0) {
         orderByStr.append(sortOrderName);
      }
      else {
         orderByStr.insert(0,sortOrderName+",");
      }
   }
}
catch (SQLException sqle) {
   sqle.printStackTrace();
}

if (orderByStr.length() > 0) {
   qStr.append(" ORDER BY "+orderByStr);
}

java.util.Date beginView = null;
if (Debug.areDebugging) {
   Debug.doLog("View qStr: "+qStr.toString(),Debug.INFO);
   beginView = new java.util.Date();
}

//stmt =
con.createStatement(ResultSet.TYPE_SCROLL_INSENSITIVE,ResultSet.CONC
UR_READ_ONLY);
rs = stmt.executeQuery(qStr.toString());
//ResultSetMetaData rsmd = rs.getMetaData();

if (Debug.areDebugging) {
   // Debug.doLog("newPageSize =
   "+request.getParameter("newPageSize"),Debug.INFO);
   // Debug.doLog("pageSize =
   "+session.getAttribute("pageSize"),Debug.INFO);
}

if (request.getParameter("newPageSize") != null) {
```

```
      session.setAttribute("pageSize",
      request.getParameter("newPageSize"));
   }
   int pageSize = (session.getAttribute("pageSize") ==
   null)?10:Integer.parseInt(((String)
   session.getAttribute("pageSize")));
   String scroll = (String) request.getParameter("Scroll");
   if (scroll == null) { scroll = ""; }
   // /*
   rs.last();
   int rowCount = rs.getRow();
   // */
   /*
   int rowCount = 0;
   try {
      while (rs.next()) {
         rowCount++;
      }
   }
   catch (Exception ex) {
      // sqle.printStackTrace();
      if (Debug.areDebugging) {
         Debug.doLog("Caught generic exception in Browse on
         rs.next()...",Debug.INFO);
      }
   }
   */
   rs.beforeFirst();
   int topRow = Math.min(se.getRowPointer(),rowCount);

   // int topRow = 0;
   // StringBuffer[] sbAry=null;
   if (rowCount < 1) {
%>
      <br><br><br>
      <hr>
      <font face="ARIAL,HELVETICA" size="4"><center>

                   &n
         bsp;   
         THERE ARE <b>NO RECORDS</b> WHICH SATISFY YOUR REQUEST
      </center></font>
<%
   }
   else if (ddtd.getTable().equals("CUSTOM_VIEW_PROTOTYPE_3") &&
   (canAddFlag) && (rowCount == 1)) {
      if (rs.first()) {
         se.setMode("search");
         se.setCurrentKey(null);
         se.setSearchString(null);
         // se.setSearchParams(new Hashtable);
         // se.setFormValues(new Hashtable);
         //pageContext.forward("/AddEditForm.jsp?"+
         response.sendRedirect("/Schemalive/AddEditForm.jsp?"+
            "tableName=SPECIAL_TABLE_1&"+
            "mode=add&"+
            "doProcess=add&"+
            // "keyValue=0&"+
```

```
        "parentKey="+rs.getString(3)+"&"+
        // "newPageSize="+pageSize+"&"+
        "stackLevel=%2B"+"&"+
        ddtd.getDatabase()
        +"__SPECIAL_TABLE_1__SPECIAL_COLUMN_1_KEY="+rs.getString(10
        )+"&"+

        //TableDescriptorDisplay.getNoCache(TableDescriptorDisplay.
        ForURL));
        "unq="+unqStr
      );
   }
}
// else if ((canEditFlag) && (rowCount == 1) && (ddtd.getKeyField()
!= null)) {
else if ((canEditFlag) && (rowCount == 1) &&
   ((ddtd.getKeyField() != null) || (ddtd.getTDType() ==
   TableDescriptor.VIEW)) &&
   (!ddtd.getTable().equals("CUSTOM_VIEW_PROTOTYPE_1")) &&
   ((session.getAttribute("expressEdit") != null) &&
   (((String) session.getAttribute("expressEdit")).equals("Yes"))))
{
   if (rs.first()) {
      /*
      se.setMode("search");
      se.setCurrentKey(null);
      se.setSearchString(null);
      */
      // se.setSearchParams(new Hashtable);
      // se.setFormValues(new Hashtable);
      // pageContext.forward("/AddEditForm.jsp?"+
      response.sendRedirect("/Schemalive/AddEditForm.jsp?"+
         "tableName="+origTableName+"&"+
         "mode=edit&"+
         "doProcess=update&"+
         // "keyValue="+rs.getString(ddtd.getKeyField())+"&"+
         // "keyValue="+rs.getString((ddtd.getTDType() ==
         TableDescriptor.VIEW)?1:ddtd.getKeyField())+"&"+
         "keyValue="+((ddtd.getTDType() ==
         TableDescriptor.VIEW)?rs.getString(1):rs.getString(ddtd.get
         KeyField()))+"&"+
         // "parentKey="+rs.getString(3)+"&"+
         // "newPageSize="+pageSize+"&"+
         // "stackLevel=%40"+"&"+
         // ddtd.getDatabase()
         +"__SPECIAL_TABLE_1__SPECIAL_COLUMN_1_KEY="+rs.getString(10
         )+"&"+
         //
         TableDescriptorDisplay.getNoCache(TableDescriptorDisplay.Fo
         rURL));
         "unq="+unqStr
      );
   }
}
/*
else {
// stmt = con.createStatement();
rs = stmt.executeQuery(qStr.toString());
```

```
rsmd = rs.getMetaData();

/-
int rowCount = 0;
while (rs.next()) {
rowCount++;
}
-/

}
*/
if (scroll.startsWith("P")) {
   topRow = topRow - pageSize;
}
else if (scroll.startsWith("N")) {
   topRow = Math.min(topRow + pageSize, (rowCount - pageSize) + 1);
}
else if (scroll.startsWith("B")) {
   topRow = (rowCount - pageSize) + 1;
}
else if (scroll.startsWith("T")) {
   topRow = 1;
}
else {
   topRow = Math.min(Math.max(1, topRow), (rowCount - pageSize) +
   1);
}
topRow = Math.max(topRow, 1);

StringBuffer[] sbAry=new StringBuffer[rsmd.getColumnCount()];

if (topRow <= 1) {
   rs.beforeFirst();
}
else {
   rs.absolute(topRow-1);
}

/*
int rowNum = 1;
while (rowNum < topRow) {
rs.next();
rowNum++;
}
*/

int rowNum = topRow;
boolean firstRow = true;
// while ((rowCount > 0) && rs.next() && (rowNum < topRow +
pageSize)) {

StringBuffer tableHelp = new StringBuffer();

while (rs.next() && (rowNum < topRow + pageSize)) {
   if (firstRow) {
      int pageNumber = 2+((topRow-2)/pageSize);
      int pageCount = (rowCount+pageSize-1)/pageSize;
      if (topRow == 1) {
```

```
        pageNumber = 1;
     }
     else if ((topRow+pageSize) >= rowCount) {
        pageNumber = pageCount;
     }
%>
     <TABLE border="1" width="100%" id="dataTable">
        <TR VALIGN=CENTER><TD ALIGN=CENTER COLSPAN="<%= ·
        rsmd.getColumnCount() + 1 %>" BGCOLOR="<%= MIDLCELL %>">
           <TABLE BORDER=0 CELLPADDING=0 WIDTH=100%%>
              <TR VALIGN=CENTER>
                 <TD WIDTH=20%></TD>
                 <TD ALIGN=CENTER><font size=2>PAGE <%= pageNumber
                 %> OF <%= pageCount %> (totaling <%= rowCount %>
                 records @ <INPUT TYPE=TEXT MAXLENGTH=4 SIZE=3
                 NAME="newPageSize" VALUE="<%= pageSize %>"> rows
                 per page)</TD>
                 <TD ALIGN=RIGHT WIDTH=20%><INPUT TYPE="SUBMIT"
                 NAME="Scroll" VALUE="Reset Rows"></TD>
              </TR>
           </TABLE>
        </TD></TR>

        <TR valign="bottom" align="left">
           <TH bgcolor="<%= DARKCELL %>" align="right">#</TH>
           <%= tableHeaders.toString() %>
<%

           firstRow = false;
   }
   //BalloonHelp bh=BalloonHelp.getInstance();
   Balloon b=bh.getNavBalloon("editLink");
   StringBuffer linkString = new StringBuffer("<A "+
      ((b!=null)?
         "onMouseOver=\"setHang('"+b.getID()
         +"',event,this,'navLink'); "+
         "return true;\" "+
         "onMouseOut=\"clearHang(); return true;\" "+
         "onClick=\"clearHang(); return true;\" ":
         ""
      )+
      "HREF=\""+
      "javascript:edit('"
   );
   for (int i=1;i<=rsmd.getColumnCount();i++) {
      String rsStr=rs.getString(i);

      if ((ddtd.getTable().equals("CUSTOM_VIEW_PROTOTYPE_2") ||
      ddtd.getTable().equals("CUSTOM_VIEW_PROTOTYPE_1")) && i==1) {
         loopCellFlag =
         (rs.getString(2).toUpperCase().equals("DRILL_CONTEXT_1"))?B
         rowseTarget1Flag:BrowseTarget2Flag;
         b=bh.getNavBalloon("CVCommentsEditLink");
         linkString = new StringBuffer("<A "+
            ((b!=null)?
               "onMouseOver=\"setHang('"+b.getID()
               +"',event,this,'navLink'); "+
               "return true;\" "+
```

```
        "onMouseOut=\"clearHang[illegible]
        "onClick=\"clearHang(); return true;\" ":
        ""
    )+
    "HREF=\"Browse.jsp?"+

    ((rs.getString(2).toUpperCase().equals("DRILL_CONTEXT_1"
    ))?
        "tableName=EDIT_TARGET_1&":
        "tableName=EDIT_TARGET_2&"
    )+
    "mode=browse&"+
    "doProcess=browse&"+
    "parentKey="+rs.getString(4)+"&"+
    "stackLevel=%2B"+
    "&unq="+unqStr+"\">"
  );
}
else if (ddtd.getTable().equals("CUSTOM_VIEW_PROTOTYPE_3") &&
i==1) {
  linkString = new StringBuffer("<A HREF=\"AddEditForm.jsp?"+
    "tableName=SPECIAL_TABLE_1&"+
    "mode=add&"+
    "doProcess=add&"+
    "parentKey="+rs.getString(3)+"&"+
    "stackLevel=%2B"+"&"+
    ddtd.getDatabase()
    +"__SPECIAL_TABLE_1__SPECIAL_COLUMN_1_KEY="+rs.getString
    (10)+"&"+
    "unq="+unqStr+"\">"
  );
}
else if ((ddtd.getTDType() == TableDescriptor.VIEW && i==1) ||
  (ddtd.getKeyField() != null &&
  ddtd.getKeyField().equals(rsmd.getColumnName(i))))
{
  linkString.append(rsStr+"',"+
    unqStr+
    ")\">"
  );
}
if (rsStr == null) {
  sbAry[i-1]=null;
}
else {
  sbAry[i-1]=new StringBuffer(rsStr);
}
}

  </TR>
  <TR valign="bottom">
    <TD bgcolor="<%= MIDLCELL %>" align="right">
      <%= (canEditFlag &&
      loopCellFlag)?linkString.toString():"" %>
      <%= rowNum++ %><%= (canEditFlag &&
      loopCellFlag)?"</A>":"" %>
    </TD>
```

```
          for (int i=0;i<sbAry.length;i++) {
            if (ddtd.getKeyField() != null &&
            ddtd.getKeyField().equals(rsmd.getColumnName(i+1))) {
               continue;
            }
%>
<%

            if
            (rsmd.getColumnName(i+1).endsWith("OVERALL_STATUS"))
            {
               String colorStr;
               if (sbAry[i]==null) {
                  colorStr=LITECELL;
               }
               else {
                  int openParen=sbAry[i].toString().indexOf("(");
                  int closeParen=
                  sbAry[i].toString().indexOf(")");
                  if (openParen >= 0 && closeParen >= 0) {
                     colorStr =
                     sbAry[i].substring(openParen+1,closeParen).t
                     rim();
                  }
                  else {
                     colorStr = LITECELL;
                  }
               }
%>
               <TD bgcolor="<%= colorStr %>">
<%
            }
            else {
%>
               <TD bgcolor="<%= LITECELL %>">
<%
            }
%>

               <font size="2">
<%
            CustomDrillDown cdd=ddtd.getCustomDrillDown(i);
            if (sbAry[i] == null) {
               //if
               (rsmd.getColumnName(i+1).endsWith("OVERALL_STATUS"
               )) {}
               if (cdd != null) {
                  String targetTable =
                  cdd.getTableName(sbAry[1].toString().toUpperCas
                  e());
                  if (targetTable.equals("DRILL_TARGET_1") &&
                  cdd.getMode().equals("edit")) {
                     loopCellFlag = EditTarget1Flag;
                  }
                  else if (targetTable.equals("DRILL_TARGET_2")
                  && cdd.getMode().equals("edit")) {
                     loopCellFlag = EditTarget2Flag;
                  }
                  else if (targetTable.equals("EDIT_TARGET_1") &&
```

```
            cdd.getMode().equals("browse")) {
               loopCellFlag = BrowseTarget1Flag;
            }
            else if (targetTable.equals("EDIT_TARGET_2") &&
            cdd.getMode().equals("browse")) {
               loopCellFlag = BrowseTarget2Flag;
            }

            if (canEditFlag && loopCellFlag) {
%>
               <A HREF="AddEditForm.jsp?tableName=<%=
               cdd.getTableName(sbAry[1].toString().toUpper
               Case()) %>&mode=<%= cdd.getMode() %>
               &doProcess=update&keyValue=<%=
               sbAry[cdd.getKeyColumn()].toString() %>
               &parentKey=<%=
               sbAry[cdd.getParentColumn()].toString() %>
               &stackLevel=%2B&focusField=<%=
               ddtd.getDatabase() %>__<%=
               cdd.getTableName(sbAry[1].toString().toUpper
               Case()) %>__<%= cdd.getFocusField() %>&unq=
               <%= unqStr %>">NONE</A>
<%
            }
            else {
%>
                
<%
            }
         }
         else {
%>
                
<%
         }
      }
      else if ((sbAry[i].length() > 255) && (cdd == null))
      {
%>
               <textarea><%= sbAry[i].toString() %>
               </textarea>
<%
      }
      else {
         if (cdd != null) {
            String targetTable =
            cdd.getTableName(sbAry[1].toString().toUpperCas
            e());
            if (targetTable.equals("DRILL_TARGET_1") &&
            cdd.getMode().equals("edit")) {
               loopCellFlag = EditTarget1Flag;
            }
            else if (targetTable.equals("DRILL_TARGET_2")
            && cdd.getMode().equals("edit")) {
               loopCellFlag = EditTarget2Flag;
            }
            else if (targetTable.equals("EDIT_TARGET_1") &&
            cdd.getMode().equals("browse")) {
```

```
                        loopCellFlag = BrowseTarget1Flag;
                     }
                     else if (targetTable.equals("EDIT_TARGET_2") &&
                     cdd.getMode().equals("browse")) {
                        loopCellFlag = BrowseTarget2Flag;
                     }

                     if (canEditFlag && loopCellFlag) {
%>
                        <A HREF="AddEditForm.jsp?tableName=<%=
                        cdd.getTableName(sbAry[1].toString().toUpper
                        Case()) %>&mode=<%= cdd.getMode() %>
                        &doProcess=update&keyValue=<%=
                        sbAry[cdd.getKeyColumn()].toString() %>
                        &parentKey=<%=
                        sbAry[cdd.getParentColumn()].toString() %>
                        &stackLevel=%2B&focusField=<%=
                        ddtd.getDatabase() %>__<%=
                        cdd.getTableName(sbAry[1].toString().toUpper
                        Case()) %>__<%= cdd.getFocusField() %>&unq=
                        <%= unqStr %>">
<%
                     }
                  }
%>
                        <%=
                           sbAry[i].toString()
                        %>
<%
                  if ((cdd != null) && canEditFlag && loopCellFlag)
                  {
%>
                        </A>
<%
                  }
               }
%>
                  </font>
                  </TD>
<%
            }
%>
         </TR>
<%
   }
   String paramList=paramStrBuf.toString();
   java.util.Date endView = null;
   java.text.DateFormat df = null;
   if (Debug.areDebugging) {
      endView = new java.util.Date();
      df = java.text.DateFormat.getInstance();
   }

   if (rowCount > 0) {
%>
         </TABLE> .
<%
```

```
    }
    if (topRow >  1 || topRow < (rowCount - pageSize) + 1) {
%>
          <HR>
          <DIV ALIGN=RIGHT>
<%
    }

    if (topRow >  1) {
%>
          <INPUT TYPE="SUBMIT" NAME="Scroll" VALUE="Top of List">
<%
    }

    if (topRow > pageSize + 1)  {
%>
          <INPUT TYPE="SUBMIT" NAME="Scroll" VALUE="Previous <%=
          pageSize %> Rows">
<%
    }

    if (topRow < (rowCount - (2*pageSize)) + 1)  {
%>
          <INPUT TYPE="SUBMIT" NAME="Scroll" VALUE="Next <%= pageSize %>
          Rows">
<%
    }

    if (topRow < (rowCount - pageSize) + 1)  {
%>
          <INPUT TYPE="SUBMIT" NAME="Scroll" VALUE="Bottom of List">
<%
    }

    if (topRow >  1 || topRow < (rowCount - pageSize) + 1) {
%>
          </DIV>
<%
    }

    se.setRowPointer(topRow);
    // session.setAttribute("pageSize",new Integer(pageSize));
%>

          <hr>
<!--/FORM-->

<%
   /*
   [b][%= TableDescriptorDisplay.getDisplayLabel(origTableName) %][/b]
   options:
   [FONT size="2"][strong][A HREF="Browse.jsp?tableName=[%= origTableName
   %]&mode=browse&doProcess=fullList"]FULL LIST[/A][/strong][/font],
   [font size="2"][strong][A HREF="AddEditForm.jsp?tableName=[%=
   origTableName %]&mode=search&doProcess=new"]NEW SEARCH[/a][/strong]
   [/font],
   [font size="2"][strong][A HREF="AddEditForm.jsp?tableName=[%=
   origTableName %]&mode=search&doProcess=revised"]REVISED SEARCH[/a]
```

```
    [/strong][/font]
    [font size="2"][strong][A HREF="AddEditForm.jsp?tableName=[%=
    origTableName %]&mode=add&doProcess=insert"]ADD[/a][/strong][/font]
    */
  %>
             <SCRIPT>
             function edit(keyValue) {
                document.editForm.keyValue.value=keyValue;
                document.editForm.action="<%= URIPath %>/AddEditForm.jsp"
                document.editForm.submit();
             }
             </SCRIPT>

             <!--FORM name="editForm" action="<%= URIPath %>
             /AddEditForm.jsp" METHOD="POST"..>
             <!--FORM name="editForm" action="/snoop" METHOD="POST"-->
             <input type="hidden" name="tableName" value="<%= origTableName
             %>">
             <input type="hidden" name="mode" value="edit">
             <input type="hidden" name="doProcess" value="update">
             <input type="hidden" name="keyValue" value="">
             <input type="hidden" name="topRow" value="<%= topRow %>">
             <input type="hidden" name="pageSize" value="<%= pageSize %>">
             <input type="hidden" name="unq" value="<%= unqStr %>">
             <!-- %=
             TableDescriptorDisplay.getNoCache(TableDescriptorDisplay.ForFo
             rm) % -->
          </FORM>


          <!-- hr -->
  <%
        if (Debug.areDebugging) {
  %>
          <!--
             Began DD getInstance: <%= df.format(beginDD) %><br>
             Ended DD getInstance: <%= df.format(endDD) %><p>

             Began View: <%= df.format(beginView) %><br>
             Ended View: <%= df.format(endView) %><p>

             Total load time (ms): <%= endView.getTime() -
             beginDD.getTime() %>
          -->
  <%
        }
  %>
        <!--/view:setVars-->
           <SCRIPT>
              setTableCoords();
              setupNavHelp();
              <%= tableHelp.toString() %>
           </SCRIPT>
  </BODY>
</HTML>
  <%
     }
     catch (SQLException sqle) {
```

```
        sqle.printStackTrace();
        throw sqle;
     }
     finally {
        try {
           if (rs != null)rs.close();
           if (stmt != null)stmt.close();
           if (con != null)con.close();
        }
        catch (SQLException sqle) {
           sqle.printStackTrace();
        }
     }
  %>
<%@ include file="common/GlobalFooter.jsp" %>

Schemalive/DataDictionary.jsp

<%!
  // $Revision: 2.3 $
  // $Date: 2001/10/30 01:35:53 $
%>

<%@ page import="dbUtils.*" %>

<HTML>
  <HEAD>
  <TITLE>DataDictionary</TITLE>
  <SCRIPT>
     function scrollIt() {
     parent.scrollTo(1,10000000);
  }
  </SCRIPT>
  </HEAD>
  <BODY bgcolor="#FFFFFF">
<%
  String buildDDMode = request.getParameter("buildDDMode");
  if (buildDDMode == null) {
%>
     <FORM action="DataDictionary.jsp">
        Build DataDictionary<br>
        <input type="radio" name="buildDDMode" value="DDOnly">
        Only<br>
        <input type="radio" name="buildDDMode" value="DDViewCheck">
        and Views (with check)<br>
        <input type="radio" name="buildDDMode" value="DDViewNoCheck">
        and Views (without check)<br>
        <input type="submit" value="Build">
     </FORM>
<%
  }
  else {
%>
     <INPUT type="button" value="Scroll"
     onClick="setTimeout('scrollIt()',1000)"><p>
<%
     //JspWriter out = pageContext.getOut();
     if (buildDDMode.equals("DDOnly")) {
```

```
            DataDictionary.refreshInstance("cnslt_crm","nomatter",true,false,out
            );
         }
         else if (buildDDMode.equals("DDViewCheck")) {
            DataDictionary.refreshInstance("cnslt_crm","nomatter",
               false,true,out);
         }
         else if (buildDDMode.equals("DDViewNoCheck")) {
            DataDictionary.refreshInstance("cnslt_crm","nomatter",
               false,false,out);
         }
      }
%>
   </BODY>
</HTML>
```

Schemalive/DoAddEdit.jsp

```
<%!
   // $Revision: 2.3 $
   // $Date: 2001/10/30 01:35:53 $
%>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>
<%@ page import="common.*" %>

<%@ page autoFlush="false" buffer="50k" errorPage="/Error500.jsp" %>

<%! public static final String version_DoAddEdit_jsp = "$Revision: 2.3 $"; %>

<%@ include file="common/EntryPoints.jsp" %>
<%@ include file="common/GlobalHeaderVARS.jsp" %>
<%@ include file="common/EmptyParamCheck.jsp" %>

<%
   String unqStr=

      TableDescriptorDisplay.getNoCache(TableDescriptorDisplay.ForJavaScript)
      ;
   if (request.getParameter("unq") != null &&
      request.getParameter("unq").equals((String)
      session.getAttribute("unq")))
   {
      if (Debug.areDebugging) {
         Debug.doLog("DoAddEdit unq matched!",Debug.INFO);
      }
      session.setAttribute("unq",unqStr);
   }
   else if (request.getParameter("unq") != null &&
      session.getAttribute("unq") == null)
   {
      if (Debug.areDebugging) {
         Debug.doLog("DoAddEdit unq did not match",Debug.INFO);
```

```
   }
   response.sendRedirect("/Schemalive/ExpiredSession.jsp");
   return;
}
else {
   response.sendRedirect("/Schemalive/OutOfSequence.jsp");
   return;
}

Connection con=null;
Statement stmt=null;
ResultSet rs=null;
try {
   con=SQLUtil.makeConnection();
   String doProcess = request.getParameter("doProcess");
   Enumeration parameterNames = request.getParameterNames();

   DataDictionary dd = DataDictionary.getInstance(dbName,dbConnName);
   LinkedList l=(LinkedList)session.getAttribute("sessionStack");
   Hashtable tableVals=((StackElement)l.get(l.size()-1)).getFormValues();
   Hashtable filterVals=((StackElement)
   l.get(l.size()-1)).getSearchParams();

   String tableName = null;

   if (doProcess.equals("drillDetail") ||
   doProcess.equals("drillPickList")) {

      // put all parameter values into session

      // get first legit parameter name to get at key
      while (parameterNames.hasMoreElements()) {
         String param=(String)parameterNames.nextElement();
         // int dbSep1=param.indexOf("__");
         // if (dbSep1 < 0) {
         if (param.indexOf("__") < 0) {
            continue;
         }
         // }
         // int dbSep2=param.indexOf("__",dbSep1+1);
         tableVals.put(param,request.getParameter(param));
      }

      String mode="edit";
      String newProcess="update";
      if (request.getParameter("keyValue") == null ||
         request.getParameter("keyValue").equals(""))
      {
         mode="add";

         //insert return field as if it had been selected. Actual key will
         be
         //put in below.
         tableVals.put(request.getParameter("returnDropDown"),"0");
         newProcess="insert";
      }
      String forwardPage=(doProcess.equals("drillDetail"))?
         "Browse.jsp":"AddEditForm.jsp";
```

```
   pageContext.forward("/"+forwardPage+"?tableName="+
      request.getParameter("tableName")+"&keyValue="+
      request.getParameter("keyValue")+"&mode="+mode+"&doProcess="+
      newProcess+"&stackLevel=%2B&"+
      "unq="+unqStr
   );
}
else {
   Hashtable paramHash=new Hashtable();

   boolean setTableName=false;
   while (parameterNames.hasMoreElements()) {
      String param=(String)parameterNames.nextElement();

      if (param.indexOf("__") < 0) {
         continue;
      }

      if (!setTableName) {
         setTableName=true;
         int dbSep1=param.indexOf("__");
         int dbSep2=param.indexOf("__",dbSep1+1);
         tableName=param.substring(dbSep1+2,dbSep2);
      }

      /*
      if (doProcess.equals("filter")) {
      filterVals.put(param,request.getParameter(param));
      }
      String value=null;
      */

      String value=request.getParameter(param);
      String[] values=null;
      if (doProcess.equals("filter")) {
         filterVals.put(param,value);
         if (param.endsWith("_FLAG")) {
            value=null;
            values=(String[])request.getParameterValues(param);
            if (values.length==1) {
               filterVals.put(param,values[0]);
            }
            else {
               filterVals.put(param,"");
            }
         }
      }

      /*
      if (param.endsWith("_FLAG") && doProcess.equals("filter")) {
      values=(String[])request.getParameterValues(param);
      }
      else {
      value=request.getParameter(param);
      }
      */

      if (values != null || !value.equals("")) {
```

```
            int dbSep1=param.indexOf("__");
            int dbSep2=param.indexOf("__",dbSep1+1);
            if (param.endsWith("_DATE")) {
               paramHash.put(param.substring(dbSep2+2),
                  "to_date('"+value+"','MM/DD/RRRR')");
            }
            else {
               if (values != null) {
                  paramHash.put(param.substring(dbSep2+2),values);
               }
               else {
                  paramHash.put(param.substring(dbSep2+2),value);
               }
            }
         }
      }

      String qStr=null;
      Enumeration paramHashKeys=paramHash.keys();
      String primaryKeyName=null;
      String primaryKeyVal=null;
      // session.setAttribute("powerAdd", "No");
      if (doProcess.equals("insert")) {
         // session.setAttribute("powerAdd",
         (request.getParameter("powerAdd") != null)?((String)
         request.getParameter("powerAdd")):"No");

         StringBuffer qStrStart=new StringBuffer();
         StringBuffer qStrEnd=new StringBuffer();

         while (paramHashKeys.hasMoreElements()) {
            String paramKey = (String)paramHashKeys.nextElement();
            String paramVal = (String)paramHash.get(paramKey);
            if (!paramVal.startsWith("to_date")) {
               paramVal="'"+SQLUtil.processSingleQuote(paramVal)+"'";
            }
            qStrStart.append(paramKey+",");
            qStrEnd.append(paramVal+",");
         }

         Integer usersKey=(Integer)session.getAttribute("usersKey");
         // check for ENTERED_BY_USERS_KEY, ENTRY_DATE,
         // MODIFIED_BY_USERS_KEY, and LAST_MODIFIED_DATE
         DataDictionaryTD ddtd = dd.getDataDictionaryTD(tableName);
         if (ddtd.findColumnName("ENTERED_BY_USERS_KEY") != 0) {
            qStrStart.append("ENTERED_BY_USERS_KEY,");
            qStrEnd.append(usersKey+",");
         }

         if (ddtd.findColumnName("MODIFIED_BY_USERS_KEY") != 0) {
            qStrStart.append("MODIFIED_BY_USERS_KEY,");
            qStrEnd.append(usersKey+",");
         }

         // get rid of trailing comma
         qStrStart.deleteCharAt(qStrStart.length()-1);
         qStrEnd.deleteCharAt(qStrEnd.length()-1);
```

```
   qStr="IN[redacted]T into "+tableName+"("+q[illegible][redacted]LUES"
   ("+qStrEnd+")";
}
else if (doProcess.equals("filter")) {
   session.setAttribute("expressEdit",
   (request.getParameter("expressEdit") != null)?((String)
   request.getParameter("expressEdit")):"No");

   StringBuffer qStrBuff=new StringBuffer();
   while (paramHashKeys.hasMoreElements()) {
      String paramKey = (String)paramHashKeys.nextElement();
      String paramVal = null;
      String[] paramVals = null;
      String likePart = " LIKE ";
      if (paramKey.endsWith("_FLAG")) {
         paramVals=(String[])paramHash.get(paramKey);
      }
      else {
         paramVal=((String)paramHash.get(paramKey)).trim();
         if (paramVal.startsWith("<=") || paramVal.startsWith("<>")
         || paramVal.startsWith(">=")) {
            likePart = " "+paramVal.substring(0,2)+" ";
            paramVal = paramVal.substring(2).trim();
            if (Debug.areDebugging) {
               Debug.doLog("********** FOUND TWO-CHARACTER (NON-
               DATE) RELATIONAL OPERATOR!",Debug.INFO);
               Debug.doLog("********** likePart:
               "+likePart,Debug.INFO);
               Debug.doLog("********** paramVal:
               "+paramVal,Debug.INFO);
            }
         }
         else if (paramVal.startsWith("<") ||
         paramVal.startsWith("=") || paramVal.startsWith(">")) {
            likePart = " "+paramVal.charAt(0)+" ";
            paramVal = paramVal.substring(1).trim();
            if (Debug.areDebugging) {
               Debug.doLog("********** FOUND ONE-CHARACTER (NON-
               DATE) RELATIONAL OPERATOR!",Debug.INFO);
               Debug.doLog("********** likePart:
               "+likePart,Debug.INFO);
               Debug.doLog("********** paramVal:
               "+paramVal,Debug.INFO);
            }
         }
      }

      //DataDictionaryTD ddtd =
      dd.getDataDictionaryTD(tableName+"_VIEW");
      DataDictionaryTD ddtd =
      dd.getDataDictionaryTD(ViewGenerator.getViewName(tableName));
      String outputKey = new String(paramKey);
      if (ddtd != null) {
         outputKey="A."+outputKey;
      }

      // String likePart=" LIKE ";
      boolean skipIt=false;
```

```
      if (paramKey.endsWith("_FLAG")) {
         //special case; may have more than one
         if (paramVals.length != 2) {
            //qStrBuff.append(paramKey+" "+paramVals[1]+" 0 AND ");
            paramVal="0";
            likePart=" "+paramVals[0]+" ";
         }
         else {
            skipIt=true;
         }
      }
      else if (paramKey.endsWith("_KEY")) {
         if (likePart.equals(" LIKE ")) {
            likePart=" = ";
         }
         paramVal=SQLUtil.processSingleQuote(paramVal);
      }
      else if (!paramVal.startsWith("to_date")) {
         if (likePart.equals(" LIKE ")) {
            paramVal="UPPER('"+SQLUtil.processSingleQuote(paramVal)
            +"%')";
         }
         else {
            paramVal="UPPER('"+SQLUtil.processSingleQuote(paramVal)
            +"')";
         }
         outputKey="UPPER("+outputKey+")";
      }
      else {
         String dateStart = paramVal.substring(9).trim();
         if (dateStart.startsWith("<=") ||
         dateStart.startsWith("<>") || dateStart.startsWith(">=")) {
            likePart = " "+dateStart.substring(0,2)+" ";
            paramVal = "to_date('"+ dateStart.substring(2).trim();
         }
         else if (dateStart.startsWith("<") ||
         dateStart.startsWith(">") || dateStart.startsWith("=")) {
            likePart = " "+dateStart.charAt(0)+" ";
            paramVal = "to_date('" + dateStart.substring(1).trim();
         }
      }
      if (!skipIt) {
         qStrBuff.append(outputKey+likePart+paramVal+" AND ");
      }
   }

   if (qStrBuff.length() > 4) {
      qStrBuff.delete(qStrBuff.length()-4,qStrBuff.length()-1);
   }

   StackElement se= (StackElement)l.get(l.size()-1);
   se.setSearchString(qStrBuff.toString());
}
else if (doProcess.equals("update")) { // edit
   DataDictionaryTD ddtd = dd.getDataDictionaryTD(tableName);
   StringBuffer qStrBuff=new StringBuffer();
   ResultSetMetaData rsmd=ddtd.getMetaData();
   for (int i=1;i<=rsmd.getColumnCount();i++) {
```

```
        String paramKey = rsmd.getColumnName(i);
        String paramVal = (String)paramHash.get(paramKey);

        if (paramKey.equals("ENTERED_BY_USERS_KEY") ||
            paramKey.equals("ENTRY_DATE") ||
            paramKey.equals("MODIFIED_BY_USERS_KEY") ||
            paramKey.equals("LAST_MODIFIED_DATE"))
        {
            continue;
        }

        if (paramVal == null) {
            if (paramKey.endsWith("_FLAG")) {
                paramVal="0";
            }
            else {
                paramVal="";
            }
        }
        if (ddtd.getKeyField().equals(paramKey)) {
            primaryKeyName=paramKey;
            primaryKeyVal=paramVal;
            continue;
        }
        if (!paramVal.startsWith("to_date")) {
            paramVal="'"+SQLUtil.processSingleQuote(paramVal)+"'";
        }
        qStrBuff.append(paramKey+"="+paramVal+",");
    }

    // Check for MODIFIED_BY_USERS_KEY, and LAST_MODIFIED_DATE
    Integer usersKey=(Integer)session.getAttribute("usersKey");

    if (ddtd.findColumnName("MODIFIED_BY_USERS_KEY") != 0) {
        qStrBuff.append("MODIFIED_BY_USERS_KEY="+usersKey+",");
    }

    if (ddtd.findColumnName("LAST_MODIFIED_DATE") != 0) {
        qStrBuff.append("LAST_MODIFIED_DATE=SYSDATE,");
    }

    qStrBuff.deleteCharAt(qStrBuff.length()-1);
    qStr="UPDATE "+tableName+" SET "+qStrBuff+" WHERE "+
        primaryKeyName+"="+primaryKeyVal;

}

if (!doProcess.equals("filter")) {
    //DBConnectionManager connMgr =
    DBConnectionManager.getInstance();
    //Connection con=connMgr.getConnection(dbConnName);

    //Connection con= (Connection)
    pageContext.getAttribute("globalCon");
    stmt = con.createStatement();
    stmt.executeUpdate(qStr);
    //stmt.close();
```

```
    StackElement se=(StackElement)l.getLast();
    se.setSearchString(null);
    se.setSearchParams(new Hashtable());
}

// hit the last item in the save list or go back to view
// LinkedList l=(LinkedList)session.getAttribute("LinkedList");

// String returnTable=(String)session.getAttribute("returnTable");
/*
if (doProcess.equals("filter")) {    //   || l == null || l.size() ==
0 || returnTable != null) {
    if (returnTable != null) {
        pageContext.forward("/Browse.jsp?tableName="+returnTable+"&"+

        TableDescriptorDisplay.getNoCache(TableDescriptorDisplay.ForUR
        L));
    }
    else {
        pageContext.forward("/Browse.jsp?tableName="+tableName+"&"+

        TableDescriptorDisplay.getNoCache(TableDescriptorDisplay.ForUR
        L));
    }
}
else {
*/
// build return
StackElement se=(StackElement)l.getLast();
String mode=null;
String stackLevel=null;
String masterColumn=se.getMasterColumn();
tableName=se.getTableName();
// if ((doProcess.equals("insert")) &&
((session.getAttribute("powerAdd") != null) && (((String)
session.getAttribute("powerAdd")).equals("Yes")))) {
Debug.doLog("powerAdd: "+request.getParameter("powerAdd"),
Debug.INFO);
if ((doProcess.equals("insert")) &&
((request.getParameter("powerAdd") != null) && (((String)
request.getParameter("powerAdd")).equals("Yes")))) {
   mode = "add";  // se.getMode();
   stackLevel = "@";
   se.setFormValues(new Hashtable());

   response.sendRedirect("/Schemalive/AddEditForm.jsp?tableName="+se
   .getTableName()+
      "&keyValue="+se.getCurrentKey()+
      "&mode="+mode+
      "&powerAdd=Yes"+
      "&stackLevel=@&unq="+unqStr
   );
   return;
}
else if ((l.size() < 2) || (doProcess.equals("filter"))) {
   mode = "browse";
   stackLevel = "@";
}
```

```
        else {
           se=(StackElement)l.get(l.size()-2);
           mode = se.getMode();
           stackLevel = "-";
           if ((!mode.equals("browse")) && (masterColumn == null)) {
              DataDictionaryTD ddtd = dd.getDataDictionaryTD(tableName);

              // Insert proper value into saved return field entry
              String keyFieldName = ddtd.getKeyField();
              Hashtable formValues = (Hashtable)((StackElement)
              l.get(l.size()-2)).getFormValues();
              Enumeration formValEnum = formValues.keys();
              while (formValEnum.hasMoreElements()) {
                 String keyVal = (String)formValEnum.nextElement();
                 if (((String)formValues.get(keyVal)).equals("0")) {
                    formValues.put(keyVal,paramHash.get(keyFieldName));
                    break;
                 }
              }
           }
        }
        String forwardPage=
        (mode.equals("browse"))?"Browse.jsp":"AddEditForm.jsp";
        pageContext.forward("/"+forwardPage+"?tableName="+se.getTableName()+
           "&keyValue="+se.getCurrentKey()+
           "&mode="+mode+
           "&stackLevel="+stackLevel+"&unq="+unqStr);
     }
%>

<%
   }
   catch (SQLException sqle) {
      sqle.printStackTrace();
      throw sqle;
   }
   finally {
      try {
         if (rs != null)rs.close();
         if (stmt != null)stmt.close();
         if (con != null)con.close();
      }
      catch (SQLException sqle) {
         sqle.printStackTrace();
      }
   }
%>

<%@ include file="common/GlobalFooter.jsp" %>
```

Schemalive/DoViewGenerator.jsp

```
<%!
   // $Revision: 2.3 $
   // $Date: 2001/10/30 01:35:53 $
%>

<%! public static final String version_ViewGenerator_jsp="$Revision: 2.3 $";
```

```
    ,
%>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>

<%
   DataDictionary dd=DataDictionary.getInstance("cnslt_crm","anymore");
%>
<HTML>
   <BODY bgcolor="#ffffff">
<%
   if (request.getParameter("tableName") != null) {
      DataDictionaryTD ddtd=
         dd.getDataDictionaryTD(request.getParameter("tableName"));
      if (ddtd != null) {
         new ViewGenerator(ddtd);
%>
         <h3>Built View for: <%= ddtd.getTable() %></h3>
<%
      }
      else {
%>
         <h3><%= request.getParameter("tableName") %>
         is a bad table name!</h3>
<%
      }
   }
   else {
      Set ddtdSet = dd.tables();
      Object[] ddtdAry = ddtdSet.toArray();
      Arrays.sort(ddtdAry);
      for (int i=0;i<ddtdAry.length;i++) {
         DataDictionaryTD ddtd=dd.getDataDictionaryTD((String)ddtdAry[i]);
         if (ddtd.getTDType() == TableDescriptor.VIEW) {
            continue;
         }
         ViewGenerator vg = new ViewGenerator(ddtd);
%>
         <h4>Built View for: <%= ddtd.getTable() %></h4>
<%
      }
   }
%>
   </BODY>
</HTML>
```

Schemalive/Error500.jsp

```
<%!
   // $Revision: 2.4 $
   // $Date: 2001/10/30 08:26:33 $
%>

<%@ page isErrorPage="true" %>
<%@ page import="dbUtils.*" %>
```

```
<%@ page import="HTM[redacted]ils.*" %>
<%@ page import="sessionUtils.*" %>
<%@ page import="java.sql.*" %>
<%@ page import="java.util.*" %>
<%@ page import="java.io.*" %>
<%@ page import="common.*" %>

<%! public static final String version_Error500_jsp = "$Revision: 2.4 $"; %>

<%@ include file="common/EntryPoints.jsp" %>

<%
   response.setHeader("pragma","no-cache");
   response.setHeader("Expires",
      new java.util.Date(new java.util.Date().getTime()-100).toString());
   String unqStr=
   TableDescriptorDisplay.getNoCache(TableDescriptorDisplay.ForJavaScript);
   session.setAttribute("unq",unqStr);
   Connection con=null;
   Statement stmt=null;
   ResultSet rs=null;
   try {
      con=SQLUtil.makeConnection();
%>

<%@ include file="common/GlobalHeaderVARS.jsp" %>
<HTML>
   <HEAD>
      <TITLE>Schemalive</TITLE>
<%@ include file="common/GlobalHeaderJavascript.jsp" %>
   </HEAD>

<%
      int sequence=ManageSession.updateSequence(session);
%>

   <BODY bgcolor="#FFFFFF" onLoad="history.forward(1);">

<%@ include file="common/GlobalHeaderHTML.jsp" %>
<%@ taglib uri="/WEB-INF/taglib/view.tld" prefix="view" %>
<%@ taglib uri="/WEB-INF/taglib/stack.tld" prefix="sessionUtils" %>


      <view:setVars defaultEntryPoint="<%= entryPoints[0] %>" dbName="<%=
      dbName  %>" dbConn="<%= dbConnName %>">
      <!-- sessionUtils:stack tableName="<%= origTableName %>" mode="browse"
      stackLevel="<%= stackLevel %>" database="<%= dbName %>" dbConn="<%=
      dbConnName %>" -->
      <%
      // StackInfo: %= stackInfo %
      %>
      <!-- /sessionUtils:stack -->
      <br>
      <%=
         TableDescriptorDisplay.displayStack((LinkedList)
         session.getAttribute("sessionStack"),unqStr)
      %>
      <hr>
```

```
<TABLE width="100%" cellpadding="0" cellspacing="0">
   <tr valign="bottom" align="right">
      <TD valign="bottom"><font face="ARIAL,HELVETICA" size="4">THERE
      HAS BEEN AN <b>
         INTERNAL SERVER ERROR</b>
         <!--img src="images/logo-width.gif"-->
      </font></TD>
   </TR>
</TABLE>
<hr>

<br><br>
<font face="ARIAL,HELVETICA" size="4"> <center>
            
;  
PLEASE CALL THE <b>HELP DESK</b> WITH THE FOLLOWING INFORMATION:<p>


            
;  
<b><%= new java.util.Date().toString() %></b><br>

            
;  
<b><%= exception %></b><br>

<pre>
<%
      if (0 > exception.toString().indexOf("NOT AUTHORIZED")) {
         ByteArrayOutputStream ostr = new ByteArrayOutputStream();
         exception.printStackTrace(new PrintStream(ostr));
         out.print(ostr);
      }
%>
      </pre>


      </center>
      </view:setVars>
      <SCRIPT>
         setupNavHelp();
      </SCRIPT>
   </BODY>
</HTML>

<%
      }
      catch (SQLException sqle) {
         sqle.printStackTrace();
      }
      finally {
         try {
            if (rs != null)rs.close();
            if (stmt != null)stmt.close();
            if (con != null)con.close();
         }
         catch (SQLException sqle) {
            sqle.printStackTrace();
```

```
        }
      }
      System.gc();
%>

<%@ include file="common/GlobalFooter.jsp" %>
```

Schemalive/ExpiredSession.jsp

```
<META HTTP-EQUIV="Refresh" CONTENT="30;URL=/Schemalive/AddEditForm.jsp">

<%
   // $Revision: 2.4 $
   // $Date: 2001/10/30 08:26:33 $
%>

<%! public static final String version_ExpiredSession_jsp = "$Revision: 2.4
$"; %>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>

<%@ page import="common.*" %>

<%
   String unqStr=
   TableDescriptorDisplay.getNoCache(TableDescriptorDisplay.ForJavaScript);
   session.setAttribute("unq",unqStr);
   Connection con=null;
   Statement stmt=null;
   ResultSet rs=null;
   try {
      con=SQLUtil.makeConnection();
%>

<% response.setHeader("pragma","no-cache"); %>
<% response.setHeader("Expires",new java.util.Date(new
java.util.Date().getTime()-100).toString()); %>

<%@ include file="common/GlobalHeaderVARS.jsp" %>
<HTML>
   <HEAD>
      <TITLE>Schemalive</TITLE>
      <%@ include file="common/GlobalHeaderJavascript.jsp" %>
   </HEAD>

   <!-- %@ include file="common/GlobalHeaderVARS.jsp" % -->
   <%@ include file="common/EntryPoints.jsp" %>

<%
      int sequence=ManageSession.updateSequence(session);
%>

   <BODY bgcolor="#FFFFFF" onLoad="history.forward(1)">
```

```
<%@ include file="common/GlobalHeaderHTML.jsp" %>
<%@ taglib uri="/WEB-INF/taglib/view.tld" prefix="view" %>
<%@ taglib uri="/WEB-INF/taglib/stack.tld" prefix="sessionUtils" %>


   <view:setVars defaultEntryPoint="<%= entryPoints[0] %>" dbName="<%=
   dbName  %>" dbConn="<%= dbConnName %>">
   <!-- sessionUtils:stack tableName="<%= origTableName %>" mode="browse"
   stackLevel="<%= stackLevel %>" database="<%= dbName %>" dbConn="<%=
   dbConnName %>" -->
   <%
      // StackInfo: %= stackInfo %  //*****MPK (temporary delta)
   %>
   <!-- /sessionUtils:stack -->
   <br>
   <%=
      TableDescriptorDisplay.displayStack((LinkedList)
      session.getAttribute("se ssionStack"),unqStr)
   %>
   <hr>
   <TABLE width="100%" cellpadding="0" cellspacing="0">
      <tr valign="bottom" align="right">
         <TD valign="bottom"><font face="ARIAL,HELVETICA" size="4">YOUR
         SESSION HAS <b>
            EXPIRED</b>
            <!--img src="images/logo-width.gif"-->
         </font></TD>
      </TR>
   </TABLE>
   <hr>

   <br><br>

   <font face="ARIAL,HELVETICA" size="4">
   <center>
      THE SERVER <b>NO LONGER RETAINS</b> ANY INFORMATION<BR>
      REGARDING <b>YOUR</b> (APPARENTLY IN-PROGRESS)<BR>
      <b>WORKING SESSION</b>
      <p>
      IT IS THEREFORE NECESSARY THAT YOU <b>RESTART</b> YOUR SESSION<BR>
      BY DOING <b>ANY ONE OF THE FOLLOWING:</b>
      <p>
      <BR>
      CHOOSE TO SEARCH OR BROWSE A TABLE FROM THE <b>HEADER SECTION</b>
      (ABOVE)</b><BR>
      -----<BR>
      <b>WAIT</b>, AND THE SYSTEM WILL RESTART AUTOMATICALLY IN <b>30
      SECONDS</b><BR>
      -----<BR>
      CLICK <a href="/Schemalive/AddEditForm.jsp">HERE</a> TO RESTART THE
      SYSTEM <b>IMMEDIATELY</b><BR>
      <BR><BR><BR>
      <p>
      IF YOU HAVE ANY QUESTIONS, PLEASE CALL THE <b>HELP DESK</b>
   </center>
   </view:setVars>
   <SCRIPT>
      setupNavHelp();
```

```
        </SCRIPT>
    </BODY>
</HTML>

<%
        }
        catch (SQLException sqle) {
            sqle.printStackTrace();
        }
        finally {
            try {
                if (rs != null)rs.close();
                if (stmt != null)stmt.close();
                if (con != null)con.close();
            }
            catch (SQLException sqle) {
                sqle.printStackTrace();
            }
        }
        System.gc();
%>

<%@ include file="common/GlobalFooter.jsp" %>
```

Schemalive/OutOfSequence.jsp

```
<META HTTP-EQUIV="Refresh" CONTENT="30;URL=/Schemalive/AddEditForm.jsp">

<%
    // $Revision: 2.4 $
    // $Date: 2001/10/30 08:26:33 $
%>

<%! public static final String version_ExpiredSession_jsp = "$Revision: 2.4
$"; %>

<%@ page import="dbUtils.*" %>
<%@ page import="HTMLUtils.*" %>
<%@ page import="sessionUtils.*" %>
<%@ page import="java.sql.*" %>
<%@ page import="java.util.*" %>

<%@ page import="common.*" %>

<%
    String unqStr=
    TableDescriptorDisplay.getNoCache(TableDescriptorDisplay.ForJavaScript);
    session.setAttribute("unq",unqStr);
    Connection con=null;
    Statement stmt=null;
    ResultSet rs=null;
    try {
        con=SQLUtil.makeConnection();
%>

<% response.setHeader("pragma","no-cache"); %>
<% response.setHeader("Expires",new java.util.Date(new
java.util.Date().getTime()-100).toString()); %>
```

```
<%
      int sequence=ManageSession.updateSequence(session);
%>
<%@ include file="common/GlobalHeaderVARS.jsp" %>
<HTML>
   <HEAD>
      <TITLE>Schemalive</TITLE>
      <%@ include file="common/GlobalHeaderJavascript.jsp" %>
   </HEAD>


   <!-- %@ include file="common/GlobalHeaderVARS.jsp" % -->
   <%@ include file="common/EntryPoints.jsp" %>


   <BODY bgcolor="#FFFFFF" onLoad="history.forward(1)">

      <%@ include file="common/GlobalHeaderHTML.jsp" %>
      <%@ taglib uri="/WEB-INF/taglib/view.tld" prefix="view" %>
      <%@ taglib uri="/WEB-INF/taglib/stack.tld" prefix="sessionUtils" %>


      <view:setVars defaultEntryPoint="<%= entryPoints[0] %>" dbName="<%=
      dbName  %>" dbConn="<%= dbConnName %>">
      <!-- sessionUtils:stack tableName="<%= origTableName %>" mode="browse"
      stackLevel="<%= stackLevel %>" database="<%= dbName %>" dbConn="<%=
      dbConnName %>" -->
      <%
         // StackInfo: %= stackInfo %
      %>
      <!-- /sessionUtils:stack -->
      <br>
      <%=
         TableDescriptorDisplay.displayStack((LinkedList)
         session.getAttribute("sessionStack"),unqStr)
      %>
      <hr>
      <TABLE width="100%" cellpadding="0" cellspacing="0">
         <tr valign="bottom" align="right">
            <TD valign="bottom"><font face="ARIAL,HELVETICA" size="4">YOU
            HAVE GENERATED A <b>
               SESSION-SEQUENCE ERROR</b>
               <!--img src="images/logo-width.gif"-->
            </font></TD>
         </TR>
      </TABLE>
      <hr>

      <br><br>

      <font face="ARIAL,HELVETICA" size="4">
      <center>
         THE SERVER HAS DETECTED AN <b>ILLEGAL PAGE TRANSITION,</b>
         WHEREIN<BR>
         <b>YOUR BROWSER</b> HAS SUBMITTED A PAGE <b>OTHER THAN</b> THE LAST
         PAGE<BR>
```

```
        THAT <b>THE[redacted]ERVER</b> HAD PREVIOUSLY DELIVERED IT[redacted]OU.
        <p>
        THIS CAN RESULT FROM DOING A <b>'REFRESH'</b> (OR
        <b>'RELOAD'</b>),<BR>
        FROM TRYING TO USE A <b>'FAVORITE'</b> (OR <b>'BOOKMARK'</b>),<BR>
        FROM USING THE <b>'BACK' BUTTON</b> ON YOUR BROWSER, OR BY<BR>
        <b>DOUBLE-CLICKING</b> OR <b>EXECUTING MULTIPLE CLICKS</b> WHILE
        SUBMITTING A PAGE
        <p>
        IT IS THEREFORE NECESSARY THAT YOU <b>RESTART</b> YOUR SESSION<BR>
        BY DOING <b>ANY ONE OF THE FOLLOWING:</b>
        <p>
        <BR>
        CHOOSE TO SEARCH OR BROWSE A TABLE FROM THE <b>HEADER SECTION</b>
        (ABOVE)</b><BR>
        -----<BR>
        <b>WAIT</b>, AND THE SYSTEM WILL RESTART AUTOMATICALLY IN <b>30
        SECONDS</b><BR>
        -----<BR>
        CLICK <a href="/Schemalive/AddEditForm.jsp">HERE</a> TO RESTART THE
        SYSTEM <b>IMMEDIATELY</b><BR>
        <BR><BR><BR>
        <p>
        IF YOU HAVE ANY QUESTIONS, PLEASE CALL THE <b>HELP DESK</b>
      </center>
      </view:setVars>
      <SCRIPT>
        setupNavHelp();
      </SCRIPT>
   </BODY>
</HTML>

<%
      }
      catch (SQLException sqle) {
         sqle.printStackTrace();
      }
      finally {
         try {
            if (rs != null)rs.close();
            if (stmt != null)stmt.close();
            if (con != null)con.close();
         }
         catch (SQLException sqle) {
            sqle.printStackTrace();
         }
      }
      System.gc();
%>

<%@ include file="common/GlobalFooter.jsp" %>
```

Schemalive/showSession.jsp

```
<%
   // $Revision: 2.4 $
   // $Date: 2001/10/30 08:26:33 $
%>
```

```
<%@ page import="sessionUtils.*" %>
<%@ page import="java.util.*" %>
<HTML>
   <HEAD><TITLE>Session Values</TITLE></HEAD>
   <BODY bgcolor="#ffffff">
<%
      if (request.getParameter("suicide") != null &&
         request.getParameter("suicide").equals("yes"))
      {
         session.invalidate();
%>
         <H1>AARRRGHHH, I'm dead!</H1>
<%
      }
      else {
         LinkedList l=(LinkedList)session.getAttribute("sessionStack");
         if (request.getParameter("pop") != null && l != null) {
            l.remove(Integer.parseInt(request.getParameter("pop")));
         }
         ListIterator li=null;
         if (l != null) {
            li=l.listIterator(0);
         }
%>

         <TABLE border=1>
<%
         int index=0;
         while (li!=null && li.hasNext()) {
%>
            <TR>
               <TD>
                  <TABLE border=1>
<%
                  StackElement se=(StackElement)li.next();
                  Hashtable formValues=se.getFormValues();
                  Hashtable searchParams=se.getSearchParams();
                  String mode=se.getMode();
                  String tableName=se.getTableName();
                  String searchString=se.getSearchString();
                  String currentKey=se.getCurrentKey();
                  String focusField=se.getFocusField();
                  String masterColumn=se.getMasterColumn();
%>
                     <TR><TD>
                        tableName
                     </TD><TD>
                        <%= tableName %>
                     </TD>
                     <td rowspan=8 valign=center align=center>
                        <A HREF="/Schemalive/showSession.jsp?pop=<%= index++
                        %>">pop</A>
                     </td></TR>
                     <TR><TD>
                        mode
                     </TD><TD>
```

```
            <%= mode %>
        </TD></TR>
        <TR><TD>
            searchString
        </TD><TD>
            <%= searchString %>
        </TD></TR>
        <TR><TD>
            currentKey
        </TD><TD>
            <%= currentKey %>
        </TD></TR>
        <TR><TD>
            focusField
        </TD><TD>
            <%= focusField %>
        </TD></TR>
        <TR><TD>
            masterColumn
        </TD><TD>
            <%= masterColumn %>
        </TD></TR>
        <TR><TD>
            searchParams
        </TD><TD>
            <TABLE border=1>
                <TR><TH>Key</TH><TH>Values</TH></TR>
<%
                if (searchParams != null) {
                    Enumeration searchParamKeys=
                    searchParams.keys();
                    while (searchParamKeys.hasMoreElements()) {
                        String searchParamKey=(String)
                        searchParamKeys.nextElement();
                        String searchParamVal=
                        (String)searchParams.get(searchParamKey);
%>
                        <TR><TD><%= searchParamKey %></TD>
                        <TD><%= searchParamVal %></TD></TR>
<%
                    }
                }
%>
            </TABLE>
        </TD></TR>
        <TR><TD>
            formValues
        </TD><TD>
            <TABLE border=1>
                <TR><TH>Key</TH><TH>Values</TH></TR>
<%
                if (formValues != null) {
                    Enumeration formValueKeys=formValues.keys();
                    while (formValueKeys.hasMoreElements()) {
                        String formValueKey=(String)
                        formValueKeys.nextElement();
                        String formValueVal=
                            (String)formValues.get(formValueKey);
```

```
%>
                                    <TR><TD><%= formValueKey %></TD>
                                    <TD><%= formValueVal %></TD></TR>
<%
                                    }
                                }
%>
                        </TD></TR>
                    </TABLE>
                </TABLE>
                </TD>
            </TR>
            <TR><TABLE border=1>
<%
        }
        Enumeration sessionVars=session.getAttributeNames();
        while (sessionVars.hasMoreElements()) {
            String sessionVar=(String)sessionVars.nextElement();
            if (sessionVar.equals("sessionStack")) {
                continue;
            }
            Object sessionVal=session.getAttribute(sessionVar);
%>
                <TR><TD><%= sessionVar %></TD><TD><%= sessionVal %></TD></TR>
<%
        }
%>
            </TABLE>
        </TABLE>
<%
    }
%>
    </BODY>
</HTML>
```

Schemalive/common/EmptyParamCheck.jsp

```
<%!
   // $Revision: 2.3 $
   // $Date: 2001/10/30 01:35:53 $
%>

<%
   if (!request.getParameterNames().hasMoreElements()) {
      String headerUnqStr=

         TableDescriptorDisplay.getNoCache(TableDescriptorDisplay.ForJavaScri
         pt);
      session.removeAttribute("sessionStack");
      session.removeAttribute("headerMode");
      session.setAttribute("unq",headerUnqStr);
      response.sendRedirect("/Schemalive/Browse.jsp?unq="+headerUnqStr);
      return;
   }
%>

<%! public static final String version_common_EmptyParamCheck_jsp =
"$Revision: 2.3 $"; %>
```

Schemalive/common/EntryPoints.jsp

```
<%!
    // $Revision: 2.3 $
    // $Date: 2001/10/30 01:35:53 $
%>
<%
    String[] entryPoints=
    {
        "OPPORTUNITY",
        "CONTACT_EVENT",
        "PEOPLE"
    };
%>
```

Schemalive/common/GlobalFooter.jsp

```
<%! public static final String version_common_GlobalFooter_jsp = "$Revision:
2.3 $"; %>
```

Schemalive/common/GlobalHeaderHTML.jsp

```
<%!
   // $Revision: 2.3 $
   // $Date: 2001/10/30 01:35:53 $
%>
   <FORM name="viewTable">
      <TABLE border="0" cellpadding="0" cellspacing="0" width="100%">
         <TR><TD align="right" valign="top">
            Browse
            <input type="radio" name="headerMode" value="Browse.jsp"
               onClick="document.viewTable.tableName.options[0].text=
               'Select table to browse';"
            <%
               if (headerMode.equals("Browse.jsp")) {
            %>
               checked
            <%
               }
            %>
            >
            Search
            <input type="radio" name="headerMode" value="AddEditForm.jsp"
               onClick="document.viewTable.tableName.options[0].text=
               'Select table to search';"
            <%
               if (headerMode.equals("AddEditForm.jsp")) {
            %>
               checked
            <%
               }
            %>
            >

            <%
            // get balloon.help for quickLinks
            Balloon bl = bh.getNavBalloon("quickLink");
```

```
   Balloon [redacted]= bh.getNavBalloon("qui[illegible]");

   //SELECT used to go below
   %>
   <SELECT name="tableName"
   onChange="showView(this.options[this.selectedIndex].value);" <%
   if (b2!=null) { %> onMouseOver="setHang('<%= b2.getID()
   %>',event,this,'navLink'); return true;" onMouseOut="clearHang();
   return true;" onClick="clearHang();" <% } %>>
      <OPTION value="doNothing">Select table to <%=
      (headerMode.equals("Browse.jsp")?"browse":"search") %>
   <%
   /*
   Set tables=dd.tables();
   Object[] tableSet=tables.toArray();
   Arrays.sort(tableSet);

   for (int i=0;i<tableSet.length;i++) {
      if (((String)tableSet[i]).endsWith("_VIEW")) {
         continue;
      }
      else if (((TableDescriptor)dd.getDataDictionaryTD((String)
      tableSet[i])).getTDType() == TableDescriptor.VIEW) {
         continue;
      }
   */
   for (int i=0;i<headerTableList.length;i++) {
   %>
      <OPTION value="<%= headerTableList[i] %>">
      <%= TableDescriptorDisplay.getDisplayLabel(headerTableList[i],
      TableDescriptorDisplay.AllUpper) %>
   <%
   }
   %>
   </SELECT>
   <%// link used to go here%>
   <% if (b2 != null) { %> <A HREF="" STYLE="color: <%= DARKCELL %>;
   text-decoration: none;" onMouseOver="setHang('<%= b2.getID()
   %>',event,this,'navLink'); return true;" onMouseOut="clearHang();
   return true;" onClick="processAsterisk(); return false;" ><sup>
   <font size=+1>*</font></sup></A> <% } %>
</TD>
<%
for (int i=0;i<entryPoints.length;i++) {
   if (Arrays.binarySearch(headerTableList,entryPoints[i]) >= 0) {
%>
<TD valign="top">
   <nobr>  <a href="javascript:showView('<%=
   entryPoints[i] %>')" onMouseOver="showStatus('<%=
   TableDescriptorDisplay.getDisplayLabel(entryPoints[i]
   ,TableDescriptorDisplay.AllUpper) %>'); <% if (b1!=null) { %>
   setHang('<%= b1.getID() %>',event,this,'navLink'); <% } %> return
   true;" onMouseOut="window.status=''; <% if (b1!=null) { %>
   clearHang(); <% } %> return true;" onClick="clearHang(); return
   true;"><%=
   TableDescriptorDisplay.getDisplayLabel(entryPoints[i],TableDescri
   ptorDisplay.AllUpper) %></a></nobr>
</TD>
```

```
        <%
            }
        }
        %>
        <TD width="100%" valign="top"><img src="images/logo.gif"
        align="right"></TD>
        </TR>
    </TABLE>
  </FORM>
<%!
  public static final String version_common_GlobalHeaderHTML_jsp =
  "$Revision: 2.3 $";
%>
```

Schemalive/common/GlobalHeaderJavascript.jsp

```
<%!
   // $Revision: 2.3 $
   // $Date: 2001/10/30 01:35:53 $
%>

<%
   java.util.Date beginDD = new java.util.Date();

   DataDictionary dd = DataDictionary.getInstance(dbName,dbConnName);

   BalloonHelp bh=BalloonHelp.getInstance();

   // check for REMOTE_USER match in database
   Integer usersKey = (Integer)session.getAttribute("usersKey");
   if (usersKey == null) {
      // String remoteUser=request.getRemoteUser();
      String remoteUser=(request.getRemoteUser()==
      null)?"DEVONSHIRE\\mpk":request.getRemoteUser();
      String qStr="SELECT USERS_KEY FROM USERS WHERE UPPER(LOGIN_ID)='"+
      remoteUser.toUpperCase()+"'";

      if (Debug.areDebugging) {
         Debug.doLog("GHH: "+qStr,Debug.INFO);
      }

      //Connection myCon = SQLUtil.makeConnection();
      Statement myStmt=null;
      ResultSet myRs=null;
      try {
         myStmt = con.createStatement();
         myRs = myStmt.executeQuery(qStr);
         if (myRs.next()) {
            usersKey=new Integer(myRs.getString(1));
            session.setAttribute("usersKey",usersKey);
         }
      }
      catch (SQLException sqle) {
         sqle.printStackTrace();
      }
      finally {
         myRs.close();
         myStmt.close();
```

```
    }

    if (Debug.areDebugging) {
        Debug.doLog("remoteUser= "+remoteUser+", usersKey=
        "+usersKey,Debug.INFO);
    }
}

java.util.Date endDD = new java.util.Date();

/*
String headerSelectStr = "SELECT SECURITY_TABLE.Security_Table_Name "+
"FROM SECURITY_GROUP_TABLE, SECURITY_GROUP_USER, SECURITY_TABLE, "+
"USERS WHERE  SECURITY_GROUP_TABLE.Can_Browse_Flag = 1  AND "+
"USERS.Users_Key = SECURITY_GROUP_USER.Users_Key AND "+
"SECURITY_GROUP_USER.Security_Group_Key = "+
"SECURITY_GROUP_TABLE.Security_Group_Key AND "+
"SECURITY_GROUP_TABLE.Security_Table_Key = "+
"SECURITY_TABLE.Security_Table_Key AND USERS.Users_Key = "+usersKey;
*/

String headerSelectStr = "SELECT Security_Table_Name FROM SECURITY_TABLE
WHERE Security_Table_Key IN "+
    "  (SELECT Security_Table_Key "+
    //            "  FROM PEOPLE, STAFF, USERS, SECURITY_GROUP_USER,
    SECURITY_GROUP_TABLE "+
    "   FROM PEOPLE, USERS, SECURITY_GROUP_USER, SECURITY_GROUP_TABLE "+
    "   WHERE "+
    "        PEOPLE.Active_Flag <> 0 AND "+
    //                          "        PEOPLE.People_Key =
    STAFF.People_Key AND "+
    //                          "        STAFF.Staff_Key = USERS.Staff_Key
    AND "+
    "        PEOPLE.People_Key = USERS.People_Key AND "+
    "        USERS.Users_Key = SECURITY_GROUP_USER.Users_Key AND "+
    "   SECURITY_GROUP_USER.Security_Group_Key =
    SECURITY_GROUP_TABLE.Security_Group_Key AND "+
    "   Can_Browse_Flag <> 0 AND "+
    "   SECURITY_GROUP_USER.Users_Key = "+usersKey+") ORDER BY 1";

Statement myStmt =
con.createStatement(ResultSet.TYPE_SCROLL_INSENSITIVE,ResultSet.CONCUR_REA
D_ONLY);
ResultSet myRs = myStmt.executeQuery(headerSelectStr);
myRs.last();
headerTableList = new String[myRs.getRow()];
myRs.beforeFirst();
int headerTableIndex=0;
while (myRs.next()) {
  headerTableList[headerTableIndex++]=myRs.getString(1);
}
myRs.close();
myStmt.close();

String headerMode = request.getParameter("headerMode");
if (headerMode == null || headerMode.equals("")) {
   headerMode=(String)session.getAttribute("headerMode");
   if (headerMode == null) {
```

```
         headerMode=[redacted]owse.jsp";
      }
   }
   session.setAttribute("headerMode",headerMode);

   String checkHeader = request.getParameter("header");
   if (checkHeader != null && checkHeader.equals("true")) {
      session.removeAttribute("sessionStack");
   }
%>
   <style type="text/css">
      <!--
      .balloon {border-width: thin; border-style: groove;
      border-color: <%= LITECELL %>;
      position: absolute; background-color: #877887;
      padding: 3; layer-background-color: #877887;
      font-size: x-small; line-height: 120%; text-align: left;
      font-family: sans-serif; font-weight: bold;
      visibility: hidden}
      .isTip {text-decoration: none; color: yellow;}
      .notDecorated {text-decoration: none; color: black; cursor: default}
      -->
   </style>
   <SCRIPT Language="JavaScript">
      var agt=navigator.userAgent.toLowerCase();
      var appVer = navigator.appVersion.toLowerCase();
      var is_minor = parseFloat(appVer);
      var is_major = parseInt(is_minor);

      var is_nav  = ((agt.indexOf('mozilla')!=-1) &&
         (agt.indexOf('spoofer')==-1) &&
         (agt.indexOf('compatible') == -1) &&
         (agt.indexOf('opera')==-1) &&
         (agt.indexOf('webtv')==-1));
      var isNav4up = (is_nav && (is_major >= 4));

      var hangDocObj=null;
      var hangID=null;
      var hangType=null;
      var hangX=null;
      var hangY=null;
      var timeID=null;

      var columnWidth=50;
      var columnLeft=1;
      var tableTop=0;

      function keyPress()
      {
         if (hangID != null) {
            clearHang();
         }
      }

      function mouseDown()
      {
         mouseUp();
      }
```

```
function mouseUp()
{
   if (hangID != null) {
      clearHang();
   }
   return true;
}

function processAsterisk() {
   if (isNav4up) {
      if (document.layers[hangID] != null &&
         document.layers[hangID].visibility=="hide") {
         showHelp();
      }
      else {
         clearHang();
      }
   }
   else {
      if (document.all[hangID] != null &&
         document.all[hangID].style.visibility=="hidden") {
         showHelp();
      }
      else {
         clearHang();
      }
   }
}

function makeBalloon(id, message, width, type)
{
   var localWidth;
   if (type=="table") {
      localWidth=columnWidth;
   }
   else {
      localWidth=width;
   }
   var theString = '<STYLE TYPE="text/css">#'+id+
      '{width:'+localWidth+'; color: white; z-index: 1;}</STYLE>';
      theString += '<DIV CLASS="balloon" id="'+id+'">'+message+'</DIV
      >';
   //alert(theString);
   document.write(theString);
}

function makeNavBalloon(id, message, width)
{
   makeBalloon(id,message,width,"nav");
}

function makeTableBalloon(id, message)
{
   makeBalloon(id,message,0,"table");
}

function setupNavHelp()
```

```
{
   //We want *just* the header and nav stuff set up here
   <%
   Enumeration e=bh.getNavBalloonIDs();
   while (e.hasMoreElements()) {
      String id=(String)e.nextElement();
      Balloon b=bh.getNavBalloon(id);
   %>
      makeNavBalloon("<%= id %>","<%=
      TableDescriptorDisplay.processDoubleQuote(b.getMsg()) %>",<%=
      b.getBSize() %>);
   <%
   }
   %>
}

function setHang(id,event,docObj,type)
{
   hangID=id;
   hangDocObj=docObj;
   hangType=type;
   hangX=event.clientX;
   hangY=event.clientY;
   timeID=setTimeout("showHelp()",1500);
}

function clearHang() {
   if (timeID != null) {
      clearTimeout(timeID);
   }
   hideHelp(hangID);
}

function showHelp()
{
   var id=hangID

   if (isNav4up) {
      if (document.layers[id] == null) {
         return;
      }

      if (hangType=="dataTable") {
         document.layers[id].left =  columnLeft;
         document.layers[id].top = tableTop+
         hangDocObj.parentElement.offsetTop;
         document.layers[id].width=columnWidth;
      }
      else if (hangType=="dataLink") {
         document.layers[id].left =
         document.body.scrollLeft+columnLeft;
         document.layers[id].top =  document.body.scrollTop+hangY+10;
         document.layers[id].width = columnWidth;
      }
      else { // nav link
         document.layers[id].left = document.body.scrollLeft+hangX+10;
         document.layers[id].top =  document.body.scrollTop+hangY+10;
      }
```

```
        document.layers[id].color="white";
        document.layers[id].visibility = "show";
    }
    else {
        if (document.all[id] == null) {
            return;
        }

        if (hangType=="dataTable") {
            document.all[id].style.pixelLeft =  columnLeft;
            document.all[id].style.pixelTop =
                tableTop + hangDocObj.parentElement.offsetTop;
            document.all[id].style.width=columnWidth;
        }
        else if (hangType=="dataLink") {
            document.all[id].style.pixelLeft =
                document.body.scrollLeft+columnLeft;
            document.all[id].style.pixelTop =
                document.body.scrollTop+hangY+10;
            document.all[id].style.width=columnWidth;
        }
        else { // nav link
            document.all[id].style.pixelLeft =
                document.body.scrollLeft+hangX+10;
            document.all[id].style.pixelTop =
                document.body.scrollTop+hangY+10;
        }
        document.all[id].style.color="white";
        document.all[id].style.visibility = "visible";
    }
}

function hideHelp(id)
{
    if (isNav4up) {
        if (document.layers[id] != null) {
            document.layers[id].visibility="hide";
        }
    }
    else {
        if (document.all[id] != null) {
            document.all[id].style.visibility="hidden";
        }
    }
}

function validateTextarea(textareaObj,textAreaName,maxSize) {
    if (textareaObj.value.length > maxSize) {
        textareaObj.focus();
        alert("The "+textAreaName+" field has a maximum length of "+
            maxSize+" characters, but is currently "+
            textareaObj.value.length+" characters long.");
        return(false);
    }
}

function validateRPP() {
    var inputObj=document.forms[1].newPageSize;
```

```
    // check for valid number; not 0
    if (isNaN(inputObj.value)) {
       alert(inputObj.value+" is not a valid number.\n"+
       "Please enter a numeric value.");
       inputObj.focus();
       inputObj.select();
       return(false);
    }
    else if (inputObj.value == 0) {
       alert("Please enter a number greater than 0.");
       inputObj.focus();
       inputObj.select();
       return(false);
    }
    else {
       return(true);
    }
}

function showStatus(tableName) {
    var headerModeObj=document.viewTable.headerMode;
    var headerMode;
    if (headerModeObj[0].checked) {
       headerMode=headerModeObj[0].value;
    }
    else {
       headerMode=headerModeObj[1].value;
    }
    var action;
    if (headerMode == "Browse.jsp") {
       action="BROWSE";
    }
    else {
       action="SEARCH";
    }
    window.status=tableName+" ["+action+"]";
}

function showView(tableName) {
    var headerModeObj=document.viewTable.headerMode;
    var headerMode;
    if (headerModeObj[0].checked) {
       headerMode=headerModeObj[0].value;
    }
    else {
       headerMode=headerModeObj[1].value;
    }
    var mode;
    var doProcess;
    if (headerMode == "Browse.jsp") {
       mode="browse";
       doProcess="browse";
    }
    else {
       mode="search";
       doProcess="new";
    }
    if (tableName != "doNothing") {
```

```
            location.[redacted]ef=headerMode+"?tableName="+tableNa[redacted]
               "&mode="+mode+"&doProcess="+doProcess+"&stackLevel=0"+
               "&headerMode="+headerMode+"&header=true&unq=<%= unqStr %>";
         }
      }

      function setTableCoords() {
         if (isNav4up) {
            tableTop = document.layers['dataTable'].top;
            columnLeft =
               document.layers['dataTable'].left+
            document.layers['dataTable'].rows[0].offsetLeft;
            columnWidth = document.layers['dataTable'].cells[0].offsetWidth;
         }
         else {
            if (document.all("dataTable")==null) {
               return;
            }
            tableTop = document.all("dataTable").offsetTop;
            columnLeft =
            document.all("dataTable").offsetLeft+
            document.all("dataTable").rows[0].offsetLeft;
            columnWidth = document.all("dataTable").cells[0].offsetWidth;
            //columnWidth=200;
         }
      }

      //document.onmouseup=mouseUp;
      //document.onmousedown=mouseUp;
      document.onkeypress=keyPress;
   </SCRIPT>

<%!
   public String[] headerTableList=null;
%>
```

Schemalive/common/GlobalHeaderVARS.jsp

```
<%!
   // $Revision: 2.3 $
   // $Date: 2001/10/30 01:35:53 $
%>
<%

   String PAGEBKGD = "#FFFFFF";
   String DARKCELL = "#60B2B2";  // "#B5A0B5";
   String MIDLCELL = "#89BCBC";  // "#D5C0D5";
   String LITECELL = "#CEE5D4";  // "#F5E0E5";

   String URIPath = "/Schemalive";

   String dbName = "cnslt_crm";
   String dbConnName = "oraclev8";

   response.setContentType("text/html");
   response.setHeader("pragma","no-cache");

   /*
```

```
    if (!request.getParameterNames().hasMoreElements())
    String headerUnqStr=
    TableDescriptorDisplay.getNoCache(TableDescriptorDisplay.ForJavaScript);
    session.removeAttribute("sessionStack");
    session.removeAttribute("headerMode");
    session.setAttribute("unq",headerUnqStr);
    response.sendRedirect("/Schemalive/AddEditForm.jsp?unq="+headerUnqStr);
    return;
    }
    */
%>

<%! public static final String version_common_GlobalHeaderVARS_jsp =
"$Revision: 2.3 $"; %>
```

Schemalive/WEB-INF/web.xml

```
<?xml version="1.0" encoding="ISO-8859-1"?>

<!DOCTYPE web-app
     PUBLIC "-//Sun Microsystems, Inc.//DTD Web Application 2.2//EN"
     "http://java.sun.com/j2ee/dtds/web-app_2_2.dtd">

<web-app>
     <servlet>
    <servlet-name>AddEditForm</servlet-name>
    <servlet-class>com.schemalive.AddEditForm</servlet-class>
     </servlet>
     <servlet>
    <servlet-name>Browse</servlet-name>
    <servlet-class>com.schemalive.Browse</servlet-class>
     </servlet>
     <servlet>
    <servlet-name>BalloonHelpUtil</servlet-name>
    <servlet-class>com.schemalive.BalloonHelpUtil</servlet-class>
     </servlet>
     <servlet>
    <servlet-name>DataDictionaryUtil</servlet-name>
    <servlet-class>com.schemalive.DataDictionaryUtil</servlet-class>
     </servlet>
     <servlet>
    <servlet-name>DoAddEdit</servlet-name>
    <servlet-class>com.schemalive.DoAddEdit</servlet-class>
     </servlet>
     <servlet>
    <servlet-name>DoViewGenerator</servlet-name>
    <servlet-class>com.schemalive.DoViewGenerator</servlet-class>
     </servlet>
     <servlet>
    <servlet-name>Error500</servlet-name>
    <servlet-class>com.schemalive.Error500</servlet-class>
     </servlet>
     <servlet>
    <servlet-name>ExpiredSession</servlet-name>
    <servlet-class>com.schemalive.ExpiredSession</servlet-class>
     </servlet>
     <servlet>
    <servlet-name>OutOfSequence</servlet-name>
```

```
<servlet-class>com[redacted]chemalive.OutOfSequence</servlet-cla[redacted]>
 </servlet>
 <servlet>
<servlet-name>showSession</servlet-name>
<servlet-class>com.schemalive.showSession</servlet-class>
 </servlet>
 <servlet>
<servlet-name>
   dbUtils.DataDictionaryServlet
</servlet-name>
<servlet-class>
   dbUtils.DataDictionaryServlet
</servlet-class>
<init-param>
   <param-name>dbConn</param-name>
   <param-value>oraclev8</param-value>
</init-param>
<init-param>
   <param-name>database</param-name>
   <param-value>cnslt_crm</param-value>
</init-param>
 </servlet>
 <servlet>
<servlet-name>
   dbUtils.MasterDetailServlet
</servlet-name>
<servlet-class>
   dbUtils.MasterDetailServlet
</servlet-class>
<init-param>
   <param-name>dbConn</param-name>
   <param-value>oraclev8</param-value>
</init-param>
<init-param>
   <param-name>database</param-name>
   <param-value>cnslt_crm</param-value>
</init-param>
 </servlet>
 <servlet-mapping>
<servlet-name>
   dbUtils.DataDictionaryServlet
</servlet-name>
<url-pattern>
   dbUtils.DataDictionaryServlet
</url-pattern>
 </servlet-mapping>
 <servlet-mapping>
<servlet-name>
   dbUtils.MasterDetailServlet
</servlet-name>
<url-pattern>
   dbUtils.MasterDetailServlet
</url-pattern>
 </servlet-mapping>

 <welcome-file-list>
<welcome-file>index.html</welcome-file>
 </welcome-file-list>
```

```
<taglib>
    <taglib-uri>view</taglib-uri>
  <taglib-location>WEB-INF/taglib/view.tld</taglib-location>
</taglib>
<taglib>
  <taglib-uri>stack</taglib-uri>
  <taglib-location>WEB-INF/taglib/stack.tld</taglib-location>
</taglib>

<security-constraint>
  <web-resource-collection>
    <web-resource-name>Schemalive</web-resource-name>
    <url-pattern>/</url-pattern>
    <http-method>GET</http-method>
    <http-method>POST</http-method>
  </web-resource-collection>
  <auth-constraint>
    <role-name>Schemalive</role-name>
  </auth-constraint>
</security-constraint>
<login-config>
  <auth-method>BASIC</auth-method>
  <realm-name>Schemalive</realm-name>
</login-config>
<security-role>
  <role-name>Schemalive</role-name>
</security-role>
</web-app>
```

Schemalive/WEB-INF/classes/Connection.properties

```
# $Revision: 1.1 $
# $Date: 2001/10/29 22:18:29 $

JDBCURL=jdbc:oracle:oci8:@orcl.thetick
#JDBCURL=jdbc:oracle:oci8:@ora816
user=cnslt_crm
pwd=c0nsult1ng
#user=schema
#pwd=sch3ma
```

Schemalive/WEB-INF/classes/common/Debug.java

```
// $Revision: 2.3 $
// $Date: 2001/10/30 01:35:53 $

package common;

// import weblogic.common.*;
import java.util.*;

public class Debug {

   public static final String version_dbUtils_DataDictionary_java =
   "$Revision: 2.3 $";

   public static final boolean areDebugging = true;
```

```
    public static final int INFO = 0;
    public static final int ERROR = 1;
    public static final int WARN = 2;

    private static Debug instance;
    //  private LogServicesDef logHandle;

    private Debug() {
       //     T3ServicesDef t3s = T3Services.getT3Services();
       //     logHandle = t3s.log();
    }


    public static synchronized void doLog(String logMessage,
    int logType) {

       if (instance == null) {
          instance = new Debug();
       }
       try {
          switch (logType) {
             case Debug.INFO:
                // instance.logHandle.info(logMessage);
                System.out.println(new Date().toString()+": INFO:
                "+logMessage);
                break;
             case Debug.WARN:
                // instance.logHandle.warning(logMessage);
                System.out.println(new Date().toString()+": WARN:
                "+logMessage);
                break;
             default:
                // instance.logHandle.error(logMessage);
                System.out.println(new Date().toString()+": ERROR: "+
                logMessage);
                break;
          }
       }
       /*
       catch (T3Exception t3e) {
          t3e.printStackTrace();
       */
       catch (Exception e) {
       }
    }
}
```

Schemalive/WEB-INF/classes/dbUtils/CustomCaps.java

```
// $Revision: 2.4 $
// $Date: 2001/10/30 08:26:33 $

package dbUtils;

public class CustomCaps {
   public static final String[] customCaps=
   {
      "RFS",   "SGP",   "PRT",      "MM",       "FPN",
```

```
        "RF",     "TC",     "FMA",       "NE",        "MRT",
        "AR",     "CR",     "FAQ",       "FAR",       "POC",
        "TandL",  "ID",     "DB",        "URL",       "ZIPcode",
        "HRID",   "MSM",    "PM",        "PO",        "OT",
        "DEV",    "US",     "USD",       "NoCharge",  "CostTransfer",
        "PopUp",  "FS",     "NDA",       "YTD"
    };
}
```

Schemalive/WEB-INF/classes/dbUtils/CustomDrillDown.java

```
// $Revision: 2.3 $
// $Date: 2001/10/30 01:35:53 $

package dbUtils;

public class CustomDrillDown implements java.io.Serializable {

    public static final String version_dbUtils_CustomDrillDown_java =
    "$Revision: 2.3 $";

    private String tableName;
    private String mode;
    private int keyColumn;
    private int parentColumn;
    private String focusField;

    public CustomDrillDown(String tableName,String mode,
        int keyColumn,int parentColumn,
        String focusField)
    {
        this.tableName=tableName;
        this.mode=mode;
        this.keyColumn=keyColumn;
        this.parentColumn=parentColumn;
        this.focusField=focusField;
    }

    public String getTableName() {
        return(getTableName(""));
    }

    public String getTableName(String prefix) {
        if (tableName.startsWith("_")) {
            return(prefix+tableName);
        }
        else {
            return(tableName);
        }
    }

    public String getMode() {
        return(mode);
    }

    public int getKeyColumn() {
        return(keyColumn);
    }
```

```
    public int getParentColumn() {
        return(parentColumn); .
    }

    public String getFocusField() {
        return(focusField);
    }
}
```

Schemalive/WEB-INF/classes/dbUtils/CustomDropDown.java

```
// $Revision: 2.3 $
// $Date: 2001/10/30 01:35:53 $

package dbUtils;

import java.util.*;

public class CustomDropDown implements java.io.Serializable {

    public static final String version_dbUtils_CustomDropDown_java =
    "$Revision: 2.3 $";

    private String SQLStr;
    // place CustomDropDownComponents into cddc
    private Vector cddc;

    public CustomDropDown() {
        cddc=new Vector();
    }

    public CustomDropDown(String mySQLStr) {
        this();
        SQLStr=mySQLStr;
    }

    public String getSQLStr() {
        return(SQLStr);
    }

    public void setSQLStr(String mySQLStr) {
        SQLStr = mySQLStr;
    }

    public void addCDDC(CustomDropDownComponent cddcElem) {
        cddc.add(cddcElem);
    }

    public void addCDDC(int index,CustomDropDownComponent cddcElem) {
        cddc.add(index,cddcElem);
    }

    public CustomDropDownComponent removeCDDC(int index) {
        return((CustomDropDownComponent)cddc.remove(index));
    }

    public boolean removeCDDC(CustomDropDown cddcElem) {
```

```
      return(cddc.remove(cddcElem));
   }
}
```

Schemalive/WEB-INF/classes/dbUtils/CustomDropDownComponent.java

```
// $Revision: 2.3 $
// $Date: 2001/10/30 01:35:53 $

package dbUtils;

public class CustomDropDownComponent implements java.io.Serializable {

   public static final String version_dbUtils_CustomDropDownComponent_java =
   "$Revision: 2.3 $";

      private String tableName;
      private String columnName;
      private String separator;

      public CustomDropDownComponent(String myTableName, String myColumnName)
      {
         this(myTableName,myColumnName," ");
      }

      public CustomDropDownComponent(String myTableName, String myColumnName,
         String mySeparator)
      {

         tableName=myTableName;
         columnName=myColumnName;
         separator=mySeparator;
      }

      public String getTableName() {
         return(tableName);
      }

      public String getColumnName() {
         return(columnName);
      }

      public String getSeparator() {
         return(separator);
      }
}
```

Schemalive/WEB-INF/classes/dbUtils/DataDictionary.java

```
// $Revision: 2.3 $
// $Date: 2001/10/30 01:35:53 $

package dbUtils;

import java.io.*;
import java.sql.*;
import java.util.*;
import common.*;
```

```
import javax.servlet.[redacted]
import javax.servlet.jsp.*;

//import com.customer.*;

public class DataDictionary implements java.io.Serializable {

   public static final String version_dbUtils_DataDictionary_java =
   "$Revision: 2.3 $";

   private static DataDictionary instance;
   private static Hashtable ddtdHash=new Hashtable();
   private static String saveFile="DataDictionary.save";
   private static boolean buildDDOnly = false;
   private static boolean checkForViewExist = false;
   private static JspWriter out = null;
   private static boolean rebuild = false;
   private static boolean buildingViews = false;

   private DataDictionary(String database,String dbConnection) {
      init(database,dbConnection);
   }

   public static DataDictionary refreshInstance(String database,
      String dbConnection,
      boolean myBuildDDOnly,
      boolean myCheckForViewExist,
      JspWriter myOut)
      // throws ServletException {
   {

      out = myOut;
      return(refreshInstance(database,
         dbConnection,myBuildDDOnly,myCheckForViewExist));
   }

   public static DataDictionary refreshInstance(String database,
      String dbConnection,
      boolean myBuildDDOnly,
      boolean myCheckForViewExist)
      // throws ServletException {serial
   {

      buildDDOnly = myBuildDDOnly;
      checkForViewExist = myCheckForViewExist;
      rebuild=true;
      return(getInstance(database,dbConnection));
   }

   public static synchronized DataDictionary getInstance(String database,
      String dbConnection)
      // throws ServletException {
   {

      // check license
      //String unlockKeyString = "zrftuaxwouanxvveduvgqwkldlmkdivb";
      //B.rymu(unlockKeyString);
```

```
    //Fid licenseVerifier = new Fid();
    //boolean licenseOk =
    licenseVerifier.Pmdz("d:\\wls5.1.0\\Schemalive\\license");
    /*
    if (!licenseOk) {
       int errCode = licenseVerifier.dsz();
       switch (errCode) {
          case 2:
             Exception fgn = licenseVerifier.Ucao();
             if (fgn.toString().indexOf("NullPointerException") >= 0) {
                throw new ServletException("No License File found");
             }
             else {
                throw new ServletException(fgn.toString());
             }
          case 3:
             throw new ServletException("License has expired");
          default:
             throw new ServletException("License error code: "+errCode);
       }
    }
    */

    if (instance == null || rebuild) {
       if (!buildingViews) {
          instance = new DataDictionary(database,dbConnection);
          rebuild=false;
       }
    }
    return(instance);
 }

 public static synchronized DataDictionary refreshInstance(
    String database,String dbConnection)
 {
    instance = new DataDictionary(database,dbConnection);
    return(instance);
 }

 // This will pre-load the data dictionary into a hash of
 // DataDictionaryTD objects keyed on the table name
 private void init(String database,String dbConnection) {
    // Check to see if serialization file exists
    FileInputStream filIn=null;
    ObjectInputStream objIn=null;
    try {
       if (rebuild) {
          throw new FileNotFoundException();
       }
       saveFile="DataDictionary."+database+".save";
       filIn=new FileInputStream(saveFile);
       objIn=new ObjectInputStream(filIn);
       ddtdHash=(Hashtable)objIn.readObject();
       objIn.close();
       return;
    }
    catch (FileNotFoundException fnfe) {
       outputInfo("<b>About to build DataDictionary: first pass.</b><br>");
```

```
      doDataDictionary(database,dbConnection);
      outputInfo("<b>Done building DataDictionary: first pass.</b><br>");
      if (!buildDDOnly) {
         outputInfo(
         "<b>About to call ViewGenerator for all Views.</b><br>");
         // build Views
         instance=this;
         buildingViews=true;
         rebuild=false;
         Set ddtdSet = tables();
         Object[] ddtdAry = ddtdSet.toArray();
         Arrays.sort(ddtdAry);
         for (int i=0;i<ddtdAry.length;i++) {
            DataDictionaryTD ddtd=
            getDataDictionaryTD((String)ddtdAry[i]);
            if (ddtd.getTDType() == TableDescriptor.VIEW) {
               continue;
            }
            ViewGenerator vg = null;
            if (checkForViewExist) {
               vg = new ViewGenerator(ddtd,true,true,out);
            }
            else {
               vg = new ViewGenerator(ddtd,out);
            }
         }
         instance=null;
         buildingViews=false;
         outputInfo("<b>Done building Views.</b><br>");
         outputInfo(
         "<b>About to build DataDictionary: second pass.</b><br>");
         doDataDictionary(database,dbConnection);
         outputInfo(
         "<b>Done building DataDictionary: second pass.</b><br>");
      }
      out = null;
      this.serialize();
   }
   catch (IOException ioe) {
      ioe.printStackTrace();
   }
   catch (ClassNotFoundException cnfe) {
      cnfe.printStackTrace();
   }
}

private void outputInfo(String infoStr) {
   try {
      if (Debug.areDebugging) {
         Debug.doLog(infoStr,Debug.INFO);
      }
      if (out != null) {
         out.println(infoStr);
         out.flush();
      }
   }
   catch (IOException ioe) {
      ioe.printStackTrace();
```

```
    }
}

public void doDataDictionary(String database,String dbConnection) {
   Connection con = SQLUtil.makeConnection();

   try {
      Statement stmt = con.createStatement();
      outputInfo("<b>Building DataDictionary for tables.</b><br>");
      String qStr="SELECT TABLE_NAME FROM USER_TABLES ORDER BY "+
         "TABLE_NAME DESC";
      ResultSet rs=stmt.executeQuery(qStr);
      outputInfo("\t<blockquote>");
      while (rs.next()) {
         String tableName=rs.getString(1);
         //System.out.println("tableName: "+tableName);
         outputInfo("\tAdding table: "+tableName+" to
         DataDictionary.<br>");
         DataDictionaryTD ddtd =
            new DataDictionaryTD(database,tableName,dbConnection,out);
         ddtd.setTDType(TableDescriptor.TABLE);
         ddtdHash.put(tableName,ddtd);
      }
      outputInfo("\t</blockquote>");
      outputInfo("<b>Building DataDictionary for views.</b><br>");
      outputInfo("\t<blockquote>");
      qStr="SELECT VIEW_NAME FROM USER_VIEWS ORDER BY VIEW_NAME DESC";
      rs=stmt.executeQuery(qStr);
      while (rs.next()) {
         String viewName=rs.getString(1);
         outputInfo("\tAdding view: "+viewName+" to DataDictionary.<br>");
         DataDictionaryTD ddtd =
            new DataDictionaryTD(database,viewName,dbConnection,out);
         ddtd.setTDType(TableDescriptor.VIEW);
         ddtdHash.put(viewName,ddtd);
      }
      outputInfo("\t</blockquote>");
      outputInfo("<b>Building constraints in DataDictionary.</b><br>");
      // Micah 1-17-01
      Enumeration ddtdEnum=ddtdHash.keys();
      while (ddtdEnum.hasMoreElements()) {
         DataDictionaryTD ddtd=

            (DataDictionaryTD)ddtdHash.get((String)
            ddtdEnum.nextElement());
         ddtd.buildConstraints(dbConnection,this);
      }

      rs.close();
      stmt.close();
   }
   catch (SQLException sqle) {
      sqle.printStackTrace();
   }
   catch (Exception e) {
      System.out.println("con "+con);
      e.printStackTrace();
   }
```

```
      try {
         con.close();
      }
      catch (SQLException sqle) {
         sqle.printStackTrace();
      }
   }

   public DataDictionaryTD getDataDictionaryTD(String tableName) {
      return((DataDictionaryTD)ddtdHash.get(tableName.toUpperCase()));
   }

   public Set tables() {
      return(ddtdHash.keySet());
   }

   private void serialize() {
      ObjectOutputStream objOut= null;
      FileOutputStream filOut = null;

      try {
         filOut = new FileOutputStream(saveFile);
         objOut = new ObjectOutputStream(filOut);

         objOut.writeObject(ddtdHash);
         objOut.flush();
         objOut.close();
      }
      catch (IOException ioe) {
         ioe.printStackTrace();
      }
   }
}
```

Schemalive/WEB-INF/classes/dbUtils/DataDictionaryServlet.java

```
// $Revision: 2.4 $
// $Date: 2001/10/30 05:40:38 $

package dbUtils;

import java.io.*;
import java.util.*;
import java.sql.*;
import javax.servlet.*;
import javax.servlet.http.*;

import dbUtils.*;

public class DataDictionaryServlet extends HttpServlet {

   String dbConn=null;
   String database=null;

   private DataDictionary dd;

   public void init(ServletConfig config) {
```

```
      database=config.getInitParameter("database");
      dbConn=config.getInitParameter("dbConn");
      dd=DataDictionary.getInstance(database,dbConn);
   }

   public void doGet(HttpServletRequest req, HttpServletResponse res) {
      // if not tableName param, return summary of all
      String tableName=req.getParameter("tableName");
      String refresh=req.getParameter("refresh");

      if (refresh != null && refresh.equals("yes")) {
         dd=DataDictionary.refreshInstance(database,dbConn);
      }

      if (tableName == null) {
         showSummary(req,res);
      }
      else {
         showDetail(req,res,tableName);
      }
   }

   public void showSummary(HttpServletRequest req, HttpServletResponse res) {
      Set e=dd.tables();
      Object[] tableSet=e.toArray();
      Arrays.sort(tableSet);

      res.setContentType("text/html");
      StringBuffer outputString = new StringBuffer();

      outputString.append("<HTML>\n\t"+
         "<HEAD>"+
         "<TITLE>DataDictionary</TITLE>"+
         "</HEAD>\n");

      outputString.append("\t<BODY bgcolor=\"#ffffff\">\n");

      outputString.append("\t\tAvailable Tables for "+database+": <br>\n");
      outputString.append("\t\t<font size=\"-2\">Click table name to see "+
         "details.</font>\n");

      outputString.append("\t\t<TABLE width=\"600\" border=\"1\">\n");

      int columnCount=0;

      for (int i=0;i<tableSet.length;i++) {
         if (columnCount == 5) {
            outputString.append("\n\t\t\t</TR>\n");
            columnCount=0;
         }
         if (columnCount == 0) {
            outputString.append("\t\t\t<TR>\n\t\t\t\t");
         }
         String tName=(String)tableSet[i];
         outputString.append("<TD><A HREF=\"/Schemalive/dbUtils."+
            "DataDictionaryServlet?tableName="+
            tName+"\">"+tName+"</A></TD>"
         );
```

```
        columnCount++;
    }

    while (columnCount < 5) {
        outputString.append("<TD> </TD>");
        columnCount++;
        if (columnCount == 6) {
            outputString.append("\n\t\t\t</TR>\n");
        }
    }
    outputString.append("\t\t</TABLE>\n");
    outputString.append("\t</BODY>\n");
    outputString.append("</HTML>");

    PrintWriter out=null;
    try {
        out=res.getWriter();
    }
    catch (IOException ioe) {
        ioe.printStackTrace();
    }
    out.println(outputString.toString());

}

public void showDetail(HttpServletRequest req, HttpServletResponse res,
    String table)
{
    res.setContentType("text/html");
    StringBuffer outputString = new StringBuffer();

    outputString.append("<HTML>\n\t"+
        "<HEAD>"+
        "<TITLE>DataDictionary</TITLE>"+
        "</HEAD>\n"
    );

    outputString.append("\t<BODY bgcolor=\"#ffffff\">\n");

    outputString.append(
    "<A HREF=\"/Schemalive/dbUtils.DataDictionaryServlet"+
        "\">Return to Table listing</A><p>\n");

    DataDictionaryTD ddtd=dd.getDataDictionaryTD(table);

    outputString.append("\t\tDetails for table: "+table+" (key: "+
    ddtd.getKeyField()+")<p>\n");

    outputString.append("\t\t<TABLE width=\"600\" border=\"1\">\n");

    String viewSelect = null;
    if (ddtd.getTDType() == TableDescriptor.VIEW) {
        viewSelect = ddtd.getViewSelect();
    }
    ResultSetMetaData rsmd=ddtd.getMetaData();

    outputString.append("\t\t\t<TR><TH>ColmnName</TH>"+
        "<TH>Null?</TH><TH> ColumntType(Size)</TH>"+
```

```
    "<TH>Constraint Table/Key</TH>\n"
);

try {
    for (int i=1;i<=rsmd.getColumnCount();i++) {
        String columnName=rsmd.getColumnName(i);
        String formattedColumnName=ddtd.getFormattedField(i-1);
        String columnType=rsmd.getColumnTypeName(i);

        outputString.append("\t\t\t<TR>\n");
        outputString.append("\t\t\t\t<TD>"+columnName+
            "<br>("+
            formattedColumnName+")</TD>\n"
        );

        outputString.append("\t\t\t\t<TD>");

        if (rsmd.isNullable(i) != ResultSetMetaData.columnNullable) {
            outputString.append("NOT NULL ");
        }
        else {
            outputString.append(" ");
        }

        outputString.append("</TD><TD>");

        outputString.append(columnType);
        if (!columnType.equals("DATE")) {
            outputString.append("(");
            if (columnType.equals("NUMBER")) {
                int precision=rsmd.getPrecision(i);
                int scale=rsmd.getScale(i);
                if (precision != 0) {
                    outputString.append(precision+","+scale);
                }
            }
            else {
                outputString.append(rsmd.getColumnDisplaySize(i));
            }
            outputString.append(")</TD>\n");
        }
        outputString.append("\t\t\t\t<TD>");

        TableDescriptor td=null;
        if ((td=ddtd.getConstraint(columnName)) != null) {

            outputString.append("<A HREF=\"/Schemalive/dbUtils."+
                "DataDictionaryServlet?tableName="+
                td.getTable()+"\">"+td.getTable()+
                "</A>/"+td.getKeyField()
            );
        }
        else {
            outputString.append(" ");
        }

        outputString.append("</TD>\n");
        outputString.append("\t\t\t</TR>\n");
```

```
            }
        }
        catch (SQLException sqle) {
            sqle.printStackTrace();
        }
        if (viewSelect != null) {
            outputString.append("<TR><TD><b>View Select:</b></TD>\n");
            outputString.append("<TD colspan=3>\""+viewSelect);
            outputString.append("\"</TD></TR>\n");
        }
        outputString.append("\t\t</TABLE><p>\n");

        outputString.append(
        "<A HREF=\"/Schemalive/dbUtils.DataDictionaryServlet"+
            "\">Return to Table listing</A><p>\n");

        outputString.append("\t</BODY>\n");
        outputString.append("</HTML>\n");


        PrintWriter out=null;
        try {
            out=res.getWriter();
        }
        catch (IOException ioe) {
            ioe.printStackTrace();
        }
        out.println(outputString.toString());

    }
}
```

Schemalive/WEB-INF/classes/dbUtils/DataDictionaryTD.java

```
// $Revision: 2.3 $
// $Date: 2001/10/30 01:35:53 $

package dbUtils;

import java.io.*;
import java.sql.*;
import java.util.*;

import common.*;
import javax.servlet.jsp.*;

//import dbPoolUtils.*;

public class DataDictionaryTD extends TableDescriptor implements java.io.
Serializable {

    public static final String version_dbUtils_DataDictionaryTD_java =
    "$Revision: 2.3 $";
    private static JspWriter out=null;

    public DataDictionaryTD(String database,String table,
        String dbConnection).
    {
```

```
   this(database,table,dbConnection,null);
}

public DataDictionaryTD(String database,String table,
   String dbConnection,JspWriter out)
{
   super(database,table.toUpperCase(),dbConnection,out);
   this.out=out;

   // Micah 1-17-01
   //buildConstraints(dbConnection);
}

// Micah 1-17-01
public void buildConstraints(String dbConnection,DataDictionary dd) {
   // This class is going to automagically load up the TD stuff using
   // DataDictionary
   Vector constraints=new Vector();
   try {
      Connection con = SQLUtil.makeConnection();

      if (con == null) {
         throw new SQLException("Can't get connection: "+dbConnection);
      }
      Statement stmt = con.createStatement();

      // first let's see if we are dealing with a view
      String qStr="SELECT TEXT from USER_VIEWS where "+
         "VIEW_NAME='"+getTable()+"'";
      ResultSet rs=stmt.executeQuery(qStr);
      if (rs.next()) { // dealing with a view
         outputInfo("<b>Setting ViewSelect for "+getTable()+
            "</b><br>");
         setViewSelect(rs.getString(1));
         rs.close();
         stmt.close();
         con.close();

         // check for column comments for CustomDrillDown
         Enumeration dfsEnum = displayFields();
         int index=0;
         while (dfsEnum.hasMoreElements()) {
            //con = connMgr.getConnection(dbConnection);
            con = SQLUtil.makeConnection();
            if (con == null) {
               throw new SQLException("Can't get connection: "+
               dbConnection);
            }
            String df = (String)dfsEnum.nextElement();
            qStr="select comments from user_col_comments "+
               "where comments is not null and table_name='"+
               getTable()+"' and column_name='"+df+"'";

            stmt = con.createStatement();
            rs=stmt.executeQuery(qStr);
            if (rs.next()) {
               String comments=rs.getString(1);
               if (Debug.areDebugging) {
```

```
Debug.doLog("col comments for "+
  getTable()+"."+df+": "+comments,Debug.INFO);
}
// parse
// get tableName
int beginTag=comments.indexOf("<tableName>")+
"<tableName>".length();
int endTag=0;
if (beginTag >= "<tableName>".length()) {
   endTag=comments.indexOf("</tableName>");
   String tableName=comments.substring(beginTag,endTag).
   toUpperCase().trim();

   // get mode
   beginTag=comments.indexOf("<mode>")+
      "<mode>".length();
   endTag=comments.indexOf("</mode>");
   String mode=comments.substring(beginTag,endTag).trim();

   //get keyColumn
   beginTag=comments.indexOf("<keyColumn>")+
      "<keyColumn>".length();
   endTag=comments.indexOf("</keyColumn>");
   int keyColumn=Integer.parseInt(
      comments.substring(
      beginTag,endTag).trim()
   );

   //get parentColumn
   beginTag=comments.indexOf("<parentColumn>")+
      "<parentColumn>".length();
   endTag=comments.indexOf("</parentColumn>");
   int parentColumn=Integer.parseInt(
      comments.substring(beginTag,endTag).trim()
   );

   //get focusField
   beginTag=comments.indexOf("<focusField>")+
      "<focusField>".length();
   endTag=comments.indexOf("</focusField>");
   String focusField=comments.substring(beginTag,endTag).
   toUpperCase().trim();
   if (Debug.areDebugging) {
      Debug.doLog("DDTD: tableName="+tableName+", mode="+
      mode+", keyColumn="+keyColumn+", parentColumn="+
      parentColumn+",focusField="+focusField,Debug.INFO);
   }

   setCustomDrillDown(new CustomDrillDown(
   tableName,mode,keyColumn,
   parentColumn,focusField),index++);
}

// parse for constraints
beginTag=comments.indexOf("<foreignTableName>")+
   "<foreignTableName>".length();
endTag=0;
if (beginTag >= "<foreignTableName>".length()) {
```

```
        endTag=comments.indexOf("</foreignTableName>");
        String foreignTableName=
        comments.substring(
        beginTag,endTag).toUpperCase().trim();
        beginTag=comments.indexOf("<foreignKeyField>")+
           "<foreignKeyField>".length();
        endTag=comments.indexOf("</foreignKeyField>");
        String foreignKeyField=
        comments.substring(
        beginTag,endTag).toUpperCase().trim();

        if (Debug.areDebugging) {
           Debug.doLog("About to create new TD on "+
              getTable()+"."+df+" with "+
              "foreignTableName: "+
              foreignTableName+
              " foreignKeyField: "+
              foreignKeyField,Debug.INFO
           );
        }
        TableDescriptor td=
           new TableDescriptor(getDatabase(),
              foreignTableName,
              getDBConnection(),out
           );
        td.setKeyField(foreignKeyField);
        putConstraintForView(df,td);

        /* Micah 1-17-01
        TableDescriptor td =
        dd.getDataDictionaryTD(foreignTableName);
        td.setKeyField(foreignKeyField);
        putConstraintForView(df,td);
         */

        index++;
     }
   }
   else {
      setCustomDrillDown(null,index++);
   }

   rs.close();
   stmt.close();
   //connMgr.freeConnection(dbConnection,con);
   con.close();
 }
 return;
} // end check for dealing with a view

// check for column comments on a table
Enumeration dfsEnum = displayFields();
int index=0;
while (dfsEnum.hasMoreElements()) {
   String df = (String)dfsEnum.nextElement();
   qStr="select comments from user_col_comments "+
      "where comments is not null and table_name='"+
      getTable()+"' and column_name='"+df+"'";
```

```
    rs=stmt.executeQuery(qStr);
    if (rs.next()) {
       String comments=rs.getString(1);
       if (Debug.areDebugging) {
          Debug.doLog("col comments for "+
             getTable()+"."+df+": "+comments,Debug.INFO
          );
       }

       // parse for customdropdown
       int endTag=0;
       int beginTag=0;
       if (0 < (endTag=comments.indexOf("</sql>"))) {
          beginTag=comments.indexOf("<sql>")+"<sql>".length();
          String
          customDropDownSQL=comments.substring(beginTag,endTag).
          toUpperCase().trim();
          if (Debug.areDebugging) {
             Debug.doLog("Setting 'local' Foreign CDD to: "+
             customDropDownSQL,
                Debug.INFO);
          }
          setForeignCDD(df,customDropDownSQL);
       }
    }
}

qStr="SELECT B.COLUMN_NAME, C.TABLE_NAME, C.COLUMN_NAME "+
   "FROM USER_CONSTRAINTS A, USER_CONS_COLUMNS B, "+
   "USER_CONS_COLUMNS C WHERE "+
   "A.CONSTRAINT_TYPE = 'R' AND A.TABLE_NAME = '"+getTable()+
   "' AND A.CONSTRAINT_NAME = B.CONSTRAINT_NAME "+
   "AND A.R_CONSTRAINT_NAME = C.CONSTRAINT_NAME";


rs=stmt.executeQuery(qStr);
outputInfo("<b>constraints for: "+getTable()+"</b><blockquote>");
while (rs.next()) {
   /* Micah 1-17-01
   TableDescriptor td=new TableDescriptor(getDatabase(),
      rs.getString(2),
      getDBConnection()
    );
   td.setKeyField(rs.getString(3));
   putConstraint(rs.getString(1),td);
   Micah 1-17-01 */

   TableDescriptor td=dd.getDataDictionaryTD(rs.getString(2));
   td.setKeyField(rs.getString(3));
   putConstraint(rs.getString(1),td);

   outputInfo(rs.getString(1)+" --> "+
      rs.getString(2)+"."+td.getKeyField()+"<br>");

   if (getForeignCDD(rs.getString(1)) == null) {
      if (td.getPrimaryCDD() != null) {
         if (Debug.areDebugging) {
```

```
                    Debug.doLog(getTable()+"."+rs.getString(1)+
                     ": Inheriting remote Primary CDD as: "+td.getPrimaryCDD
                     ().getSQLStr(),Debug.INFO);
                  }
                  setForeignCDD(rs.getString(1),td.getPrimaryCDD().getSQLStr
                  ());
               }
            }
         }
         outputInfo("</blockquote>");
         qStr="SELECT B.COLUMN_NAME FROM "+
            "USER_CONSTRAINTS A,USER_CONS_COLUMNS B WHERE "+
            "A.CONSTRAINT_TYPE='P' AND A.TABLE_NAME = '"+getTable()+
            "' AND A.CONSTRAINT_NAME=B.CONSTRAINT_NAME";

         rs=stmt.executeQuery(qStr);
         if (rs.next()) {
            setKeyField(rs.getString(1));
         }
         rs.close();
         stmt.close();
         //connMgr.freeConnection(dbConnection,con);
         con.close();
      }
      catch (SQLException sqle) {
         sqle.printStackTrace();
      }
      catch (Exception e) {
         e.printStackTrace();
      }
   }

   private void outputInfo(String infoStr) {
      try {
         if (Debug.areDebugging) {
            Debug.doLog(infoStr,Debug.INFO);
         }
         if (out != null) {
            out.println(infoStr);
            out.flush();
         }
      }
      catch (IOException ioe) {
         ioe.printStackTrace();
      }
   }
}
```

Schemalive/WEB-INF/classes/dbUtils/MasterDetail.java

```
// $Revision: 2.3 $ */
// $Date: 2001/10/30 01:35:53 $ */

package dbUtils;

import java.io.*;
import java.sql.*;
import java.util.*;
```

```
public class MasterDetail {

   public static final String version_dbUtils_MasterDetail_java =
   "$Revision: 2.3 $";

   private static MasterDetail instance;
   private static Hashtable mdHash=new Hashtable();

   private MasterDetail(String database,String dbConnection) {
      init(database,dbConnection);
   }

   public static synchronized MasterDetail getInstance(String database,
      String dbConnection)
   {
      if (instance == null) {
         instance = new MasterDetail(database,dbConnection);
      }
      return(instance);
   }

   public static synchronized MasterDetail getInstance() {
      return(instance);
   }

   private void init(String database, String dbConnection) {
      try {
         Connection con = SQLUtil.makeConnection();
         if (con == null) {
            throw new SQLException("Can't get connection: "+dbConnection);
         }

         Statement stmt = con.createStatement();
         String qStr="select table_name,comments from user_tab_comments "+
            "where comments is not null";
         ResultSet rs=stmt.executeQuery(qStr);
         while (rs.next()) {
            Vector detailVect=parseComments(rs.getString(2));
            mdHash.put(rs.getString(1),detailVect);
         }
         rs.close();
         stmt.close();
         con.close();
      }
      catch (SQLException sqle) {
         sqle.printStackTrace();
      }
   }

   private Vector parseComments(String comments) {

      Vector detailTables=new Vector();
      int begTag=comments.indexOf("<detailTable>")+
         "<detailTable>".length();
      int endTag=comments.indexOf("</detailTable>",begTag);
      while (begTag >= "<detailTable>".length() && endTag >= 0) {
         detailTables.add(comments.substring(begTag,endTag).toUpperCase().
```

```
            trim());
            begTag=comments.indexOf("<detailTable>",endTag)+
               "<detailTable>".length();
            endTag=comments.indexOf("</detailTable>",begTag);
         }
         return(detailTables);
      }

      public Vector getDetailTables(String tableName) {
         Vector detailTables=(Vector)mdHash.get(tableName.toUpperCase());
         if (detailTables == null) {
            return(new Vector());
         }
         else {
            return(detailTables);
         }
      }

      public Set tables() {
         return(mdHash.keySet());
      }
   }
```

Schemalive/WEB-INF/classes/dbUtils/MasterDetailServlet.java

```
// $Revision: 2.4 $
// $Date: 2001/10/30 05:40:38 $

package dbUtils;

import java.io.*;
import java.util.*;
import java.sql.*;
import javax.servlet.*;
import javax.servlet.http.*;

import dbUtils.*;

public class MasterDetailServlet extends HttpServlet {

   String dbConn=null;
   String database=null;

   private MasterDetail md;

   public void init(ServletConfig config) {
      database=config.getInitParameter("database");
      dbConn=config.getInitParameter("dbConn");
      md=MasterDetail.getInstance(database,dbConn);
   }

   public void doGet(HttpServletRequest req, HttpServletResponse res) {
      String tableName=req.getParameter("tableName");

      String outputString=null;
      if (tableName == null) {
         outputString=showSummary(req,res);
      }
```

```
    else {
       outputString=showDetail(req,res,tableName);
    }

    res.setContentType("text/html");
    PrintWriter out=null;
    try {
       out=res.getWriter();
    }
    catch (IOException ioe) {
       ioe.printStackTrace();
    }
    out.println(outputString);
}

public String showSummary(HttpServletRequest req,
HttpServletResponse res) {
    Set tables=md.tables();
    Object[] tableSet=tables.toArray();
    Arrays.sort(tableSet);

    StringBuffer outputString = new StringBuffer();

    outputString.append("<HTML>\n\t"+
       "<HEAD>"+
       "<TITLE>MasterDetail</TITLE>"+
       "</HEAD>\n"
    );

    outputString.append("\t<BODY bgcolor=\"#ffffff\">\n");

    outputString.append("\t\tMaster tables for "+database+": <br>\n");
    outputString.append("\t\t<font size=\"-2\">Click table name to see "+
       "detail tables.</font>\n");

    outputString.append("\t\t<TABLE border=\"1\">\n");

    int columnCount=0;
    for (int i=0;i<tableSet.length;i++) {
       if (columnCount == 5) {
          outputString.append("\n\t\t\t</TR>\n");
          columnCount=0;
       }
       if (columnCount == 0) {
          outputString.append("\t\t\t<TR>\n\t\t\t\t");
       }
       String tableName=(String)tableSet[i];
       outputString.append("<TD><A HREF=\"/Schemalive/dbUtils."+
          "MasterDetailServlet?tableName="+
          tableName+"\">"+tableName+"</a></TD>\n"
       );
       columnCount++;
    }
    while (columnCount < 5) {
       outputString.append("\t\t\t\t<TD> </TD>\n");
       columnCount++;
       if (columnCount == 6) {
          outputString.append("\t\t\t</TR>\n");
```

```
        }
    }
    outputString.append("\t\t</TABLE>\n");
    outputString.append("\t</BODY>\n");
    outputString.append("</HTML>");

    return(outputString.toString());
  }

  public String showDetail(HttpServletRequest req, HttpServletResponse res,
  String table) {
    StringBuffer outputString = new StringBuffer();

    outputString.append("<HTML>\n\t"+
      "<HEAD>"+
      "<TITLE>MasterDetail</TITLE>"+
      "</HEAD>\n"
    );

    outputString.append("\t<BODY bgcolor=\"#ffffff\">\n");
    outputString.append("<A HREF=\"/Schemalive/dbUtils.MasterDetailServlet"
    +
      "\">Return to Master Table Listing</A><p>\n");
    outputString.append("\t\tDetail tables for : "+table+"<p>\n");
    outputString.append("\t\t<TABLE border=\"1\">\n");
    Vector detailTables=md.getDetailTables(table);
    Enumeration e=detailTables.elements();

    while (e.hasMoreElements()) {
      outputString.append("\t\t\t<TR>\n\t\t\t\t<TD>"+
      (String)e.nextElement()+
      "</TD>\n\t\t\t</TR>\n");
    }

    outputString.append("\t\t\t</TR>\n");
    outputString.append("\t\t</TABLE>\n");
    outputString.append("\t</BODY>\n");
    outputString.append("</HTML>");

    return(outputString.toString());
  }
}
```

Schemalive/WEB-INF/classes/dbUtils/SQLUtil.java

```
// $Revision: 2.3 $
// $Date: 2001/10/30 01:35:53 $

package dbUtils;

import java.util.*;
import java.sql.*;
import javax.sql.*;
import oracle.jdbc.driver.*;
import oracle.jdbc.pool.*;

import common.*;
```

```
//import dbPoolUtil[redacted];

public class SQLUtil {

   public static final String version_dbUtils_SQLUtil_java =
   "$Revision: 2.3 $";

   //public static final String JDBCDriver = "weblogic.jdbc.pool.Driver";
   //public static final String JDBCDriver = "weblogic.jdbc20.pool.Driver";


   //public static final String JDBCURL = "jdbc:weblogic:pool:oraclePool";
   //public static final String JDBCURL = "jdbc20:weblogic:pool:oraclePool";
   //public static final String JDBCURL = "jdbc:oracle:oci8:@orcl.thetick";
   //public static final String user = "CNSLT_CRM";  // "schema";
   //public static final String pwd = "CONSULTING";  // "sch3ma";

   //public static Driver oraDriver=null;

   public static OracleConnectionCacheImpl ods=null;

   public static String processSingleQuote(String str) {
      int prevIndex=0;
      int curIndex=0;

      if (str == null) {
         return(str);
      }

      while ((curIndex=str.indexOf("'",prevIndex)) >= 0) {
         str=str.substring(0,curIndex)+"'"+str.substring(curIndex);
         prevIndex=curIndex+2;
      }

      return(str);
   }

   public static Connection makeConnection() {
      Connection con=null;
      try {
         //if (oraDriver == null) {
         if (ods == null) {
            String JDBCURL=null;
            String user=null;
            String pwd=null;

            Properties p = new Properties();
            p.load(ClassLoader.getSystemResourceAsStream(
            "Connection.properties"));
            JDBCURL = p.getProperty("JDBCURL");
            user = p.getProperty("user");
            pwd = p.getProperty("pwd");

            Debug.doLog("Connecting to: "+JDBCURL+", with: "+user+"/*****",
            Debug.WARN);

            ods = new OracleConnectionCacheImpl();
            ods.setURL(JDBCURL);
```

```
            ods.setUser(user);
            ods.setPassword(pwd);

            ods.setMaxLimit(20);

            //System.out.println("oraDriver is null, setting to:
            "+JDBCDriver);
            //oraDriver=(Driver)
            Class.forName(SQLUtil.JDBCDriver).newInstance();
         }
         //con=DriverManager.getConnection(SQLUtil.JDBCURL);
         //con=oraDriver.connect(SQLUtil.JDBCURL,null);
         con=ods.getConnection();
      }
      catch (SQLException sqle) {
         sqle.printStackTrace();
      }
      catch (Exception e) {
         e.printStackTrace();
      }
      return(con);
   }

   /*
   public static Hashtable checkConnection(Connection con,
   String connName) {

   Hashtable h = new Hashtable();
   Boolean b;

   if (con == null) {
   DBConnectionManager connMgr=DBConnectionManager.getInstance();
   con=connMgr.getConnection(connName);
   b=new Boolean(true);
   }
   else {
   b=new Boolean(false);
   }
   h.put("connection",con);
   h.put("needToClose",b);
   return(h);
   }
   */

   public static void main(String[] args) {
      System.out.println("orig Str: "+args[0]);
      System.out.println("new Str: "+processSingleQuote(args[0]));
      System.out.println("null Test: "+processSingleQuote(null));
   }
}
```

Schemalive/WEB-INF/classes/dbUtils/TableDescriptor.java

```
// $Revision: 2.3 $
// $Date: 2001/10/30 01:35:53 $

package dbUtils;
```

```
import java.io.*;
import java.sql.*;
import java.util.*;

import common.*;

import HTMLUtils.*;
import javax.servlet.jsp.*;

public class TableDescriptor implements java.io.Serializable {

    public static final String version_dbUtils_TableDescriptor_java =
    "$Revision: 2.3 $";

    public static final int DisplayAllNotNullable=0;
    public static final int DisplayAllWritable=1;

    public static final int TABLE=0;
    public static final int VIEW=1;

    private String database;
    private String table;
    private String dbConnection;

    private String where;
    private String orderBy;
    private String keyField;

    private String viewSelect;
    private int    tdType;

    private ResultSetMetaData rsmd;
    private MetaData[] columns;

    private CustomDrillDown[] cdd;

    private Hashtable foreignCDDs;
    private CustomDropDown primaryCDD;

    private static JspWriter out = null;

    // A list of fields to be shown. This is initialized because there will
    // always be a default list of displayFields
    private Vector displayFields=new Vector();
    private Vector formattedFields=new Vector();

    // What gets shown in a constraint picklist (space-delimited). This is
    // not initialized because it may not be used.
    private Vector constraintFields=null;


    // A hash reference to constraints where key is a String (referenceing
    // a particular field) and value is a reference to another
    // TableDescriptor Object. This is not initialized because it may not
    // be used
    private Hashtable constraints=null;

    public TableDescriptor(String database, String table,
```

```
String dbConnecti[redacted]) {
   this(database,table,dbConnection,null);
}

public TableDescriptor(String database, String table,
String dbConnection,JspWriter out) {

   this.out=out;
   this.database=database;
   this.table=table;
   this.dbConnection=dbConnection;

   foreignCDDs=new Hashtable();

   try {
      Connection con = SQLUtil.makeConnection();

      if (con == null) {
         throw new SQLException("Can't get connection.");
      }
      Statement stmt = con.createStatement();

      // let's see if there a table comments for ordering the
      // the rows
      ResultSet rs =
      stmt.executeQuery("select comments from user_tab_comments"+
         " where table_name='"+table.toUpperCase()+"' and "+
         "comments is not null");
      StringBuffer qStrBuff = new StringBuffer("SELECT * FROM "+table);
      if (rs.next()) {
         String comments=rs.getString(1);
         int endTag=0;
         int begTag=comments.indexOf("<cl>");
         if (begTag >= 0) {
            endTag=comments.indexOf("</cl>");
            qStrBuff = new StringBuffer("SELECT ");
            while (endTag >= 0) {
               String column=comments.substring(begTag+"<cl>".length(),
               endTag);
               qStrBuff.append(column+",");
               begTag=comments.indexOf("<cl>",endTag);
               endTag=comments.indexOf("</cl>",endTag+1);
            }
            qStrBuff.deleteCharAt(qStrBuff.length()-1);
            qStrBuff.append(" FROM "+table);
         }

         // parse for customdropdown
         if (0 < (endTag=comments.indexOf("</sql>"))) {
            begTag=comments.indexOf("<sql>")+"<sql>".length();
            String customDropDownSQL=comments.substring(begTag,endTag).
            toUpperCase().trim();
            if (Debug.areDebugging) {
               Debug.doLog(getTable()+": Setting Primary CDD to: "+
               customDropDownSQL,Debug.INFO);
            }
            setPrimaryCDD(customDropDownSQL);
         }
```

```
        }
        if (Debug.areDebugging) {
           Debug.doLog("TableDesctiptor qStrBuff: "+qStrBuff,Debug.INFO);
        }
        // fill in metaData
        // More efficient query hack suggested by Rob
        rs = stmt.executeQuery(qStrBuff.toString());

        rsmd = new MetaData(rs.getMetaData());

        // set the displayFields
        setDefaultDisplayFields();
        setDefaultFormattedFields();

        cdd=new CustomDrillDown[displayFields.size()];

        setDefaultConstraintFields();

        // don't need the database connection anymore
        rs.close();
        stmt.close();
        con.close();
     }
     catch (SQLException sqle) {
        outputInfo("<blockquote><pre>"+sqle+"</pre></blockquote>");
        sqle.printStackTrace();
     }
     catch (Exception e) {
        e.printStackTrace();
     }
  }

  public String getDatabase() {
     return(database);
  }

  public String getTable() {
     return(table);
  }

  public String getDBConnection() {
     return(dbConnection);
  }

  public int getTDType() {
     return(tdType);
  }

  public void setTDType(int tdType) {
     this.tdType=tdType;
  }

  public String getViewSelect() {
     return(viewSelect);
  }

  public void setViewSelect(String viewSelect) {
     this.viewSelect=viewSelect;
```

```
}

public String getKeyField() {
   return(keyField);
}

public boolean setKeyField(String keyField)
   throws SQLException
{
   // Make sure that the keyfield exists in this table
   if (findColumnName(keyField) == 0) {
      return(false);
   }
   this.keyField=keyField;
   return(true);
}

public String getOrderBy() {
   return(orderBy);
}

public boolean setOrderBy(String orderBy)
   throws SQLException
{
   // Make sure that the keyfield exists in this table
   if (findColumnName(orderBy) == 0) {
      return(false);
   }
   this.orderBy=orderBy;
   return(true);
}

public String getWhere() {
   return(where);
}

public void setWhere(String where) {
   this.where=where;
}

public CustomDrillDown getCustomDrillDown(int index) {
   if (index < 0 || index >= cdd.length) {
      return(null);
   }
   return(cdd[index]);
}

public void setCustomDrillDown(CustomDrillDown cdd, int index) {
   if (index >= 0  && index < this.cdd.length) {
      this.cdd[index]=cdd;
   }
}

public CustomDropDown getForeignCDD(String columnName) {
   return((CustomDropDown)foreignCDDs.get(columnName));
}

public void setForeignCDD(String columnName,String sqlStr) {
```

```
   foreignCDDs.put(columnName,new CustomDropDown(sqlStr));
}

public CustomDropDown getPrimaryCDD() {
   return(primaryCDD);
}

public void setPrimaryCDD(String sqlStr) {
   primaryCDD=new CustomDropDown(sqlStr);
}

public void addFormattedField(String field) {
   formattedFields.add(TableDescriptorDisplay.getFormattedLabel(field));
}

public void addDisplayField(String field)
   throws SQLException
{
   // normalize field
   String fieldUpper = field.toUpperCase();

   // shouldn't already exist in the displayFields vector
   if (displayFields.indexOf(fieldUpper) != -1) {

      return;
   }

   // must be a valid field in the table
   int index=0;
   if ((index=findColumnName(fieldUpper)) == 0) {
      return;
   }

   // must be writable
   if (!rsmd.isWritable(index)) {
      return;
   }

   // now we can add it
   displayFields.add(fieldUpper);
}

public String getFormattedField(int index) {
   return((String)formattedFields.elementAt(index));
}

public String getDisplayField(int index) {
   return((String)displayFields.elementAt(index));
}

public boolean isFormattedField(String formattedField) {
   return(formattedFields.contains(formattedField));
}

public boolean isDisplayField(String displayField) {
   //normalize displayField
   String displayFieldUpper=displayField.toUpperCase();
```

```
   return(displayFields.contains(displayFieldUpper));
}

public void clearFormattedFields() {
   formattedFields=new Vector();
}

public void clearDisplayFields() {
   displayFields=new Vector();
}

public Enumeration formattedFields() {
   return(formattedFields.elements());
}

public Enumeration displayFields() {
   return(displayFields.elements());
}

public String removeFormattedField(int index) {
   return((String)formattedFields.remove(index));
}

public String removeDisplayField(int index) {
   return((String)displayFields.remove(index));
}

public void addConstraintField(String field)
   throws SQLException
{
   // normalize field
   String fieldUpper=field.toUpperCase();

   // shouldn't already exist
   if (constraintFields != null &&
      constraintFields.indexOf(fieldUpper) != -1)
   {
      return;
   }

   // must be a valid field in the table
   if (findColumnName(fieldUpper) == 0) {
      return;
   }

   // must be in the display vector
   if (displayFields.indexOf(fieldUpper) == -1) {
      return;
   }

   if (constraintFields == null) {
      constraintFields=new Vector();
   }
   constraintFields.addElement(fieldUpper);
}

public String getConstraintField(int index) {
   return(
```

```
        (constraintFields==null)?
        null:
        (String)constraintFields.elementAt(index)
    );
}

public boolean isConstraintField(String constraintField) {
    //normalize constraintField
    String constraintFieldUpper=constraintField.toUpperCase();
    return(constraintFields.contains(constraintFieldUpper));
}

public void clearConstraintFields() {
    if (constraintFields != null) {
        constraintFields=new Vector();
    }
}

public Enumeration constraintFields() {
    return(
        (constraintFields==null)?
        null:
        constraintFields.elements()
    );
}

public void setDefaultConstraintFields()
    throws SQLException
{
    if (getConstraintField(0) != null) {
        // constraintFields have already been set
        return;
    }

    // this method will set constraint fields IF none
    // have already been set according to the following:
    //   1) If there are columns named: first_name, middle_name,
    //        and/or last_name they will all be added
    //   2) If any column ends with _name it will be added

    // check for first, middle, and/or last:
    boolean foundNamePart=false;
    if (findColumnName("FIRST_NAME") != 0) {
        addConstraintField("FIRST_NAME");
        foundNamePart=true;
    }
    if (findColumnName("MIDDLE_NAME") != 0) {
        addConstraintField("MIDDLE_NAME");
        foundNamePart=true;
    }
    if (findColumnName("LAST_NAME") != 0) {
        addConstraintField("LAST_NAME");
        foundNamePart=true;
    }

    // if no name part was found, let's add the first column ending
    // in _name
    if (!foundNamePart) {
```

```
        ResultSetMetaData rsmd=getMetaData();
        String constraintFieldName;
        for (int i=1;i<=rsmd.getColumnCount();i++) {
            if ((constraintFieldName=
                rsmd.getColumnName(i)).endsWith("_NAME"))
            {
                addConstraintField(constraintFieldName);
                break;
            }
        }
    }
}


public String removeConstraintField(int index) {
    return(
        (constraintFields==null)?
        null:
        (String)constraintFields.remove(index)
    );
}

public ResultSetMetaData getMetaData() {
    return(rsmd);
}

public int findColumnName(String name) throws SQLException {
    for (int i=1;i<=rsmd.getColumnCount();i++) {
        if (rsmd.getColumnName(i).equalsIgnoreCase(name)) {
            return(i);
        }
    }
    return(0);
}

public void setDefaultFormattedFields()
    throws SQLException
{
    for (int i=1;i<=rsmd.getColumnCount();i++) {
        if (rsmd.isWritable(i)) {
            addFormattedField(rsmd.getColumnName(i));
        }
    }
}

public void setDefaultDisplayFields()
    throws SQLException
{
    setDefaultDisplayFields(TableDescriptor.DisplayAllWritable);
}

public void setDefaultDisplayFields(int mode)
    throws SQLException
{
    for (int i=1;i<=rsmd.getColumnCount();i++) {
        if (rsmd.isNullable(i) != ResultSetMetaData.columnNullable &&
            rsmd.isWritable(i))
        {
```

```
            addDisplayField(rsmd.getColumnName(i));
        }
        else if (mode == TableDescriptor.DisplayAllWritable &&
            rsmd.isWritable(i))
        {
            addDisplayField(rsmd.getColumnName(i));
        }
    }
}

public TableDescriptor putConstraintForView(String columnName,
    TableDescriptor td)
    throws SQLException
{
    String columnNameUpper=columnName.toUpperCase();

    if (constraints == null) {
        constraints = new Hashtable();
    }
    return((TableDescriptor)constraints.put(columnNameUpper,td));
}

public TableDescriptor putConstraint(String columnName,
    TableDescriptor td)
    throws SQLException
{
    // normalize columnName
    String columnNameUpper=columnName.toUpperCase();

    int columnIndex;
    // Check to see if columnName exists
    if ((columnIndex=findColumnName(columnNameUpper)) == 0) {
        return(null);
    }
    // Make sure it is in the displayFields
    if (displayFields.indexOf(columnNameUpper) < 0) {
        return(null);
    }
    // Make sure that the key field exists and type matches
    String foreignKeyField=td.getKeyField();
    if (foreignKeyField == null) {
        return(null);
    }
    int foreignColumnIndex=td.findColumnName(foreignKeyField);
    int foreignColumnType=
    td.getMetaData().getColumnType(foreignColumnIndex);
    int columnType=rsmd.getColumnType(columnIndex);
    if (columnType != foreignColumnType) {
        return(null);
    }

    if (constraints == null) {
        constraints = new Hashtable();
    }
    //setDefaultConstraintFields(td);
    return((TableDescriptor)constraints.put(columnNameUpper,td));
}
```

```
public TableDescriptor getConstraint(String columnName) {
   //normalize columnName
   String columnNameUpper=columnName.toUpperCase();

   return(
      (constraints==null)?
      null:
      (TableDescriptor)constraints.get(columnNameUpper)
   );
}

public TableDescriptor removeConstraint(String columnName) {
   //normalize columnName
   String columnNameUpper=columnName.toUpperCase();
   return((TableDescriptor)constraints.remove(columnNameUpper));
}

public Enumeration constraintKeys() {
   return(constraints.keys());
}

public Enumeration constraintElements() {
   return(constraints.elements());
}

public String getNullableString(int isNullable) {
   if (isNullable == ResultSetMetaData.columnNullable) {
      return("columnNullable");
   }
   else if (isNullable == ResultSetMetaData.columnNoNulls) {
      return("columnNoNulls");
   }
   else if (isNullable == ResultSetMetaData.columnNullableUnknown) {
      return("columnNullableUnknown");
   }
   else {
      return("Invalid isNullable value");
   }
}

class MetaData implements ResultSetMetaData,java.io.Serializable {
   private int columnCount;

   private String[] catalogNames;
   private String[] columnClassNames;
   private int[] columnDisplaySizes;
   private String[] columnLabels;
   private String[] columnNames;
   private int[] columnTypes;
   private String[] columnTypeNames;
   private int[] precisions;
   private int[] scales;
   private String[] schemaNames;
   private String[] tableNames;
   private boolean[] isAutoIncrements;
   private boolean[] isCaseSensitives;
   private boolean[] isCurrencies;
   private boolean[] isDefinitelyWritables;
```

```
private int[] isNullables;
private boolean[] isReadOnlys;
private boolean[] isSearchables;
private boolean[] isSigneds;
private boolean[] isWritables;

public MetaData(ResultSetMetaData rsmd) {
    try {
        columnCount = rsmd.getColumnCount();

        catalogNames=new String[columnCount];
        columnClassNames=new String[columnCount];
        columnDisplaySizes=new int[columnCount];
        columnLabels=new String[columnCount];
        columnNames=new String[columnCount];
        columnTypes=new int[columnCount];
        columnTypeNames=new String[columnCount];
        precisions=new int[columnCount];
        scales=new int[columnCount];
        schemaNames=new String[columnCount];
        tableNames=new String[columnCount];
        isAutoIncrements=new boolean[columnCount];
        isCaseSensitives=new boolean[columnCount];
        isCurrencies=new boolean[columnCount];
        isDefinitelyWritables=new boolean[columnCount];
        isNullables=new int[columnCount];
        isReadOnlys=new boolean[columnCount];
        isSearchables=new boolean[columnCount];
        isSigneds=new boolean[columnCount];
        isWritables=new boolean[columnCount];

        for (int i=0;i<columnCount;i++) {

            catalogNames[i]=rsmd.getCatalogName(i+1);
            columnClassNames[i]="dunno";
            //buggy bitch!
            //rsmd.getColumnClassName(i+1);
            columnDisplaySizes[i]=rsmd.getColumnDisplaySize(i+1);
            columnLabels[i]=rsmd.getColumnLabel(i+1);
            columnNames[i]=rsmd.getColumnName(i+1);
            columnTypes[i]=rsmd.getColumnType(i+1);
            columnTypeNames[i]=rsmd.getColumnTypeName(i+1);
            precisions[i]=rsmd.getPrecision(i+1);
            scales[i]=rsmd.getScale(i+1);
            schemaNames[i]=rsmd.getSchemaName(i+1);
            tableNames[i]=rsmd.getTableName(i+1);
            isAutoIncrements[i]=rsmd.isAutoIncrement(i+1);
            isCaseSensitives[i]=rsmd.isCaseSensitive(i+1);
            isCurrencies[i]=rsmd.isCurrency(i+1);
            isDefinitelyWritables[i]=rsmd.isDefinitelyWritable(i+1);
            isNullables[i]=rsmd.isNullable(i+1);
            isReadOnlys[i]=rsmd.isReadOnly(i+1);
            isSearchables[i]=rsmd.isSearchable(i+1);
            isSigneds[i]=rsmd.isSigned(i+1);
            isWritables[i]=rsmd.isWritable(i+1);
        }
    }
    catch (SQLException sqle) {
```

```
      sqle.printStackTrace();
   }
}

public int getColumnCount() {
   return(columnCount);
}

public String getCatalogName(int index) {
   return(catalogNames[index-1]);
}

public String getColumnClassName(int index) {
   return(columnClassNames[index-1]);
}

public int getColumnDisplaySize(int index) {
   return(columnDisplaySizes[index-1]);
}

public String getColumnLabel(int index) {
   return(columnLabels[index-1]);
}

public String getColumnName(int index) {
   return(columnNames[index-1]);
}

public int getColumnType(int index) {
   return(columnTypes[index-1]);
}

public String getColumnTypeName(int index) {
   return(columnTypeNames[index-1]);
}

public int getPrecision(int index) {
   return(precisions[index-1]);
}

public int getScale(int index) {
   return(scales[index-1]);
}

public String getSchemaName(int index) {
   return(schemaNames[index-1]);
}

public String getTableName(int index) {
   return(tableNames[index-1]);
}

public boolean isAutoIncrement(int index) {
   return(isAutoIncrements[index-1]);
}

public boolean isCaseSensitive(int index) {
   return(isCaseSensitives[index-1]);
```

```
        }

        public boolean isCurrency(int index) {
            return(isCurrencies[index-1]);
        }

        public boolean isDefinitelyWritable(int index) {
            return(isDefinitelyWritables[index-1]);
        }

        public int isNullable(int index) {
            return(isNullables[index-1]);
        }

        public boolean isReadOnly(int index) {
            return(isReadOnlys[index-1]);
        }

        public boolean isSearchable(int index) {
            return(isSearchables[index-1]);
        }

        public boolean isSigned(int index) {
            return(isSigneds[index-1]);
        }

        public boolean isWritable(int index) {
            return(isWritables[index-1]);
        }
    }

    private void outputInfo(String infoStr) {
        try {
            if (Debug.areDebugging) {
                Debug.doLog(infoStr,Debug.INFO);
            }
            if (out != null) {
                out.println(infoStr);
                out.flush();
            }
        }
        catch (IOException ioe) {
            ioe.printStackTrace();
        }
    }
}
```

Schemalive/WEB-INF/classes/dbUtils/ViewGenerator.java

```
// $Revision: 2.3 $
// $Date: 2001/10/30 01:35:53 $

package dbUtils;

import java.io.*;
import java.sql.*;
import java.util.*;
```

```
import common.*;

import javax.servlet.jsp.*;

//import dbPoolUtils.*;

public class ViewGenerator {

   public static final String version_dbUtils_ViewGenerator_java =
   "$Revision: 2.3 $";
   public static final int MaxNameLen = 30;

   private TableDescriptor td;
   private StringBuffer columnList = new StringBuffer();
   private StringBuffer fromList = null;
   private StringBuffer whereList = new StringBuffer();
   private StringBuffer orderByList = new StringBuffer();
   private StringBuffer nextAlias = new StringBuffer("A");
   private StringBuffer firstAlias = new StringBuffer();
   private StringBuffer leftAlias = new StringBuffer();
   private StringBuffer rightAlias = new StringBuffer();

   private boolean checkExist = false;
   private JspWriter out = null;

   private void outputInfo(String infoStr) {
      try {
         if (Debug.areDebugging) {
            Debug.doLog(infoStr,Debug.INFO);
         }
         if (out != null) {
            out.println(infoStr);
            out.flush();
         }
      }
      catch (IOException ioe) {
         ioe.printStackTrace();
      }
   }

   public ViewGenerator(TableDescriptor tdParm,JspWriter myOut) {
      this(tdParm,true,false,myOut);
   }

   public ViewGenerator(TableDescriptor tdParm) {
      this(tdParm,true,false,null);
   }

   public ViewGenerator(TableDescriptor tdParm, boolean executeSQL) {
      this(tdParm,executeSQL,false,null);
   }

   public ViewGenerator(TableDescriptor tdParm,
      boolean executeSQL,boolean myCheckExist,
      JspWriter myOut)
   {
      out = myOut;
      td = tdParm;
```

```
    checkExist = myCheckExist;
    fromList = new StringBuffer(td.getTable()+" A");

    String qStr="SELECT view_name FROM USER_VIEWS WHERE view_name = '"+
       getViewName(td.getTable())+"' OR view_name = '"+td.getTable()+"'";

    if (checkExist) {
       try {
          Connection con = SQLUtil.makeConnection();
          Statement stmt = con.createStatement();
          ResultSet rs = stmt.executeQuery(qStr);
          if (rs.next()) {
             rs.close();
             stmt.close();
             con.close();
             return;
          }
          else {
             rs.close();
             stmt.close();
             con.close();
          }
       }
       catch (SQLException sqle) {
          sqle.printStackTrace();
       }
    }

    outputInfo("<blockquote>Generating view for table: "+td.getTable()+
       " named: "+getViewName(td.getTable())+"</blockquote>");

    buildView();
    columnList=new StringBuffer(columnList.toString().trim());
    fromList=new StringBuffer(fromList.toString().trim());
    whereList=new StringBuffer(whereList.toString().trim());
    orderByList=new StringBuffer(orderByList.toString().trim());

    if (executeSQL) {
       executeViewSQL();
    }
 }


 public static String getViewName(String baseTable) {
    String proposedName = baseTable+"_VIEW";
    proposedName = proposedName.substring(Math.max(0,
    proposedName.length()-MaxNameLen));
    return(proposedName);
 }

 public String getViewSQL() {
    return(getViewSQL(false));
 }

 public String getViewSQL(boolean createView) {
    String viewSQL="SELECT "+columnList+" FROM "+fromList;//+" WHERE
    "+whereList;
    if (whereList.length() > 0) {
```

```
        viewSQL+=" WHERE "+whereList;
    }
    if (createView) {
        viewSQL="CREATE OR REPLACE VIEW "+getViewName(td.getTable())+" AS "+
        viewSQL;
    }
    return(viewSQL);
}

private void executeViewSQL() {
    try {
        String viewSQL="CREATE OR REPLACE VIEW "+getViewName(td.getTable())+
        " AS SELECT "+columnList+" FROM "+fromList;//+" WHERE "+whereList;
        if (whereList.length() >0) {
            viewSQL+=" WHERE "+whereList;
        }

        if (Debug.areDebugging) {
            Debug.doLog("viewSQL: "+viewSQL,Debug.INFO);
        }
        Connection con = SQLUtil.makeConnection();
        Statement stmt = con.createStatement();
        stmt.executeQuery(viewSQL);
        stmt.close();
        con.close();
    }
    catch (SQLException sqle) {
        outputInfo("<blockquote><pre>"+sqle+"</pre></blockquote>");
        sqle.printStackTrace();
    }
}

public static void main(String[] args) {
    DataDictionary dd = DataDictionary.getInstance(args[0],args[1]);
    if (args.length > 2) {
        DataDictionaryTD ddtd=dd.getDataDictionaryTD(args[2]);
        if (ddtd != null) {
            new ViewGenerator(ddtd);
        }
        else {
            System.out.println(args[2]+" is a bad table name!");
        }
    }
    else {
        Set ddtdSet = dd.tables();
        Object[] ddtdAry = ddtdSet.toArray();
        for (int i=0;i<ddtdAry.length;i++) {
            DataDictionaryTD ddtd=dd.getDataDictionaryTD((String)ddtdAry[i]);
            ViewGenerator vg = new ViewGenerator(ddtd);
        }
    }
}

private void buildView() {
    Enumeration dfEnum=td.displayFields();
    while (dfEnum.hasMoreElements()) {
        String columnName = (String) dfEnum.nextElement();
```

```
DataDictionary dd =
DataDictionary.getInstance(td.getDatabase(),
td.getDBConnection());

TableDescriptor tdF = null;
String customColumnSQL = null;
TableDescriptor td1 = td.getConstraint(columnName);
if (td1 != null) {
   tdF = dd.getDataDictionaryTD(td1.getTable());

   // check for custom column
   CustomDropDown myCDD = td.getForeignCDD(columnName);
   if (myCDD != null) {
      customColumnSQL = myCDD.getSQLStr();
      if (Debug.areDebugging) {
         Debug.doLog("Found custom column for "+
            td.getTable()+"."+columnName+".",Debug.INFO);
      }
   }
}
TableDescriptor td2 = null;
if (columnName.endsWith("ENTRY_DATE") || columnName.endsWith(
"LAST_MODIFIED_DATE")) {
   columnList.append("TO_CHAR(A."+columnName+
      ",'MM/DD/RRRR HH24:MI:SS') AS ");
   columnList.append(columnName+", ");
}
else if (columnName.endsWith("_DATE")) {
   columnList.append("TO_CHAR(A."+columnName+
      ",'MM/DD/RRRR') AS ");
   columnList.append(columnName+", ");
}
else if (columnName.endsWith("_FLAG")) {
   columnList.append("Show_Boolean(A."+columnName+") AS ");
   columnList.append(columnName.substring(0,
      columnName.indexOf("_FLAG"))+", ");
}
else if (customColumnSQL != null) {
   // parse custoColumnmSQL and add to columnList,
   // fromList, whereList (and orderByList?)

   // first, let's break it up
   StringBuffer selectPart = new StringBuffer();
   StringBuffer fromPart = new StringBuffer();
   StringBuffer wherePart = new StringBuffer();
   StringBuffer orderByPart = new StringBuffer();
   int begPart = customColumnSQL.indexOf("SELECT")+
      "SELECT".length();
   int endPart = customColumnSQL.indexOf("FROM");
   selectPart.append(customColumnSQL.substring(
   begPart,endPart).toUpperCase().trim());
   begPart = endPart+"FROM".length();
   endPart = customColumnSQL.indexOf("WHERE");
   if (endPart > begPart) {
      fromPart.append(customColumnSQL.substring(begPart,
         endPart).toUpperCase().trim());
      begPart = endPart+"WHERE".length();
      endPart = customColumnSQL.indexOf("ORDER BY");
```

```
      if (endPart > begPart) {
         wherePart.append(customColumnSQL.substring(begPart,
            endPart).toUpperCase().trim());
         begPart = endPart+"ORDER BY".length();
         orderByPart.append(customColumnSQL.substring(
            begPart).toUpperCase().trim());
      }
      else {
         wherePart.append(customColumnSQL.substring(begPart).
         toUpperCase().trim());
      }
   }
   else {
      endPart = customColumnSQL.indexOf("ORDER BY");
      if (endPart > begPart) {
         fromPart.append(customColumnSQL.substring(begPart,endPart).
         toUpperCase().trim());
         begPart = endPart+"ORDER BY".length();
         orderByPart.append(customColumnSQL.substring(begPart).
         toUpperCase().trim());
      }
      else {
         fromPart.append(customColumnSQL.substring(begPart).
         toUpperCase().trim());
      }
   }
   if (Debug.areDebugging) {
      Debug.doLog("ViewGenerator.selectPart(324):
      "+selectPart,Debug.INFO);
      Debug.doLog("ViewGenerator.fromPart(325): "+fromPart,Debug.
      INFO);
      Debug.doLog("ViewGenerator.wherePart(326): "+wherePart,Debug.
      INFO);
   }

   // now we need to map aliases
   Hashtable aliasMap=new Hashtable();

   int prevComma = 0;
   int curComma = 0;

   String fromString = fromPart.toString().trim()+",";
   while (0 < (curComma=fromString.indexOf(',',prevComma))) {
      String keyAlias=null;
      StringTokenizer st = new StringTokenizer(fromString.substring(
      prevComma,curComma));
      while(st.hasMoreTokens()) {
         keyAlias=st.nextToken();
      }
      if (!aliasMap.containsKey(keyAlias)) {
         aliasMap.put(keyAlias,"");
      }
      prevComma=curComma+1;
   }

   // now we can replace aliases in the different parts
   //Enumeration aliasEnum = aliasMap.keys();
   Set aliasKeySet = aliasMap.keySet();
```

```
Object[] aliasKeyArray = aliasKeySet.toArray();
Arrays.sort(aliasKeyArray);

for (int j=0;j<aliasKeyArray.length;j++) {
   String nAlias = getNextAlias().toString();
   if (Debug.areDebugging) {
      Debug.doLog("ViewGenerator(339) - origAlias "+aliasKeyArray
      [j]+
         " maps to "+nAlias,Debug.INFO);
   }
   aliasMap.put(aliasKeyArray[j],nAlias);
}

StringBuffer[] partAry=new StringBuffer[2];
partAry[0]=selectPart;
partAry[1]=wherePart;
for (int j=aliasKeyArray.length-1;j>=0;j--) {
   String keyAlias = (String)aliasKeyArray[j];
   String valueString = (String)aliasMap.get(keyAlias);
   for (int i=0;i<partAry.length;i++) {
      int dot=0;
      while (0 <=
      (dot=partAry[i].toString().indexOf(keyAlias+".",dot))) {
         if (Debug.areDebugging) {
            Debug.doLog("About to replace: "+partAry[i].toString
            ().substring(dot,dot+1)+" with: "+valueString,Debug.
            INFO);
         }

         partAry[i].replace(dot,dot+keyAlias.length(),valueString
         );
         dot+=valueString.length()+1;
      }
   }
}

// convert any INNER JOINs to OUTER JOINs...
int startJoin = 0;
int endJoin = wherePart.toString().indexOf("AND", startJoin);
while (0 <= endJoin) {
   String joinPart = wherePart.substring(startJoin, endJoin);
   int equalSign = joinPart.indexOf("=");
   if ((joinPart.indexOf(".") < equalSign) &&
      (joinPart.lastIndexOf(".") > equalSign) &&
      (joinPart.indexOf("(+)") == -1))
   {
      wherePart.insert(endJoin, "(+) ");
      endJoin += 4;
   }
   startJoin = endJoin + 3;
   endJoin = wherePart.toString().indexOf("AND", startJoin);
}
if (startJoin < wherePart.length()) {
   String joinPart = wherePart.substring(startJoin);
   int equalSign = joinPart.indexOf("=");
   if ((joinPart.indexOf(".") < equalSign) &&
      (joinPart.lastIndexOf(".") > equalSign) &&
      (joinPart.indexOf("(+)") == -1))
```

```
    {
       wherePart.append(" (+)");
    }
}

// need to replace aliases in fromPart
fromPart=new StringBuffer(fromPart.toString().trim());

for (int j=aliasKeyArray.length-1;j>=0;j--) {
   String keyAlias=(String)aliasKeyArray[j];
   String valueString=(String)aliasMap.get(keyAlias);
   int preComma=0;
   int postComma=0;
   while (0 <= (postComma=fromPart.toString().indexOf(',',
   preComma))) {
      // find space before alias
      int aliasLoc=fromPart.toString().substring(preComma,
      postComma).lastIndexOf(" "+keyAlias)+1;

      if (aliasLoc > 0) {
         fromPart.replace(aliasLoc+preComma,
            aliasLoc+1+preComma,valueString);
      }
      preComma=postComma+valueString.length()+1; // skip space
   }

   // get the last one
   int aliasLoc=fromPart.toString().substring(preComma).
   lastIndexOf(" "+keyAlias)+1;
   if (aliasLoc > 0) {
      fromPart.replace(aliasLoc+preComma,aliasLoc+preComma+1,
      valueString);
   }
}
if (Debug.areDebugging) {
   Debug.doLog("ViewGenerator.selectPart(423):
   "+selectPart,Debug.INFO);
   Debug.doLog("ViewGenerator.fromPart(424): "+fromPart,Debug.
   INFO);
   Debug.doLog("ViewGenerator.wherePart(425): "+wherePart,Debug.
   INFO);
}

// need to strip first column out of selectPart
// this is key that will give us the right match
// for each record
int comma = selectPart.toString().indexOf(',');
String keyPart = selectPart.toString().substring(0,comma);
selectPart.delete(0,comma+1);

// need to kill AS if it exists
int as = selectPart.toString().indexOf("AS ");
if (as > 0) {
   selectPart=new StringBuffer(selectPart.toString().substring(0,
   as));
}
// lop key off column name
int key = columnName.indexOf("_KEY");
```

```
    selectPart.append(" AS "+
       ((key>0)?columnName.substring(0,key):columnName));


    columnList.append(" "+selectPart+", ");
    fromList.append(", "+fromPart);
    whereList.append(" "+wherePart);
    whereList.append(" AND A."+columnName+" = "+keyPart+" (+) AND ");
 }
 else if (td1 != null) {
    // look for custom column information
    boolean foundName = false;
    StringBuffer joinBuffer = new StringBuffer();

    try {

       firstAlias = new StringBuffer(getNextAlias().toString());
       rightAlias = new StringBuffer("");

       while (!foundName) {
          ResultSetMetaData rsmd1 = td1.getMetaData();
          for (int i=1; i <= rsmd1.getColumnCount(); i++) {
             if (rsmd1.getColumnName(i).endsWith("_NAME")) {
                foundName = true;
                break;
             }
          }

          if (!foundName) {
             String qStr="SELECT a.table_name, "+
                "b.column_name FROM "+
                "user_constraints a, user_cons_columns b, "+
                "user_constraints c, user_cons_columns d "+
                "WHERE "+
                "a.constraint_type='P' AND "+
                "c.constraint_type='U' "+
                "AND c.table_name ='"+td1.getTable()+"' AND "+
                "c.constraint_name = d.constraint_name AND "+
                "b.column_name = d.column_name AND "+
                "b.constraint_name = a.constraint_name";
             Connection con = SQLUtil.makeConnection();
             Statement stmt = con.createStatement();
             ResultSet rs = stmt.executeQuery(qStr);
             if (rs.next()) {
                String tableName=rs.getString(1);
                String keyFieldName=rs.getString(2);

                td2=dd.getDataDictionaryTD(tableName);

                fromList.append(", "+td1.getTable()+" "+
                   (leftAlias = ((rightAlias.length() == 0)?
                firstAlias:rightAlias)));

                whereList.append(leftAlias+"."+keyFieldName+
                   " = "+(rightAlias = getNextAlias())+"."+
                   td2.getKeyField()+" (+) AND "
                );
```

```
            td1=dd.getDataDictionaryTD(td2.getTable());
        }
        else {
            rs.close();
            stmt.close();

            con.close();
            break;
        }

        rs.close();
        stmt.close();

        con.close();
    }
}
// now I am at a TD that has _NAME field(s)
boolean foundNamePart=false;

if (td1.findColumnName("LAST_NAME") != 0 &&
    td1.findColumnName("FIRST_NAME") != 0 &&
    td1.findColumnName("MIDDLE_NAME") != 0)
{
    columnList.append("Formatted_Name("+nextAlias+
        "."+td1.getKeyField()+") AS ");
    int keyIndex=columnName.indexOf("_KEY");
    if (keyIndex >= 0) {
        columnList.append(columnName.substring(0,keyIndex)+
        ", ");
    }
    else {
        columnList.append(columnName+",");
    }
    fromList.append(", "+td1.getTable()+" "+nextAlias);
    whereList.append("A."+columnName+" = "+firstAlias+"."+
        tdF.getKeyField()+" (+) AND ");
    foundNamePart=true;
}
if (!foundNamePart) {
    ResultSetMetaData rsmd=td1.getMetaData();
    for (int i=1;i<=rsmd.getColumnCount();i++) {
        if (rsmd.getColumnName(i).endsWith("_NAME")) {
            String localColumnName =
                rsmd.getColumnName(i).substring(0,
                    rsmd.getColumnName(i).indexOf("_NAME"));
            int keyIndex = columnName.indexOf("_KEY");
            String asName = (keyIndex > 0)?
                columnName.substring(0,keyIndex):
                columnName;
            columnList.append(nextAlias+"."+
                rsmd.getColumnName(i)+" AS "+
                asName+", ."
            );
            fromList.append(", "+td1.getTable()+" "+nextAlias);
            whereList.append("A."+columnName+" = "+
                firstAlias+"."+
                tdF.getKeyField()+
                " (+) AND "
```

```
                        );
                        orderByList.append(localColumnName);
                        foundNamePart=true;
                        break;
                     }
                  }
                  if (!foundNamePart) {
                     columnList.append("A."+columnName+", ");
                  }
               }
            }
            catch (SQLException sqle) {
               sqle.printStackTrace();
            }
         }
         else {
            columnList.append("A."+columnName+", ");
         }
      }

      if (Debug.areDebugging) {
         Debug.doLog("ViewGenerator.columnList(586):
         "+columnList,Debug.INFO);
         Debug.doLog("ViewGenerator.fromList(587): "+fromList,Debug.INFO);
         Debug.doLog("ViewGenerator.whereList(588): "+whereList,Debug.INFO);
      }

      columnList.delete(columnList.length()-2, columnList.length());
      if (whereList.length() > 4)
         whereList.delete(whereList.length()-5, whereList.length()-1);
   }

   private StringBuffer getNextAlias() {
      int stub = nextAlias.length()-1;
      char lastChar[] = { nextAlias.charAt(stub) };
      if (lastChar[0] == 'Z')
         nextAlias.replace(stub, stub+1, "AA");
      else {
         lastChar[0]++;
         nextAlias.replace(stub, stub+1, new String(lastChar));
      }
      return(nextAlias);
   }
}
```

Schemalive/WEB-INF/classes/HTMLUtils/Balloon.java

```
// $Revision: 2.3 $
// $Date: 2001/10/30 01:35:53 $

package HTMLUtils;

import java.io.*;
import java.sql.*;
import java.util.*;

import common.*;
```

```
import javax.servlet.jsp.*;

public class Balloon implements java.io.Serializable {

   public static final String version_HTMLUtils_Balloon_java =
   "$Revision: 2.3 $";
   private static JspWriter out=null;

   private String id;
   private String msg;
   private int bSize;

   public Balloon(String myId,int myBSize,String myMsg) {
      this(myId,myBSize,myMsg,null);
   }

   public Balloon(String myId,int myBSize,String myMsg,JspWriter myOut) {
      id=myId;
      bSize=myBSize;
      msg=myMsg;
      out=myOut;

      outputInfo("Creating balloon with id: "+id+", bSize: "+bSize+
      ", msg:\n\t"+msg);
   }

   public String getID() {
      return(id);
   }

   public int getBSize() {
      return(bSize);
   }

   public String getMsg() {
      return(msg);
   }

   private void outputInfo(String infoStr) {
      try {
         if (Debug.areDebugging) {
            Debug.doLog(infoStr,Debug.INFO);
         }
         if (out != null) {
            out.println(infoStr);
            out.flush();
         }
      }
      catch (IOException ioe) {
         ioe.printStackTrace();
      }
   }
}
```

Schemalive/WEB-INF/classes/HTMLUtils/BalloonHelp.java

```
// $Revision: 2.4 $
// $Date: 2001/10/30 08:26:33 $
```

```
package HTMLUtils;

import java.io.*;
import java.sql.*;
import java.util.*;
import common.*;
import javax.servlet.jsp.*;
import java.sql.*;
import dbUtils.*;

public class BalloonHelp implements java.io.Serializable {

   public static final String version_HTMLUtils_BalloonHelp_java =
   "$Revision: 2.4 $";

   private static BalloonHelp instance;
   private static JspWriter out = null;
   private static boolean rebuild = false;

   private static Hashtable balloonNavHash=new Hashtable();
   private static Hashtable balloonTableHash=new Hashtable();

   private static String saveFile="BalloonHelp.save";

   private BalloonHelp() {
      init();
   }

   public static BalloonHelp refreshInstance(JspWriter myOut) {
      out = myOut;
      return(refreshInstance());
   }

   public static BalloonHelp refreshInstance() {
      rebuild=true;
      return(getInstance());
   }

   public static synchronized BalloonHelp getInstance() {
      if (instance == null || rebuild) {
         instance = new BalloonHelp();
         rebuild=false;
      }
      return(instance);
   }

   private void init() {
      // Check to see if serialization file exists
      FileInputStream filIn=null;
      ObjectInputStream objIn=null;
      try {
         if (rebuild) {
            throw new FileNotFoundException();
         }
         filIn=new FileInputStream(saveFile);
         objIn=new ObjectInputStream(filIn);
         balloonNavHash=(Hashtable)objIn.readObject();
```

```
      balloonTableHash=(Hashtable)objIn.readObject();
      objIn.close();
      return;
   }
   catch (FileNotFoundException fnfe) {
      outputInfo("<b>About to build BalloonHelp</b><br>");
      buildBalloonHelp();
      this.serialize();
   }
   catch (IOException ioe) {
      ioe.printStackTrace();
   }
   catch (ClassNotFoundException cnfe) {
      cnfe.printStackTrace();
   }
}

private void serialize() {
   ObjectOutputStream objOut=null;
   FileOutputStream filOut=null;

   try {
      filOut = new FileOutputStream(saveFile);
      objOut = new ObjectOutputStream(filOut);

      objOut.writeObject(balloonNavHash);
      objOut.writeObject(balloonTableHash);
      objOut.flush();
      objOut.close();
   }
   catch (IOException ioe) {
      ioe.printStackTrace();
   }
}

public Balloon getNavBalloon(String id) {
   return((Balloon)balloonNavHash.get(id));
}

public Enumeration getNavBalloonIDs() {
   return(balloonNavHash.keys());
}

public Balloon getTableBalloon(String id) {
   return((Balloon)balloonTableHash.get(id));
}

public Enumeration getTableBalloonIDs() {
   return(balloonTableHash.keys());
}

private void buildBalloonHelp() {
   Connection con=null;
   Statement stmt=null;
   ResultSet rs=null;
   try {
      con = SQLUtil.makeConnection();
      stmt = con.createStatement();
```

```
    // get nav first
    String qStr = "SELECT Help_Object_Name,PopUp_Text FROM HELP_OBJECT "
    +
       "WHERE UPPER(Help_Object_Name) NOT LIKE '%.ASP%'";

    rs = stmt.executeQuery(qStr);
    Balloon b=null;

    outputInfo("<blockquote>");

    while (rs.next()) {
       String id=rs.getString(1);
       String tip=rs.getString(2);
       if (id != null && tip != null) {
          // nav
          outputInfo("Creating nav balloon: "+id+" - "+tip+"<br>");
          b = new Balloon(id,150,tip);
          balloonNavHash.put(b.getID(),b);
       }
    }

    rs.close();

    qStr =
    "SELECT Help_Schema_Table, Help_Schema_Column, PopUp_Text FROM
    HELP_SCHEMA";
    rs = stmt.executeQuery(qStr);

    while (rs.next()) {
       String idTable=rs.getString(1);
       String idColumn=rs.getString(2);
       String tip=rs.getString(3);

       if (idTable != null && idColumn != null && tip != null) {
          // data
          outputInfo("Creating data ballon: "+idTable.toUpperCase()+"."+
          idColumn.toUpperCase()+
             " - "+tip+"<br>");
          b = new Balloon(idTable.toUpperCase()+"."+idColumn.toUpperCase
          (),150,tip);
          balloonTableHash.put(b.getID(),b);
       }
    }

    outputInfo("</blockquote>");
 }
 catch (SQLException sqle) {
    sqle.printStackTrace();
 }
 finally {
    try {
       rs.close();
       stmt.close();
       con.close();
    }
    catch(SQLException sqle) {
       sqle.printStackTrace();
```

```
            }
         }
      }

   private void outputInfo(String infoStr) {
      try {
         if (Debug.areDebugging) {
            Debug.doLog(infoStr,Debug.INFO);
         }
         if (out != null) {
            out.println(infoStr);
            out.flush();
         }
      }
      catch (IOException ioe) {
         ioe.printStackTrace();
      }
   }
}
```

Schemalive/WEB-INF/classes/HTMLUtils/TableDescriptorDisplay.java

```
// $Revision: 2.5 $
// $Date: 2001/10/30 08:26:33 $

package HTMLUtils;

import java.io.*;

import dbUtils.*;
import sessionUtils.*;

import java.sql.*;
import java.util.*;

import common.*;

//import dbPoolUtils.*;

public class TableDescriptorDisplay {

   public static final String version_HTMLUtils_TableDescriptorDisplay_java =
   "$Revision: 2.5 $";

   public static final int AllUpper=1;

   public static final int ForURL = 0;
   public static final int ForForm = 1;
   public static final int ForJavaScript = 2;

   public static String getDisplayLabelView(TableDescriptor td,
      String column)
   {
      int index=0;
      StringBuffer displayLabelUpper=null;
      ResultSetMetaData rsmd=null;

      try {
```

```
        index=td.findColumnName(column);
        rsmd=td.getMetaData();
        displayLabelUpper=new StringBuffer(rsmd.getColumnName(index));
    }
    catch (SQLException sqle) {
        sqle.printStackTrace();
    }

    // does it exist?
    if (index == 0) {
        return(null);
    }

    return(getDisplayLabel(displayLabelUpper.toString()));
}

public static String getDisplayLabelEdit(TableDescriptor td,
    String column,
    String htmlElement,
    LinkedList sessionStack,
    String unqStr,
    Integer usersKey,
    Connection con)
    throws SQLException
{

    boolean keyField = false;
    if (td.getKeyField() != null && td.getKeyField().toUpperCase().equals(
    column)) {
        keyField = true;
    }

    int columnIndex = -1;
    try {
        columnIndex=td.findColumnName(column);
    }
    catch (SQLException sqle) {
        sqle.printStackTrace();
    }

    StringBuffer displayLabel=
    //      new StringBuffer(getDisplayLabelView(td,column));
    new StringBuffer(td.getFormattedField(columnIndex-1));

    /*
    if (keyField) {
        int numIndex=displayLabel.toString().lastIndexOf(" Number");
        if (numIndex >= 0) {
            displayLabel=new
            StringBuffer(displayLabel.toString().substring(0,numIndex)+"
            Key");
        }
    }
    */

    ResultSetMetaData rsmd=td.getMetaData();

    // deal with Required fields
```

```
try {
   if (rsmd.isNullable(columnIndex) !=
   ResultSetMetaData.columnNullable) {
      displayLabel.insert(0,"<b>");
      displayLabel.append("</b>");
   }
}
catch (SQLException sqle) {
   sqle.printStackTrace();
}

// Deal with constraint fields
TableDescriptor td1=null;

BalloonHelp bh=BalloonHelp.getInstance();
Balloon b=null;

if ((td1=td.getConstraint(column)) != null) {
   int numIndex=displayLabel.toString().indexOf(" Number");
   if (numIndex >= 0) {
      displayLabel.delete(numIndex," Number".length()+numIndex);
   }

   if ((((StackElement)sessionStack.getLast()).getMasterColumn() ==
   null) ||
      (!((StackElement)sessionStack.getLast()).getMasterColumn().equals
      (column)))
   {
      Statement sfmt=null;
      ResultSet sf=null;

      try {
         sfmt = con.createStatement(ResultSet.TYPE_SCROLL_INSENSITIVE,
         ResultSet.CONCUR_READ_ONLY);
         sf = sfmt.executeQuery(
            "SELECT "+

            "        DECODE(MAX(ABS(Can_Edit_Flag)), NULL, 0,
            MAX(ABS(Can_Edit_Flag))) AS Can_Edit_Flag, "+

            "        DECODE(MAX(ABS(Can_Add_Flag)), NULL, 0,
            MAX(ABS(Can_Add_Flag))) AS Can_Add_Flag "+
            "FROM "+
            //              "        PEOPLE, STAFF, USERS,
            SECURITY_GROUP_USER, SECURITY_GROUP_TABLE, SECURITY_TABLE
            "+

            "        PEOPLE, USERS, SECURITY_GROUP_USER,
            SECURITY_GROUP_TABLE, SECURITY_TABLE "+
            "WHERE "+
            "  PEOPLE.Active_Flag <> 0 AND "+
            //        "  PEOPLE.People_Key = STAFF.People_Key AND "+
            //        "  STAFF.Staff_Key = USERS.Staff_Key AND "+
            "  PEOPLE.People_Key = USERS.People_Key AND "+
            "  USERS.Users_Key = SECURITY_GROUP_USER.Users_Key AND "+

            "        SECURITY_GROUP_USER.Security_Group_Key =
            SECURITY_GROUP_TABLE.Security_Group_Key AND "+
```

```
"        SECURITY_GROUP_TABLE.Security_Table_Key =
SECURITY_TABLE.Security_Table_Key AND "+
"        SECURITY_TABLE.Security_Table_Name = '"+tdl.
getTable()+"' AND "+
"        SECURITY_GROUP_USER.Users_Key = "+usersKey
);
sf.next();

b = bh.getNavBalloon("drillLink");

if (sf.getBoolean(1) || sf.getBoolean(2)) {
    displayLabel.insert(0,
        "<A HREF=\""+
        "javascript:holdForPickList('"+
        tdl.getTable()+"','"+htmlElement+"',"+
        unqStr+")\" "+
        ((b != null)?
            "onMouseOver=\"setHang('"+b.getID()+
            "',event,this,'dataLink'); "+

            "return true;\" onMouseOut=\"clearHang(); return
            true;\" "+
            "onClick=\"clearHang(); return true;\" ":
            ""
        )+
        ">"
    );
    displayLabel.append("</A>");
}
}
catch (SQLException sqle) {
    sqle.printStackTrace();
    throw sqle;
}
finally {
    try {
        if (sf != null)sf.close();
        if (sfmt != null)sfmt.close();
    }
    catch (SQLException sqle) {
        sqle.printStackTrace();
    }
}
}

/*
if (((StackElement)sessionStack.getLast()).getMasterColumn() ==
null) {
    displayLabel.insert(0,"<A HREF=\""+
        "javascript:holdForPickList('"+
        tdl.getTable()+"','"+htmlElement+"',"+
        unqStr+
        ")\">"
    );
    displayLabel.append("</A>");
}
else if
```

```
        (!((StackElement)
        sessionStack.getLast()).getMasterColumn().equals(column)) {
            displayLabel.insert(0,"<A HREF=\""+
                "javascript:holdForPickList('"+
                td1.getTable()+"','"+htmlElement+"','"+
                unqStr+
                "')\">"
            );
            displayLabel.append("</A>");
        }
        */
    }
    b=bh.getTableBalloon(td.getTable().toUpperCase()+"."+column.toUpperCase
    ());
    if (b != null) {
        displayLabel.insert(0,
        "<A HREF=\"\" onClick=\"processAsterisk(); return false;\" "+
            "CLASS=\"isTip\" "+
            "onMouseOver=\"setHang('"+b.getID()+
            "',event,this,'dataLink'); return true;\" "+
            "onMouseOut=\"clearHang(); return true;\" "+
            "><sup><font size=+1>*</font></sup></A>"
        );
    }
    return(displayLabel.toString());
}

public static String getFormattedLabel(String label) {
    StringBuffer retLabel=new StringBuffer(getDisplayLabel(label));
    // find all occurences of customCaps

    for (int i=0;i<CustomCaps.customCaps.length;i++) {
        int customLoc=0;
        // Check startsWith
        if (retLabel.toString().toUpperCase().startsWith(
            (CustomCaps.customCaps[i]+" ").toUpperCase()))
        {
            retLabel.replace(0,
            CustomCaps.customCaps[i].length(),
            CustomCaps.customCaps[i]);
            customLoc+=CustomCaps.customCaps[i].length();
        }
        // Check within
        while ((customLoc=retLabel.toString().toUpperCase().indexOf(
            (" "+CustomCaps.customCaps[i]+" ").toUpperCase(),
            customLoc)) >= 0)
        {
            retLabel.replace(customLoc+1,
            customLoc+1+CustomCaps.customCaps[i].length(),
            CustomCaps.customCaps[i]);
            customLoc+=CustomCaps.customCaps[i].length()+2;
        }
        // check for endsWith
        if (retLabel.toString().toUpperCase().endsWith(
            (" "+CustomCaps.customCaps[i]).toUpperCase()))
        {
            customLoc=retLabel.toString().toUpperCase().lastIndexOf(
                (" "+CustomCaps.customCaps[i]).toUpperCase());
```

```
            retLabel.replace(customLoc+1,
                customLoc+1+CustomCaps.customCaps[i].length(),
                CustomCaps.customCaps[i]);
        }
        else if (retLabel.toString().toUpperCase().equals(
            CustomCaps.customCaps[i].toUpperCase()))
        {
            return(CustomCaps.customCaps[i]);
        }
    }
    return(retLabel.toString());
}

public static String getDisplayLabel(String label,int upper) {
    String str=getDisplayLabel(label);
    return(str.toUpperCase());
}

public static String getDisplayLabel(String label) {
    // check for _KEY
    int underScore=label.lastIndexOf("_KEY");
    if (underScore >= 0) {
        label=label.substring(0,underScore)+"_NUMBER";
    }

    // Strip _FLAG
    underScore=label.lastIndexOf("_FLAG");
    if (underScore >= 0) {
        label=label.substring(0,underScore);
    }

    //lowercase it
    StringBuffer displayLabelLower=
    new StringBuffer(label.toLowerCase());

    //replace all '_' with ' ' and capitalize first letter
    displayLabelLower.setCharAt(0,label.charAt(0));
    int underScorePos=0;
    while ((underScorePos=label.indexOf("_",underScorePos)) >= 0) {
        displayLabelLower.setCharAt(underScorePos,' ');
        underScorePos++;
        if (underScorePos < label.length()) {
            displayLabelLower.setCharAt(underScorePos,
            label.charAt(underScorePos));
        }
    }
    return(displayLabelLower.toString());
}

public static String getDisplayFieldKeyEdit(TableDescriptor td,
    String column,
    String doProcess,
    String value,
    LinkedList sessionStack,
    Connection con)
{
    String s=null;
    if (doProcess.equals("search")) {
```

```
    s="<input name=\""+td.getDatabase()+"__"+td.getTable()+
        "__"+column.toUpperCase()+"\" type=\"text\">";
  }
  // else if (doProcess.equals("return") || doProcess.equals("edit")) {
  else if ((((StackElement)sessionStack.getLast()).getFormValues().size()
  > 0) ||
    doProcess.equals("edit"))
  {
    s=value+"\n<input name=\""+td.getDatabase()+"__"+
    td.getTable()+"__"+column.toUpperCase()+"\" type=\""+
    "hidden\" value=\""+value+"\">";
  }
  else if (doProcess.equals("add")) {
    Object seqVal=null;
    if (td.getTable().equals("SYNCHED_KEY_TABLE")) {
      if (((StackElement)sessionStack.getLast()).getMasterColumn() !=
      null) {

        seqVal=((StackElement)
        sessionStack.get(sessionStack.size()-2)).getCurrentKey();
      }
    }
    else {
      String qStr="select "+td.getTable()+"_SEQ.nextval from DUAL";
      try {
        //boolean needToClose=false;
        //DBConnectionManager connMgr=null;
        if (con == null) {
          /*
          DBConnectionManager.getInstance();
          con=connMgr.getConnection(td.getDBConnection());
          needToClose=true;
          */
        }
        Statement stmt=con.createStatement();
        ResultSet rs=stmt.executeQuery(qStr);
        rs.next();
        seqVal=rs.getObject(1);
        rs.close();
        stmt.close();
        /*
        if (needToClose) {
        connMgr.freeConnection(td.getDBConnection(),con);
        }
        */
      }
      catch (SQLException sqle) {
        sqle.printStackTrace();
      }
    }
    s=seqVal+"\n<input name=\""+td.getDatabase()+"__"+
      td.getTable()+"__"+column.toUpperCase()+"\" type=\""+
      "hidden\" value=\""+seqVal+"\">";
  }
  return(s);
}

public static String getDisplayFieldEdit(TableDescriptor td,String column,
```

```
   String doProcess,String value, LinkedList sessionStack, Connection con)
{
   //see if we are on the key field
   if (td.getKeyField() != null && td.getKeyField().toUpperCase().equals(
   column.toUpperCase())) {

      return(getDisplayFieldKeyEdit(td,column,doProcess,value,sessionStack
      ,con));
   }
   else {
      return(getDisplayFieldNKeyEdit(td,column,doProcess,value,
      sessionStack,con));
   }
}

public static String getDisplayFieldNKeyEdit(TableDescriptor td,
   String column,
   String doProcess,
   String value,
   LinkedList sessionStack,
   Connection con)
{
   int index=0;
   try {
      index=td.findColumnName(column);
   }
   catch (SQLException sqle) {
      sqle.printStackTrace();
   }

   ResultSetMetaData rsmd=null;

   // first, determine if the field is in the displayFields Vector
   if (!td.isDisplayField(column)) {
      return(column+" not found");
   }

   // Let's see if it has a constraint
   TableDescriptor tdl=td.getConstraint(column);

   if (tdl != null) {
      //build picklist

      return(buildPickList(column,td,tdl,doProcess,value,sessionStack,con)
      );
   }
   else {
      //build normal field
      return(buildNormal(td,index,doProcess,value,sessionStack));
   }
}

private static String buildNormal(TableDescriptor td, int index,
   String doProcess, String value,
   LinkedList sessionStack)
{

   StringBuffer sb=new StringBuffer();
```

```
BalloonHelp bh = BalloonHelp.getInstance();

try {
   ResultSetMetaData rsmd = td.getMetaData();

   String fieldName = rsmd.getColumnName(index);
   int precision = rsmd.getPrecision(index);
   int scale = rsmd.getScale(index);
   int displaySize = rsmd.getColumnDisplaySize(index);
   String type = rsmd.getColumnTypeName(index);

   Balloon b = bh.getTableBalloon(td.getTable().toUpperCase()+"."+
   fieldName.toUpperCase());

   sb.append("<input name=\""+td.getDatabase()+"__"+
   td.getTable()+"__"+fieldName+"\" ");

   if (b!=null) {
      sb.append("onMouseOver=\"setHang('"+b.getID()+
         "',event,this,'dataTable'); return true;\" "+
         "onMouseOut=\"clearHang(); return true;\" "+
         "onClick=\"clearHang(); return true;\" ");
   }

   sb.append("type=\"");

   if (fieldName.endsWith("_FLAG")) {
      sb.append("checkbox\" value=\"");

      if (!doProcess.equals("search") &&
         value != null &&
         !value.equals("") &&
         Integer.parseInt(value.trim()) != 0)
      {
         sb.append("1\" CHECKED>");
      }
      else if (doProcess.equals("search")) {
         sb.append("NOT LIKE\" "+
            (value != null &&
            value.equals("NOT LIKE")?"CHECKED":"")+
            ">Yes <input name=\""+
            td.getDatabase()+"__"+
            td.getTable()+"__"+fieldName+
            "\" type=\"checkbox\" value=\"LIKE\" "+
            (value != null && value.equals("LIKE")?"CHECKED":"")+
            ">No "
         );
      }
      else {
         sb.append("1\">");
      }
   }
   else if (type.equals("NUMBER")) {
      if (precision == 0) {
         precision = 10;
      }
      sb.append("text\" maxlength=\""+precision+
         "\" size=\""+precision+"\" ");
```

```
            sb.append("value=\""+value+"\">"
         );
      }
      else if (type.equals("VARCHAR2")) {
         if (displaySize < 100) {
            sb.append("text\" maxlength=\""+displaySize+"\" "+
               "size=\""+((displaySize>60)?60:displaySize)+"\" "
            );
            sb.append("value=\""+processDoubleQuote(value)+"\">");
         }
         else {
            sb=new StringBuffer("<textarea name=\""+
               td.getDatabase()+"__"+
               td.getTable()+"__"+fieldName+
               "\" COLS=\"60\" ROWS=\"5\" WRAP=\"SOFT\"
               onBlur=\"validateTextarea(this,'"+
               td.getFormattedField(index-1)+"',"+displaySize+")\" "
            );

            if (b!=null) {
               sb.append("onMouseOver=\"setHang('"+b.getID()+
                  "',event,this,'dataTable'); return true;\" "
               );
               sb.append("onMouseOut=\"clearHang(); return true;\" ");
               sb.append("onClick=\"clearHang(); return true;\" ");
            }

            sb.append(">");
            sb.append(processDoubleQuote(value));
            sb.append("</textarea>\n");
         }
      }
      else if (type.equals("DATE")) {
         sb.append("text\" maxlength=\"10\" size=\"10\" ");
         sb.append("value=\""+value+"\" ");
         // if (!doProcess.equals("search")) {
         sb.append("onBlur=\"checkDate(this)\"");
         // }
         sb.append(">");
      }

      sb.append("\n");
   }
   catch (SQLException sqle) {
      sqle.printStackTrace();
   }
   return(sb.toString());
}


private static String buildPickList(String fieldName,
   TableDescriptor td,
   TableDescriptor td1,
   String doProcess,
   String value,
   LinkedList sessionStack,
   Connection con)
{
```

```
//first, generate sql

BalloonHelp bh=BalloonHelp.getInstance();
Balloon b=bh.getTableBalloon(td.getTable().toUpperCase()+"."+fieldName.
toUpperCase());
StringBuffer sb=
new StringBuffer("<select name=\""+
   td.getDatabase()+"__"+
   td.getTable()+"__"+fieldName+"\" "
);

if (b!=null) {
   sb.append("onMouseOver=\"setHang('"+b.getID()+
      "',event,this,'dataTable'); return true;\" "+
      "onMouseOut=\"clearHang(); return true;\" "+
      "onClick=\"clearHang();\" "
   );
}

sb.append(">");

if (((StackElement)sessionStack.getLast()).getMasterColumn() == null) {
   sb.append("<option>\n");
}
else if (!((StackElement)sessionStack.getLast()).getMasterColumn().
equals(fieldName)) {
   sb.append("<option>\n");
}

boolean foundName=false;
boolean foundNamePart=false;
boolean specialView=
   (td.getTable().equals("CUSTOM_VIEW_PROTOTYPE_2") ||
      td.getTable().equals("CUSTOM_VIEW_PROTOTYPE_3") ||
      td.getTable().equals("CUSTOM_VIEW_PROTOTYPE_1")
   )?true:false;

DataDictionary dd =
DataDictionary.getInstance(td.getDatabase(),
td.getDBConnection());

String td1SaveTableName = td1.getTable();
String fullQuery = (td.getForeignCDD(fieldName) != null)?td.
getForeignCDD(fieldName).getSQLStr():null;
StringBuffer selectPart = new StringBuffer();
StringBuffer fromPart = new StringBuffer();
StringBuffer wherePart = new StringBuffer();
StringBuffer orderByPart = new StringBuffer();

if (Debug.areDebugging) {
   Debug.doLog("fieldName: "+fieldName,Debug.INFO);
   Debug.doLog("fullQuery: "+fullQuery,Debug.INFO);
}

try {
   if (fullQuery != null) {
      int begPart = fullQuery.indexOf("SELECT")+"SELECT".length();
      int endPart = fullQuery.indexOf("FROM");
```

```
    selectPart.append(fullQuery.substring(begPart,endPart).
    toUpperCase().trim());
    begPart = endPart+"FROM".length();
    endPart = fullQuery.indexOf("WHERE");
    if (endPart > begPart) {
       fromPart.append(fullQuery.substring(begPart,endPart).
       toUpperCase().trim());
       begPart = endPart+"WHERE".length();
       endPart = fullQuery.indexOf("ORDER BY");
       if (endPart > begPart) {
          wherePart.append(fullQuery.substring(begPart,endPart).
          toUpperCase().trim());
          begPart = endPart+"ORDER BY".length();
          orderByPart.append(fullQuery.substring(begPart).toUpperCase
          ().trim());
       }
       else {

          wherePart.append(fullQuery.substring(begPart).toUpperCase()
          .trim());
       }
    }
    else {
       endPart = fullQuery.indexOf("ORDER BY");
       if (endPart > begPart) {
          fromPart.append(fullQuery.substring(begPart,endPart).
          toUpperCase().trim());
          begPart = endPart+"ORDER BY".length();
          orderByPart.append(fullQuery.substring(begPart).toUpperCase
          ().trim());
       }
       else {
          fromPart.append(fullQuery.substring(begPart).toUpperCase().
          trim());
       }
    }
    if (Debug.areDebugging) {
       Debug.doLog("selectPart: "+wherePart,Debug.INFO);
       Debug.doLog("fromPart: "+fromPart,Debug.INFO);
       Debug.doLog("wherePart: "+wherePart,Debug.INFO);
       Debug.doLog("orderByPart: "+wherePart,Debug.INFO);
    }
 }
 else {
    selectPart.append(tdl.getTable()+"."+tdl.getKeyField());
    fromPart.append(tdl.getTable());
    if (specialView) {
       orderByPart.append(tdl.getKeyField());
    }

    while (!specialView && !foundName) {
       ResultSetMetaData rsmdl=tdl.getMetaData();
       for (int i=1;i<=rsmdl.getColumnCount();i++) {
          if (rsmdl.getColumnName(i).endsWith("_NAME")) {
             foundName=true;
             break;
          }
       }
```

```
   if (!foundName) {
      String qStr="select a.table_name,b.column_name from "+
         "user_constraints a, user_cons_columns b, "+
         "user_constraints c, user_cons_columns d "+
         "where "+
         "a.constraint_type='P' and c.constraint_type='U' "+
         "and c.table_name='"+td1.getTable()+"' and "+
         "c.constraint_name=d.constraint_name and "+
         "b.column_name=d.column_name and "+
         "b.constraint_name=a.constraint_name";

      boolean needToClose=false;
      if (con == null) {
         /*
         DBConnectionManager.getInstance();
         con=connMgr.getConnection(td1.getDBConnection());
         needToClose=true;
         */
      }

      Statement stmt=con.createStatement();
      ResultSet rs=stmt.executeQuery(qStr);
      if (!rs.next()) {
         break;
      }
      if (rs.getString(1).startsWith("MICAH")) {
         rs.next();
      }
      String tableName=rs.getString(1);
      String keyFieldName=rs.getString(2);

      td=dd.getDataDictionaryTD(td1.getTable());
      td1=dd.getDataDictionaryTD(tableName);

      wherePart.append(td.getTable()+"."+keyFieldName+"="+
         tableName+"."+td1.getKeyField()+" and ");
         fromPart.append(","+td1.getTable());

      rs.close();
      stmt.close();
      if (needToClose) {
         //connMgr.freeConnection(td1.getDBConnection(),con);
      }
   }
}

// now I am at a TD that has _NAME field(s)
foundNamePart=false;
if (!specialView && td1.findColumnName("LAST_NAME") != 0) {
   selectPart.append(","+td1.getTable()+".LAST_NAME");
   orderByPart.append(td1.getTable()+".LAST_NAME,");
   if (td1.findColumnName("FIRST_NAME") != 0) {
      selectPart.append(","+td1.getTable()+".FIRST_NAME");
      orderByPart.append(td1.getTable()+".FIRST_NAME,");
   }
   if (td1.findColumnName("MIDDLE_NAME") != 0) {
      selectPart.append(","+td1.getTable()+".MIDDLE_NAME");
```

```
        o[redacted]rByPart.append(td1.getTable()+".MID[redacted]_NAME,");
      }
      foundNamePart=true;
   }
   if (!specialView && !foundNamePart) {
      ResultSetMetaData rsmd=td1.getMetaData();
      for (int i=1;i<=rsmd.getColumnCount();i++) {
         if (rsmd.getColumnName(i).endsWith("_NAME")) {
            selectPart.append(","+rsmd.getColumnName(i));
            orderByPart.append(rsmd.getColumnName(i));
            break;
         }
      }
   }
   else if (foundName) {
      orderByPart.deleteCharAt(orderByPart.length()-1);
   }
}

StringBuffer qStrBuf=new StringBuffer("SELECT "+selectPart+" FROM "+
fromPart);

if (((StackElement)sessionStack.getLast()).getMasterColumn() !=
null) {
   if (((StackElement)sessionStack.getLast()).getMasterColumn().
   equals(fieldName)) {
      if ( ((StackElement)sessionStack.get(sessionStack.size()-2)).
      getTableName().equals("CUSTOM_VIEW_PROTOTYPE_1") ||
         ((StackElement)sessionStack.get(sessionStack.size()-2)).
         getTableName().equals("CUSTOM_VIEW_PROTOTYPE_2") ||
         ((StackElement)sessionStack.get(sessionStack.size()-2)).
         getTableName().equals("CUSTOM_VIEW_PROTOTYPE_3"))
      {
         if (fullQuery == null) {
            wherePart.append(td1SaveTableName+"."+fieldName+"="+((
            StackElement)sessionStack.get(sessionStack.size()-2)).
            getCurrentKey()+" AND ");
         }
         else {
            wherePart.append(" AND A."+fieldName+"="+((StackElement)
            sessionStack.get(sessionStack.size()-2)).getCurrentKey
            ());
         }
      }
      else {
         if (fullQuery == null) {
            wherePart.append(((StackElement)sessionStack.get(
            sessionStack.size()-2)).getTableName()+"."+
               fieldName+"="+((StackElement)sessionStack.get(
               sessionStack.size()-2)).getCurrentKey()+" AND "
            );
         }
         else {
            wherePart.append(" AND A"+"."+fieldName+"="+((
            StackElement)sessionStack.get(sessionStack.size()-2)).
            getCurrentKey());
         }
      }
```

```
}

if (wherePart.length() != 0) {
   if (fullQuery == null) {
      wherePart.delete(wherePart.length()-5,wherePart.length()-1);
   }
   qStrBuf.append(" WHERE "+wherePart);
}

if (fullQuery == null) {
   String sortOrderName = null;
   ResultSetMetaData rsmd = td1.getMetaData();
   for (int i=1;i<=rsmd.getColumnCount();i++) {
      String curColName = rsmd.getColumnName(i);
      if (curColName.endsWith("SORT_ORDER") ||
         curColName.endsWith("SORT_KEY"))
      {
         sortOrderName = curColName;
         break;
      }
   }
   if (sortOrderName != null) {
      if (orderByPart.length() == 0) {
         orderByPart.append(td1SaveTableName+"."+sortOrderName);
      }
      else {

         orderByPart.insert(0,td1SaveTableName+"."+sortOrderName+","
         );
      }
   }
}

if (orderByPart.length() != 0) {
   qStrBuf.append(" ORDER BY "+orderByPart);
}

if (Debug.areDebugging) {
   Debug.doLog("TableDescriptorDisplay qStrBuf:
   "+qStrBuf,Debug.INFO);
}
boolean needToClose=false;
//DBConnectionManager connMgr=null;
if (con == null) {
   /*
   DBConnectionManager.getInstance();
   con=connMgr.getConnection(td1.getDBConnection());
   needToClose=true;
    */
}
Statement stmt=con.createStatement();
ResultSet rs=stmt.executeQuery(qStrBuf.toString());
ResultSetMetaData rsmd=rs.getMetaData();
while (rs.next()) {
   String optVal=rs.getString(1);
   String curTableName = td.getTable();
   sb.append("<option value=\"");
```

```
        if (curTableName.equals("CUSTOM_VIEW_PROTOTYPE_2") ||
            curTableName.equals("CUSTOM_VIEW_PROTOTYPE_1") ||
            curTableName.equals("CUSTOM_VIEW_PROTOTYPE_3"))
        {
            sb.append(rs.getString(1));
        }
        else {
            sb.append(optVal);
        }
        sb.append("\" "+
            (optVal.equals(value)?"SELECTED":"")+
            ">"
        );
        if (foundNamePart && rsmd.getColumnCount() == 4) {
            String lastName = rs.getString(2);
            String firstName = rs.getString(3);
            String middleName = rs.getString(4);

            String apStr=(lastName == null?"":lastName+", ")+
            (firstName == null?"":firstName+" ")+
            (middleName == null?"":middleName);

            sb.append(apStr);
        }
        else if ((!foundName) && (fullQuery == null)) {
            sb.append(rs.getString(1));
        }
        else {
            for (int i=2;i<=rsmd.getColumnCount();i++) {
                if (rs.getString(i) != null) {
                    sb.append(rs.getString(i)+" ");
                }
            }
            sb.deleteCharAt(sb.length()-1);
        }
        sb.append("\n");
      }
      rs.close();
      stmt.close();
      if (needToClose) {
        //connMgr.freeConnection(td1.getDBConnection(),con);
      }
   }
   catch (SQLException sqle) {
      sqle.printStackTrace();
   }

   sb.append("</select>\n");

   return(sb.toString());
}

public static String getOrderBy(TableDescriptor td) {
   StringBuffer orderByBuff=new StringBuffer();
   boolean foundNamePart=false;
   try {
      if (td.findColumnName("LAST_NAME") != 0) {
         orderByBuff.append("LAST_NAME,");
```

```
        foundNamePart=true;
      }
      if (td.findColumnName("FIRST_NAME") != 0) {
        orderByBuff.append("FIRST_NAME,");
        foundNamePart=true;
      }
      if (td.findColumnName("MIDDLE_NAME") != 0) {
        orderByBuff.append("MIDDLE_NAME,");
        foundNamePart=true;
      }
      if (!foundNamePart) {
        ResultSetMetaData rsmd = td.getMetaData();
        String nameColumn;
        for (int i=1;i<=rsmd.getColumnCount();i++) {
          if ((nameColumn=rsmd.getColumnName(i)).endsWith("_NAME")) {
            orderByBuff.append(nameColumn);
            foundNamePart=true;
            break;
          }
        }
      }
      else {
        orderByBuff.deleteCharAt(orderByBuff.length()-1);
      }
    }
    catch (SQLException sqle) {
      sqle.printStackTrace();
    }
    if (foundNamePart) {
      return(orderByBuff.toString());
    }
    else {
      return("");
    }
  }


  public static String displayStack(LinkedList l, String unqStr) {
    StringBuffer stackListBuff=new StringBuffer("<TABLE width=\"100%\" "+
      "cellpadding=\"0\" "+
      "cellspacing=\"0\">\n");
    stackListBuff.append("<TR><TD align=\"left\" valign=\"bottom\">\n");
    String targetName=null;
    String doProcess=null;
    int i=0;
    BalloonHelp bh = BalloonHelp.getInstance();
    Balloon b = bh.getNavBalloon("stackLink");
    String bString =
      ((b!=null)?
        "onMouseOver=\"setHang('"+b.getID()+
        "',event,this,'navLink'); return true;\" "+
        "onMouseOut=\"clearHang(); return true;\" "+
        "onClick=\"clearHang(); return true;\" ":
        ""
      );
      while (l != null && i < l.size()) {
        StackElement se=(StackElement)l.get(i);
        targetName="AddEditForm.jsp";
```

```
        if (se.getMode().equals("browse")) {
            targetName="Browse.jsp";
            doProcess="browse";
        }
        else if (se.getMode().equals("add")) {
            doProcess="insert";
        }
        else if (se.getMode().equals("edit")) {
            doProcess="update&keyValue="+se.getCurrentKey();
        }
        else if (se.getMode().equals("search")) {
            if (se.getTableName().equals("CUSTOM_VIEW_PROTOTYPE_3")) {
                doProcess="revised";
            }
            else {
                doProcess="filter";
            }
        }

        stackListBuff.append("<A HREF=\""+targetName+"?tableName="+
            se.getTableName()+"&mode="+se.getMode()+
            "&doProcess="+doProcess+"&stackLevel="+i+
            "&unq="+unqStr+"\" "+
            bString+
            ">"
        );
        stackListBuff.append(TableDescriptorDisplay.getDisplayLabel(
            se.getTableName()).toUpperCase()+
            " ["+se.getMode().toUpperCase()+"]</A> -->\n"
        );
        i++;
    }
    if (l != null) {
        stackListBuff = new StringBuffer(stackListBuff.substring(0,
        stackListBuff.length()-7));
    }
    stackListBuff.append("</TD><TD valign=\"bottom\" align=\"right\">");
    stackListBuff.append("</TD></TR></TABLE>");
    return(stackListBuff.toString());
}

public static String displayNavbar(String origTableName,String unqStr,
boolean canBrowseFlag,boolean canAddFlag,boolean isFiltered) {

    BalloonHelp bh = BalloonHelp.getInstance();
    Balloon b = null;

    StringBuffer navbarBuff=new StringBuffer();
    navbarBuff.append("<b>"+TableDescriptorDisplay.getFormattedLabel(
    origTableName)+"</b> options: \n");
    if (canBrowseFlag) {
        b=bh.getNavBalloon("navFullBrowseLink");
        navbarBuff.append("<font size=\"2\"><strong>"+
            "<A HREF=\"Browse.jsp?tableName="+
            origTableName+"&mode=browse&doProcess=fullList&"+
            "unq="+unqStr+
            "\" "+
```

```
    ((b != null)?
        "onMouseOver=\"setHang('"+b.getID()+
        "',event,this,'navLink'); return true;\" "+
        "onMouseOut=\"clearHang(); return true;\" "+
        "onClick=\"clearHang(); return true;\" ":
        ""
    )+

    ">FULL BROWSE</A></strong></font>"
);

if ((!isFiltered) && ((!canAddFlag) || origTableName.equals(
"CUSTOM_VIEW_PROTOTYPE_1") ||
    origTableName.equals("CUSTOM_VIEW_PROTOTYPE_2") || origTableName.
    equals("CUSTOM_VIEW_PROTOTYPE_3")))
{
    navbarBuff.append(" or");
}
else {
    navbarBuff.append(",");
}

if (isFiltered) {
    b=bh.getNavBalloon("navFilteredBrowseLink");
    navbarBuff.append(" <font size=\"2\"><strong>"+
        "<A HREF=\"Browse.jsp?tableName="+
        origTableName+"&mode=browse&doProcess=filter&"+
        "unq="+unqStr+
        "\" "+

        ((b != null)?
            "onMouseOver=\"setHang('"+b.getID()+
            "',event,this,'navLink'); return true;\" "+
            "onMouseOut=\"clearHang(); return true;\" "+
            "onClick=\"clearHang(); return true;\" ":
            ""
        )+

        ">FILTERED BROWSE</A></strong></font>,"
    );
}

b=bh.getNavBalloon("navNewSearchLink");
navbarBuff.append(" <font size=\"2\"><strong>"+
    "<A HREF=\"AddEditForm.jsp?tableName="+
    origTableName+"&mode=search&doProcess=new&"+
    "unq="+unqStr+
    "\" "+

    ((b != null)?
        "onMouseOver=\"setHang('"+b.getID()+
        "',event,this,'navLink'); return true;\" "+
        "onMouseOut=\"clearHang(); return true;\" "+
        "onClick=\"clearHang(); return true;\" ":
        ""
    )+

    ">NEW SEARCH</a></strong></font>"
```

```
    );

    if (isFiltered) {
       b=bh.getNavBalloon("navRevisedSearchLink");
       navbarBuff.append(",");
       if ((!canAddFlag) || origTableName.equals(
       "CUSTOM_VIEW_PROTOTYPE_1") || origTableName.equals(
       "CUSTOM_VIEW_PROTOTYPE_2") || origTableName.equals(
       "CUSTOM_VIEW_PROTOTYPE_3")) {
          navbarBuff.append(" or");
       }
       navbarBuff.append(" <font size=\"2\"><strong>"+
          "<A HREF=\"AddEditForm.jsp?tableName="+
          origTableName+"&mode=search&doProcess=revised&"+
          "unq="+unqStr+
          "\" "+

          ((b != null)?
             "onMouseOver=\"setHang('"+b.getID()+
             "',event,this,'navLink'); return true;\" "+
             "onMouseOut=\"clearHang(); return true;\" "+
             "onClick=\"clearHang(); return true;\" ":
             ""
          )+

          ">REVISED SEARCH</a></strong></font>"
       );
    }
 }
 if (! ((!canAddFlag) || origTableName.equals("CUSTOM_VIEW_PROTOTYPE_1")
 || origTableName.equals("CUSTOM_VIEW_PROTOTYPE_2") || origTableName.
 equals("CUSTOM_VIEW_PROTOTYPE_3")) ) {
    b=bh.getNavBalloon("navAddLink");
    if (canBrowseFlag) {
       navbarBuff.append(", or");
    }
    navbarBuff.append(" <font size=\"2\"><strong>"+
       "<A HREF=\"AddEditForm.jsp?tableName="+
       origTableName+"&mode=add&doProcess=insert&"+
       "unq="+unqStr+
       "\" "+

       ((b != null)?
          "onMouseOver=\"setHang('"+b.getID()+
          "',event,this,'navLink'); return true;\" "+
          "onMouseOut=\"clearHang(); return true;\" "+
          "onClick=\"clearHang(); return true;\" ":
          ""
       )+

       ">ADD</a></strong></font>\n"
    );
 }

 return navbarBuff.toString();
}

public static String getNoCache(int forType) {
```

```
        long curDate=new java.util.Date().getTime();

        if (forType == TableDescriptorDisplay.ForForm) {
            return("<input type=\"hidden\" name=\"unq\"
            value=\""+curDate+"\">");
        }
        else if (forType == TableDescriptorDisplay.ForJavaScript) {
            return(""+curDate);
        }
        else { // (forType == TableDescriptorDisplay.ForURL)
            return("unq="+curDate);
        }
    }

    public static String processDoubleQuote(String str) {
        StringBuffer retStrBuf = new StringBuffer();
        int prevQuote=0;
        int curQuote=0;
        while ((curQuote=str.indexOf('"',prevQuote)) >= 0) {
            retStrBuf.append(str.substring(prevQuote,curQuote));
            retStrBuf.append("&quot;");
            prevQuote = curQuote+1;
        }
        retStrBuf.append(str.substring(prevQuote));
        return(retStrBuf.toString());
    }
}
```

Schemalive/WEB-INF/classes/sessionUtils/ManageSession.java

```
// $Revision: 2.3 $
// $Date: 2001/10/30 01:35:53 $

package sessionUtils;

import javax.servlet.*;
import javax.servlet.http.*;

import java.util.*;
import java.io.*;

public class ManageSession {

    public static final String version_sessionUtils_ManageSession_java =
    "$Revision: 2.3 $";

    public static int getCurSequence(HttpSession session) {
        Integer curSequence =
            (Integer)session.getAttribute("sessionSequence");
        if (curSequence != null) {
            return(curSequence.intValue());
        }
        else {
            ManageSession.updateSequence(session);
            return(1);
        }
    }
```

```
    public static int updateSequence(HttpSession session) {
        Integer curSequence = (Integer)session.getAttribute("sessionSequence");
        int nextSequence;
        if (curSequence == null) {
            nextSequence=1;
        }
        else {
            nextSequence = curSequence.intValue()+1;
        }

        session.setAttribute("sessionSequence",new Integer(nextSequence));
        return(ManageSession.getCurSequence(session));
    }

    public static boolean checkSequence(HttpSession session,int sequence) {
        if (sequence != ManageSession.getCurSequence(session)) {
            return(false);
        }
        else {
            return(true);
        }
    }
}
```

Schemalive/WEB-INF/classes/sessionUtils/StackElement.java

```
// $Revision: 2.3 $
// $Date: 2001/10/30 01:35:53 $

package sessionUtils;

import java.util.*;
import java.io.*;

public class StackElement implements Serializable {

    public static final String version_sessionUtils_StackElement_java =
    "$Revision: 2.3 $";

    private Hashtable formValues=new Hashtable();
    private Hashtable searchParams=new Hashtable();
    private String mode=null;
    private String tableName=null;
    private String searchString=null;
    private String currentKey=null;
    private String focusField=null;
    private String masterColumn=null;
    private int rowPointer=0;

    public StackElement() {
        ;
    }

    private synchronized void writeObject(java.io.ObjectOutputStream out)
    throws IOException {
        out.defaultWriteObject();
        out.writeObject(formValues);
        out.writeObject(searchParams);
```

```
    out.writeObj[redacted](mode);
    out.writeObject(tableName);
    out.writeObject(searchString);
    out.writeObject(currentKey);
    out.writeObject(focusField);
    out.writeObject(masterColumn);
}
private synchronized void readObject(java.io.ObjectInputStream in)
throws IOException, ClassNotFoundException {
    in.defaultReadObject();

    formValues=(Hashtable)in.readObject();
    searchParams=(Hashtable)in.readObject();
    mode=(String)in.readObject();
    tableName=(String)in.readObject();
    searchString=(String)in.readObject();
    currentKey=(String)in.readObject();
    focusField=(String)in.readObject();
    masterColumn=(String)in.readObject();
}

// get accessor methods
public String getCurrentKey() {
    return(currentKey);
}

public String getSearchString() {
    return(searchString);
}

public String getTableName() {
    return(tableName);
}

public String getMode() {
    return (mode);
}

public String getFocusField() {
    return(focusField);
}

public Hashtable getSearchParams() {
    return(searchParams);
}

public Hashtable getFormValues() {
    return(formValues);
}

public String getMasterColumn() {
    return(masterColumn);
}

public int getRowPointer() {
    return(rowPointer);
}
```

```
//set accessor m[redacted]hods
public void setCurrentKey(String myCurrentKey) {
   currentKey=myCurrentKey;
}

public void setSearchString(String mySearchString) {
   searchString=mySearchString;
}


public void setTableName(String myTableName) {
   tableName=myTableName;
}

public void setMode(String myMode) {
   mode=myMode;
}

public void setFocusField(String myFocusField) {
   focusField=myFocusField;
}

public void setSearchParams(Hashtable mySearchParams) {
   searchParams=mySearchParams;
}

public void setFormValues(Hashtable myFormValues) {
   formValues=myFormValues;
}

public void setMasterColumn(String myMasterColumn) {
   masterColumn=myMasterColumn;
}

public void setRowPointer(int myRowPointer) {
   rowPointer=myRowPointer;
}

//Specific settings for the hashtables
public boolean searchParamsContains(Object o) {
   return(searchParams.contains(o));
}

public boolean formValuesContains(Object o) {
   return(formValues.contains(o));
}

public Enumeration searchParamsElements() {
   return(searchParams.elements());
}

public Enumeration formValuesElements() {
   return(formValues.elements());
}

public Object searchParamsGet(Object key) {
   return(searchParams.get(key));
}
```

```
    public Object formValuesGet(Object key) {
        return(formValues.get(key));
    }

    public Enumeration searchParamsKeys() {
        return(searchParams.keys());
    }

    public Enumeration formValuesKeys() {
        return(formValues.keys());
    }

    public Object searchParamsPut(Object key,Object value) {
        return(searchParams.put(key,value));
    }

    public Object formValuesPut(Object key,Object value) {
        return(formValues.put(key,value));
    }

    public void copyFormToSearch() {
        // Hashtable formValues=se.getFormValues();
        // Hashtable searchParams=new Hashtable();
        this.searchParams=new Hashtable();
        deepClone(this.searchParams,this.formValues);
        // setSearchParams(searchParams);
    }

    public void copySearchToForm() {
        // Hashtable formValues=new Hashtable();
        this.formValues=new Hashtable();
        // Hashtable searchParams=se.getSearchParams();
        deepClone(this.formValues,this.searchParams);
        // setFormValues(formValues);
    }

    public void deepClone(Hashtable dst,Hashtable src) {
        // Hashtable dst=new Hashtable();
        Enumeration srcKeys=src.keys();
        while (srcKeys.hasMoreElements()) {
            Object srcKey=srcKeys.nextElement();
            Object srcVal=src.get(srcKey);
            dst.put(srcKey,srcVal);
        }
        // return(dst);
    }
}
```

Schemalive/WEB-INF/classes/sessionUtils/StackTag.java

```
// $Revision: 2.5 $
// $Date: 2001/10/30 08:26:33 $

package sessionUtils;

import javax.servlet.*;
import javax.servlet.http.*;
```

```
import javax.servle[redacted]jsp.*;
import javax.servlet.jsp.tagext.*;

import java.util.*;
import java.io.*;

import dbUtils.*;
// import dbPoolUtils.*;

import common.*;

public class StackTag extends BodyTagSupport {

   public static final String version_sessionUtils_StackTag_java =
   "$Revision: 2.5 $";

   private String mode=null;
   private String tableName=null;
   private String stackLevel=null;
   private String database=null;
   private String dbConn=null;

   public int doStartTag() {
      pageContext.setAttribute("stackError","");
      pageContext.setAttribute("stackInfo","");

      // Check mode to determine what to do
      /*
      if (mode.equals("add")) {
      buildAdd();
      }
      else if (mode.equals("edit") || mode.equals("hold")) {
      buildEdit();
      }
      else if (mode.equals("search")) {
      buildSearch();
      }
       */
      if (mode.equals("add") || mode.equals("edit") || mode.equals("search"))
      {
         buildAddEdit(mode);
      }
      else if (mode.equals("browse")) {
         buildBrowse();
      }
      else {
         pageContext.setAttribute("stackError","StackError: mode "+
            mode+" not recognized");
      }

      return(EVAL_BODY_TAG);
    }


    public int doAfterBody() {
       try {
          BodyContent body = getBodyContent();
          JspWriter out= body.getEnclosingWriter();
```

```
        out.print(body.getString());
    }
    catch (IOException ioe) {
        ioe.printStackTrace();
    }
    return(SKIP_BODY);
}

public int endEndTag() {
    return(EVAL_PAGE);
}

private void buildAddEdit(String mode) {

    LinkedList sessionStack=getSessionStack();
    boolean pushFlag = false;
    if (isPush()) {
        StackElement se=new StackElement();
        sessionStack.add(se);
        pushFlag = true;
        // se.setMode("edit");
        // se.setTableName(tableName);
    }

    clearStackChildren(sessionStack);
    StackElement se=(StackElement)sessionStack.getLast();
    se.setMode(mode);
    if ((se.getTableName() != null) &&
    (!se.getTableName().equals(tableName))) {
        se.setRowPointer(0);
        se.setSearchString(null);
        se.setSearchParams(new Hashtable());
    }
    se.setTableName(tableName);
    se.setCurrentKey(pageContext.getRequest().getParameter("keyValue"));

    setMasterColumn(sessionStack, se, pushFlag);

    pageContext.setAttribute("stackInfo","buildAddEdit(\""+mode+"\") for "+
    tableName);
}

private void buildBrowse() {
    if (Debug.areDebugging) {
        Debug.doLog("In buildBrowse()...",Debug.INFO);
    }

    LinkedList sessionStack=getSessionStack();
    boolean pushFlag = false;
    if (isPush()) {
        StackElement se=new StackElement();
        sessionStack.add(se);
        pushFlag = true;
        // se.setMode("browse");
        // se.setTableName(tableName);
    }

    clearStackChildren(sessionStack);
```

```
StackElement se=(StackElement)sessionStack.getLast();
se.setMode("browse");
if ((se.getTableName() != null) &&
(!se.getTableName().equals(tableName))) {
   se.setRowPointer(0);
   se.setSearchString(null);
   se.setSearchParams(new Hashtable());
}
se.setTableName(tableName);
se.setCurrentKey(null);
// This is probably a hack, and should really be happening elsewhere
(?)...
se.setFormValues(new Hashtable());

setMasterColumn(sessionStack, se, pushFlag);

String doProcess=
   pageContext.getRequest().getParameter("doProcess");
String curTableName=se.getTableName();

if (Debug.areDebugging) {
   Debug.doLog("curTableName: "+curTableName+" tableName: "+tableName,
   Debug.INFO);
}

se.setMode("browse");
if ((doProcess != null && doProcess.equals("fullList")) ||
   !tableName.equals(curTableName))
{
   // frag any filters
   se.setSearchParams(new Hashtable());
   se.setSearchString(null);
   se.setTableName(tableName);
}

pageContext.setAttribute("stackInfo","buildBrowse() for "+
tableName);
}

private boolean isPush() {
   int curStackLevel=getSessionStack().size()-1;
   return(getStackLevelInt() > curStackLevel);
}

private LinkedList getSessionStack() {

   HttpSession session=pageContext.getSession();
   LinkedList sessionStack=
      (LinkedList)session.getAttribute("sessionStack");
   if (sessionStack == null) {
      if (Debug.areDebugging) {
         Debug.doLog("Need to create LinkedList...",Debug.INFO);
      }
      sessionStack = new LinkedList();
      session.setAttribute("sessionStack",sessionStack);
      StackElement se=new StackElement();
      sessionStack.add(se);
      se.setMode("browse");
```

```
      se.setTableName(tableName);
   }
   return(sessionStack);
}

private int getStackLevelInt() {
   int curStackLevel=getSessionStack().size()-1;
   if (Debug.areDebugging) {
      Debug.doLog("curStackLevel="+curStackLevel+"\nstackLevel="+
      stackLevel+"\n",
      Debug.INFO);
   }
   if (stackLevel == null || stackLevel.indexOf('@') >= 0) {
      return(curStackLevel);
   }

   if (stackLevel.indexOf('+') >= 0) {
      return(curStackLevel+1);
   }
   else if (stackLevel.indexOf('-') >= 0) {
      return((curStackLevel-1 < 0)?0:curStackLevel-1);
   }

   try {
      curStackLevel=Integer.parseInt(stackLevel);
   }
   catch (NumberFormatException nfe) {
      curStackLevel=0;
   }
   return(curStackLevel);
}


public void setMode(String myMode) {
   mode=myMode;
}

public void setTableName(String myTableName) {
   tableName=myTableName;
}

public void setStackLevel(String myStackLevel) {
   stackLevel=myStackLevel;
}

public void setDatabase(String myDatabase) {
   database=myDatabase;
}

public void setDbConn(String myDbConn) {
   dbConn=myDbConn;
}

public String getMode() {
   return(mode);
}

public String getTableName() {
```

```
   return(tableN[redacted]e);
}

public String getStackLevel() {
   return(stackLevel);
}

public String getDatabase() {
   return(database);
}

public String getDbConn() {
   return(dbConn);
}

public static String getParentTableName(LinkedList sessionStack) {
   return(getParentTableName(sessionStack,sessionStack.size()-1));
}

public static String getParentTableName(LinkedList sessionStack,
int stackLevel) {
   if (stackLevel > sessionStack.size() || stackLevel < 1) {
      return("");
   }
   return(((StackElement)sessionStack.get(stackLevel-1)).getTableName());
}

private void setMasterColumn(LinkedList sessionStack, StackElement se,
boolean pushFlag) {
   if (sessionStack.size() > 1) {
      StackElement
      pe=(StackElement)sessionStack.get(sessionStack.size()-2);

      MasterDetail md=MasterDetail.getInstance(database,dbConn);
      Vector detailTables=md.getDetailTables(pe.getTableName());
      Enumeration dtEnum=detailTables.elements();
      se.setMasterColumn(null);
      while (dtEnum.hasMoreElements()) {
         String detailTable=(String)dtEnum.nextElement();
         if (Debug.areDebugging) {
            Debug.doLog("table: "+tableName+", detailTable: "+detailTable,
            Debug.INFO);
         }


         int dot=detailTable.indexOf('.');
         if (detailTable.startsWith(tableName+".")) {
            se.setMasterColumn(detailTable.substring(dot+1));
            if (pushFlag && (pe.getTableName().equals(
            "CUSTOM_VIEW_PROTOTYPE_1") || pe.getTableName().equals(
            "CUSTOM_VIEW_PROTOTYPE_2") ||
               pe.getTableName().equals("CUSTOM_VIEW_PROTOTYPE_3")))
            {
               pe.setCurrentKey(pageContext.getRequest().getParameter(
               "parentKey"));
            }
            break;
         }
```

```
            ;
        }
    }

    private void clearStackChildren(LinkedList sessionStack) {
        int curLevel=getStackLevelInt();
        while (sessionStack.size()-1 > curLevel) {
            sessionStack.removeLast();
        }
    }
}
```

Schemalive/WEB-INF/classes/sessionUtils/StackTagExtraInfo.java

```
/* $Revision: 2.3 $ */
/* $Date: 2001/10/30 01:35:53 $ */

package sessionUtils;

import javax.servlet.jsp.*;
import javax.servlet.jsp.tagext.*;

public class StackTagExtraInfo extends TagExtraInfo {

    public static final String version_sessionUtils_StackTagExtraInfo_java =
    "$Revision: 2.3 $";

    public VariableInfo[] getVariableInfo(TagData data) {
        return( new VariableInfo[] {
            new VariableInfo("stackError","String",true,VariableInfo.AT_BEGIN),
            new VariableInfo("stackInfo","String",true,VariableInfo.AT_BEGIN),
        });
    }
}
```

Schemalive/WEB-INF/classes/tagUtils/ViewTag.java

```
// $Revision: 2.3 $
// $Date: 2001/10/30 01:35:53 $

package tagUtils;

import javax.servlet.*;
import javax.servlet.http.*;
import javax.servlet.jsp.*;
import javax.servlet.jsp.tagext.*;

import dbUtils.*;

public class ViewTag extends TagSupport {

    private String entryPoint;
    private String dbName;
    private String dbConn;

    public int doStartTag() {

        ServletRequest request=pageContext.getRequest();
```

```
      HttpSession session=pageContext.getSession();

      String tableName=request.getParameter("tableName");
      String keyField=request.getParameter("keyField");
      String keyVal=request.getParameter("keyVal");
      String doProcess=request.getParameter("doProcess");
      String stackLevel=request.getParameter("stackLevel");

      pageContext.setAttribute("tableName",
         (tableName==null)?"null":tableName);
      pageContext.setAttribute("keyField",
         (keyField==null)?"null":keyField);
      pageContext.setAttribute("keyVal",
         (keyVal==null)?"null":keyVal);
      pageContext.setAttribute("doProcess",
         (doProcess==null)?"null":doProcess);
      pageContext.setAttribute("stackLevel",
         (stackLevel==null)?"0":stackLevel);
      if ((String)session.getAttribute("returnTable") != null) {
         session.removeAttribute("returnTable");
      }

      if (((String)pageContext.getAttribute("tableName")).equals("null")) {
         pageContext.setAttribute("tableName",entryPoint.toUpperCase());
      }
      else {
         pageContext.setAttribute("tableName",
            ((String)pageContext.getAttribute("tableName")).toUpperCase());
      }


      tableName=(String)pageContext.getAttribute("tableName");

      DataDictionary dd = DataDictionary.getInstance(dbName,dbConn);
      if (dd.getDataDictionaryTD(tableName+"_View") != null) {
         pageContext.setAttribute("origTableName",tableName);
         pageContext.setAttribute("tableName",tableName+"_VIEW");
      }
      else {
         pageContext.setAttribute("origTableName",tableName);
      }

      return(EVAL_BODY_INCLUDE);
   }

   public void setDefaultEntryPoint(String entryPoint) {
      this.entryPoint=entryPoint;
   }

   public void setDbName(String dbName) {
      this.dbName=dbName;
   }

   public void setDbConn(String dbConn) {
      this.dbConn=dbConn;
   }
}
```

Schemalive/WEB-INF/classes/tagUtils/ViewTagExtraInfo.java

```
// $Revision: 2.3 $
// $Date: 2001/10/30 01:35:53 $

package tagUtils;

import javax.servlet.jsp.*;
import javax.servlet.jsp.tagext.*;

public class ViewTagExtraInfo extends TagExtraInfo {

   public VariableInfo[] getVariableInfo(TagData data) {
      return( new VariableInfo[] {
         new VariableInfo("tableName","String",true,VariableInfo.AT_BEGIN),
         new VariableInfo("keyField","String",true,VariableInfo.AT_BEGIN),
         new VariableInfo("keyVal","String",true,VariableInfo.AT_BEGIN),
         new VariableInfo("doProcess","String",true,VariableInfo.AT_BEGIN),
         new VariableInfo("stackLevel","String",true,VariableInfo.AT_BEGIN),
         new
         VariableInfo("origTableName","String",true,VariableInfo.AT_BEGIN),
      });
   }
}
```

Schemalive/WEB-INF/taglib/stack.tld

```
<?xml version="1.0" encoding="ISO-8859-1" ?>
<!DOCTYPE taglib
   PUBLIC "-//Sun Microsystems, Inc.//DTD JSP Tag Library 1.1//EN"
   "http://java.sun.com/j2ee/dtds/web-jsptaglib_1_1.dtd">

<taglib>
   <tlibversion>1.0</tlibversion>
   <jspversion>1.1</jspversion>

   <tag>
      <name>stack</name>
      <tagclass>sessionUtils.StackTag</tagclass>
      <teiclass>sessionUtils.StackTagExtraInfo</teiclass>
      <bodycontent>JSP</bodycontent>
      <attribute>
         <name>mode</name>
         <required>true</required>
         <rtexprvalue>true</rtexprvalue>
      </attribute>
      <attribute>
         <name>tableName</name>
         <required>true</required>
         <rtexprvalue>true</rtexprvalue>
      </attribute>
      <attribute>
         <name>stackLevel</name>
         <required>false</required>
         <rtexprvalue>true</rtexprvalue>
      </attribute>
      <attribute>
         <name>database</name>
```

```
         <required>true</required>
         <rtexprvalue>true</rtexprvalue>
      </attribute>
      <attribute>
         <name>dbConn</name>
         <required>true</required>
         <rtexprvalue>true</rtexprvalue>
      </attribute>
   </tag>
</taglib>
```

Schemalive/WEB-INF/taglib/view.tld

```
<?xml version="1.0" encoding="ISO-8859-1" ?>
<!DOCTYPE taglib
   PUBLIC "-//Sun Microsystems, Inc.//DTD JSP Tag Library 1.1//EN"
   "http://java.sun.com/j2ee/dtds/web-jsptaglib_1_1.dtd">

<taglib>
   <tlibversion>1.0</tlibversion>
   <jspversion>1.1</jspversion>

   <tag>
      <name>setVars</name>
      <tagclass>tagUtils.ViewTag</tagclass>
      <teiclass>tagUtils.ViewTagExtraInfo</teiclass>
      <bodycontent>JSP</bodycontent>
      <attribute>
         <name>defaultEntryPoint</name>
         <required>true</required>
         <rtexprvalue>true</rtexprvalue>
      </attribute>
      <attribute>
         <name>dbName</name>
         <required>true</required>
         <rtexprvalue>true</rtexprvalue>
      </attribute>
      <attribute>
         <name>dbConn</name>
         <required>true</required>
         <rtexprvalue>true</rtexprvalue>
      </attribute>
   </tag>
</taglib>
```

Run-Time Environment for the Schemalive Reference Implementation

Overview

The Schemalive Reference Implementation (SRI) is a web application which conforms to Sun Microsystems' J2EE (Java 2 Enterprise Edition) Platform, which in turn incorporates the JSP (Java Server Pages) 1.2, Servlet 2.3, and JDBC (Java Database Connectivity) 2.0 specifications on which the SRI explicitly depends. More information on the structure of web applications can be found at http://jcp.org/aboutJava/communityprocess/first/jsr053/index.html. The web application can be placed in any J2EE-compliant container (i.e., application-server software), including such products as BEA WebLogic, Macromedia JRun, and Apache Tomcat.

Directory Structure

A root directory named Schemalive is required; the system's JSP files and static content (i.e., images) are located in this directory. A subdirectory Schemalive/WEB-INF is also required, and must contain a file named web.xml, which is the deployment descriptor (see below) for the application. Supporting classes for the JSP are located in a subdirectory Schemalive/WEB-INF/classes. The web.xml references the application's custom tag libraries (see below) through tag library descriptor files. These XML descriptors are located in a subdirectory Schemalive/WEB-INF/taglib, and have a .tld file extension. Following is a tree diagram for the SRI directory structure:

```
+Schemalive
    –AddEditForm.jsp
    –BalloonHelp.jsp
    –Browse.jsp
    –DataDictionary.jsp
    –DoAddEdit.jsp
    –DoViewGenerator.jsp
    –Error500.jsp
    –ExpiredSession.jsp
    –OutOfSequence.3sp
    –showSession.jsp
    +common
        –EmptyParamCheck.jsp
        –EntryPoints.jsp
        –GlobalFooter.jsp
        –GlobalHeaderHTML.jsp
        –GlobalHeaderJavascript.jsp
        –GlobalHeaderVARS.jsp
    +images
        –logo.gif
        –logo-width.gif
    +WEB–INF
        –web.xml
        +classes
            –Connection.properties
            +common
                –Debug-class
            +dbUtils
                –CustomCaps.class
                –CustomDrillDown.class
                –CustomDropDown.class
                –CustomDropDownComponent.class
                –DataDictionary.class
                –DataDictionaryServlet.class
                –DataDictionaryTD.class
                –MasterDetail.class
                –MasterDetailServlet.class
                –SQLUtil.class
                –TableDescriptor.class
                –ViewGenerator.class
            +HTMLUtils
                –Balloon.class
                –BalloonHelp.class
                –TableDescriptorDisplay.class
```

-continued

```
            +sessionUtils
                –ManageSession.class
                –StackElement.class
                –StackTag.class
                –StackTagExtraInfo.class
            +tagUtils
                –ViewTag.class
                –ViewTagExtraInfo.class
        +taglib
            –stack.tld
            –view.tld
```

Deployment Descriptor

The deployment descriptor (web.xml) is an XML (eXtensible Markup Language) file which contains all pertinent configuration information for running the web application. The SRI relies on the following portions of the deployment descriptor: servlet definitions; tag library references; and security constraints. The XML parsing rules for this file are contained in a DTD (Document Type Definition) which can be found at http://java.sun.com/j2ee/dtds/web-app__2__2.dtd. Refer to the JSP specification (above) for more information on deployment descriptors.

Servlet Definitions

The SRI incorporates a number of utility servlets (server-side Java applets which conform to the CGI specification). Servlets are identified in a <servlet> section within web.xml. A name is assigned to each servlet (which is used in creating a servlet mapping, described below), and this name is equated with the appropriate class-file name (specified relative to the Schemalive/WEB-INF/classes subdirectory). For example, a given servlet might be identified as follows:

```
<servlet>
    <servlet-name>DataDictionaryServlet</servlet-name>
    <servlet-class>
        dbUtils.DataDictionaryServlet
    </servlet-name>
</servlet>
```

By this definition, the following path should exist:

Schemalive/WEB-INF/classes/dbUtils/DataDictionaryServlet.class

Note that the <servlet-name> does not represent the actual URL (Uniform Resource Locator) for the servlet; a separate mapping from <servlet-name> to URL occurs in a <servlet-mapping> section:

```
<servlet-mapping>
    <servlet-name>DataDictionaryServlet</servlet-name>
    <url-pattern>DataDictionaryServlet</servlet-name>
</servlet-mapping>
```

By this definition (and assuming the root directory is Schemalive), the URL:

http://<host name>:<port>/Schemalive/DataDictionaryServlet would cause the J2EE container to execute the code found in Schemalive/WEB-INF/classes/dbUtils/DataDictionaryServlet.class Tag Library References A tag library contains Java code that implements custom HTML tags for use within JSPs. When the JSP engine encounters such tags, it makes corresponding Java calls into the tag libraries. For more information, refer to the JSP specification.

A <taglib> section within web.xml maps a URI (as used from within the JSP) to a tag library descriptor (which contains information about the associated class name, method calls, tag parameters). Below is a sample <taglib> section:

```
<taglib>
    <taglib-uri>view</taglib-uri>
    <taglib-location>WEB-INF/taglib/view.tld</taglib-location>
</taglib>
```

See http://java.sun.com/j2ee/dtds/web-jsptaglib__1__1.__1.dtd for the XML DTD for taglib.

The following is the contents of Schemalive/WEB-INF/taglib/view.tld:

```
<taglib>
    <tlibversion>1.0</tlibversion>
    <jspversion>1.2</jspversion>
    <tag>
        <name>setVars</name>
        <tagclass>tagUtils.ViewTag</tagclass>
        <teiclass>tagUtils.ViewTagExtraInfo</teiclass>
        <bodycontent>JSP</bodycontent>
        <attribute>
            <name>defaultEntryPoint</name>
            <required>true</required>
            <rtexprvalue>true</rtexprvalue>
        </attribute>
        <attribute>
            <name>dbName</name>
            <required>true</required>
            <rtexprvalue>true</rtexprvalue>
        </attribute>
        <attribute>
            <name>dbConn</name>
            <required>true</required>
            <rtexprvalue>true</rtexprvalue>
        </attribute>
    </tag>
</taglib>
```

The important part are the <name>, <tagclass>, and <attribute> tags. The classes referenced in <taglclass> must lie along the J2EE-container's CLASSPATH (note that the SCHEMALIVE/WEB-INF/classes directory is automatically included in the CLASSPATH). Combined with <taglib-uri>, there is enough information now to use the custom tag within a JSP. One such invocation would look like this:

```
<view:setVars defaultEntryPoint=" <%= entryPoints[0] %>" dbName="
    <%= dbName %>" dbConn=" <%= dbConnName %>">
</view:setVars>
```

Notice the use of <taglib-uri>, <name>, and <attributes> within the custom tag. Also, it is perfectly legal to use JSP inline variables, such as <%=entryPoints[0] %>, as the example shows.

Security Constraints web.xml contains information about how the SRI web application should handle security. This includes specifying what to secure, and how—as well as who can access the application (which is governed by the role names to which the user is assigned). The assignment of users to roles, however, is the responsibility of the J2EE container, and is handled differently by the different containers. The <security-constraint> section controls what is protected, and establishes the corresponding role name, while the <login-config> section establishes the user-authentication method. Here is a sample:

```
<security-constraint>
        <web-resource-collection>
        <web-resource-name>Schemalive<:/web-resource-name>
            <url-pattern>/*</url-pattern>
        <http-method>GET</http-method>
            <http-method>POST</http-method>
    </web-resource-collection>
        <auth-constraint>
        <role-name>Schemalive</role-name>
        </auth-constraint>
</security-constraint>
<login-config>
    <auth-method>BASIC</auth-method>
        <realm-name>Schemalive</realm-name>
</login-config>
```

Within the <web-resource-collection< section, the <url-pattern> tag protects the entire application (i.e., "/*") for the GET and POST methods. The <auth-constraint> tag references a role named Schemalive; somewhere within the container's configuration, this role is defined and a set of userids and passwords associated with it. The <login-config> section establishes BASIC as the authentication method; this is what will cause the userid/password prompt to pop-up when first accessing the site.

Connection Pooling

The SRI accomplishes database connectivity through the use of connection pooling, as defined in the JDBC 2.0 specification. (For documentation, see http://java.sun.com/j2se/1.3/docs/guide/jdbc/index.html.)

In connection pooling, a specified number of connections are pre-made to the underlying RDBMS (Oracle, in the reference implementation) at container start-up time. Connections are "borrowed"—that is, checked in and out of this pool—by program threads on an as-needed basis, without being opened, initialized, closed each time. This provides a dramatic improvement in the application's performance. The mechanics of the connection pool are largely hidden from the software; the standard API calls for opening and closing connections are used, although in actuality the corresponding connections are merely being checked in and out of the pool. The particular interfaces used for connection pooling can be found in the API documentation at http://java.sun.com/products/jdbc/jdbc20.stdext.javadoc/. (The pertinent classes are javax.sql.ConnectionPoolDataSource and javax.sql.PooledConnection.)

A static handle to the connection pool is managed through the dbUtils.SQLUtil class, which is implemented in Schemalive/WEB-INF/classes/dbUtils/SQLUtil.java.

This class obtains handles to pool connections using the Oracle JDBC 2.0 driver interface; the Javadocs for this API can be found at http://download.oracle.com.otn/utilities-_drivers/jdbc/817/javadoc.tar.

A file named Schemalive/WEB-INF/classes/Connection-.properties will need to be customized for each particular installation JDBCURL contains a (properly formatted) string to reference the Oracle database-server instance. The SRI currently references the Type 2 JDBC driver, and the corresponding URL is in the formaljdbx.oracle.oci.8.@<ns name>. The user and pwd properties refer to the credentials the SRI will use for database access; if/when these values need to change, the server must be restarted in order for those changes to take effect.

Run-Time Maintenance

To enhance system performance (by reducing the need for real-time database queries), the SRI maintains two caches of information.

The first is called the DataDictionary, and contains all of the metadata derived by interrogating the schema (comprising table and column names, column datatypes and sizes, referential-integrity constraints, check constraints, and view definitions). The second is called BalloonHelp, and contains all of the help information specified in the base-tables HELP_OBJECT and HELP_SCHEMA.

When changes are made to the schema structure, or to the records in the help tables, these cached objects must (variously) be refreshed. This can be done dynamically, without having to restart the container.

The DataDictionary is rebuilt by referencing the JSP DataDictionary.jsp. There are three options when rebuilding the DataDictionary: Only, Views (with check), and Views (without check). The "Only" option simply rebuilds the DataDictionary object (i.e., re-interrogates the database) without rebuilding any (system-generated) views. The other two modes regenerate these views on the fly; the "with check" mode checks to see if a given view (for a corresponding table) already exists, and rebuilds the view only if it is not found. The "without check" option does a brute-force rebuild of all system-generated views, regardless of whether or not they are already defined.

Note that while the DataDictionary is being rebuilt (which can be a lengthy process, depending on the size of the schema), users will be blocked from accessing the application.

BalloonHelp is rebuilt by referencing the JSP BalloonHelp.jsp. The current contents of the BalloonHelp object are displayed along with a link to rebuild. When the link is clicked, the cached object is refreshed from the base-tables.

Changes that are stored to these cached objects are immediately reflected within the application.

Summary

Because of its adherence to various open-standard specifications, the SRI is not dependent on any one container, but rather, can operate in any J2EE compliant container. The only customization that should be required to run the SRI in a particular environment are the variables (mentioned above and) defined within the Schemalive/WEB-INF/classes/dbUtils/SQLUtil.java.file.

```
REM ***** CreateSc[redacted]a.sql
REM *****
REM *****
REM ***** SAMPLE SCHEMALIVE SCHEMA FOR CONSULTANCY CRM -- CREATE TABLES
REM ***** v0.5
REM ***** 10/30/01


CONNECT INTERNAL/ORACLE@ORA816;
DROP USER CNSLT_CRM CASCADE;
DROP TABLESPACE CNSLT_CRM INCLUDING CONTENTS;
CREATE TABLESPACE CNSLT_CRM DATAFILE 'd:\orant\database\cnslt_crm.dat' SIZE
10M REUSE AUTOEXTEND ON MAXSIZE UNLIMITED;


CREATE USER "CNSLT_CRM" IDENTIFIED BY "CONSULTING" DEFAULT TABLESPACE
"CNSLT_CRM";
GRANT "CONNECT" TO "CNSLT_CRM";
GRANT "RESOURCE" TO "CNSLT_CRM";
GRANT "DBA" TO "CNSLT_CRM";


CONNECT CNSLT_CRM/CONSULTING@ORA816;


CREATE TABLE USERS(
   Users_Key                                NUMBER(*,0) PRIMARY KEY NOT NULL
);


CREATE TABLE CONTRACTUAL_RELATIONSHIP(
   Contractual_Relationship_Key             NUMBER(*,0) PRIMARY KEY NOT NULL,
   Contractual_Relationship_Name            VARCHAR2(50) NOT NULL,
   Description                              VARCHAR2(255),
   Entered_By_Users_Key                     NUMBER(*,0) REFERENCES
     USERS(Users_Key) NOT NULL,
   Entry_Date                               DATE DEFAULT SYSDATE NOT NULL,
   Modified_By_Users_Key                    NUMBER(*,0) REFERENCES
     USERS(Users_Key) NOT NULL,
   Last_Modified_Date                       DATE DEFAULT SYSDATE NOT NULL
);
CREATE SEQUENCE CONTRACTUAL_RELATIONSHIP_SEQ INCREMENT BY 1  START WITH    1
  NOMAXVALUE  MINVALUE 1  NOCYCLE  CACHE 10  NOORDER;


CREATE TABLE PRIORITY(
   Priority_Key                             NUMBER(*,0) PRIMARY KEY NOT NULL,
   Priority_Name                            VARCHAR2(50) NOT NULL,
   Description                              VARCHAR2(255),
   Entered_By_Users_Key                     NUMBER(*,0) REFERENCES
     USERS(Users_Key) NOT NULL,
   Entry_Date                               DATE DEFAULT SYSDATE NOT NULL,
   Modified_By_Users_Key                    NUMBER(*,0) REFERENCES
     USERS(Users_Key) NOT NULL,
   Last_Modified_Date                       DATE DEFAULT SYSDATE NOT NULL
);
CREATE SEQUENCE PRIORITY_SEQ INCREMENT BY 1  START WITH    1  NOMAXVALUE
  MINVALUE 1  NOCYCLE  CACHE 10  NOORDER;
```

```
CREATE TABLE REGION(
   Region_Key                              NUMBER(*,0) PRIMARY KEY NOT NULL,
   Region_Name                             VARCHAR2(50) NOT NULL,
   Description                             VARCHAR2(255),
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE REGION_SEQ INCREMENT BY 1  START WITH    1  NOMAXVALUE
  MINVALUE 1  NOCYCLE  CACHE 10  NOORDER;
COMMENT ON TABLE REGION IS
  '<detailTables>
     <detailTable>
       COUNTRY.Region_Key
     </detailTable>
     <detailTable>
       OPPORTUNITY.Region_Key
     </detailTable>
   </detailTables>';


CREATE TABLE COUNTRY(
   Country_Key                             NUMBER(*,0) PRIMARY KEY NOT NULL,
   Country_Name                            VARCHAR2(50),
   Region_Key                              NUMBER(*,0) REFERENCES
     REGION(Region_Key) NOT NULL,
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE COUNTRY_SEQ INCREMENT BY 1  START WITH    1  NOMAXVALUE
  MINVALUE 1  NOCYCLE  CACHE 10  NOORDER;
COMMENT ON TABLE COUNTRY IS
  '<detailTables>
     <detailTable>
       CITY.Country_Key
     </detailTable>
     <detailTable>
       STATE_OR_PROVINCE.Country_Key
     </detailTable>
   </detailTables>';


CREATE TABLE STATE_OR_PROVINCE(
   State_Or_Province_Key                   NUMBER(*,0) PRIMARY KEY NOT NULL,
   State_Or_Province_ID                    VARCHAR2(2),
   State_Or_Province_Name                  VARCHAR2(50) NOT NULL,
   Country_Key                             NUMBER(*,0) REFERENCES
     COUNTRY(Country_Key) NOT NULL,
   Entered_By_Users_Key                    NUMBER(*,0) REFERENCES
```

```
    USERS(Users_Key) NOT NULL,
   Entry_Date                               DATE DEFAULT SYSDATE NOT NULL,
   Modified_By_Users_Key                    NUMBER(*,0) REFERENCES
    USERS(Users_Key) NOT NULL,
   Last_Modified_Date                       DATE DEFAULT SYSDATE NOT NULL
);
CREATE SEQUENCE STATE_OR_PROVINCE_SEQ INCREMENT BY 1  START WITH    1
  NOMAXVALUE  MINVALUE 1  NOCYCLE  CACHE 10  NOORDER;
COMMENT ON TABLE STATE_OR_PROVINCE IS
  '<hints>
    <detailTables>
      <detailTable>
        CITY.State_Or_Province_Key
      </detailTable>
    </detailTables>
  </hints>';


CREATE TABLE CITY(
   City_Key                                 NUMBER(*,0) PRIMARY KEY NOT NULL,
   City_Name                                VARCHAR2(50) NOT NULL,
   State_Or_Province_Key                    NUMBER(*,0) REFERENCES
    STATE_OR_PROVINCE(State_Or_Province_Key),
   Country_Key                              NUMBER(*,0) REFERENCES
    COUNTRY(Country_Key) NOT NULL,
   Entered_By_Users_Key                     NUMBER(*,0) REFERENCES
    USERS(Users_Key) NOT NULL,
   Entry_Date                               DATE DEFAULT SYSDATE NOT NULL,
   Modified_By_Users_Key                    NUMBER(*,0) REFERENCES
    USERS(Users_Key) NOT NULL,
   Last_Modified_Date                       DATE DEFAULT SYSDATE NOT NULL
);
CREATE SEQUENCE CITY_SEQ INCREMENT BY 1  START WITH    1  NOMAXVALUE
  MINVALUE 1  NOCYCLE  CACHE 10  NOORDER;
COMMENT ON TABLE CITY IS
  '<hints>
    <sql>
      SELECT
       A.City_Key,
       A.City_Name ||
   DECODE(B.State_Or_Province_ID,
      NULL,
          DECODE(B.State_or_Province_Name,    NULL,
            DECODE(C.Country_Name, NULL, NULL,
                         '''', NULL,
                         '' '', NULL,
                         '', '' || C.Country_Name),
                  '''',
            DECODE(C.Country_Name, NULL, NULL,
                         '''', NULL,
                         '' '', NULL,
                         '', '' || C.Country_Name),
                  '' '',
            DECODE(C.Country_Name, NULL, NULL,
                         '''', NULL,
                         '' '', NULL,
                         '', '' || C.Country_Name),
                  '', '' || B.State_or_Province_Name
```

```
        ),
    '''',
        DECODE(B.State_or_Province_Name,     NULL,
          DECODE(C.Country_Name, NULL, NULL,
                          '''', NULL,
                          '' '', NULL,
                          '', '' || C.Country_Name),
                    '''',
          DECODE(C.Country_Name, NULL, NULL,
                          '''', NULL,
                          '' '', NULL,
                          '', '' || C.Country_Name),
                    '' '',
          DECODE(C.Country_Name, NULL, NULL,
                          '''', NULL,
                          '' '', NULL,
                          '', '' || C.Country_Name),
                    '', '' || B.State_or_Province_Name
        ),
    '' '',
        DECODE(B.State_or_Province_Name,     NULL,
          DECODE(C.Country_Name, NULL, NULL,
                          '''', NULL,
                          '' '', NULL,
                          '', '' || C.Country_Name),
                    '''',
          DECODE(C.Country_Name, NULL, NULL,
                          '''', NULL,
                          '' '', NULL,
                          '', '' || C.Country_Name),
                    '' '',
          DECODE(C.Country_Name, NULL, NULL,
                          '''', NULL,
                          '' '', NULL,
                          '', '' || C.Country_Name),
                    '', '' || B.State_or_Province_Name
        ),
    '', '' || B.State_Or_Province_ID
  )       AS City
     FROM
     CITY A, STATE_OR_PROVINCE B, COUNTRY C
     WHERE
     A.State_or_Province_Key = B.State_or_Province_Key (+)
     AND
     A.Country_Key = C.Country_Key (+)
     ORDER BY
     2
   </sql>
 </hints>';

CREATE TABLE COMPANY(
   Company_Key                              NUMBER(*,0) PRIMARY KEY NOT NULL,
   Company_Name                             VARCHAR2(50) NOT NULL,
   NDA_Flag                                 NUMBER(1,0) DEFAULT 0 NOT NULL,
   Contractual_Relationship_Key             NUMBER(*,0) REFERENCES
     CONTRACTUAL_RELATIONSHIP(Contractual_Relationship_Key) NOT NULL,
   Priority_Key                             NUMBER(*,0) REFERENCES
```

```
    PRIORITY(Priority_Key) NOT NULL,
  Address_1                              VARCHAR2(80),
  Address_2                              VARCHAR2(80),
  City_Key                               NUMBER(*,0) REFERENCES
    CITY(City_Key),
  State_Or_Province_Key                  NUMBER(*,0) REFERENCES
    STATE_OR_PROVINCE(State_Or_Province_Key),
  Postal_Code                            VARCHAR2(10),
  Country_Key                            NUMBER(*,0) REFERENCES
    COUNTRY(Country_Key),
  Phone                                  VARCHAR2(80),
  Company_URL                            VARCHAR2(255),
  Notes                                  VARCHAR2(4000),
  Entered_By_Users_Key                   NUMBER(*,0) REFERENCES
    USERS(Users_Key) NOT NULL,
  Entry_Date                             DATE DEFAULT SYSDATE NOT NULL,
  Modified_By_Users_Key                  NUMBER(*,0) REFERENCES
    USERS(Users_Key) NOT NULL,
  Last_Modified_Date                     DATE DEFAULT SYSDATE NOT NULL
);
CREATE SEQUENCE COMPANY_SEQ INCREMENT BY 1  START WITH    1  NOMAXVALUE
  MINVALUE 1  NOCYCLE  CACHE 10  NOORDER;
COMMENT ON TABLE COMPANY IS
  '<hints>
    <detailTables>
      <detailTable>
        PEOPLE.Company_Key
      </detailTable>
    </detailTables>
  </hints>';


CREATE TABLE PEOPLE(
  People_Key                             NUMBER(*,0) PRIMARY KEY NOT NULL,
  Last_Name                              VARCHAR2(30) NOT NULL,
  First_Name                             VARCHAR2(30) NOT NULL,
  Middle_Name                            VARCHAR2(30),
  Company_Key                            NUMBER(*,0) REFERENCES
    COMPANY(Company_Key) CONSTRAINT nn_company NOT NULL,
  Job_Title                              VARCHAR2(50),
  Salutation_Name                        VARCHAR2(30),
  Address_1                              VARCHAR2(80),
  Address_2                              VARCHAR2(80),
  City_Key                               NUMBER(*,0) REFERENCES
    CITY(City_Key) CONSTRAINT nn_city NOT NULL,
  State_Or_Province_Key                  NUMBER(*,0) REFERENCES
    STATE_OR_PROVINCE(State_Or_Province_Key),
  Postal_Code                            VARCHAR2(10),
  Country_Key                            NUMBER(*,0) REFERENCES
    COUNTRY(Country_Key) CONSTRAINT nn_country NOT NULL,
  Work_Phone                             VARCHAR2(80),
  Cell_Phone                             VARCHAR2(80),
  Work_Fax                               VARCHAR2(80),
  Work_Pager                             VARCHAR2(80),
  Work_Email                             VARCHAR2(80),
  Active_Flag                            NUMBER(1,0) DEFAULT 0 NOT NULL,
  Login_ID                               VARCHAR2(30),
  Notes                                  VARCHAR2(4000),
```

```
   Entered_By_Users_Key                          NUMBER(*,0) REFERENCES
     USERS(Users_Key) NOT NULL,
   Entry_Date                                    DATE DEFAULT SYSDATE NOT NULL,
   Modified_By_Users_Key                         NUMBER(*,0) REFERENCES
     USERS(Users_Key) NOT NULL,
   Last_Modified_Date                            DATE DEFAULT SYSDATE NOT NULL
);
CREATE SEQUENCE PEOPLE_SEQ INCREMENT BY 1  START WITH    1  NOMAXVALUE
  MINVALUE 1  NOCYCLE  CACHE 10  NOORDER;


CREATE TABLE OPPORTUNITY_STATUS(
   Opportunity_Status_Key                        NUMBER(*,0) PRIMARY KEY NOT NULL,
   Opportunity_Status_Name                       VARCHAR2(50) NOT NULL,
   Description                                   VARCHAR2(255),
   Entered_By_Users_Key                          NUMBER(*,0) REFERENCES
     USERS(Users_Key) NOT NULL,
   Entry_Date                                    DATE DEFAULT SYSDATE NOT NULL,
   Modified_By_Users_Key                         NUMBER(*,0) REFERENCES
     USERS(Users_Key) NOT NULL,
   Last_Modified_Date                            DATE DEFAULT SYSDATE NOT NULL
);
CREATE SEQUENCE OPPORTUNITY_STATUS_SEQ INCREMENT BY 1  START WITH    1
  NOMAXVALUE  MINVALUE 1  NOCYCLE  CACHE 10  NOORDER;


CREATE TABLE OPPORTUNITY(
   Opportunity_Key                               NUMBER(*,0) PRIMARY KEY NOT NULL,
   Opportunity_Title                             VARCHAR2(50) NOT NULL,
   Opportunity_Date                              DATE NOT NULL,
   Contact_Person_Key                            NUMBER(*,0) REFERENCES
     PEOPLE(People_Key) NOT NULL,
   Region_Key                                    NUMBER(*,0) REFERENCES
     REGION(Region_Key) NOT NULL,
   Revenue_Potential                             NUMBER(*,2),
   Profit_Potential                              NUMBER(*,2),
   Amount_Spent_YTD                              NUMBER(*,2),
   Probability_Of_Success                        NUMBER(2,0) NOT NULL CHECK
     (Probability_Of_Success BETWEEN 0 AND 99),
   Referred_By_Key                               NUMBER(*,0) REFERENCES
     PEOPLE(People_Key) NOT NULL,
   Opportunity_Status_Key                        NUMBER(*,0) REFERENCES
     OPPORTUNITY_STATUS(Opportunity_Status_Key) NOT NULL,
   Notes                                         VARCHAR2(4000),
   Entered_By_Users_Key                          NUMBER(*,0) REFERENCES
     USERS(Users_Key) NOT NULL,
   Entry_Date                                    DATE DEFAULT SYSDATE NOT NULL,
   Modified_By_Users_Key                         NUMBER(*,0) REFERENCES
     USERS(Users_Key) NOT NULL,
   Last_Modified_Date                            DATE DEFAULT SYSDATE NOT NULL
);
CREATE SEQUENCE OPPORTUNITY_SEQ INCREMENT BY 1  START WITH    1  NOMAXVALUE
  MINVALUE 1  NOCYCLE  CACHE 10  NOORDER;
COMMENT ON TABLE OPPORTUNITY IS
  '<hints>
    <sql>
      SELECT
       A.Opportunity_Key,
```

```
      A.Opportunity_Title
      FROM
      Opportunity A
      WHERE
      A.Opportunity_Key IS NOT NULL
      ORDER BY
      1
   </sql>
   <detailTables>
     <detailTable>
       CONTACT_EVENT.Opportunity_Key
     </detailTable>
     <detailTable>
       OPPORTUNITY_TYPE.Opportunity_Key
     </detailTable>
   </detailTables>
 </hints>';

CREATE TABLE CONTACT_TYPE(
   Contact_Type_Key                        NUMBER(*,0) PRIMARY KEY NOT NULL,
   Contact_Type_Name                       VARCHAR2(50) NOT NULL,
   Description                             VARCHAR2(255),
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE CONTACT_TYPE_SEQ INCREMENT BY 1  START WITH   1  NOMAXVALUE
  MINVALUE 1  NOCYCLE  CACHE 10  NOORDER;

CREATE TABLE CONTACT_EVENT(
   Contact_Event_Key                       NUMBER(*,0) PRIMARY KEY NOT NULL,
   Contact_Event_Title                     VARCHAR2(255),
   Opportunity_Key                         NUMBER(*,0) REFERENCES
     OPPORTUNITY(Opportunity_Key) NOT NULL,
   Contact_Type_Key                        NUMBER(*,0) REFERENCES
     CONTACT_TYPE(Contact_Type_Key) NOT NULL,
   Previous_Event_Key                      NUMBER(*,0) REFERENCES
     CONTACT_EVENT(Contact_Event_Key),
   Event_Date                              DATE,
   Notes                                   VARCHAR2(4000),
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE CONTACT_EVENT_SEQ INCREMENT BY 1  START WITH   1  NOMAXVALUE
  MINVALUE 1  NOCYCLE  CACHE 10  NOORDER;
COMMENT ON TABLE CONTACT_EVENT IS
  '<detailTables>
     <detailTable>
       CONTACT_PARTICIPANTS.Contact_Event_Key
```

```
    </detailTable>
  </detailTables>';

CREATE TABLE CONTACT_PARTICIPANTS(
   Contact_Participant_Key                        NUMBER(*,0) PRIMARY KEY NOT NULL,
   Contact_Event_Key                              NUMBER(*,0) REFERENCES
     CONTACT_EVENT(Contact_Event_Key) NOT NULL,
   People_Key                                     NUMBER(*,0) REFERENCES
     PEOPLE(People_Key) NOT NULL,
   Entered_By_Users_Key                           NUMBER(*,0) REFERENCES
     USERS(Users_Key) NOT NULL,
   Entry_Date                                     DATE DEFAULT SYSDATE NOT NULL,
   Modified_By_Users_Key                          NUMBER(*,0) REFERENCES
     USERS(Users_Key) NOT NULL,
   Last_Modified_Date                             DATE DEFAULT SYSDATE NOT NULL
);
CREATE SEQUENCE CONTACT_PARTICIPANTS_SEQ INCREMENT BY 1  START WITH    1
  NOMAXVALUE  MINVALUE 1  NOCYCLE  CACHE 10  NOORDER;
COMMENT ON TABLE CONTACT_PARTICIPANTS IS
  '<detailTables>
     <detailTable>
       FOLLOW_UP_ACTIONS.Contact_Participant_Key
     </detailTable>
   </detailTables>';

CREATE TABLE FOLLOW_UP_ACTIONS(
   FOLLOW_UP_Actions_Key                          NUMBER(*,0) PRIMARY KEY NOT NULL,
   Contact_Participant_Key                        NUMBER(*,0) REFERENCES
     CONTACT_PARTICIPANTS(Contact_Participant_Key) NOT NULL,
   Description                                    VARCHAR2(255),
   Due_Date                                       DATE,
   Completed_Date                                 DATE,
   Entered_By_Users_Key                           NUMBER(*,0) REFERENCES
     USERS(Users_Key) NOT NULL,
   Entry_Date                                     DATE DEFAULT SYSDATE NOT NULL,
   Modified_By_Users_Key                          NUMBER(*,0) REFERENCES
     USERS(Users_Key) NOT NULL,
   Last_Modified_Date                             DATE DEFAULT SYSDATE NOT NULL
);
CREATE SEQUENCE FOLLOW_UP_ACTIONS_SEQ INCREMENT BY 1  START WITH    1
  NOMAXVALUE  MINVALUE 1  NOCYCLE  CACHE 10  NOORDER;

CREATE TABLE PRODUCTS_AND_SERVICES(
   Products_And_Services_Key                      NUMBER(*,0) PRIMARY KEY NOT NULL,
   Products_And_Services_Name                     VARCHAR2(50) NOT NULL,
   Description                                    VARCHAR2(255),
   Entered_By_Users_Key                           NUMBER(*,0) REFERENCES
     USERS(Users_Key) NOT NULL,
   Entry_Date                                     DATE DEFAULT SYSDATE NOT NULL,
   Modified_By_Users_Key                          NUMBER(*,0) REFERENCES
     USERS(Users_Key) NOT NULL,
   Last_Modified_Date                             DATE DEFAULT SYSDATE NOT NULL
);
CREATE SEQUENCE PRODUCTS_AND_SERVICES_SEQ INCREMENT BY 1  START WITH    1
  NOMAXVALUE  MINVALUE 1  NOCYCLE  CACHE 10  NOORDER;
```

```
CREATE TABLE OPPORTUNITY_TYPE(
   Opportunity_Type_Key                   NUMBER(*,0) PRIMARY KEY NOT NULL,
   Opportunity_Key                        NUMBER(*,0) REFERENCES
     OPPORTUNITY(Opportunity_Key) NOT NULL,
   Products_And_Services_Key              NUMBER(*,0) REFERENCES
     PRODUCTS_AND_SERVICES(Products_And_Services_Key) NOT NULL,
   Entered_By_Users_Key                   NUMBER(*,0) REFERENCES
     USERS(Users_Key) NOT NULL,
   Entry_Date                             DATE DEFAULT SYSDATE NOT NULL,
   Modified_By_Users_Key                  NUMBER(*,0) REFERENCES
     USERS(Users_Key) NOT NULL,
   Last_Modified_Date                     DATE DEFAULT SYSDATE NOT NULL
);
CREATE SEQUENCE OPPORTUNITY_TYPE_SEQ INCREMENT BY 1  START WITH    1
  NOMAXVALUE  MINVALUE 1  NOCYCLE  CACHE 10  NOORDER;

ALTER TABLE USERS ADD(
-- Users_Key                              NUMBER(*,0) PRIMARY KEY NOT NULL,
   People_Key                             NUMBER(*,0) UNIQUE REFERENCES
     PEOPLE(People_Key) CONSTRAINT nn_people NOT NULL,
   Login_ID                               VARCHAR2(30) NOT NULL,
   Entered_By_Users_Key                   NUMBER(*,0) NOT NULL CONSTRAINT
     fk_users_to_entered_by REFERENCES USERS(Users_Key),
   Entry_Date                             DATE DEFAULT SYSDATE NOT NULL,
   Modified_By_Users_Key                  NUMBER(*,0) NOT NULL CONSTRAINT
     fk_users_to_modified_by REFERENCES USERS(Users_Key),
   Last_Modified_Date                     DATE DEFAULT SYSDATE NOT NULL
);
CREATE SEQUENCE USERS_SEQ INCREMENT BY 1  START WITH    1  NOMAXVALUE
  MINVALUE 1  NOCYCLE  CACHE 10  NOORDER;
ALTER TABLE USERS DISABLE CONSTRAINT nn_people;
ALTER TABLE USERS DISABLE CONSTRAINT fk_users_to_entered_by;
ALTER TABLE USERS DISABLE CONSTRAINT fk_users_to_modified_by;
INSERT INTO USERS
   (Users_Key, Login_ID, Entered_By_Users_Key, Modified_By_Users_Key)
VALUES
   (USERS_SEQ.NextVal, 'DEVONSHIRE\mpk', USERS_SEQ.NextVal,
   USERS_SEQ.NextVal);
ALTER TABLE USERS ENABLE CONSTRAINT fk_users_to_entered_by;
ALTER TABLE USERS ENABLE CONSTRAINT fk_users_to_modified_by;
COMMENT ON TABLE USERS IS
  '<hints>
    <detailTables>
      <detailTable>
        SECURITY_GROUP_USER.Users_Key
      </detailTable>
    </detailTables>
  </hints>';
ALTER TABLE PEOPLE DISABLE CONSTRAINT nn_company;
ALTER TABLE PEOPLE DISABLE CONSTRAINT nn_city;
ALTER TABLE PEOPLE DISABLE CONSTRAINT nn_country;
INSERT INTO PEOPLE
   (People_Key, Last_Name, First_Name, Middle_Name, Active_Flag,
   Entered_By_Users_Key, Modified_By_Users_Key)
VALUES
   (PEOPLE_SEQ.NextVal, 'Kaufman', 'Michael', 'Philip', 1, (SELECT
```

```
  MIN(Users_Key) FROM USERS), (SELECT MIN(Users_Key) FROM USERS));
UPDATE USERS SET People_Key = (SELECT MIN(People_Key) FROM PEOPLE) WHERE
Users_Key = (SELECT MIN(Users_Key) FROM USERS);
ALTER TABLE USERS ENABLE CONSTRAINT nn_people;

CREATE TABLE SECURITY_TABLE(
   Security_Table_Key                        NUMBER(*,0) PRIMARY KEY NOT NULL,
   Security_Table_Name                       VARCHAR2(50) UNIQUE NOT NULL,
   Entered_By_Users_Key                      NUMBER(*,0) REFERENCES
     USERS(Users_Key) NOT NULL,
   Entry_Date                                DATE DEFAULT SYSDATE NOT NULL,
   Modified_By_Users_Key                     NUMBER(*,0) REFERENCES
     USERS(Users_Key) NOT NULL,
   Last_Modified_Date                        DATE DEFAULT SYSDATE NOT NULL
);
CREATE SEQUENCE SECURITY_TABLE_SEQ INCREMENT BY 1  START WITH    1
  NOMAXVALUE  MINVALUE 1  NOCYCLE  CACHE 10  NOORDER;
COMMENT ON TABLE SECURITY_TABLE IS
  '<hints>
    <detailTables>
      <detailTable>
        SECURITY_GROUP_TABLE.Security_Table_Key
      </detailTable>
    </detailTables>
  </hints>';


CREATE TABLE SECURITY_GROUP(
   Security_Group_Key                        NUMBER(*,0) PRIMARY KEY NOT NULL,
   Security_Group_Name                       VARCHAR2(50) UNIQUE NOT NULL,
   Entered_By_Users_Key                      NUMBER(*,0) REFERENCES
     USERS(Users_Key) NOT NULL,
   Entry_Date                                DATE DEFAULT SYSDATE NOT NULL,
   Modified_By_Users_Key                     NUMBER(*,0) REFERENCES
     USERS(Users_Key) NOT NULL,
   Last_Modified_Date                        DATE DEFAULT SYSDATE NOT NULL
);
CREATE SEQUENCE SECURITY_GROUP_SEQ INCREMENT BY 1  START WITH    1
  NOMAXVALUE  MINVALUE 1  NOCYCLE  CACHE 10  NOORDER;
COMMENT ON TABLE SECURITY_GROUP IS
  '<detailTables>
     <detailTable>
       SECURITY_GROUP_USER.Security_Group_Key
     </detailTable>
     <detailTable>
       SECURITY_GROUP_TABLE.Security_Group_Key
     </detailTable>
   </detailTables>';


CREATE TABLE SECURITY_GROUP_USER(
   Security_Group_User_Key                   NUMBER(*,0) PRIMARY KEY NOT NULL,
   Security_Group_Key                        NUMBER(*,0) REFERENCES
     SECURITY_GROUP(Security_Group_Key) NOT NULL,
   Users_Key                                 NUMBER(*,0) REFERENCES
     USERS(Users_Key) NOT NULL,
   Entered_By_Users_Key                      NUMBER(*,0) REFERENCES
     USERS(Users_Key) NOT NULL,
```

```
   Entry_Date                                     DATE DEFAULT SYSDATE NOT NULL,
   Modified_By_Users_Key                          NUMBER(*,0) REFERENCES
     USERS(Users_Key) NOT NULL,
   Last_Modified_Date                             DATE DEFAULT SYSDATE NOT NULL
);
CREATE SEQUENCE SECURITY_GROUP_USER_SEQ INCREMENT BY 1  START WITH    1
  NOMAXVALUE  MINVALUE 1  NOCYCLE  CACHE 10  NOORDER;

CREATE TABLE SECURITY_GROUP_TABLE(
   Security_Group_Table_Key                       NUMBER(*,0) PRIMARY KEY NOT NULL,
   Security_Group_Key                             NUMBER(*,0) REFERENCES
     SECURITY_GROUP(Security_Group_Key) NOT NULL,
   Security_Table_Key                             NUMBER(*,0) REFERENCES
     SECURITY_TABLE(Security_Table_Key) NOT NULL,
   Can_Browse_Flag                                NUMBER(1,0) DEFAULT 0 NOT NULL,
   Can_Edit_Flag                                  NUMBER(1,0) DEFAULT 0 NOT NULL,
   Can_Add_Flag                                   NUMBER(1,0) DEFAULT 0 NOT NULL,
   Can_Delete_Flag                                NUMBER(1,0) DEFAULT 0 NOT NULL,
   Entered_By_Users_Key                           NUMBER(*,0) REFERENCES
     USERS(Users_Key) NOT NULL,
   Entry_Date                                     DATE DEFAULT SYSDATE NOT NULL,
   Modified_By_Users_Key                          NUMBER(*,0) REFERENCES
     USERS(Users_Key) NOT NULL,
   Last_Modified_Date                             DATE DEFAULT SYSDATE NOT NULL
);
CREATE SEQUENCE SECURITY_GROUP_TABLE_SEQ  INCREMENT BY 1  START WITH    1
  NOMAXVALUE  MINVALUE 1  NOCYCLE  CACHE 10  NOORDER;

INSERT INTO SECURITY_TABLE
   (Security_Table_Key, Security_Table_Name, Entered_By_Users_Key,
   Modified_By_Users_Key)
SELECT
   SECURITY_TABLE_SEQ.NextVal, Table_Name, (SELECT MIN(Users_Key) FROM
   USERS), (SELECT MIN(Users_Key) FROM USERS)
FROM
   USER_TABLES;


INSERT INTO SECURITY_GROUP
   (Security_Group_Key, Security_Group_Name, Entered_By_Users_Key,
   Modified_By_Users_Key)
VALUES
   (SECURITY_GROUP_SEQ.NextVal, 'Administrator', (SELECT MIN(Users_Key) FROM
   USERS), (SELECT MIN(Users_Key) FROM USERS));
INSERT INTO SECURITY_GROUP
   (Security_Group_Key, Security_Group_Name, Entered_By_Users_Key,
   Modified_By_Users_Key)
VALUES
   (SECURITY_GROUP_SEQ.NextVal, 'Regular', (SELECT MIN(Users_Key) FROM
   USERS), (SELECT MIN(Users_Key) FROM USERS));


INSERT INTO SECURITY_GROUP_USER
   (Security_Group_User_Key, Security_Group_Key, Users_Key,
   Entered_By_Users_Key, Modified_By_Users_Key)
VALUES
   (SECURITY_GROUP_USER_SEQ.NextVal, (SELECT MIN(Security_Group_Key) FROM
   SECURITY_GROUP), (SELECT MIN(Users_Key) FROM USERS), (SELECT
```

```
  MIN(Users_Key) FROM USERS), (SELECT MIN(Users_Key) FROM USERS));

INSERT INTO SECURITY_GROUP_TABLE
   (Security_Group_Table_Key, Security_Group_Key, Security_Table_Key,
   Can_Browse_Flag, Can_Edit_Flag, Can_Add_Flag, Can_Delete_Flag,
   Entered_By_Users_Key, Modified_By_Users_Key)
SELECT
   SECURITY_GROUP_TABLE_SEQ.NextVal, (SELECT MIN(Security_Group_Key) FROM
   SECURITY_GROUP), Security_Table_Key, 1, 1, 1, 0, (SELECT MIN(Users_Key)
   FROM USERS), (SELECT MIN(Users_Key) FROM USERS)
FROM
   SECURITY_TABLE;
INSERT INTO SECURITY_GROUP_TABLE
   (Security_Group_Table_Key, Security_Group_Key, Security_Table_Key,
   Can_Browse_Flag, Can_Edit_Flag, Can_Add_Flag, Can_Delete_Flag,
   Entered_By_Users_Key, Modified_By_Users_Key)
SELECT
   SECURITY_GROUP_TABLE_SEQ.NextVal, (SELECT MAX(Security_Group_Key) FROM
   SECURITY_GROUP), Security_Table_Key, 1, 0, 0, 0, (SELECT MIN(Users_Key)
   FROM USERS), (SELECT MIN(Users_Key) FROM USERS)
FROM
   SECURITY_TABLE;


CREATE TABLE HELP_SCHEMA(
   Help_Schema_Key                         NUMBER(*,0) PRIMARY KEY NOT NULL,
   Help_Schema_Table                       VARCHAR2(30),
   Help_Schema_Column                      VARCHAR2(30),
   PopUp_Text                              VARCHAR2(4000),
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE HELP_SCHEMA_SEQ INCREMENT BY 1  START WITH    1  NOMAXVALUE
  MINVALUE 1  NOCYCLE  CACHE 10  NOORDER;


CREATE TABLE HELP_OBJECT(
   Help_Object_Key                         NUMBER(*,0) PRIMARY KEY NOT NULL,
   Help_Object_Name                        VARCHAR2(255),
   PopUp_Text                              VARCHAR2(4000),
   Entered_By_Users_Key                    NUMBER(*,0) REFERENCES
     USERS(Users_Key) NOT NULL,
   Entry_Date                              DATE DEFAULT SYSDATE NOT NULL,
   Modified_By_Users_Key                   NUMBER(*,0) REFERENCES
     USERS(Users_Key) NOT NULL,
   Last_Modified_Date                      DATE DEFAULT SYSDATE NOT NULL
);
CREATE SEQUENCE HELP_OBJECT_SEQ INCREMENT BY 1  START WITH    1  NOMAXVALUE
  MINVALUE 1  NOCYCLE  CACHE 10  NOORDER;
INSERT INTO HELP_OBJECT
   (Help_Object_Key, Help_Object_Name, PopUp_Text, Entered_By_Users_Key,
   Modified_By_Users_Key)
VALUES
```

```
   (HELP_OBJECT_SEQ.NextVal, 'stackLink', 'These links track your current
   "stack" of pending table-sessions (which result from following drill-down
   and/or master/detail links). You can "jump" back up to any previous stack-
   level (and abandon all intervening levels) by clicking on the
   corresponding link.', (SELECT MIN(Users_Key) FROM USERS), (SELECT
   MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'powerAddCheckbox', 'When enabled, "power add"
   locks you into ADD mode for the current table (rather than returning you
   to BROWSE mode after you add the current record).<p>This is useful when
   you need to add multiple records to the same table.<p>When you turn "power
   add" on, it remains on only until you leave ADD mode, navigate to another
   table, or explicitly turn it off.', (SELECT MIN(Users_Key) FROM USERS),
   (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'navAddLink', 'Adds a new record to this
   table.', (SELECT MIN(Users_Key) FROM USERS), (SELECT MIN(Users_Key) FROM
   USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'navFullBrowseLink', 'Browse the current table
   in its entirety (removing any filters currently in effect).', (SELECT
   MIN(Users_Key) FROM USERS), (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'drillLink', 'Allows you to "drill down" to the
   underlying table for the dropdown to the right. If the dropdown shows a
   value, this link will edit the corresponding record. If the dropdown is
   empty, this link will add a new record to the corresponding table.',
   (SELECT MIN(Users_Key) FROM USERS), (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'editLink', 'Takes you to EDIT mode for this
   record.', (SELECT MIN(Users_Key) FROM USERS), (SELECT MIN(Users_Key) FROM
   USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'navNewSearchLink', 'Specify a new search filter
```

```
   (from scratch) for this table.', (SELECT MIN(Users_Key) FROM USERS),
   (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'navFilteredBrowseLink', 'Browse the current
   table without resetting any current filters.', (SELECT MIN(Users_Key) FROM
   USERS), (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'expressEditCheckbox', 'When enabled, "express
   edit" will skip directly from SEARCH mode to EDIT mode (bypassing BROWSE
   mode) if your search finds exactly one matching record.<p>This also
   applies when master/detail drill-downs find exactly one child record.<p>
   Once you turn "express edit" on, it remains on until you explicitly turn
   it off.', (SELECT MIN(Users_Key) FROM USERS), (SELECT MIN(Users_Key) FROM
   USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'quickDrop', 'Restarts your session on the
   selected table (in either BROWSE or SEARCH mode, according to your
   selection from the radio buttons above).', (SELECT MIN(Users_Key) FROM
   USERS), (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'quickLink', 'Restarts your session on this
   table (in either BROWSE or SEARCH mode, according to your selection from
   the radio buttons to the left).', (SELECT MIN(Users_Key) FROM USERS),
   (SELECT MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'mdLink', 'Allows you to "drill down" to a
   detail (or child) table for the current (master, or parent) table.<p>When
   you drill-down to a child table, your entire working context is
   constrained so that only records belonging to the current master-table
   record are visible.', (SELECT MIN(Users_Key) FROM USERS), (SELECT
   MIN(Users_Key) FROM USERS));

INSERT INTO HELP_OBJECT
   (Help_Object_Key, Help_Object_Name, PopUp_Text, Entered_By_Users_Key,
   Modified_By_Users_Key)
VALUES
   (HELP_OBJECT_SEQ.NextVal, 'navRevisedSearchLink', 'Revise the current
   search filter for this table.', (SELECT MIN(Users_Key) FROM USERS),
```

```
(SELECT MIN(User_Key) FROM USERS));

CREATE OR REPLACE FUNCTION FORMATTED_NAME (RecordID IN NUMBER) RETURN
VARCHAR2 AS
    CURSOR c1 IS SELECT DISTINCT LAST_NAME, FIRST_NAME, MIDDLE_NAME FROM
    PEOPLE WHERE People_Key = RecordID;
    retval  VARCHAR2(32767);
BEGIN
    retval := '';
    FOR name_rec IN c1 LOOP
        retval := name_rec.LAST_NAME || ', ' || name_rec.FIRST_NAME || ' ' ||
        name_rec.MIDDLE_NAME;
    END LOOP;
    RETURN retval;
    EXCEPTION
        WHEN NO_DATA_FOUND THEN
            RETURN retval;
END FORMATTED_NAME;

CREATE OR REPLACE FUNCTION SHOW_BOOLEAN (BooleanValue IN NUMBER) RETURN
VARCHAR2 AS
BEGIN
    IF (BooleanValue <> 0) THEN RETURN '<center>&times;</center>'; END IF;
    RETURN '';
END SHOW_BOOLEAN;

REM ***** Must complete data-entry for "lead user" before executing following
modifications:
--- ALTER TABLE PEOPLE ENABLE CONSTRAINT nn_company;
--- ALTER TABLE PEOPLE ENABLE CONSTRAINT nn_city;
--- ALTER TABLE PEOPLE ENABLE CONSTRAINT nn_country;
```

We claim:

1. A method for operating a server comprising a processor for automatically generating an end-user interface for working with the data within a relational database defined within a relational DBMS whose data is stored in machine-readable media and which is accessible to said server, wherein said relational database comprises a plurality of tables, constraints and relationships stored in said DBMS in accordance with a data model comprising said tables and their column-complements and datatypes, said constraints, and the relationships across said tables, and wherein said relational database may be of any arbitrary size or complexity, said method comprising (a) providing an output stream from said server, for user display and input devices, defining a user interface paradigm comprising a set of modes for interacting with a given database table, said modes comprising create, retrieve, update and delete, and a corresponding display format for each mode;

(b) causing said server to scan said database and apply a body of rules to determine the table structures, constraints and relationships of said data model, and store representations thereof in machine-readable media accessible to said server; and (c) causing said server to use said representations to construct a corresponding client application for access through said user display and input devices, wherein said client application provides a connection to said database, provides displays of the table contents of said database for each of said modes in accordance with the display formats of said paradigm, integrates into each said mode display processes for representing, navigating, and managing said relationships across tables, for selecting among said modes, and for navigating across said tables and interacting in accordance the selected mode with the data in the tables that are reached by said navigation, while observing and enforcing relational interdependencies among data across said tables.

2. The method of claim 1, further comprising incorporating within said client application components for revealing and enforcing non-relational constraints defined within said database for each individual table-column.

3. The method of claim 1, wherein said relational interdependencies are embodied in referential-integrity constraints within the underlying database.

4. A computer-implemented system for automatically generating an end-user interface for working with the data within a relational database defined within a relational DBMS whose data is stored in machine-readable media and which is accessible to said system, wherein said relational database comprises a plurality of tables, constraints and relationships in accordance with a data model comprising said tables and their column-complements and datatypes, said constraints, and the relationships across said tables, and wherein said relational database may be of any arbitrary size or complexity, said system comprising a server comprising a processor, said server further comprising:

(a) machine-readable routines to provide an output stream for user display and input devices, defining a user interface paradigm comprising a set of modes for interacting with a given database table, said modes comprising create, retrieve, update and delete, and a corresponding display format for each mode;

(b) machine-readable routines for scanning said database and applying a body of rules to determine the table structures, constraints and relationships of said data model, and for storing representations thereof; and (c) machine-readable routines for using said representations to construct a corresponding client application, wherein said client application provides a connection to said database, provides displays of the table contents of said database for each of said modes in accordance with the display formats of said paradigm, integrates into each said mode display processes for representing, navigating, and managing said relationships across tables, for selecting among said modes, and for navigating across said tables and interacting in accordance the selected mode with the data in the tables that are reached by said navigation, while observing and enforcing relational interdependencies among data across said tables.

5. A computer-readable storage medium containing a set of instructions for a general purpose computer, for automatically generating an end-user interface for working with the data within a relational database, wherein said relational database comprises a plurality of tables, constraints and relationships in accordance with a data model comprising said tables and their column-complements and datatypes, said constraints, and the relationships across said tables, and wherein said relational database may be of any arbitrary size or complexity, said set of instructions comprising:

(a) a routine for providing a user interface paradigm comprising a set of modes for interacting with a given database table, said modes comprising create, retrieve, update and delete, and a corresponding display format for each mode;

(b) a routine for scanning said database and applying a body of rules to determine the table structures, constraints and relationships of said data model, and for storing representations thereof; and (c) a routine for using said representations to construct a corresponding client application, wherein said client application provides a connection to said database, provides displays of the table contents of said database for each of said modes in accordance with the display formats of said paradigm, integrates into each said mode display processes for representing, navigating, and managing said relationships across tables, for selecting among said modes, and for navigating across said tables and interacting in accordance the selected mode with the data in the tables that are reached by said navigation, while observing and enforcing relational interdependencies among data across said tables.

6. The computer-readable medium of claim 5, wherein said set of instructions are integrated with an RDBMS also provided in machinereadable form.

* * * * *